(12) United States Patent
Richards

(10) Patent No.: US 6,292,810 B1
(45) Date of Patent: Sep. 18, 2001

(54) POLYMORPHIC ENHANCED MODELING

(76) Inventor: Richard Steele Richards, 4838 Brandon Creek Dr., Boulder, CO (US) 80301

( * ) Notice: Subject to any disclaimer, the term of this patent is extended or adjusted under 35 U.S.C. 154(b) by 0 days.

(21) Appl. No.: 09/034,700

(22) Filed: Mar. 3, 1998

Related U.S. Application Data

(60) Provisional application No. 60/038,569, filed on Mar. 3, 1997.

(51) Int. Cl.[7] .................................................. G06F 17/21
(52) U.S. Cl. ........................ 707/503; 707/100; 345/352
(58) Field of Search .................................... 707/503, 504, 707/903, 904, 905, 506, 509, 100, 101, 102, 103 R; 345/339, 352–355; 709/220–222

(56) References Cited

U.S. PATENT DOCUMENTS

| | | |
|---|---|---|
| 4,982,344 | 1/1991 | Jordan et al. . |
| 5,055,998 | 10/1991 | Wright et al. . |
| 5,121,499 | 6/1992 | McCaskill et al. . |
| 5,182,793 | 1/1993 | Alexander et al. . |
| 5,247,611 | 9/1993 | Norden-Paul et al. . |
| 5,276,607 | 1/1994 | Harris et al. . |
| 5,297,249 | 3/1994 | Bernstein et al. . |
| 5,303,146 | 4/1994 | Ammirato et al. . |
| 5,317,686 | 5/1994 | Salas et al. . |
| 5,319,777 | 6/1994 | Perez et al. . |
| 5,333,252 * | 7/1994 | Brewer, III et al. ................. 707/506 |
| 5,339,410 | 8/1994 | Kanai et al. . |
| 5,375,201 | 12/1994 | Davoust et al. . |
| 5,396,621 | 3/1995 | MacGregor et al. . |
| 5,416,895 | 5/1995 | Anderson et al. . |
| 5,418,898 | 5/1995 | Zand et al. . |
| 5,418,902 | 5/1995 | West et al. . |
| 5,432,903 | 7/1995 | Frid-Nielsen . |
| 5,446,891 | 8/1995 | Kaplan et al. . |
| 5,572,644 * | 11/1996 | Liaw et al. ............................ 395/793 |
| 5,603,021 * | 2/1997 | Spencer et al. ....................... 345/604 |
| 5,604,854 * | 2/1997 | Glassey ................................. 707/503 |
| 5,739,824 * | 4/1998 | Dietrich et al. ................... 707/503 X |
| 5,767,854 * | 6/1998 | Anwar .................................. 345/355 |
| 5,784,545 * | 7/1998 | Anderson et al. .................... 395/148 |
| 5,852,740 * | 12/1998 | Estes .............................. 709/220 X |
| 5,883,623 * | 3/1999 | Cseri .................................... 345/335 |

OTHER PUBLICATIONS

Underdahl, "Using Quattro Pro 6 for Windows", Que Corp, pp. 33–38,13,14,31–32,28,88,554–570,16,47–475,580–581, 1994.*

* cited by examiner

Primary Examiner—Joseph H. Feild
(74) Attorney, Agent, or Firm—Charles E. Rohrer

(57) ABSTRACT

A polymorphic modeling method to permutate a model into one of the many alternate model forms. Data can be entered for calculating each model after it is produced. Model permutations employ a permutation process and a permutation control attribute. The permutation control attribute indicates the type of permutation including locked, protected, prompting, interactive, interdependent, single and multiple, polyversion and permutation enabled subroutine. These attributes designate a particular type of permutation behavior assigned to each node in the model. Future node content is included in permutation control by the user or automatically after user designation of initial node content defining an initial model. The permutation process responds to context-sensitive impact events and includes message enabled nodes that can compose, send, read and process messages within a model or between models at remote locations thereby enabling permutation operations that are local, networked, or external such as over the Internet. Permutation loop processing, an enhanced formula syntax, and alternate horizontal and vertical storage formats enhance the permutation process. Constraints may be entered directly into model nodes and are enforced via constrained model permutation processing.

26 Claims, 77 Drawing Sheets

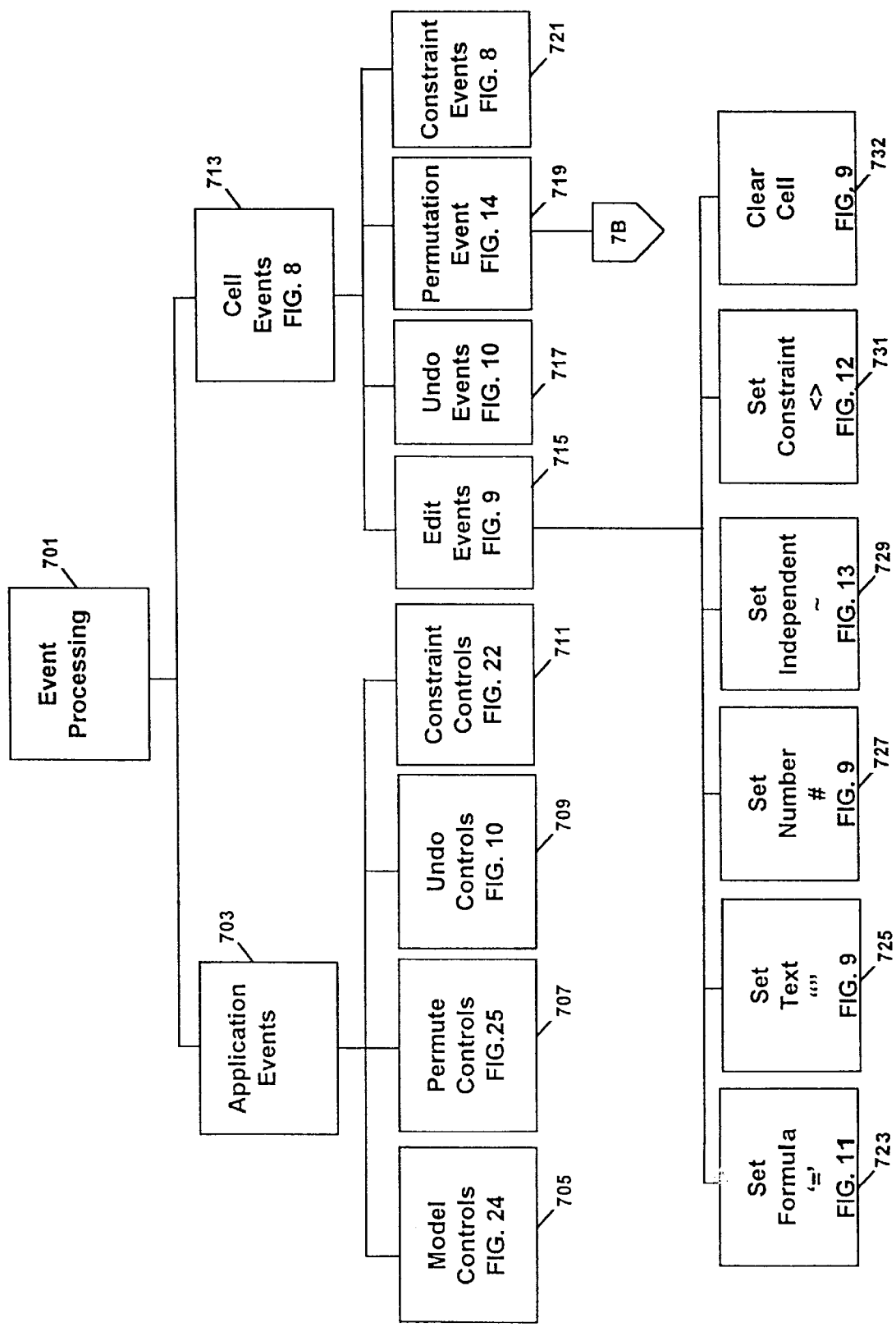

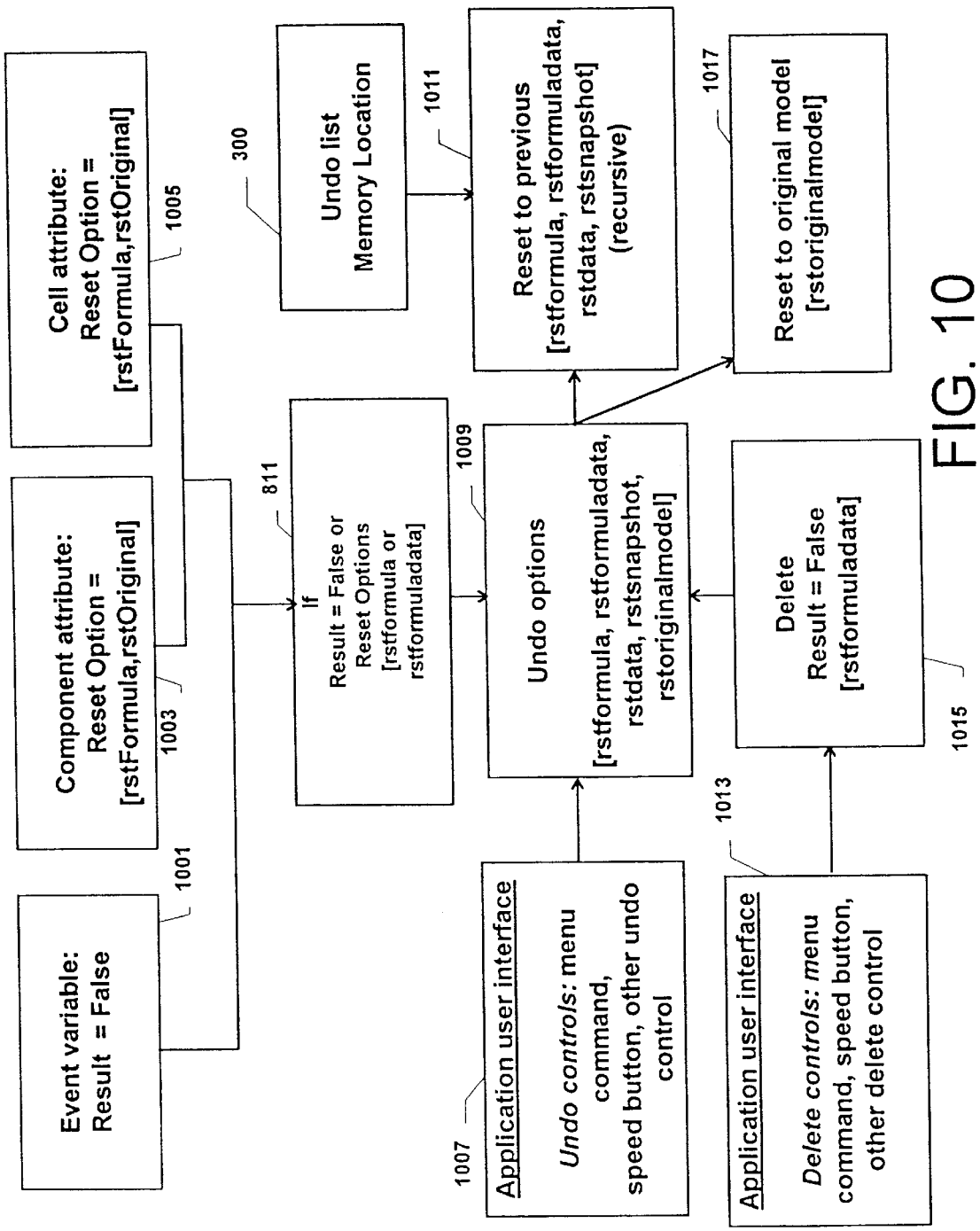

POLYMORPHIC ENHANCED MODELING

This application claims the benefit of U.S. Provisional Patent Application No. 60/038,569, filed Mar. 3, 1997.

TECHNICAL FIELD

The present invention relates generally to the field of information processing by digital computers and particularly to the processing and presentation of information by computer program applications such as electronic spreadsheets.

BACKGROUND OF THE INVENTION

Spreadsheets enable the organization of data into columns and rows, permitting rapid accumulation of information by a user. Before spreadsheet processors were developed for computers, spreadsheet information, especially financial, was prepared on accountants' columnar pads or paper spreadsheets, using pencils and calculators. The task of preparing a spreadsheet on paper is much slower than in a computer because each entry must be calculated and hand entered in the spreadsheet. Manually prepared spreadsheets are prone to errors.

A spreadsheet processor (hereafter, spreadsheet) is an interactive computer processor that consists of a collection of rows and columns displayed on a computer monitor screen in a scrollable window. The intersection of each row and column is called a cell or a node. A cell can hold a number, a text string, or a formula that does calculations using the entries in one or more other cells. A spreadsheet can copy cells, move cells, and modify formulas. Spreadsheets may save a cell in a file for later use and may discard a cell after it has served its purpose. Spreadsheets can format cells in a spreadsheet presentation in a variety of ways and the presentation may be printed for hard-copy reference. In addition, groups of cells can be used to generate charts and maps.

Perhaps the most significant advantage of an electronic spreadsheet is the easy, immediate recalculation of a formula's results when a change is made in any of the entries in cells. Once a spreadsheet is set up by defining formulas, it can be used as a model to try different possibilities by varying entries to show the effect of changes.

A typical spreadsheet processor configures the memory of a computer to resemble the grid format of an accountant's columnar pad, providing a visible presentation for a user. Because the pad exists dynamically in the computer's memory, however, it differs from paper pads in several important ways. Locations in the electronic spreadsheet, for example, must be expressed to the computer in a format which it can use. A common scheme for accomplishing that is to assign a number to each row and a letter to each column. For example, the reference A1 designates the address of a location at column A and row 1, i.e., the cell in the upper-left-hand corner. In that manner, the spreadsheet reference defines an addressable storage location or cell at each intersection of a row with a column.

Data entry into an electronic spreadsheet is done in much the same manner that information is entered on an accountant's pad. A screen cursor is positioned at a desired location and a user enters alphanumeric information. Besides holding text and numeric information, however, spreadsheet cells can store special instructions such as formulas specifying calculations to be done on values stored in other spreadsheet cells. Cell addresses can be used as variables in an equation, allowing mathematical relationships to be defined among cells. The structure and operation of a spreadsheet processor, including functions and macros, are well known in the art.

Electronic spreadsheets offer many advantages. They can be much larger to hold more information than their paper counterparts; electronic spreadsheets having thousands or even millions of cells are not uncommon. Spreadsheet processors also allow users to do what-if scenarios. After they have stored a set of computational relationships into a worksheet, the spreadsheet information can be recalculated using different sets of assumptions with the results of each recalculation appearing almost instantaneously. Doing this operation manually with paper and pencil might require recalculating every relationship in the model with each change made.

Spreadsheets can be multidimensional rather than being restricted to two-dimensional models. In a three-dimensional spreadsheet, they uniquely identify each cell by a row, a column, and a page. This is analogous to a notebook or workbook. A notebook can hold any number of spreadsheets or worksheet pages. A notebook, therefore, depicts a three-dimensional representation of information cells. Using this metaphor, the user can leaf through many pages of information or to go to a specific page of information within the notebook.

The present state-of-the-art electronic spreadsheets have limitations and do not support additional forms of analysis that many users would find very valuable. For example, in current art spreadsheets, a value entered into a formula cell will override the formula, place the value in the cell, erase the formula, and invalidate the existing model logic. This result is counter productive. The spreadsheet should respond in a more intelligent, context-sensitive, fashion. First, it should not simply erase the formula and invalidate the model without further interaction with the user. Second, it should seek to correctly satisfy the user. The correct response when the user enters a value on a formula cell is to change the model's form, i.e., from one that cannot be calculated into one that can be calculated. Since many cells can contain formulas, the correct response will also include the ability for the model to take on any one of many possible forms. It should accept an entry into any formula cell present in the model, without breaking it.

It is an object of the present invention to both prevent a corrupt model and to provide a correct response when the user enters a value on a formula cell. The spreadsheet should generate one of a potentially unlimited number of new model forms that can be correctly calculated. The result is an event driven, polymorphic spreadsheet, that can reconfigure itself into one of several model formats dynamically during runtime operation.

Current art spreadsheets bind data and formulas together. When a model is loaded, it replaces both the current data and the current formulas in computer memory. This limits the user to a single spreadsheet model that operates on a single set of spreadsheet data. Commercially available spreadsheets at the current time also provide only a single standard calculation method that operates on a single model and a single set of data. Thus, the model's logic and data are bound together. It is, however, an advantage to be able to apply more than one model version to a single set of spreadsheet data. There are many desirable, but currently unsolved forms of analysis, that require the ability to apply multiple model versions to a single set of data.

Therefore, it is an object of the invention to uncouple spreadsheet data from its formulas, so that the data and the model formulas are independent. In so doing, an unlimited number of model versions can be applied to a single set of spreadsheet data.

U.S. Pat. No. 5,339,410 shows the use of more than a one-way calculation method. However, its bidirectional method is limited in scope to a forward and a backward direction. In a complex spreadsheet model with a large number of interrelated formula cells, a plurality of directions, i.e., combinations and permutations, exist. At every formula node directional decisions can be made that are equal in number to the number of precedent cells contained in the cell's formula. So, while many directions can exist for each cell, an almost unlimited number of directions can result from the combinations and permutations produced by many formula cells. Unfortunately, the bidirectional method is limited to a single directional decision for each cell. Also, since a bidirectional computation method is fixed in computer logic it is limited to a single alternate computational path. For each cell affected by a first change event, it derives a single inverse formula, using algebra, that it uses to calculate a single result cell. As a result, for any particular one of the model's formula cells, it can calculate only one alternate computational path. However, many alternate computational paths exist for each formula cell, i.e., one for each precedent cell found in the cell's formula. Therefore, the need exists to be able to select any one of the formula's precedent cells as the target cell and develop an inverse formula for that cell.

There is also a need for the user to control the computations. Every formula cell is a node in the spreadsheet that can make a directional decision. However, no method is currently provided for the user to control and to select computational permutations with multiple directions, both statically at design-time and dynamically at runtime. Both design-time and runtime interactive directional control require an intelligent, interactive cell type. The cells need the capability to interact with the user giving the user a list of options. The user must be enable to select from those options, and the cells must be able to correctly perform the selected option.

In view of the foregoing, it is an object of the present invention to provide an interactive cell type where directional decisions can be made for every node. Such decisions can be made in formula nodes and also in independent trigger nodes. Such decisions can be made both statically at design-time and dynamically at runtime. The invention provides directional decision making for a limitless number of computational directions.

The need exists for handling formulas that cannot be inverted such as non-algebraic formulas that contain functions or constructs using the logical values of cells. Also, even when a formula is an algebraic equation, there remain many complex forms that cannot be inverted.

It is, therefore, an object of the present invention to eliminate fatal errors resulting from total reliance upon the derivation of an inverse formula; to provide a means for user input of impact formulas, values or other acceptable cell contents; to provide a means for accessing and using user provided content in the model permutation process, and simultaneously providing enhancements to the inverse formula process so that it can be of use where it is appropriate and only where it is successful.

It is a further object of the present invention to eliminate the need for right-side to left-side value comparisons of bi-directional equations to eliminate fatal errors resulting from floating point inequalities. This is accomplished with the polymorphic focus of the present invention. When a model is permutated from one form that cannot be calculated into another form that can be calculated, the result is a standard spreadsheet calculation of a valid spreadsheet model. As a consequence, there is no right-side nor left-side to evaluate what-so-ever in the permutated model.

An independent cell is a cell that is not found in the formula of a formula cell. The independent cell, however, is one that in certain cases should be changed when the formula cell changes value. In the current art there are no means to detect the existence of an independent cell from the formula cell. It is an object of the present invention to provide an impact cell that can effect a change to an independent cell when needed.

There is a need for a multiple impact cell, one where a change to a formula cell will result in a change to more than one direct or indirect precedent cell and/or independent cells. It is an object of the present invention to provide for multiple impact cells that can impact a plurality of precedent and independent cells with various forms of contents during model permutation events.

A special case of the multiple impact cell is the multiple allocation cell which enables an allocation of an amount entered into a multiple impact cell among the precedent cells. Such allocation may be equal to all cells, based upon a percentage calculated from the previous value as a percent of the total value, or the amount based upon weighting factors, such as seasonal sales factors found in a separate range of cells within the spreadsheet. There is no provision for multiple allocation cells in current art spreadsheets.

It is an object of the present invention to provide multiple allocation impact cells, including but not limited to split even, split percent, split using weights stored in a named range of cells, or split to a partial list of precedent cells.

There are special cases involving multiple impact and multiple allocation cells where precedent cells require group processing. Because each of the children cells receive part of their parent cell's value, they require interdependent processing to maintain model synchronization so that if any one of the group of sibling cells subsequently change content, the parent and all of the sibling cells receive notification and change instructions. Interdependent sibling cells are not provided in current art spreadsheets. It is an object of the present invention to provide for interdependent impact cells for the grouping and callback processing required for proper model synchronization as the result of multiple impact parent cells.

There is also a need for the user to be able to provide independent processing logic to create permutations in the model which may take the form of an algorithm beyond the scope of standard processing provided by the spreadsheet or its formulas. Therefore, the need exists for an algorithm control mechanism to provide for alternative forms of processing as defined by the user. In that manner, user defined subroutines can satisfy the unlimited range of computational results that a user may want.

It is an object of the present invention to provide for user defined subroutines in the form of independent processing logic that can be stored and referenced by any impact cell type to provide unlimited computational alternatives that may go beyond the scope of standard spreadsheet operations.

The bidirectional method mentioned above is limited to triggering its single alternate computational method by formula type cells. However, it is also advantageous to have the capability of storing a permutation trigger within an input type cell. In the present invention, provision is made for a permutation trigger. That trigger consists of cell contents that are passed to an impact cell when data is entered into the input cell. This action results in an additional process beyond a simple edit to the value of an input cell. It results in an additional model permutation, i.e., an action, triggered in an independent cell, that can impact one or more additional cells. There is no provision for an independent cell containing a permutation trigger in current art spreadsheets.

It is a further object of the present invention to provide independent impact cells with permutation triggers (independent trigger cells) that can impact or effect changes in one or more other model cells while simultaneously functioning as an input cell.

In the current art, a model is loaded into the spreadsheet, calculations are performed, and the model always returns to the same original form. However, it is advantageous in many circumstances to not return to the original model form. In fact, it is more advantageous to be able to assume many model forms, i.e., not just the starting model form, but a series of many model forms, as many possible forms as may be derived from the combinations and permutations present in the starting model equations. Thus, an accumulation of changes can occur so that the resulting model may be quite different from the model loaded by the user, while requiring little or no additional input from the user. There is, however, no provision in current art spreadsheets for model permutations of this kind.

It is an object of the present invention to provide incremental or cumulative model permutations to accommodate every possible combination and permutation of form that a model can take. And further, to provide for model versions that are independent of all current cell content so that unlimited possibilities can exist for model permutation and the application of a plurality of models to a single set of spreadsheet data.

It is a further object of the present invention to support undo options such as, reset after change, no reset after change, i.e., so that incremental changes can accumulate, reset to the original model, or incremental undo of changes to retrace steps. While the undo of edits made by the user in the current art will undo only the individual edits made, undo in a permutation enhanced spreadsheet will also undo the permutations made to the model as directed by the user.

Current art spreadsheets enable users to copy cells, move cells, and modify formulas. The relative cell references that are found within the cell content is maintained during those operations. However, because the current art spreadsheets are not permutation-enabled there are many operations that will fail to produce the correct cell content when a model permutation occurs. For example, a cells' permutation content is not maintained for clipboard operations, multiple sheet selections, drag-copy or drag-move operations, insertions or deletions of cell(s), row(s), column(s), and sheet(s), and renaming model components. The polymorphic spreadsheet cell is permutation-enabled, and therefore, the inability of current art spreadsheets to maintain its permutation content during content transfer or move operations is overcome.

Therefore, it is an object of the present invention to "permutation-enable" every operation that transfers or moves cell content, i.e., not only for the original content, but also the polymorphic content used in model permutation operations.

Current art spreadsheets provide built-in functions such as sum and average, as well as more complex functions that perform sophisticated operations such as the correlation coefficient for two sets of data. However, these built-in functions are not permutation-enabled. Such functions may not properly operate when used in a permutation-enabled cell. For example, the simple sum command may become an impact targeting mechanism for a plurality of cells in a model permutation. Therefore, it is an object of the present invention to provide permutation-enabled functions so that such functions can change from one form into another form, for interacting with the permutation behaviors of the invention to yield valid alternative model forms.

Current art spreadsheets are available in multiple delivery formats, i.e., in a standalone form and in a component form. The component form encapsulates the behaviors of the spreadsheet and provides a callable public interface to the operations contained in the component. However, because current art spreadsheet components are not polymorphic, their callable interface does not include operations that can correctly interface with the permutation enabled methods of a polymorphic spreadsheet. Therefore, it is an object of the present invention to provide a component format that is permutation enabled with user callable interface routines. These interface routines provide polymorphic operations that interface with the component's data structure and are beyond the capabilities of the current art.

Formulas are the quintessential spreadsheet capability that perform the analysis that makes them so useful. Formulas are entered into the spreadsheet cell using a format that can be parsed by the spreadsheet and translated into a form that can be calculated in computer memory. The format of the spreadsheet formula however, is inadequate to provide essential permutation content to the cell. Therefore, it is an object of the invention to provide an enhanced formula syntax, i.e., a syntax that can be parsed by the polymorphic spreadsheet into current and future cell content or other permutation control behaviors as are necessary to achieve both current cell calculation and future cell permutation.

Circular references are managed in current art spreadsheets via an iteration control with settings for the maximum number of iterations or a maximum change value. However, the circular reference of a cell or its precedents or indirect precedents referring to itself in a formula takes on new meaning when that formula is permutated or inverted. There are two distinctions that can be made. First, the formula in a permutated form may contain a circular reference. The iteration control of the current art is adequate to handle the computational iterations of that reference. Second, the sequence of cell permutations that can occur when the inverse content is moved between cells, can lead to a permutation loop. In a permutation loop, the content that is moved out of the cell gets moved back into the cell. A permutation loop is a different event from a circular reference because it involves content, not computation. Current art spreadsheets do not provide a means for handling the permutation loop. An object of the current invention is to handle permutation loops.

Optimization and constraint processing in spreadsheets is most often achieved using a solver-add-in capability. The solver-add-in is a separate computational engine that is fixed in computer programming logic and takes a limited set of input from the user. With the single exception of a data entry validation rule, the user is not able to enter constraints directly into the spreadsheet cells. The user is given limited control over the methods of the computational processing. Because the solver technology was built using the single model paradigm it is not adequate for a polymorphic paradigm. The polymorphic paradigm enables a new approach to the user interface with constraint and optimization processing. First, the user should be able to enter constraints directly into the cells in a context sensitive fashion. Second, the user should be given access to and control over the model permutation behaviors that accomplish the constraint processing. The result of an optimization or constraint process is simply the reallocation of values among cells. The restricted access to the methods used for this allocation by the solver-add-in is a significant limitation that is removed in a polymorphic paradigm. It is an object of this invention to provide a polymorphic spreadsheet enabling the user to enter constraints directly into the cells and to control constraint processing.

Current art spreadsheets and spreadsheet components do not support a polymorphic paradigm. Therefore, the component interface of current art does not have polymorphic interaction with a polymorphic data structure. The eventuality of permutation content as a part of a cell formula syntax is also a short coming. The functions used in equations are unaware of their meaning in the context of permutations and polymorphic behaviors. The eventuality of permutation loops found in the polymorphic paradigm are not addressed. Current art spreadsheets do not support in-place editing of constraints, nor user access to control the form or sequence of processing for the allocations that occur during constraint processing.

Current art techniques do not anticipate, nor do they provide for interactive impact cells, cell selection for multiple single impact cell computational pathways, independent impact cells, multiple impact cells, multiple allocation cells, interdependent impact cells, user-provided algorithms that can be triggered by context-sensitive cell-based events, independent trigger cells, nor cumulative model permutations.

Current art techniques do not address the issue of applying an unlimited number of independent model versions to a single set of spreadsheet data, nor do they permit the user to have direct access and control over model permutation. In fact, they offer no permutation at all. They suffer from fatal errors that invalidate the model when a value is entered on a formula cell and lack the intelligence to respond in an intelligent, context-sensitive manner with a permutated model format.

The above shortcomings are avoided in the present invention by providing more than one mode of operation in combination with the ability to operate on a single spreadsheet's data with an unlimited number of alternative models.

The user is given direct access to the cell's enhanced data structure where each display cell can store more than one processing cell in computer memory as well as mode control, model permutation control and constraint algorithms. Each cell is enhanced so that it can simultaneously support a plurality of cell behaviors or functions to provide advanced capabilities for model permutation.

The user is provided with a hierarchy of impact cell types that support a plurality of model permutation behaviors that result in a substantially unlimited range of model permutation and computational results.

The result is a one-to-many spreadsheet that is polymorphic, i.e., can change from one form into another one of many alternative forms. Thus, a broader spectrum of modeling solutions is available while maintaining the speed and ease of the familiar spreadsheet human interface.

SUMMARY OF THE INVENTION

The present invention is a multidimensional polymorphic spreadsheet that can apply an unlimited number of models to a single set of spreadsheet data. The invention uses a permutation control attribute to store a plurality of cell content in the cell's data structure in computer memory. So, the spreadsheet cell of the present invention is polymorphic.

Many modes of operation are supported in the invention. Some modes of operation are stored at the component level with a corresponding attribute at the cell level. The component level and cell level operating modes cooperate to provide the polymorphic, enhanced standard, polyversion, permutation locked, permutation reset, and undo modes of operation.

The reset and undo operations reset permutations incrementally. The last permutation can be reset to the previous equations, a particular version can be reset as selected by the user, or the entire model can be reset to the original computational format entered by the user. The cell data structure additionally includes the original state control that stores the original cell content to support these reset and undo operations.

Using the various modes, behaviors and controls of the invention, the user can define the scope of permutation allowed within a given model. Polymorphism may be totally enabled, totally restricted, or of any in between scope.

The permutation control also uses "enhanced formula syntax." The enhanced formula syntax is used to parse the content of the permutation control into its component parts. The component parts are the current cell content, pluralities of future cell content and the permutation type identifier. The current content can hold an equation to calculate the cell's value, text, number or the like. Permutation control uses the current cell content, future cell contents and the permutation type identifier in combination to generate model permutations. It uses the type identifier to interpret the content of the permutation control and apply it correctly to the cell's permutation operations.

In addition to direct editing of cell content by users, the methods of the present invention also provide for the algebraic derivation of inverse formula content that represent permutations and combinations of the formulas entered by the users. It stores these permutations as future cell content in the permutation control. It also provides means for reordering the permutation control contents and moving cell contents during permutation operations.

The cell also stores a constraint control in the cell data structure. The constraint control has a format similar in structure to the permutation control. The invention uses the constraint control to enable constraint processing via iterative model permutations, rather than relying only on fixed computational algorithms. Therefore, the polymorphic cell can store pluralities of cell contents that are used in model permutation operations and each individual cell in the invention is simultaneously calculation enabled, permutations enabled, and constraint enabled.

The invention identifies many context-sensitive permutation behaviors via a permutation type identifier that it stores within the cell's permutation control. It broadly defines these permutation behaviors as locked, protected impact, prompt impact, single impact and multiple impact.

Various subtypes of behaviors can occur. Single impact subtypes are dependent and independent. Multiple impact subtypes are polyversion subroutine impact, multiple allocation and user defined. For example multiple allocation subtypes are allocate equally, as a percent, using a weight cell, using a weight cell percent, partial allocation and constraint. The polyversion subtype provides a means to load a full or partial model version into active memory, thus, numerous models can apply to a single set of data.

Intelligent interoperable cells are capable of sending, receiving, composing and processing email messages both within one workbook and externally between multiple workbooks. Inter-workbook communications are possible even when those workbooks are located at different remote sites. Inter-cell and inter-workbook model permutations are accomplished in the invention via email-enabled cells that can send change instructions locally or via the operating system to external workbooks, thus generating additional permutations in external, precedent workbooks, as well as within the local workbook.

The invention also provides permutation-aware functions enhanced to perform permutation-enabled operations. For example, the @sum function, that. can result in single impact cell targeting or multiple impact allocation permutation behaviors.

Both design time and runtime interactive operations provide user selections among pluralities of computational pathways that exist within the permutations of the model stored in the cell's permutation control.

The invention supports impact event conflict resolution. An impact event occurs when the current contents of a cell conflict with the intended content for the cell. The incoming content can come from many sources. For example, the user, the system, or cell behaviors can generate impact events. To resolve the conflict caused by the impact event the model must change forms, i.e., be permutated from a form that cannot be calculated into a form that can be calculated.

The invention supports a permutation loop behavior. The loop occurs when the origination cell receives a return email message. When this occurs it initiates a second model permutation to finalize the computational result of the model.

The invention also provides alternate formats for data storage in computer memory for the permutation, constraint and original state controls. Each format has a particular advantage, i.e., a horizontal format reduces memory use while a vertical format reduces processing time. The former is best for the edit-bar interface and the latter is best for the edit-list interface. The invention uses these alternate formats interchangeably and can convert from one to the other instantaneously. A variant memory structure uses a case identifier to select the current format. Therefore, it can store either type but it stores only the selected type in the current memory location for the cell. Consequently, the user controls the tradeoff between processing speed and efficient use of memory.

The component architecture of the invention provides for delivery in two alternate forms, i.e., a standalone polymorphic spreadsheet and a polymorphic spreadsheet component. The component interface allows the user or developer to use the operations of the component via a published interface that is 'callable' by program or subroutine operations written by the user or developer. Therefore, when doing input-output operations to the polymorphic cells, the correct actions are done to insure adherence to the standards for polymorphic behaviors defined in the methods of the invention.

Polymorphic modeling in the present invention also extends into every domain of spreadsheet operation which includes optimization using constraints. The cell validation rule and the solver add-in constraint processing of the current art are replaced in the invention with a constraint control attribute located in the cell data structure. The activation of the constraint controls is optional and user selections can start their operation for individual cells, groups of cells, or for the entire model. The constraint control operates with the other permutation behaviors of the invention.

Additional capabilities of the present invention recognize that each spreadsheet operation that has the effect of transferring or moving information between or among cells must be permutation-enabled. When cells are cut-and-pasted or dragged-and-dropped, their relative cell references must be maintained, not only in the current content portion of the cell's permutation control, but also in the future content of the cell, as well as in the entire content of the permutation control, the constraint control, and the original state control. Therefore, the methods of the present invention "permutation-enable" every standard operation of the spreadsheet to realize polymorphic operation throughout the preferred embodiment of the invention.

Clipboard operations for cut-paste and copy-paste will result in model permutations that maintain a valid model structure. Multiple worksheet selection operations, where the contents of visible cells are transferred to invisible cells on many sheets, are permutation-enabled. Renaming sheets, or other model components such as the workbook title, that appear in formulas are updated throughout the cell's permutation and constraint storage areas. Insertions or deletions of cells, row(s), columns, and sheet(s), drag-copy and drag-move operations, and the like, are permutation-enabled in support of polymorphic modeling.

It should be emphasized that the permutation enabled, polymorphic-spreadsheet of the present invention, does not use an alternative computational method. It relies solely upon the standard recalculation method. The model is first permutated and then it is calculated.

In summary, the invention delivers polymorphic, permutation enhanced modeling using a familiar spreadsheet interface via numerous operating modes; numerous permutation behaviors; multiple-cell storage in the cell's permutation control; constraint control and original state control; enhanced formula syntax for parsing these controls; methods for changing the order of the content of these controls; moving content among these controls; inverting equations to generate automated permutation content to store in these controls; permutation enabled functions; as well as direct access to the cell data structure using alternative storage formats, optimized for processing speed versus memory utilization; a public callable component interface for user defined interaction with the polymorphic component format of the preferred embodiment; as well as enabling multiple delivery formats, i.e., standalone modeling for individual users or component form for developers to use; add to these, email-enabled cells, the abilities to maintain, store, and retrieve unlimited model versions to be applied to the same set of spreadsheet data; design time and runtime enabled interactions with the user for unlimited computational pathways combined with unlimited model permutations; and user controlled constraint processing.

This plurality of operating modes, data structures, permutation-enabled controls, cells and behaviors yield a polymorphic modeling environment with broad application that is vast in its analytical scope. A familiar spreadsheet interface is maintained for ease of operation, while simultaneously minimizing the complexities of such operations via simple user selections for individual cells, sheets or at the component level. The ease, sophistication, power, and smooth operation of the present invention provide surprising and beneficial results that are achieved only via the polymorphic operations of the present invention. These objectives and others are accomplished in the present invention as disclosed herein below.

BRIEF DESCRIPTION OF THE DRAWING

The invention is described in detail by referring to the various figures which illustrate specific embodiments of the invention, and wherein like numerals refer to like elements.

FIGS. 7A–7C are a block diagram of hierarchical relationships among the event processes of the invention.

FIG. 10 is a flowchart of the undo and reset to previous process.

DETAILED DESCRIPTION

Figure 1:
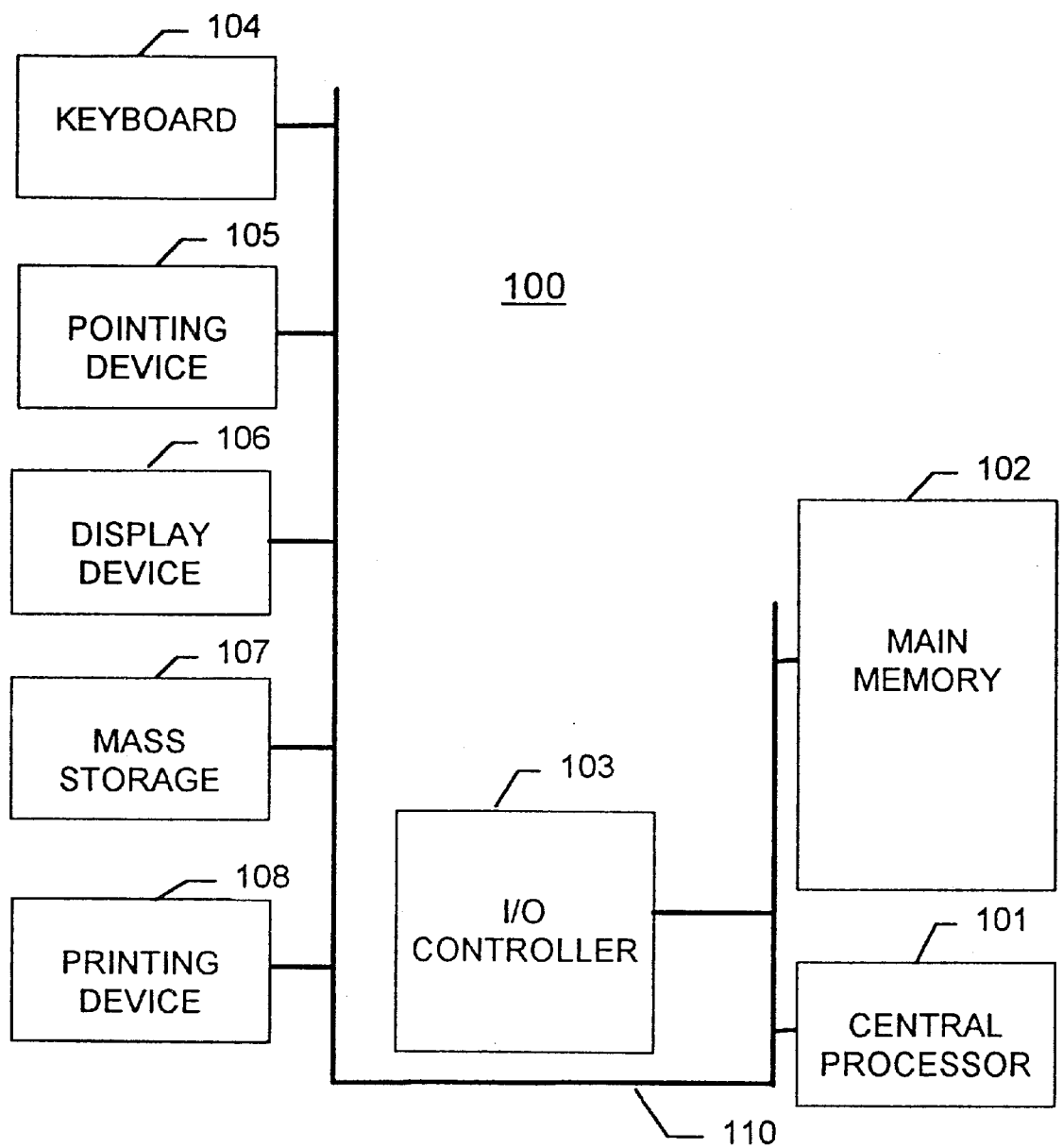
FIG. 1 is a block diagram of a computer system in which the invention can be implemented and carried out.

The present invention provides a polymorphic modeling environment. It takes two simultaneously deliverable forms, a standalone polymorphic spreadsheet and a polymorphic spreadsheet component. In both formats, users can apply limitless numbers of spreadsheet models to a single set of spreadsheet data. It also provides interactive user selections of multiple computational paths dynamically at runtime. So, users can realize limitless numbers of computational directions.

The present invention is a polymodal spreadsheet giving users the ability to select from a plurality of operating modes. Each mode addresses different needs at different times.

The polymorphic spreadsheet of the present invention is permutation-enabled or permutable. Users can permute the model from one form into another form, where limitless numbers of possible model formats exist.

Providing a permutation enabled spreadsheet cell achieves polymorphism in the invention. A permutation-enabled cell replaces the cell formula attribute found in current art spreadsheets with a permutation control. The permutation control not only provides for cell recalculation it also provides a means for model permutations. The permutation control can contain a plurality of permutation behaviors. Permutation behaviors are operations or actions taken or executed to change the model regarding order of the model's contents.

Typical spreadsheet cell behaviors are calculating a formula, entering text or a number into a cell, and logging onto a web site. Polymorphic cell behaviors include entering a permutation control into a cell, performing model permutations, retrieving alternate model versions without replacing data values, and starting a named subroutine or macro, and the like, from within the cell itself. Each item in the permutation control can, therefore, contain any valid type of cell content that it can use to permute the model, including the polymorphic behaviors provided by the invention.

The invention also enhances syntax to use "enhanced formula syntax" to extend functions beyond that of the current art formula parsing. The enhanced formula syntax provides a means of parsing the contents of the formula edit-bar or cell edit field. The enhanced parsing allows entry of a plurality of cell content. It separates each element in the edited string into individual parts and places the parsed information into the cell's permutation control. It also establishes the order of precedence for these contents. The first position contains the current cell contents. The next positions contain a plurality of future cell contents in order of precedence. The last position contains the permutation control identifier. The identifier defines the selected one of many possible permutation behaviors. The selected permutation behavior executes when a permutation event triggers it and it uses the contents stored in the permutation control to accomplish inter-cell permutations.

The enhanced formula syntax supports two interchangeable storage formats, one horizontal and the other vertical; each storage format suits a particular set of tasks and each produces a different set of performance characteristics.

The horizontal format is appropriate for formula bar editing. It also optimizes memory use. The vertical format is appropriate for line by line editing in a list box or edit control. It also optimizes processing speed. The storage format for the permutation control is selectable on a cell by cell basis. Cells can inherit the storage format from another cell or they can assign them globally for the entire model. These options give the user direct control over the performance tradeoff of speed versus space and enhance the user interface to provide smooth transitions from edit-bar to edit list interactions with the user.

The cells of the invention are both permutations enabled and email enabled. Each cell can compose, send, receive and operate upon their own contents and the contents of other cells via inter-cell email messages.

Email messages can go beyond the active workbook, and can also go to external workbooks. Workbook cells with links to cells in another workbook send email messages to the external workbook to affect changes. The external workbook sends the message to the cell that will process it. Thus, the local cell permutes the external workbook into a new form via inter-cell email messages. The result is support for multiple external polymorphic spreadsheets via inter-cell communication, and thus execution of an external model permutation is possible. The cells can also send the permutation email messages via batch processing to a remote site using a network such as the world wide web.

The invention further achieves polymorphic modeling via an array of permutation behaviors. These behaviors include preventing a permutation, prompting before it allows permutation, and prompting to complete the information needed to complete the permutation. Interactive behaviors let users select the target cell for a particular cell's permutation. Single impact behaviors affect a single cell, multiple impact behaviors affect multiple cells, and allocation behaviors split values between many cells. Interdependent behaviors treat cells as a group for interdependent permutations. User-defined subroutine behaviors execute a macro and polyversion behaviors retrieve partial or complete sets of cell contents from a storage location.

Context sensitive events, or "impact" events trigger the permutation behaviors within the cell. An impact event is a collision between an entry made into a cell with the current contents of the cell. For example, entering a value into a dependent cell creates a collision. Use the formula to calculate a value or use the value to replace the formula. Which takes precedence? The two are in conflict. Various types of impacts can occur. Each impact-type represents a class or type designation for each distinct kind of permutation behavior. The permutation behaviors, therefore, resolve the conflict created by an impact or collision between an entry made into a cell with the current contents of the cell. As a result, they change the model from one form, that they cannot calculate, into another form that they can calculate.

A cell in the enhanced standard mode of operation protects the cell from permutation until it receives additional information. A current art spreadsheet cell does not protect the contents of a dependent cell unless the user "protects" it. However, the user cannot edit a protected cell, so they do not protect the cells at design time. Therefore, users can type over and lose the contents of a dependent cell which invalidates the model contents. The permutation-enabled cell of the present invention prevents that error. It uses the enhanced standard mode of operation to prompt before it takes any action. It offers the user three options: to protect the cell's contents, update and permute the model, or select a model version, i.e., a set of contents (sans data), to retrieve into active memory. These options prevent the user from inadvertently breaking the model with a typeover of valid cell contents and offer permutation-enhanced alternative behaviors as well. These behaviors apply universally at design time and at runtime.

When an impact event triggers a cell permutation, it archives the current cell contents, including the permutation control, to a previous instance of the cell. This instance of the cell becomes the controlling agent of the model permutation process. It then updates the current cell with the new contents. Then, it will either leave the permutation control unchanged, clear the control, or update the control with a new set of contents. The calling agent governs the choice of actions.

The impact event processor then evaluates the previous instance of the impact cell to decide if a valid permutation control is present. If it finds a valid control, it composes an email message. It uses the content of the permutation control to derive the content of the message. Then it sends the message to the next impact cell for processing. This process continues for each impact cell until the final cell to receive an email message has no valid permutation control. The sequence of a cell permutation generally goes from direct precedents to indirect precedents. However, it can include independent cells. It can invoke user-defined subroutines and it can retrieve alternate model versions that it finds named in the permutation control.

It is not possible for a loop that returns to the first impact cell to continue. The first impact cell has its permutation control cleared. Therefore, no further email message can be composed or sent. In addition, the impact event processor identifies the origin cell as the first cell on the undo list and updates the origin cell. Since the origin cell does not allow further permutations, i.e., it does not send out any additional email messages, the process ends. An infinite loop cannot occur.

A permutation loop, however, can occur. Normally the origin cell only sends an email message and does not receive one. The permutation loop occurs when the origin cell receives a return email message. In this case the origin cell first becomes independent, and then, in response to the return message, it changes back into a dependent cell. This event is easy to identify but it does require one additional processing step to complete the permutation process.

When the permutation loop event occurs, the impact event processor identifies it and re-enters the original user entry into the cell. Thus, a second permutation of the model takes place that is system generated for the user.

The reason for the second permutation event is the result of mathematical consequences that derive from the first permutation in which the loop occurred. In the first loop, the trail leading up to the loop consists of cells that the impact event has changed. The loop itself also consists of cells that have changed. However, when the loop encounters the trail leading into it, it retraces that trail back to the origin and changes the origin cell back into its original form. The loop cells are not changed back. Conceptually, two models coexist, the loop model and the trail model, but they are unsynchronized. They each have a different idea about how they should organize the model, and their mathematical result is incomplete. To complete the mathematical model the system resubmits the change event. As a result, it changes the trail cells, it changes the loop cells, and it changes the origin cell, so that the model correctly synchronizes. Calculating both the trail cells and the loop cells in the order of the permutation process is important. Simply resetting or undoing the model formulas does not result in the same mathematical result. The impact event must re-enter the change instruction into the cell and the permutation process is then completed to result in a synchronized model.

The permutation loop is different from a circular reference in a current cell formula. A circular reference occurs when a cell's formula or one of its indirect precedent cell's formulas refers to it. Circular references are controlled using the iteration controls of the current art spreadsheet. The circular reference relates to calculations and the permutation loop relates to permutations. It is, in fact, the circular reference in the cell that can cause the permutation loop. However, the impact event processor must handle the two events separately. The permutation loop gets handled first, then the iteration controls handle the circular reference. Next the reinitiated permutation gets handled and then the iteration controls handle the circular reference when it recalculates the permutated model.

The permutation loop is not problematic and it cannot continue indefinitely. The permutation loop is an acceptable and anticipated form of permutation behavior correctly handled in the invention.

The preferred embodiment of the present invention comprises not only a standalone polymorphic spreadsheet delivery format, but also simultaneously is available as a polymorphic spreadsheet component.

A component is an object that encapsulates a set of behaviors such as the behaviors of a spreadsheet. A developer in an application can include the component to deliver the services of the component to the end user. A component also has a public interface part so that certain of its operations are accessible or callable by the developer or user. The polymorphic spreadsheet component of the preferred embodiment of the present invention is built using a component architecture with user callable operations. By using the user callable operations to update cell contents from within user-defined macros or subroutines, the subroutines can correctly apply the cell content to the polymorphic model according to the behaviors of the invention. Because the standalone version is based upon the component architecture, the polymorphic component is simultaneously available in an independent form.

The component architecture of the preferred embodiment, therefore, serves a dual purpose. On one hand the interface part is accessible to the application developer using the component during application development. On the other hand the interface part is accessible to the user of the standalone polymorphic spreadsheet when writing macros or subroutines that require polymorphically and permutations enhanced behaviors when entering information into individual spreadsheet cells.

Polymorphic modeling in the present invention also extends into every domain of spreadsheet operation which includes optimization using constraints. The cell validation rule and the solver add-in constraint processing of the current art are replaced in the invention with a constraint control attribute located in the cell data structure.

The activation of the constraint controls is optional and user selections can start their operation for individual cells, groups of cells, or for the entire model. The constraint control operates with the other permutation behaviors of the invention.

The constraint control is analogous to the permutation control. However, it contains both constraint behaviors and permutation behaviors. For an independent cell, a simple constraint can accomplish the same task as a validation rule, i.e., test a value and restrict the accepted values entered. However, since a user can enter a value into a dependent cell in a polymorphic spreadsheet, there is a need for a validation rule to apply to the dependent cell as well. Therefore, the invention is replaces the independent cell validation rule of present art with constraint control. The constraint control processor, however, does not have the limits of just a simple validation rule. The first position in the constraint control is the current constraint behavior which can be a complex structure using behaviors joined with "and" or "or" operators, etc. The following positions contain future behaviors in precedence order, followed in the last position by a constraint type identifier, i.e., such as maximize, minimize, converge, and the like.

When a user selection triggers constraint processing, the constraint processor evaluates each cell's constraint control to identify binding constraints. When a constraint is binding, the constraint processor builds the appropriate constraint-defined impact rule and places it in its own first available future position. Then, in a series of model permutation events, it places the binding constraints into the cells, one at a time, triggering permutation events, in the precedent order of the permutation process. When all binding constraints are in place, it iterates recalculations by resubmitting values into the model until it matches the value, they reach a maximum or minimum number or the number of iterations in the iteration control is completed.

Since the constraint control is editable using the formula edit-bars or a list box display, users can view the exact constraint content of the solution that the constraint operation applied to each cell. If users choose to edit the constraint, they can reconstruct the model with their own variations applied. Thus, users have complete control over the constraint version of the permutation model contained in the constraint control. Put simply, a constraint is nothing more than a multiple allocation method. The system will provide a first probable solution, but the user has access to and control over the outcome. Therefore, constraint processing becomes reclassified in the invention. It is no longer an alternate computation method in fixed processing logic. The constraint process is a multiple impact allocation method of the polymorphic model of the invention.

The permutation behaviors of the permutation-enabled and email-enabled cells of the invention, in combination with the permutation-enabled operation of the constraint processor provides fast, reliable, predictable modeling alternatives unlimited in scope.

In the invention, every spreadsheet activity that can affect the contents of a cell is permutation-enabled. Entering any type of data into a spreadsheet cell is a permutation-enabled event that can trigger a permutation control and/or a constraint control for both independent and dependent cells. Thus every entry into every cell can potentially require multiple functions to be performed, i.e., the multifunction cells evaluate and maintain complex relationships that make the cells interoperable with various other elements of the model.

Beyond the cell permutation control and constraint control interfacing is the broader issue of spreadsheet operations that transfer or move cell contents from one location to another. For example, entering data while multiple sheets are selected is permutation-enabled because the invention maintains relative address references for not just the current cell contents but for the entire contents of the permutation control, the constraint control, and the original state control.

Clipboard operations such as cut, copy or paste that operate with cell contents are permutation-enabled. First, the invention enhances the clipboard itself to store and retrieve, not just the normal cell contents, but also the contents of the permutation control. Second, the invention maintains the relative cell references when retrieving cell content from the enhanced clipboard during the paste event for every cell control in the cell data structure.

Insert and delete operations such as insertion or deletion of cell(s), row(s), column(s) or sheet(s) are permutation-enabled because the movement of cell contents will change all relative references in each of the cell's controls, i.e., the permutation control, the constraint control and the original state control.

Drag-copy and drag-move operations are permutation-enabled because when content is copied or moved the invention maintains the relative references in the cell's controls.

In addition, the invention permutation-enables many functions so that they become permutation aware. For example, the sum function can act as both a single or a multiple impact targeting trigger and a table of functions and their inverse forms is maintained as a lookup table for use during the derivation of permuted equations.

The invention also maintains cell controls for sheet operations of insertions, deletions, renames, and other spreadsheet elements that appear within model equations. It correctly maintains the references to these elements that appear throughout the model.

Undo operations are permutation-enhanced since not only are the cell contents affected but the cell controls must also be correctly reset according to the undo or reset options selected by the user.

The present invention provides multifunction cells where every cell is simultaneously able to receive a value as input to the cell, contain a formula with which to calculate the cell's value or contents, and contain a permutation control that, when triggered, will result in a permutation of the model into a new form, and optionally contain a processing constraint control. Support for these multiple functions, individually and in combination, provides a multifunction cell with advanced capabilities for permutation-enhanced polymorphic modeling.

The invention provides a more intelligent cell that is capably interoperable with other cells, other objects, interactive controls, user-defined macros or algorithms, and so forth. These smart cells can send, receive and process email messages. These messages take the form of: from (a caller cell), to (a receiver cell), the message (any valid cell contents), the message content type, and postscripts (keywords or other required information for permutation events such as a node list, a subroutine name, a version name, or the like.)

The user can interact directly with the cell's contents at design-time or at runtime through dynamic interactions based on user controllable selections.

The present invention enhances the cell data structure in computer memory to provide for more than one set of cell contents for each cell that appears on the display screen. These cell contents comprise pairs of cell contents: a pair of current and previous cell contents provide access to the essential pair of current and previous permutation controls. The current and previous cell contents allow the user to undo an action and reset the model during various stages of operation. The current and previous permutation control content facilitate a model permutation.

Another pairing is the current cell and one or more impact cells that when combined each comprise the from-to content of the inter-cell email messages. The cell's data structure also provides analytical contents such as a constraint control, permutation controls, and the original state control.

The present invention also links the constraint control to the standard spreadsheet iteration controls that control intentional circular references among spreadsheet formulas. In so doing, the model permutation process remains synchronized with the standard calculation method. Thus, user selected iteration controls are coordinates with the model constraint controls.

In addition, the invention permutation-enables many functions so that they become permutation aware. For example, the sum function can act as both a single or a multiple impact targeting trigger and a table of functions and their inverse forms is maintained as a lookup table for use during the derivation of permuted equations.

These and other objectives are achieved in the invention by providing more than one mode of operation in combination with permutation-enabled and email-enabled cells with the ability to operate on a single spreadsheet model's data with an unlimited number of alternative models. The user is given a plurality of impact cell types for complete control over model permutation behaviors, multifunction cell operations for context-sensitive modeling, interoperable cell behaviors to execute intelligent inter-cell communication, iteration, synchronization, and constraint enabled analytical operations. The user is also given direct access to the cell's enhanced data structure where each display cell can store more than one processing cell in computer memory, as well as mode control and model permutation control and callable user interfaces.

The result is a one-to-many spreadsheet that is polymorphic, i.e., can change from one form into another one of many alternative forms. Thus, a broader spectrum of modeling solutions is available while maintaining the speed and ease of the familiar spreadsheet human interface.

DEFINITIONS

The following terms are used in the ensuing description:

Behavior is an operation or action to be taken or executed.

Cell is an addressable storage unit for information. It is interchangeable with the term "node,"

Cell address is the location of an editable field (node) denoted according to a specified row and a specified column. In a spreadsheet the cell address row is denoted by a number and the column is denoted by a letter (although sometimes this arrangement is reversed). B3 would be the node in the second column and third row, for instance. In a non-spreadsheet modeling environment each cell address is the intersection of a variable name and a period identifier, i.e., the modeling alias for cell B3 might be "expenses" in period "three".

Cell attribute is any property, quality, or characteristic that can be ascribed to a cell.

Cell locator is an additional address specification for arrays with more than two dimensions. It can be designated as a page, a book, a library, a volume, inter alia.

Constraint control is a current constraint equation, a list of operations or actions to be taken or executed to change the model as regards node contents, and a constraint type designation, i.e., operation control parameters such as maximize, minimize, converge on value and the like, taken together.

Constraint controls are triggered in the invention by context-sensitive event processing. Constraint controls are evaluated to determine the actions to be taken in order to permute the current model into a new form when the constraint control is triggered.

Constraint data structure, "CDS", is a term used to denote a vertical storage format for the node's constraint control which replaces the node's validation attribute in the node data structure.

In CDS format, the constraint control is stored in a vertical format such as a string list or linked list. The CDS storage format uses list processing (add, delete, index) or pointer operations to store and extract the individual items contained within it.

Constraint formula structure, "CFS", is a term used to denote a horizontal storage format for the node's constraint control.

In CFS format, the constraint control is stored in a horizontal format such as a long string type.

Current content is the first component part of the permutation control. It contains the current node content.

Dependent cell, formula cell or dependent variable is a node that contains a formula used to calculate the node's value.

Dependent interactive impact cell is a formula type node that contains an interactive permutation control.

Dependent non-sibling is a content type receiver node that can be passed an equation by a user defined multiple impact cell that is not a precedent cell.

Dependent sibling is a content type receiver node that can be passed an equation by a user defined or multiple impact cell that is a precedent cell and thus the cell is a sibling, i.e., the cell is a member of a group of cells.

Dependent single impact cell is a formula node that contains a single impact permutation control attribute. It will impact only one receiver node.

Dependent user defined multiple impact cell is a formula node with a user defined permutation control that will impact a plurality of receiver nodes.

Direct precedent cell or variable value node is a node that appears in the right-hand side of a node's formula.

Edit field is an editable memory location, often called a cell or node in a spreadsheet application and often called a node in a multidimensional modeling application.

Enhanced data structure, "EDS", is a designation for a vertical storage format for the node's permutation control.

In EDS mode, the permutation control is stored in a vertical format such as a string list or possibly a linked list. The EDS storage format uses list processing (add, delete, index) or pointer operations to store and extract the individual items contained within it and is best used for table displays and to enhance processing speed.

English language syntax refers to the use of English language identifiers for nodes in a model. For example, variable names and period names in place of row and column identifiers.

Enhanced formula structure, "EFS", is a designation for a horizontal storage format for the node's permutation control.

In EFS mode, the permutation control is stored in a horizontal format such as a long string type. This format is best used in formula edit-bar application and to minimize memory use.

Enhanced formula syntax is an order of precedence that is used to parse the contents of the permutation control, the constraint control, or the original state control into its component parts.

Enhanced standard mode is a mode of operation of the present invention wherein the contents of an impact node are protected.

When an entry is made into an enhanced standard mode cell, an interactive display warns the user and provides several options, protect the cell contents and stop, proceed with the permutation process, or take another action such as load a model version selected from a list of model versions that are available.

Execute is to follow to the end, as in sequence, to perform, to carry into complete effect, to complete; to accomplish; to finish; to give effect to; to perform what is required to give validity to (the model); accomplish; complete.

Extended cell address is the concatenation of a cell address with cell locators, e.g., library1:book1:sheet1:B3.

Formula cell, dependent cell or variable node is a node that contains a formula that is used to calculate the node's value.

Formula subtype is a designation for a subtype of the permutation control attribute that passes an equation or formula during the permutation process.

Formula variable or dependent variable is a field whose value is calculated from a formula. It is equivalent to a dependent cell in a spreadsheet.

Future contents is the second component part of the permutation control where alternative future node contents are stored for use during the permutation process.

Impact or impact event is a collision between an entry made into a node with the current contents of the node that will trigger a model permutation.

Impact cell or impact node is a node that contains a permutation control, an original state control, and may contain a constraint control.

Impact cell type or impact cell sub-types are synonymous with the node's permutation type identifier or permutation control attribute and the corresponding permutation control attribute sub-types.

The types and subtypes represent a hierarchy of permutation behaviors that can be triggered by the invention's context-sensitive impact event processing. Thus, each permutation behavior represents a particular impact cell type. Some impact cell types, in turn, have subtypes.

Impact event or impact is a collision between an entry made into a node with the current contents of the node that will trigger a model permutation.

Impact type is a class type or type-subtype designation for each distinct kind of executable permutation behavior that resolves the conflict created by an impact or collision between an entry made into a cell with the current contents of the cell and is synonymous with the cell's permutation control attribute or permutation type identifier.

Independent cell, input cell or independent variable is a node that contains a numerical or text value, i.e., it does not contain a formula or equation that calculates its value.

Independent content subtype is a permutation control attribute subtype. Independent content is generally a number or text.

Independent impact cell is an independent node with a permutation control.

Independent interactive impact cell is an input node with an interactive permutation type identifier.

Independent single impact cell is an input type node that contains a single impact permutation type identifier. Independent single impact cells can consist of two sub-types, a value subtype or a formula subtype.

Indirect precedent cell is a node that does not appear specifically in a cell's formula, i.e., is not a direct precedent cell, but that does appear in a direct precedent cell's formula.

Input cell or independent cell is a node that contains a numerical or text value, i.e., it does not contain a formula.

Input variable or independent variable are synonymous terms in a modeling application and are equivalent to an independent cell or input cell in a spreadsheet.

Interactive impact cell is a node that contains an interactive permutation type identifier stored in the cell's permutation control.

An interactive impact cell causes interaction with the user at runtime. This interaction provides for the selection of the pathway through the model that the permutation process will follow. Thus the user can interactively select among alternate permutation paths.

Interdependent cell type or sibling type, is a group of nodes with a common parent that must act as group during the permutation process.

Sibling cells are interdependent upon one another and upon the parent cell. A permutation of the parent cell causes a permutation of all of the sibling cells. In turn, a permutation to a single sibling cell causes a permutation not only to the parent, but also to each of the siblings.

Interoperable cell is a node that is able to send and receive email messages and thus operate in conjunction with several spreadsheets including user interface objects, other cells, and formulas not in the active spreadsheet but available from memory storage or in a spreadsheet stored on a network.

Model, a set of equations used to calculate a set of results.

Model rules or Rules are equations or formulas that are assigned to variables and periods in the modeling environment and are equivalent to the term formula in a spreadsheet. Rules or formulas in the modeling application are often expressed with English language syntax while formulas in a spreadsheet application use cell references. Both perform the same function.

Multifunction cell is a node that can behave as an input node, a formula node, an impact node, a constrained node, or a combination of these node types, in a context-sensitive manner, i.e., depending on the circumstances, one or more of several node functions is enacted.

Thus, in the present invention, a multifunction cell is able to receive a value as input to the cell, contain a formula with which to calculate the cell's value or contents, and contain a permutation control that, when triggered, will result in a permutation of the model into a new form. It may contain a constraint control that when triggered will result in a constrained version of the permutated model. Support for all of these functions, individually and in combination, provides a multifunction cell with advanced capabilities for a model permutation.

Multiple allocation is a type of permutation behavior in which sibling nodes receive an equation from a set of equations located in the permutation control of a parent node.

Multiple allocation impact cell is a parent node that contains a permutation control that, when triggered, will cause permutations to multiple sibling nodes during the permutation process.

Multiple impact cell is a node that contains a permutation control that, when triggered, will cause permutations to multiple nodes during the permutation process.

Node is the location of an editable field in a multidimensional data structure. It is often called a cell in a spreadsheet application, and sometimes referred to as an editable field in a modeling application.

Order of precedence indicates the sequence of a series of behaviors.

Original state control is an archive of a node's original permutation control that is used to undo or reset the node to its original state when triggered in the invention by context-sensitive event processing.

Original state data structure, "ODS", is a designation for a vertical storage format for the node's original state control.

In ODS format, the original state control is stored in a vertical format such as a string list or linked list. The ODS storage format uses list processing (add, delete, index) or pointer operations to store and extract the individual items contained within it.

Original state formula structure, "OFS", is a designation for a horizontal storage format for the node's original state control. In CFS format, the original state control is stored in a horizontal format such as a long string type.

Parent cell is the node whose permutation control determines the permutation operations performed on a group of sibling cells during a permutation process.

Permutation behaviors are operations or actions to be taken or executed to change the model as regards order or arrangement of the model's contents.

Permutable means capable of being permutated; exchangeable. In a polymorphic model or spreadsheet, a model that is capable of being permutated; one model form is exchangeable with another model form.

Permutation means to interchange; to change among various things at once; any of the different ways a set of quantities can be arranged. In a polymorphic model, any of the different ways a set of model equations can be arranged.

Permutation content is one or more future node contents, i.e., next node contents. It is the second component of the permutation control.

Permutation control is a term designating the combination of the current node content, permutation content of one or more future node contents and a permutation control attribute.

Permutation controls are read and acted upon in the invention by context-sensitive event processing. Permutation controls are evaluated to determine the actions to be taken in order to permute the current model into a new form when the permutation control is triggered.

Permutation control attribute or permutation type identifier is the third component part of the permutation control and stores an identifier that indicates the type of permutation behavior that has been assigned to the node either by the software or by a user selection.

Permutation control storage format is either a vertical or horizontal storage format for the node's permutation control.

Permutation enabled cell is a node that contains a valid permutation control and which exists within the context of the polymorphic method of the present invention that is capable of performing the node by node permutation process. The permutation control is used to permute the model when an impact or collision occurs between an entry into the cell and the current contents of the cell.

Permutation enabled clipboard is a clipboard that is able to store and retrieve permutation enabled node contents that include a permutation control, a constraint control and an original state control in addition to conventional node attributes.

Permutation enabled clipboard behaviors are the activities of cut, copy, paste and the like that are able to operate using permutation enabled nodes to exchange information between the clipboard and the model nodes in a way that maintains the validity of the entire node contents which includes a permutation control, a constraint control and an original state control in addition to conventional node attributes.

Permutation enabled component architecture is an implementation strategy that produces a software component with public interface routines for users and developers.

In the polymorphic, permutation enabled spreadsheet component of the present invention, the permutation enabled operations of the component are declared as public operations that are accessible to the user or developer. These routines should be used when the contents of a cell are being updated. This insures that the polymorphic principles of the present invention are correctly enforced for user defined program or subroutine controlled input operations.

Permutation enabled constraint control is a constraint control that is able to operate on permutation enabled nodes so that the execution of a constraint operation interfaces with the node's permutation control to insure proper model permutations when entries are made into the node by the constraint operations.

Permutation enabled insert and delete operations are operations that maintain relative node references and other node interrelated attributes that can affect the permutation control, the constraint control, and the original state control during insert or delete operations affecting cell(s), row(s), column(s), or sheet(s).

Permutation enabled macros are subroutines that perform a sequence of operations, automatically, in a step-wise fashion on permutation enabled nodes and that specifically use the callable permutation interface of the invention so that the permutation behaviors of the invention are employed to insure a valid model permutation outcome during the execution of the macro.

Permutation enabled multiple sheet selections represent the ability of behaviors that affect multiple sheets, when multiple sheet selections have been made, to exchange information between permutation enabled nodes on multiple sheets to correctly store permutation controls appropriate to each sheet selected and/or correctly operate during the permutation process.

Permutation enabled sheet operations are insert, delete, and rename sheet operations that correctly maintain the node permutation control, constraint control and original state controls on nodes that are affected during these sheet operations.

Permutation enabled subroutines or permutation enabled macros are small, specialized programs or a list of behaviors, operations, or actions to be taken or executed that use the callable permutation interface routines of the invention, so that permutation behaviors of the invention are applied during the operation of the subroutine to insure proper permutation behaviors throughout the operation of the subroutine.

Permutation locked cell is a node that contains a permutation control attribute that prevents any attempt to change the contents of the node, what-so-ever. Thus, the cell is locked and no permutation can occur to it.

Permutation process is a process triggered by context-sensitive event processing causing a permutation of the model.

Permutation control attributes of the cells in the model are evaluated in the permutation process to determine the actions to be taken in order to permute the current model into a new form.

Permutation of a model, any of the different ways a set of node contents, i.e., text, equations and values, can be arranged.

Permutation prompt cell type is a node that does not contain all of the necessary information to complete a valid permutation control. The cell will interactively prompt the user for the information that is needed to finalize the content of the permutation control.

Permutation protected cells, sheets and models are nodes, sheets or models that have permutation control attributes that call for the protection of node, sheet or model contents.

Protected cells, sheets, or models will prompt the user before a permutation process is allowed to proceed to completion.

Permute is to interchange. To change as regards order or arrangement. In a polymorphic model, to change the model from one form into another one of a plurality of forms.

Permute mode is one of four polymorphic operating modes, viz., permute mode, polyversion mode, constraint mode and reset mode.

In permute mode, user selected permutation control options are stored in the node's data structure to control model permutation. Event processing triggers the activation of these controls.

Polyalgorithmic cell is a node that stores and triggers a user-supplied permutation enabled subroutine or algorithm when the node's permutation process is triggered.

Polymodal is the ability of the present invention to provide the user with several operating modes.

Each operating mode provides additional options for model permutation in order to achieve a substantially unlimited set of permutation capabilities.

Polymorphic mode is an operating mode of the present invention.

The polymorphic mode provides four operating options, viz., permute mode, polyversion mode, constraint mode, and reset mode.

Polymorphic spreadsheet is a spreadsheet model having many forms; a spreadsheet model assuming many forms.

Polymorphism is the property of existing in different forms. Polymorphous, polymorphic, having many forms; assuming many forms. In a polymorphic model or spreadsheet model, a model that can assume a plurality of forms.

Polyversion cell is a node whose permutation control stores and triggers a retrieval of a user-supplied partial or complete model version during a permutation process.

The named version (sans data) is retrieved into the active model when the cell's permutation process is triggered.

Polyversion mode is one of four polymorphic operating modes, viz., permute mode, polyversion mode, constraint mode and reset mode.

Polyversion mode provides the ability to apply more than a single set of model logic to a single set of spreadsheet data. In polyversion mode, an alternate one of several model versions is loaded into active memory of a spreadsheet, using a single set of data that remains unchanged until the alternate model is loaded and calculated.

Protection control attribute is an attribute stored in the model data structure that controls model, sheet, and node level protection operations.

Receiver cell or receiver node is the target node in a permutation process.

Reset model mode is one of four polymorphic operating modes, viz., permute mode, version mode, constraint mode and reset mode.

In reset model mode, the user is able to control model reset events to isolate or accumulate a series of model permutations and reset those changes in the model to one of its previous states. Reset mode affects only model logic but has no impact on model data.

Sibling subtype is a designation for a group of nodes which are found in the permutation control content of multiple impact nodes that share a common parent.

Single impact cell is a node that contains a permutation control that results in a permutation of only one other node during the permutation process.

Snap shot is the ability to capture the entire contents of the model at a given point in time so that the entire model (not the data) can be reset to that point in time by an event-driven command received from the user.

Spreadsheet model is a set of node contents comprised of text, equations and values used to calculate a spreadsheet's nodes.

A target cell is the receiver node in a permutation process. Thus, it is a cell that is being instructed to change the contents of its permutation control.

Trigger cell is a dependent node or independent node that contains a valid permutation control.

Undo mode is an application level control that provides the user with the ability to undo the effects of a recent set of changes, independent of the reset mode.

User callable interface routines are a public interface to the executable operations of the invention in a component form, that take a set of parameters as input to the routines and perform operations that are useful in permutation enabled macros and permutation enabled subroutines or in application development using the component form of the invention.

The user or developer may execute these routines by addressing them by name and including the correct parameter list enclosed in parenthesis and separated by commas.

A user defined multiple impact cell is a node that contains user defined contents in the node's permutation control. It impacts multiple cells during a permutation process.

User defined subroutine is an additional multiple impact node type where a node's permutation control contains the name of a permutation enabled user defined algorithm or subroutine that is to be stored as the permutation control and is executed during a permutation process when triggered.

Value is a number or text. It is not a formula.

Value subtype is a numerical value that is contained within a node's permutation control that will be passed to another node during a permutation process.

Variant structured control attributes are controls with a variant record structure.

The variant structure may be used, for example, for the permutation control, the constraint control and the original state control attributes. The variant structure is useful when multiple interchangeable record formats are desirable. Thus one format may be use in one instance and another format in another instance. Because there are two useful formats for each of these controls, i.e., for the permutation control the EFS and EDS formats, for the constraint control the CFS and CDS formats, and for the original state control the OFS and ODS formats the variant structure may be useful. The variant structure may be used so that a single memory location can be used for one or the other format. The selection of the format type is then designated by an index value such that the format of the variant structure permutation control attribute is as follows for the permutation control and like structure for the constraint and original state controls.

```
Case permutation_control_structure of
    Efs: (Efs_Horizontal_Format:   String);
    Eds: (Eds_vertical_format:     TstringList);
end;
```

In the description that follows, the dot designation is used. This is used in most object-oriented programs to combine an object or structure (which is analogous to a record) with a field. Thus, cell.tpermctl would be a tpermctl field in a cell structure. The set designation is also used, i.e. [prprevious, proriginal] to represent the acceptable set of constant values that can be passed to a particular operation. Each of these values would then represent an acceptable parameter to control the operation's behavior. In some instances these are user selections and in others they are selected by the system.

In the polymorphic spreadsheet, the user is provided direct control over each element of the cell's data and control over the model permutation process. The polymorphic spreadsheet relies on intelligent interoperable cells with plural cell data structure in the form of current and previous instances. The user can edit the current instance to set up the model.

Thus, a polymorphic spreadsheet depends on a user-controlled permutation process that follows a progression from the direct precedent cells to the indirect precedent cells, to named independent cells or to other system or user-defined permutation algorithm to change the model form from one in conflict into a form that can be calculated. Afterwards, the model is calculated using a standard spreadsheet calculation procedure.

The polymorphic spreadsheet also depends on automatic reordering of the content of the cells permutation controls as it progresses from the direct precedent cells to the indirect precedent cells, to named independent cells or the user-defined algorithms mentioned above.

DETAILS OF THE EMBODIMENT

The present invention may be embodied on a computer system such as the system 100 of FIG. 1, which includes a central processor 101, a main memory 102, an input/output controller 103, a keyboard 104, a pointing device 105, e.g., a mouse, a track ball, a pen device, or the like, a display device 106, and a mass storage 107, e.g., a hard disk. Additional input/output devices, such as a printing device 108, may be provided with the system 100 as desired. As shown, the various components of the system 100 communicate through a system bus 110 or similar architecture.

Figure 2:
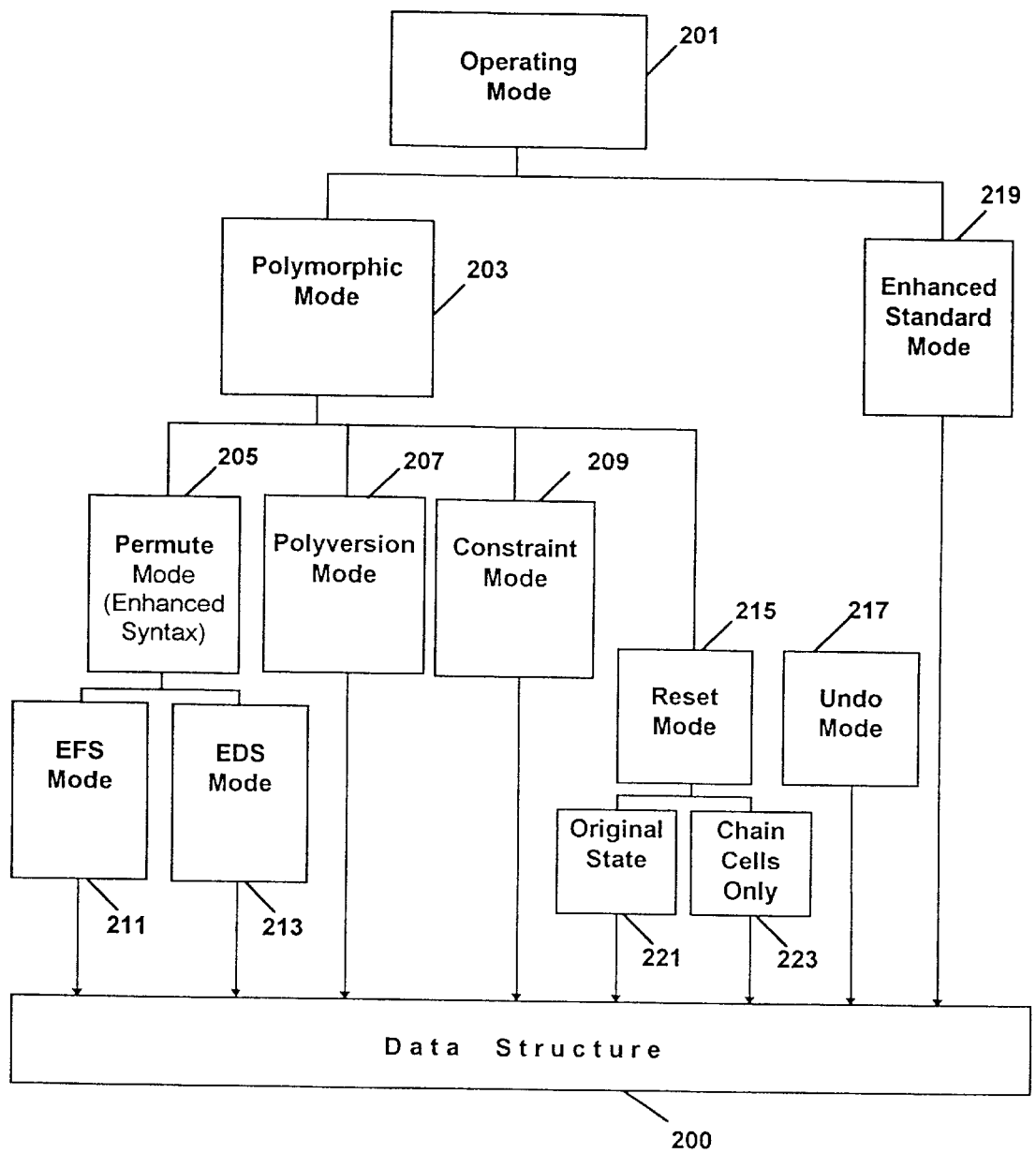
FIG. 2 is a block diagram of the relations of polymodal operations.

In FIG. 2, several operating modes of the invention are shown, some operating in a hierarchy. At the top of the hierarchy is the operational mode selection 201 which determines which of the modes is to be the active (controlling) mode.

The enhance standard mode 219 provides standard spreadsheet calculations which interact with the cell data structure to store, to retrieve, and to process the information stored in the cell data structure 200. The enhanced standard mode does not overwrite a cell formula when a value is entered into it. Instead, it provides a sound and selection dialog to warn the user that the cell is calculated using a formula stored in the permutation control. The user may select to retain the contents of the permutation control and exit without making a change, accept the value entered and permute the model using the current impact type, or retrieve an alternative model version. To clear the content of the permutation control, without triggering this warning, the user simply types a space and an enter key into the cell. This action removes the previous contents and prevents unintended erasures of formulas during spreadsheet design or definition by the user. There are several levels of protection in the invention. There are two kinds of cell locking. One can lock the cell and prevent all input into the cell, making its contents fixed, or the user can lock the cell against permutations which still allows the user to enter information into the cell. These behaviors differ from current art as a result of the polymorphic operations which are additive to the normal cell protection methods. The user can lock a cell against all input, protect the cell against inadvertent overwriting of valid contents, or protect a cell against changing forms as a result of an impact event that is attempting to change the model form during a permutation process. Thus, both the cell data content and permutation control content can be protected with various degrees of security.

The polymorphic mode of operation 203 is the default operating mode. It also controls the permute model mode 205, the polyversion mode 207, the constraint mode 209 and the reset model mode 215. The undo model mode 217 is an independent operating mode available to the user at all times.

Each of the polymorphic mode hierarchy and the independent undo mode, provide the user with the ability to control directly the contents of the cell data structure 200. The cell data structure is arranged so that the user can control the process of model permutation, i.e., change the model from one form to another of a plurality of forms. Model permutation is event driven and the events that are triggered in the polymorphic mode can, in turn, invoke or trigger other operations.

The permute mode 205 is a subsidiary selection available to the user under the polymorphic mode. The permute mode uses an enhanced formula syntax to parse the contents entered into the cell or formula edit-bar into a form stored in the permutation control. This mode supplies the user with the ability to use an extended formula syntax when entering a formula into each display cell. The enhanced formula syntax can contain a dependent cell formula, a list of impact cells and their contents and permutation control information. The permute mode uses enhanced formula syntax to respond to both recalculation and permutation events. For recalculation events it uses processing logic to parse the extended formula syntax into the dependent cell formula to calculate the cell value or for a permutation event to parse the information into the permutation control instructions that are needed to change the model form.

The permute mode uses two alternate storage strategies for the content of the enhanced formula syntax. In the EFS mode 211, the information is stored in a horizontal format, just as it appears in the edit field where the user enters it. In the EDS mode 213, the information is stored in a vertical form, such as a linked list or string list as known in the art.

Each mode offers different performance characteristics and advantages. The ability to select between the storage modes of EFS 211 and EDS 213 provides the advantage of control over the performance characteristics of speed and efficient memory utilization.

The permute model mode 205 also supplies the user with a hierarchy of permutation controls in the form of impact cell types that provide a wide array of options for an unlimited number of model permutation alternatives. In this mode, the invention will assist the user in many ways. For example, it provides an automatic default single impact cell selection, a list of alternate single impact cells, and controls for changing the default settings. It also provides many permutation controls to enhance user productivity both at design-time and at run-time.

Polyversion mode 207 is a subsidiary selection under polymorphic mode 203. This mode provides the ability to retrieve a named model version from a storage medium or memory location into active memory without overwriting the current set of data. It provides the ability to apply any number of alternative partial or complete model forms to a single set of spreadsheet data. The permutation control identifier located within the permutation control in the cell data structure 200 is set by the user to a value of polyversion to designate the polyversion mode of operation. The version name is also stored in the cell's data structure in the permutation control. When a permutation event for that cell is triggered the polyversion operating mode responds by retrieving the named version.

The constraint mode of operation 209, is a third subsidiary operating mode of the polymorphic mode 203. The constraint processing can be initiated directly by the user at any time. Constraint information is entered directly into the cell by the user and is stored in the cell data structure 200 in the cell's constraint control. Constraint processing can also be initiated at the cell level during processing events depending upon the options selected by the user and stored as type information in the cell's constraint control.

The reset mode 215 is another selection available to the user under the polymorphic mode 203. It works in conjunction with the permute mode, the polyversion mode and the constraint mode and gives the user the ability to reset the model to a previous state after a model permutation and recalculation has occurred. Model permutation has the effect of altering the form of the model as defined in the cell data structure 200. Each event that triggers a model permutation may result in a completely different model form. Therefore, after a series of changes, the model will not resemble the original model. It is sometimes desirable to be able to gain incremental or aggregate control over the model permutation process. The reset mode of operation provides both of these necessary and useful interactive controls which include the ability to reset the entire model to it's original form 221 or reset only select cells 223, i.e., those cells changed by just the last permutation event.

Because the previous form of each cell is independent, the result of each of these options is considerably different. In the first case, every cell in the model is returned to its original state. In the second case, only the cells affected by the last permutation event are reset.

The results of these two options can be both surprising and beneficial because the user is provided both incremental control and aggregate control over model permutation sequencing. In reset model mode, only the model's formulas and not the model's data are reset.

The undo mode of operation 217 is an independent application level, mode that is always available to the user. It provides the user with five undo options which include the ability to: undo the model to its original form, undo the model to its previous form, undo the model to its previous data, undo the model to both its previous form and previous data, or take a snapshot of the model at any point in time and undo the model to the last snapshot that was taken.

The operating modes 201 of polymorphic 203, enhanced standard 219, and sub-operating modes of permute mode 205, polyversion mode 207, constraint mode 209, reset model mode 215, and undo model 217 are maintained and triggered by application level events and controls, such as menu commands and speed buttons located on a toolbar, and in some cases by cell contents found in the cell data structure 200. Permute Model mode 205 is the default operating mode of the polymorphic mode 203.

Figure 3A:
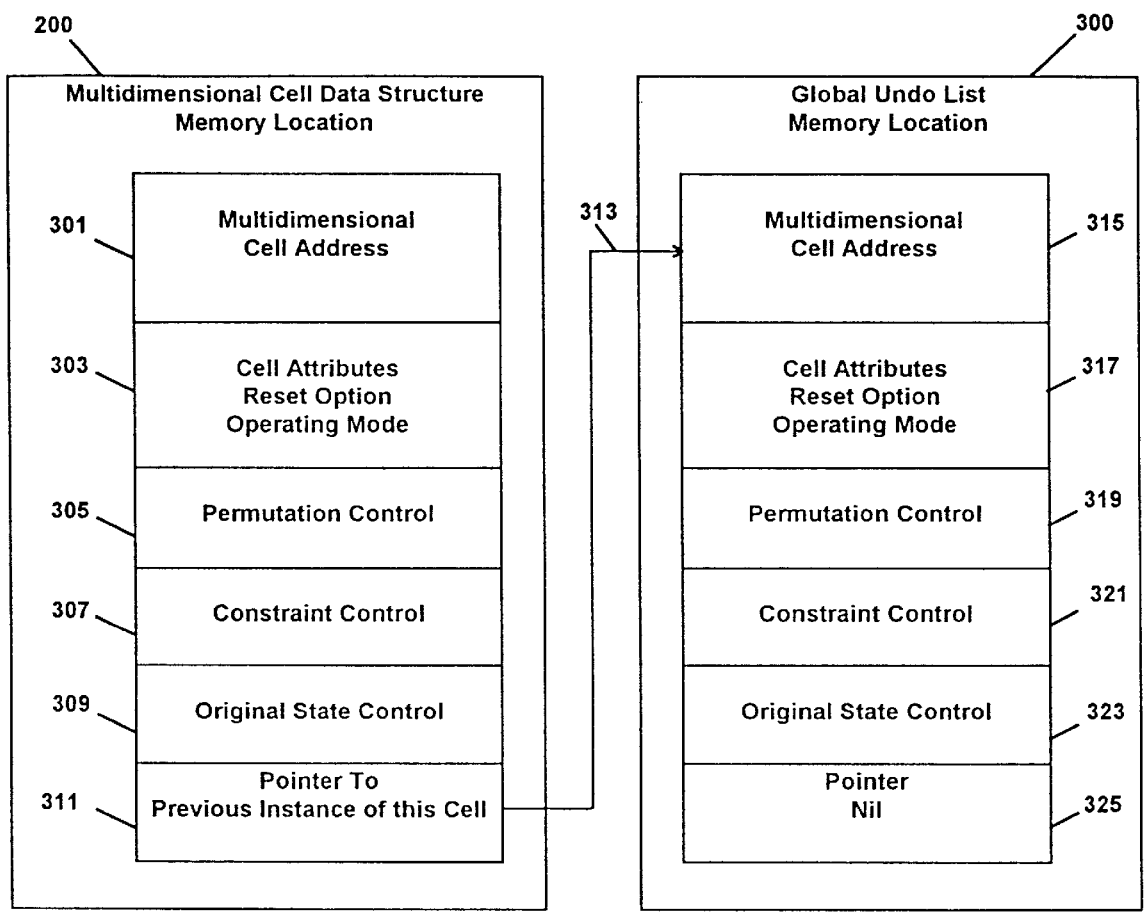
FIGS. 3A–3C are a block diagram of the cell data structure, the link to the previous cell instance on the undo list, and the communications link between multiple workbooks using the cell data structure and undo list in combination.

The cell data structure 200 is shown in FIG. 3A and includes more than one set of cell contents in computer memory for each cell shown on the computer display screen. The multidimensional data structure of the invention is stored in computer memory 102. The atomic level of the data structure is the cell's individual data structure which can be viewed as consisting of a number of connected parts. The cell data structure includes a current cell address 301, numerous cell attributes a, reset option and an operating option 303 of use in the present invention. Also found within the structure is a permutation control 305, a constraint control 307 and an original state control 309. A pointer 311 is also found to provide access to a second instance of the cell that is stored in the global undo list 300 in computer memory 102. The previous instance of the cell provides information, not only for the reset and undo operations, but also provides information that is critical to the permutation process. The previous instance of the cell is an exact copy of the current cell's data structure with all of the same controls and attributes.

The permutation control 305 and 319, constraint control 307 and 321, and original state control 309 and 323 can each contain a plurality of cell content as well as a type identifier.

The operation of the spreadsheet procedures rely upon the cell data structure 200 to accomplish the tasks related to model permutation and computational processing. In this way, the user is able to gain direct control over these processes by editing the contents of the cell data structure.

Figure 3B:
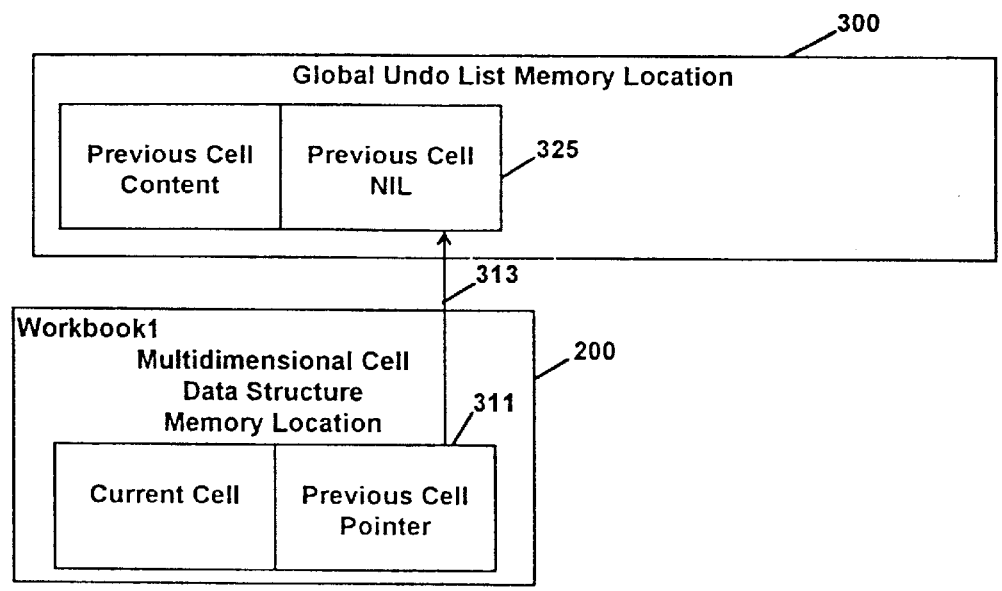

In FIG. 3B, a visual depiction shows the global undo list 300 with the previous cell content and a nil pointer 325. Below it and connected to it by the cell pointer 313 is the current cell content and previous cell pointer 311. The current cell 311 is shown as residing within the scope of the current workbook in data structure 200.

Figure 3C:
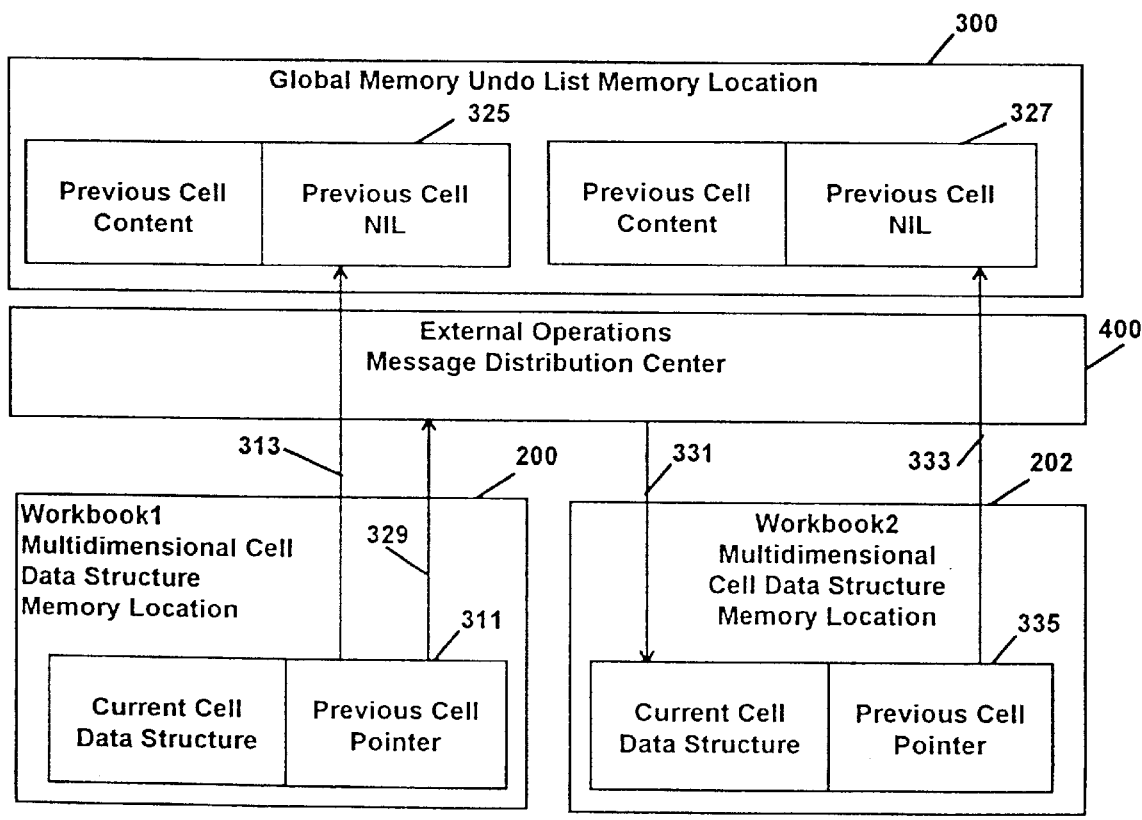

In FIG. 3C, a visual depiction shows the global undo list 300 with two cells, a previous instance 325 of a workbook1 cell 311, and a previous instance 327 of a workbook2 cell 335. Cell 311 is connected to its previous instance by pointer 313, and cell 335 is connected to its previous instance by pointer 333.

In between the worksheets 200 and 202 and the undo list 300 is the inventions application level message processing operation center 400. When a permutation event triggered by a cell 311 in worksheet1 refers to a cell 335 within worksheet2, an email message 329 is sent to the application level 400 to change the active workbook. In that message is all of the necessary content to provide for a permutation of the cell or cells in the second workbook2 202. The message 329 is re-transmitted at 331 by the message center 400 to workbook2 and directly to the cell 335. The permutation processor makes changes to the content of the cell 335, but before the changes are made, it is archived in its previous form in the undo list 300 at cell 327 and only then are its contents changed.

There are several central concepts of significance as shown in FIG. 3C. First, there are multiple instances of the spreadsheet cell, stored in computer memory, for each cell visible on the spreadsheet display on the computer screen. Second, the cell data structure, specifically in the permutation control, the constraint control and the original state control, contain a plurality of cell content within the structure. Third, the permutation events of the invention use the archived previous content of the cell as an integral part of the permutation process. Fourth, the undo list is created as a global list so that it can contain cells from multiple workbooks. This is necessary in order to both respond to the permutation event and to respond to undo or reset events that affect more than one workbook. Fifth, either of these workbooks could be accessed by a network such as the world wide web using internet URL addresses. The combination of the cell data structure, the undo list, the message processing, and the permutation behaviors of the invention provide polymorphic operation within both local and external workbooks.

As already noted, the previous instance of the cell is critical to the operation of a polymorphic cell. It's current form is preserved in the previous instance and a new form can then be taken by the current instance. Both its previous and current state can be evaluated by the polymorphic operations of the invention via a single access point, the individual cell. The intra-cell link facilitates both the permutation behaviors and the context-sensitive operations of the invention.

Both the current and the previous instance of the cell contain a permutation control, a constraint control, an original state control, and mode control attributes of the reset options and operating mode. The local mode attributes interact with component level attributes with the same names. The component level attributes take precedence over the locally stored attributes. If the component attribute contains a neutral value then the local attribute takes precedence. In this way, behaviors of the invention can be applied on a cell by cell basis, or in combination with the global operating modes of the invention.

The cell's permutation control, constraint control, and original state control contain a plurality of cell content followed by a type identifier. Permutation behaviors use the permutation control, constraint behaviors use the constraint control and undo or reset operations use the original state control, i.e., the original permutation control content is stored in the original state control when the cell content is first instantiated by the user.

Braces, '[. . .]' are used in the following description to indicate a set of valid values. The reset attribute indicates one of the valid constants [reset formula, reset data, reset formula and data, reset to original] to control model reset behavior after permutation operations are complete. The operating mode attribute indicates one of the valid constants [lock cell, enhanced standard mode, permute mode], and is used to control user interaction with the cell by controlling the operating modes that can be applied to the cell.

Each control, the permutation control, the constraint control and the original state control provide a variant type structure for their content. The variant type is capable of representing values that change type dynamically. The variant type provides a means of selecting between alternate memory storage formats with different performance characteristics at runtime, i.e., a horizontal and a vertical format.

The variant type contains a structure index to select between the alternate storage formats dynamically at runtime, and uses a single memory location for the content. At the component level the inherit structure attribute allows the user to select the storage structure for a given cell. This structure can also be changed dynamically during model permutations, since the current structure of one cell can be inherited by the next cell. The user's selection of a storage format, particularly for the permutation control, results in direct control over significant performance characteristics of speed versus memory optimization.

It should be clear to those skilled in the art that there are multiple data structures that can successfully support the operation of the present invention to accommodate a particular operating system, technological limitation, or performance characteristic. It is also understood that in one instance the user may desire processing speed and in another instance efficient memory utilization. The preferred embodiment of the present invention combines the flexibility of either choice, i.e., processing speed or efficient memory utilization, which is a desirable benefit to the user. The use of the variant data structure, however, is not a limitation or restriction on the alternative data formats that one can employ to support polymorphic permutation behaviors of the present invention. The variant type structure for the permutation, constraint and original state controls are shown in the table that follows.

PERMUTATION CONTROL STRUCTURE OF

| | |
|---|---|
| HORIZONTAL: | EFS: STRING; |
| VERTICAL: | EDS: TSTRING; |
| END. | |

CONSTRAINT CONTROL STRUCTURE OF

| | |
|---|---|
| HORIZONTAL: | CFS: STRING; |
| VERTICAL: | CDS: TSTRING; |
| END. | |

ORIGINAL STATE CONTROL STRUCTURE OF

| | |
|---|---|
| HORIZONTAL: | OFS: STRING; |
| VERTICAL: | OFS: TSTRING; |
| END. | |

The alternate permutation control storage formats are nominated "EFS" for the horizontal format and "EDS" for the vertical format. These designations appear in the table above as field names that are addressable within the software. EFS means enhanced formula syntax and EDS means enhanced data structure. The alternate constraint control storage formats are nominated "CFS" for the horizontal format and "CDS" for the vertical format. CFS means constraint formula syntax and CDS means constraint data structure. The alternate original state control storage formats are nominated "OFS" for the horizontal format and "ODS" for the vertical format. OFS means original formula syntax and ODS means original data structure.

The permutation control, constraint control, and original state control are instantiated only when in use and are set to a null value when not in use to minimize memory use.

Each control stores a plurality of cell content followed by the type identifier in the selected format field of the data structure. The controls contain both current and future cell content. The component uses current permutation control content to calculate the current value of the cell. It uses the entire contents in inter-cell email messages to permute the model. The component uses current constraint control content to determine binding constraints, and uses the future contents in inter-cell email messages to permute the model into a constrained model format.

The implementation of the enhanced formula syntax of the invention provides a means for parsing a plurality of cell content entered by the user into its current, future and type identifier parts. The horizontal storage format contains the enhanced formula entered by the user, directly into the cell or formula bar edit field plus additional information generated automatically by the system for the user. The vertical storage format contains the same information in a list format, such as a linked list or string list as known in the art. These formats are interchangeable and either format can be used alone to accomplish the objectives of the present invention. However, in combination they yield additional benefits since the former can be more memory efficient and the latter more processing efficient. In some operating environments the horizontal format is limited in length so the vertical format must be used alone.

The cell of the preferred embodiment is implemented in an object oriented environment as an object class. When instantiated the cell publishes a set of behaviors that provide access to its data structure while simultaneously providing local processing as information comes in or goes out from the cell's data structure. In this way, permutation behaviors affecting the cell's data can be applied by the cell or by the operations of the component. Some operations of the invention are implemented as cell behaviors and others are implemented as component behaviors. Hence, the component can act on the cells and the cells can act on themselves to produce permutation behaviors according to the polymorphic paradigm of the invention.

The cell interface is shown in the table that follows. Access to cell content is provided by operations to initialize, set structured content, get structured content, read or write simple content, or retrieve structured content from one storage format into another.

| | |
|---|---|
| INITIALIZE | INITIALIZES CELL CONTENT |
| INITIALIZE P CONTROL | INITIALIZES PERMUTATION CONTROL CONTENT |
| INITIALIZE C CONTROL | INITIALIZES CONSTRAINT CONTROL CONTENT |
| INITIALIZE O CONTROL | INITIALIZES ORIGINAL CONTROL CONTENT |
| GET I/O CONTENT | RETURN I/O FORMATTED CONTENT |
| SET I/O CONTENT | UPDATE WITH I/O FORMATTED CONTENT |
| GET PERMUTE CONTENT | RETURN PERMUTATION CONTROL CONTENT |
| SET PERMUTE CONTENT | SET PERMUTATION CONTROL CONTENT |
| GET CONSTRAINT CONTENT | RETURN CONSTRAINT CONTENT |
| SET CONSTRAINT CONTENT | SET CONSTRAINT CONTENT |
| GET ORIGINAL CONTENT | RETURN ORIGINAL CONTENT |
| SET ORIGINAL CONTENT | SET ORIGINAL CONTENT |
| GET IMPACT TYPE | GET IMPACT TYPE FROM PERMUTATION CONTROL |
| SET IMPACT TYPE | SET IMPACT TYPE IN PERMUTATION CONTROL |
| GET CONSTRAINT TYPE | GET CONSTRAINT TYPE FORM CONSTRAINT CTRL |
| SET CONSTRAINT TYPE | SET CONSTRAINT TYPE FROM CONSTRAINT CTRL |
| CONVERT HORIZ TO VERT | RETURN VERTICAL FORMAT OF A STRUCTURE |
| CONVERT VERT TO HORIZ | RETURN HORIZONTAL FORMAT OF A STRUCTURE |
| RESET OPTION | READ WRITE PROPERTY |
| OPERATING MODE | READ WRITE PROPERTY |
| STRUCTURE | READ WRITE PROPERTY CONTROLS MEMORY FORMAT |

The execution of each listed operation is implemented by means known to those skilled in the art. The function of each operation is determined primarily by the storage format of the information contained in the cell as described earlier. Access to the contents of the cell's data structure is provided via these published interface operations.

With an understanding of the cell's data structure it is now possible to explain in greater depth the use of the enhanced formula syntax of the invention. What follows is a description of the structure of the contents of the controls listed above, an example of how this syntax is translated into model permutation behaviors in the invention for a single impact type, and an explanation of the user defined multiple impact as exemplary of multiple impact permutation behaviors. It is also understood in the following example that EFS and EDS can be used interchangeably.

The format of the EFS attribute is a list of cell content followed by the type identifier. The items in the list are separated by a character, such as a semi-colon, i.e., the user may enter permutation control contents directly into the cell or the formula edit-bar as follows:

A3=A1+A2;A1=A3−A2;A2=A3−A1;S.

The first position in the EFS attribute is the current position, i.e., the current cell content. The current cell content can be any valid cell content such as text, number or formula. When the current content is a formula, the current content is used to calculate the current cell value. In the example above, cell A3 is set to the value of cell A1 plus A2 (A1+A2). The permutation type identifier appears at the end of the EFS attribute and can be any valid permutation control type. In this instance the control is "S" and indicates a single impact permutation type.

When an impact event occurs, i.e., the entry from another source is in conflict with the current content of the cell, the conflict must be resolved. In this example, the current cell content is a formula to calculate the cell's value. If a number is placed in the cell, either programmatically or interactively, an impact event has occurred and the only resolution to that event is a model permutation. The resolution in this example is determined by the permutation type identifier of "S", or single impact. The permutation of a single impact cell occurs as follows.

A single impact cell will first post itself to its previous instance on the undo list and update the pointer to that instance in its data structure. It will then parse the contents of its own permutation control, using the enhanced formula syntax parsing operations, to determine the cell to which it can delegate its computational responsibilities. Specifically, the single impact cell looks at the first future content stored in its permutation content, which is the second item in the EFS attribute. The second item, A1=A3−A2 identifies cell A1, therefore, A1 is chosen to receive an email-message. In colloquial terms the message states that, as the result of receiving a numerical value from an unnamed source, A3 can no longer meet its computational responsibilities. Although it knows that it may be inconvenient and require extra work on the part of cell A1, it would be greatly appreciated if A1 would read the enclosed information, determine the correct computational result and perform the necessary calculation. It is understood that if cell A1's value is calculated by a formula in the current content position of its permutation control that it will in turn need to compose a similar email message to send to another cell, and so on until the last cell in the permutation chain is not a calculated cell.

Cell A3 must next compose the email message from the entire content of its permutation control, not just the right side of the equation, =A3−A2, but the entire content:

A3=A1+A2;A1=A3−A2;A2=A3−A1;S.

The email composition process will exchange the positions of the first and second items and then pass the complete EFS attribute to the receiver cell, i.e., cell A1 receives the EFS permutation control content of: A1=A3−A2;A3=A1+A2;A2=A3−A1;S.

The email message is updated with this new contents and it is then transmitted to cell A1. Having delegated its computational responsibility to cell A1, cell A3 is now free to accept the value from the incoming data source and dispose of its permutation contents, as it is no longer needed.

Inspection of the EFS attribute received by cell A1 and a review of the current state of cell A3 indicates several facts. First, cell A3 has already been changed to an input type cell with an empty permutation control. Second, the previous instance of cell A3, pointed to from the cell data structure and stored on the undo list contains cell A3's previous content. Third, cell A3's previous content in the current, or first position, was A3=A1+A2 and in the first future position was A1=A3−A2. When compared with the EFS attribute received, these two elements have exchanged positions. They been moved within the structure of the EFS attribute that is being passed to cell A1 in the form of an email message. Fourth, the permutation content that was sent, i.e., A1=A3−A2;A3=A1+A2;A2=A3−A1;S, will be used to update the permutation control for cell A1. Fifth, before this happens, the current content of cell A1 must be instantiated in its previous form on the undo list and the pointer to it updated in cell A1's data structure. Sixth, since cell A1 is not a calculated cell, this example can come to an end.

While this example is somewhat lengthy, it is important to understand the interaction of the permutation control contents, the enhance formula syntax parsing events to identify elements, the composition step where the message is generated by exchanging the order of the elements, the address step where the identity of the cell to change is determined, the dispatch step where the message is sent, the archival of the cells to their previous instance on the undo list, and the potential for a chain reaction affecting many cells. The multiple impact example will provide less detail, but is extremely important to understand in order to appreciate additional complexity that is encountered and appropriately processed in the invention.

In this example, the user defined multiple impact type is used. It is one of the more powerful and capable types. The various cell types that it can distribute are explained and other details of significance. The multiple impact types, in contrast to the single impact type, will use every entry in the permutation control to update the contents of every cell named in the list of cell contents. In addition to precedent cells contained in the permutation control content, independent cell content may be included in a distribution list in the cell permutation control. The enhanced formula syntax is used to differentiate the precedent cells from the independent cells.

For example, all un-typed cell contents (no type identifier) are treated as precedent cells, also nominated herein as siblings or interdependent cells (since precedent cells are related they represent a group that need to be processed using group behaviors); all typed cell contents are treated as independent contents; the type identifier is included as a prefix (or suffix depending on the parsing routine used) to each independent cell's content. Examples of valid cell types and the corresponding type identifier include but are not limited to: text ("), number (#), independent formula (=), blob (\) or other cell type as may be required.

Here is an example. The following EFS attribute contains a dependent cell formula, followed by two sibling formula cells, an independent text cell, an independent number cell, and an independent formula cell:

A3=A1+A2;A1=A3*0.6;A2=A3*0.4;B1="Sales";B2=#100.00;B3==A3+B2;U.

The EFS attribute can contain an unlimited number of items followed by the type identifier. The EFS attribute can contain every valid cell type. The EFS attribute is parsed during model recalculation to determine the formula for the current cell which is used to calculate the value of the current cell; or the EFS attribute is parsed during the permutation process to determine the cell(s) to be permutated and the permutation behavior that is to be executed. The parsing also can include the type identifier when the user defined multiple impact type is used, so that precedent (sibling) cells and independent cell contents can be differentiated, one from the other. Siblings will be treated as a group in future events but independent cell contents will not be included.

Given the EFS attribute and the user defined multiple impact permutation type:

A3=A1+A2;A1=A3*0.6;A2=A3*0.4;B1="Sales";B2=#100.00;B3==A3+B2;U.

Cells A1, A2, B1, B2 and B3 will all be sent email change instructions. The following is a table that lists each of the email messages that are composed and sent by the user defined multiple impact type shown above.

```
A1=A3*0.6 ;A3=A1+A2 ;A2=A3*0.4 ;B1="SALES" ;B2=#100.00 ;B3==A3+B2 ;U
A2=A3*0.4 ;A3=A1+A2 ;A1=A3*0.6 ;B1="SALES" ;B2=#100.00 ;B3==A3+B2 ;U
B1="SALES" ;A3=A1+A2 ;A1=AZ3*0.6 ;A2=A3*0.4 ;B2=#100.00 ;B3==A3+B2 ;U
B2=#100.00 ;A3=A1+A2 ;A1=A3*0.6 ;A2=A3*0.4 ;B1="SALES" ;B3==A3+B2 ;U
B3==A3+B2 ;A3=A1+A2 ;A1=A3*0.6 ;A2=A3*0.4 ;B1="SALES" ;B2=#100.00 ;U
```

Every one of these cells that, itself, contains a valid permutation control, will in turn send out another email message, and so on, until the permutation chain ends. No matter what type of cell these cells currently represent, be it text, number or formula, the presence of future content within the permutation control of the cell, in combination with a valid type identifier, constitutes a valid permutation control. Every cell type can simultaneously contain information that is displayed on-screen and information that generates permutations of the model, as well as constraint, or original state information, plus operating mode and reset option controls.

Figure 4:
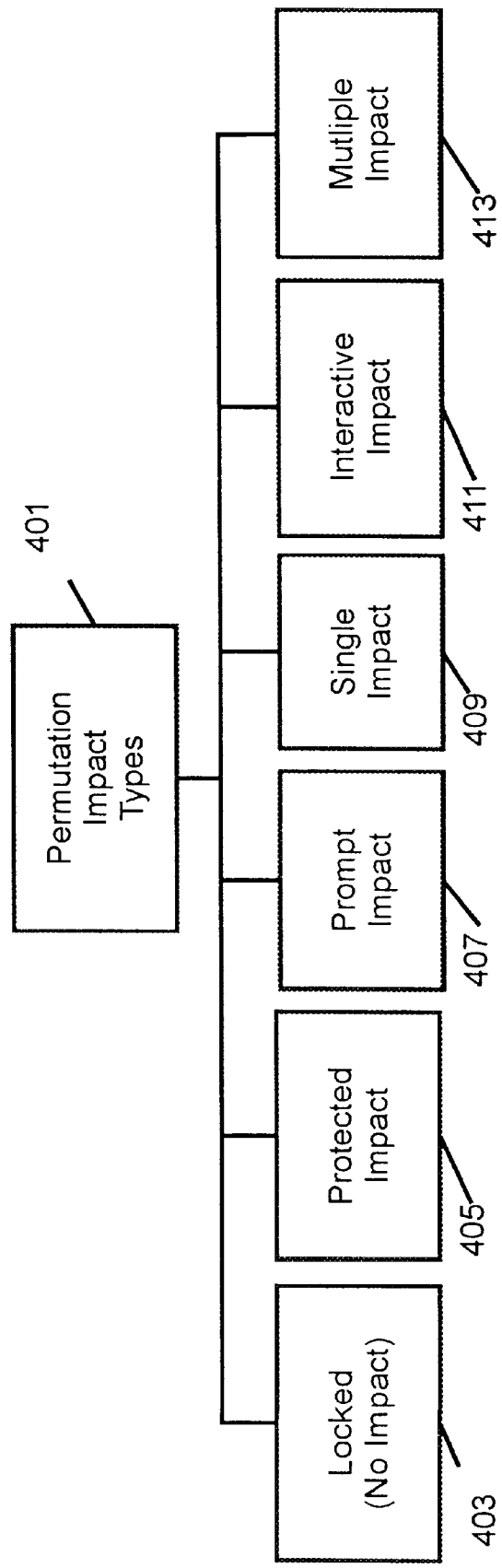
FIG. 4 is a block diagram of impact cell types and subtypes.

In FIG. 4, several impact cell types and subtypes are shown, some operating in a hierarchy of permutation behaviors that can be stored in the cell's data structure 200, and be triggered by the invention's context-sensitive event processing. At the top of the hierarchy is the permute control 401 found in the cell data structure 200, which contains, as an element of its content, the permutation type identifier. The type identifier can contain a value indicating one of the valid impact cells which include locked impact 403, protected impact 405, prompt impact 407, single impact 409, interactive impact 411, and multiple impact 413. Subtypes of interactive impact, single impact and multiple impact are shown in FIGS. 5A–C.

Figure 5A:
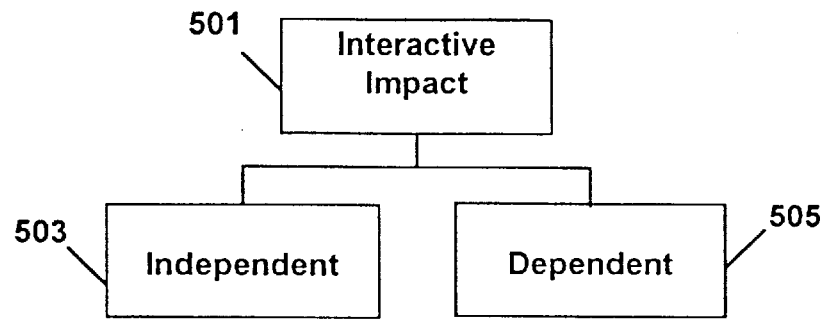
FIGS. 5A–5C are a block diagram of the relationships between impact cell types and subtypes.
Figure 5B:
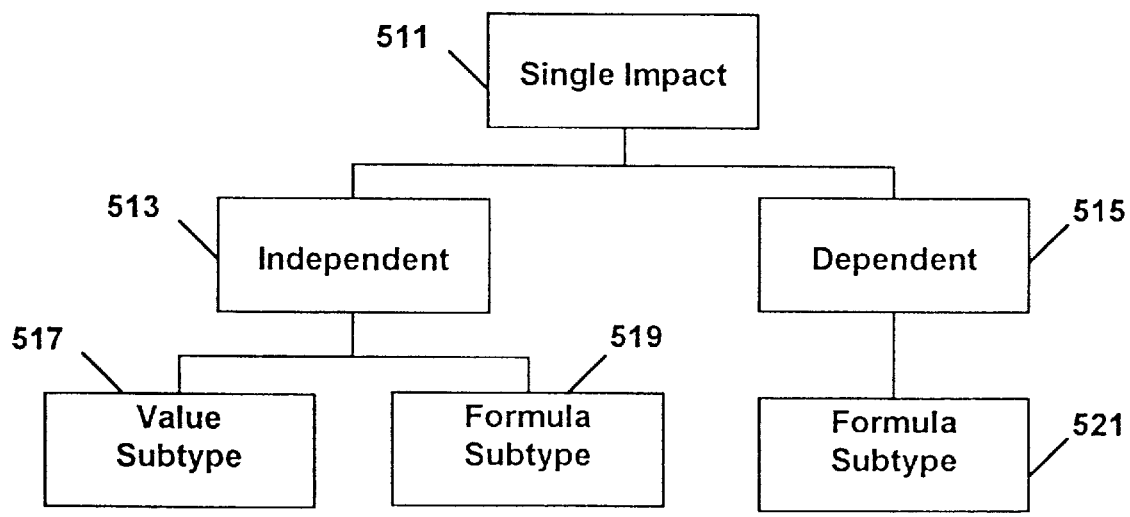
Figure 5C:
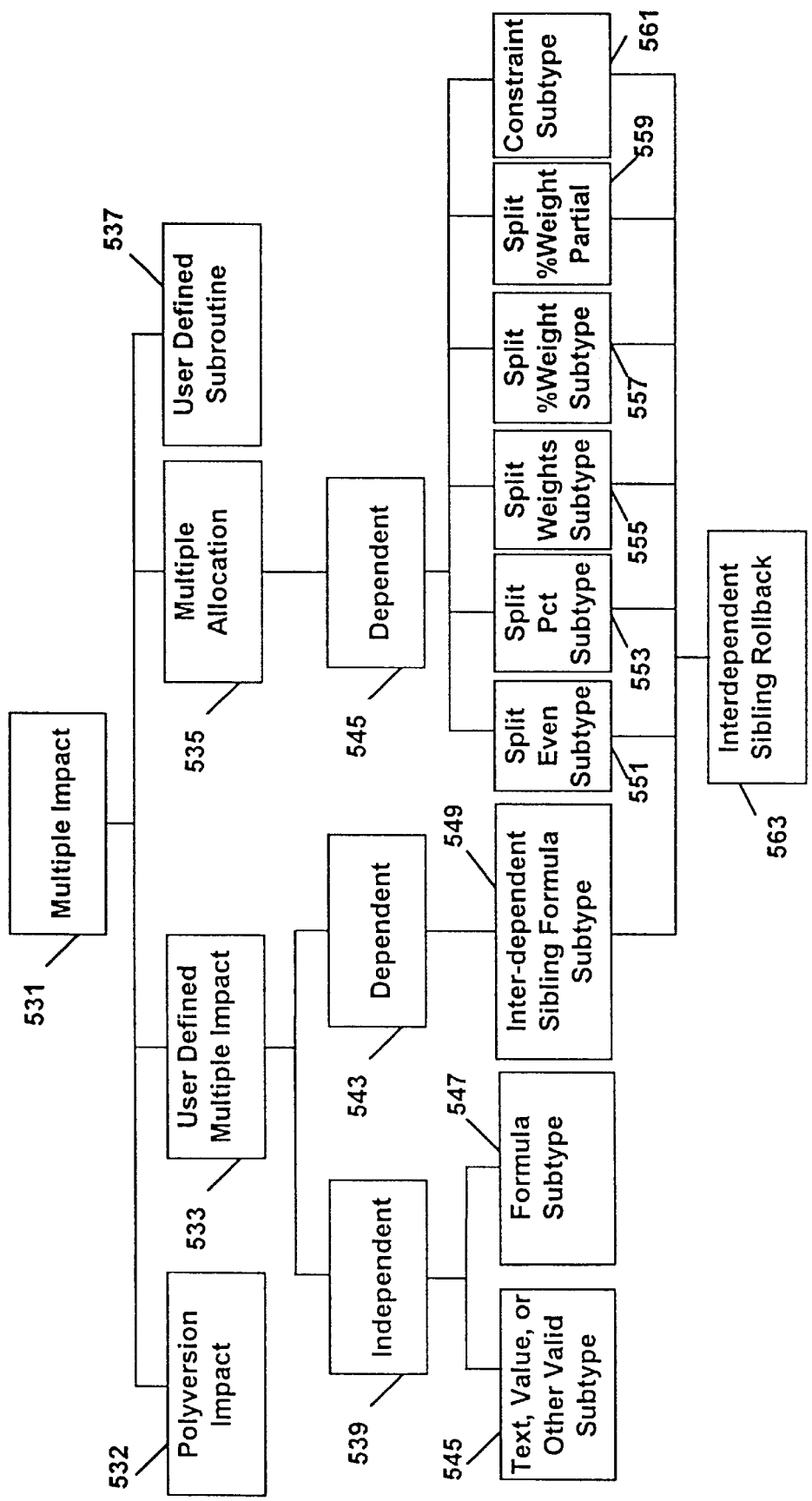

In FIGS. 5A, 5B and 5C, the impact cell types of the invention are shown in greater detail, in a hierarchical form. At the top of FIG. 5A is the interactive cell type 501 with two subtypes, independent 502 and dependent 503. An interactive impact cell is a cell that contains a permutation control that causes interaction with the user at run-time. This lets the user make directional decisions dynamically at run-time. The independent interactive impact cell 503 is an input type cell that contains an interactive permutation control. A dependent interactive impact cell 505 is a formula type cell that contains an interactive permutation control. Both input cells and formula cells can contain a permutation trigger of the interactive type 501. The interactive type can be inherited. The cell inheriting the type is designated an interactive callback cell. Users may wish to turn off either form of interaction, the initial dialog display or the inherited dialog display. For this reason there are also the sub-types of interactive-off, and interactive-on-callback-off. These designations retain the ability to interact with the user, but suspend them temporarily as the result of user selection to do so.

In FIG. 5B, the valid single impact cell types and subtypes are shown in a hierarchy. A single impact cell 511 is a cell that contains a permutation control that results in a direct change to the permutation control of only one other cell. An independent single impact cell 513 is an input type cell that contains a permutation control that affects the permutation control of only one other cell. Independent single impact cells can consist of two types, the text, value or other valid cell subtype 517 or a formula subtype 519. The permutation control for a single impact type can be defined directly by input from the user and also from equations generated by the system for the user.

An impact cell subtype is defined by the type of contents contained in the permutation control, i.e., an input cell can contain a permutation control that passes a value, a formula, or other valid cell contents to a single receiver cell.

A dependent single impact cell 515 is a formula type cell that contains a single impact permutation control. The dependent single impact cell has only one valid subtype, a formula subtype 521. A dependent single impact cell cannot pass a value to another cell without disconnecting the cell from it's precedent cells as defined in its formula. So, while it is possible to create a value subtype for a dependent single impact cell (not shown in FIG. 5B), the results would be counter productive. Therefore, the dependent single impact cell has only one valid form, the formula subtype. This is true from the perspective of maintaining the integrity of the model when a permutation event occurs. Thus, a dependent single impact cell passes a formula through its email message to a single receiver cell, as well as other necessary permutation control content. The receiver cell will change based upon the contents of the email message.

In FIG. 5C, several multiple impact cell types 531 of the invention are shown in greater detail, in a hierarchical format. A multiple impact cell is a cell that contains a permutation control that, when triggered, will cause the permutation control of more than one other cell to change.

A polyversion impact type 532 will retrieve a partial or complete set of model contents (exclusive of data) into the active memory of the invention, thus affecting many cells simultaneously.

A user defined multiple impact cell 533 is a cell that contains a user defined list of impact cells that will be changed when the permutation event is triggered. User defined impact cells are comprised of several subtypes as follow.

An independent user defined multiple impact cell 539 is an input type cell that contains a user defined cell list as its permutation control. When the contents for a cell in the cell list is a value, it is termed a text, value, or other valid subtype 545. When the contents for a cell in the cell list is a formula it is termed a formula subtype 547. Thus, the input cell 539 can pass text, value, or other valid content 545, or a formula 547, to any impact cell in the user defined cell list 533.

A dependent user defined multiple impact cell 543 is a formula cell that contains a user defined list of impact cells as its permutation control. When the a cell in the cell list appears in the parent cell formula, i.e., a precedent cell, it is termed an interdependent or sibling subtype 549.

An interdependent sibling rollback cell 563 is created when a group of sibling cells, i.e., a group with a common parent, have already been changed by a permutation event acting on them from the parent. These sibling cells, once changed, must act as a group should any one of them subsequently trigger a model permutation event. Thus, they are interdependent upon one another. The sibling that is first changed must notify not only the parent, but also each one of its siblings in the event of a permutation trigger.

The user defined multiple impact cell 533 can contain all three subtypes in the user defined impact cell list, i.e., text, value and other valid cell type, formula, and sibling subtypes, all cohabiting the same list.

A multiple allocation impact cell 535 is a dependent (formula) cell that contains a permutation control requiring an allocation of the input value to several other cells, using one of several alternative allocation algorithms. The system provided algorithms of the invention are, split evenly 551, split as a percent of the previous total 553, split based upon weights stored in a named spreadsheet range 555, split based on weights in a named range as a percent of their total 557, and a weighted split using only a partial list of precedent cells 559. When a permutation event in a multiple allocation impact cell is triggered, it results in a set of interdependent sibling impact cells 563, as have already been described. These interdependent impact cells must act as a group when a subsequent permutation event is triggered in any one of the group members.

A special case multiple allocation is the constraint type 561. Constraint processing fundamentally performs additional rule processing to determine a basis upon which to allocate values between cells in the model. As a result, the constraint processing of the invention is classified as a multiple allocation subtype.

The user defined subroutine cell 537 is an additional multiple impact cell type where any cell can contain the name of a user defined algorithm or subroutine that is to be stored as the permutation control and executed when the permutation event is triggered. User defined subroutines should make use of the callable user interface of the invention to update cell contents so that the structural integrity of the polymorphic behaviors of the invention are applied to the cells, i.e., so that user generated impact events from subroutines will result in model permutations.

There are just five multiple allocation subtypes shown in FIG. 5C. However, this limited number does not in any way limit the user to just this selection. In combination, the user defined type 533, the polyversion type 532 and the user defined subroutine type 537 are capable of delivering any and every possible desired computational outcome that the user may desire.

Figure 6:
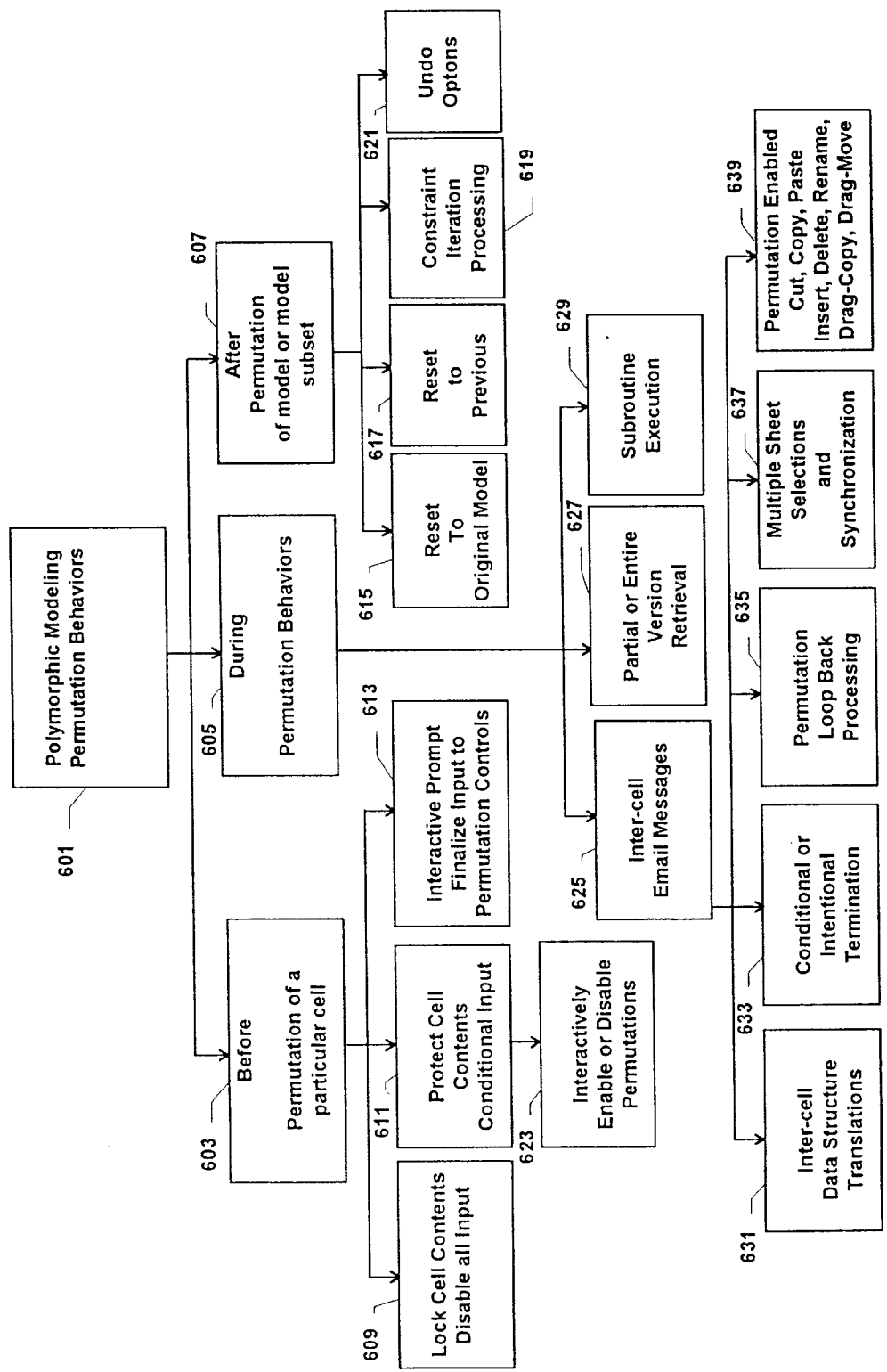
FIG. 6 is a block diagram of a hierarchical relationship among the polymorphic modeling permutation behaviors of the invention.

FIG. 6, is a block diagram showing the conceptual sequence of permutation behaviors 601 of the invention. Certain model permutation behaviors 603 occur before the permutation of a given cell. Some permutation behaviors 605 occur during the permutation of a model's cells, and other permutation behaviors 607 occur after the permutation of the cells is completed.

The permutation behaviors that generate a polymorphic model interact directly with the cell data structure 200 of the present invention. This data structure is also directly accessible to the user so that both the user and the permutation operations of the present invention directly access and operate upon the cell data structure.

Examples of several behaviors that can occur before a permutation 603 is applied to a particular cell include but are not limited to, locking 609 the cell's contents, a conditional permutation 611 of the cell, interaction 613 with the user to determine whether a permutation of the cell should be enabled or disabled, or, when the cell's permutation control is not yet finalized, i.e., the permutation information stored in the cell is incomplete, interaction with the user can occur to determine the permutation behavior to execute during the subsequent model permutation operation. Permutation behaviors 623 may also be temporarily suspended, i.e., enabled or disabled for a time by the user.

Behaviors that can occur during a permutation 605 of the model's cells can be grouped into three major categories: inter-cell email messages 625 that contain permutation instructions, the retrieval of a partial or complete model version 627, or execution of a user defined algorithms or subroutines 629. Each of these behaviors may also involve runtime interactions with the user as required by the individual permutation controls. Inter-cell email message processing requires that cells are email enabled so that they can send, compose, receive and execute email messages and their contents. As disclosed herein, the structure of the permutation control, the constraint control and the original state control found in the cell data structure may also vary from one cell to another. Therefore, email enabled cells also require data structure translation behaviors 631. This form of interoperable-cell enables instantaneous translation from one memory format to another as permutation controls are passed from one cell to another during the model permutation process.

A locked cell 609 or a permutation-disabled cell 623 can also be encountered during the runtime operation of the permutation process. Such an encounter can interrupt the permutation 633 and may be followed by a reset or undo 621 of the current set of accumulated permutations.

Another behavior unique to the polymorphic model of the present invention that can occur during model permutations is the permutation loop 635. A permutation loop is similar to a circular reference, but is very different from a circular formula reference and is not to be confused with an infinite loop. The polymorphic model of the present invention will not generate an infinite loop because any time a permutation path is crossed the previous path is automatically followed back to the origination point and processing is automatically terminated. Circular formula references result from a cell or one of its precedent or indirect precedent cells referring back to it in one of the formulas. On one hand, iteration controls are used to control circular references and are a standard part of spreadsheet operations. On the other hand, a permutation loop is found only in a permutation-enabled model. The permutation-enabled model is not susceptible to infinite loops because it does not rely on inaccurate floating point value comparisons and because the origination point is always known to the permutation process at every step, i.e., it contains an empty permutation control. Model permutation process proceeds from direct precedent cells to indirect precedent cells to named independent cells and to multiple sibling cells or call back cells. Each cell in the permutation sequence is changed. The permutation of the cell replaces any prior reference that may have resulted in a circular outcome and the return path leading from each cell that has been permutated back to the cell of origin has been placed sequentially in each permutated cell. Therefore, in the event of a loop, all roads lead back to the cell of origin.

There is one exception that may occur that is screened out before a cell may be permutated which is the case of a cell referring directly to itself from within its permutation control. A direct self reference is an invalid permutation control and will not be executed.

Under normal conditions, i.e., when a loop is not present, the origination cell is transformed into an independent cell with no permutation control type. When a loop occurs the origination cell is permutated a second time, back into its previous dependent cell form and it will contain a valid permutation control type. The cells where the loop transpired, however, are not returned to their original form. The result is a complete model permutation into a viable model form that can be calculated, but only a part of the model has returned to its previous form.

As a result, the processor will resubmit the permutation event in order to synchronize the model when a permutation loop occurs. The result will be a retracing of the last permutation in a reverse direction around the loop cells, the model will return to its original form, and any computational anomalies that might have occurred on the first permutation are corrected by the second permutation.

Another in the list of possible behaviors to occur during a model permutation is the selection of multiple sheets by the user 637. Multiple sheet selections are intended to allow entry on one sheet to be copied directly to each of the selected sheets. The polymorphic methods of the present invention validate the integrity of multiple sheet selections by a test to determine if the contents of the multiple sheet selections are synchronized. The contents of the selected sheets are said to be synchronized when each cell in the selected range of cells that is to be entered is of the same type as the visible cell.

When the sheets are synchronized, the entry into the visible cell is automatically performed on each of the selected sheets, including all of the necessary permutation behaviors to insure that the entire model is permutation-enabled after the clipboard or edit operation is completed. When the sheets are not synchronized, the user is warned and given the option to continue solely on the visible sheet, to cancel the operation or to continue.

The present invention provides a permutation enabled clipboard 639 so that cut, copy, paste, insert, delete, rename, drag-copy and drag-move operations all result in a correctly permutated model. In a spreadsheet of the current art the permutation processes are not present and therefore the clipboard operation is quite simple and uncomplicated. Relative cell references are maintained when information is cut and pasted from one area of the spreadsheet to another.

However, when the spreadsheet is enhanced for polymorphic modeling, the current art clipboard is inadequate to maintain the integrity of the model's permutation controls. The relative references contained within the permutation controls must be maintained as well. The clipboard 639 of the present invention is, therefore, permutation-enabled, and every operation that involves moving, copying, inserting, deleting, renaming or otherwise changing the location or contents of a single cell or a group of cells, has been enhanced to maintain the integrity of the polymorphic model permutation controls such that the clipboard operations and the insert, delete, rename operations and the drag-copy and drag-move operations are all permutation-enabled or permutation-friendly. Current art clipboards are permutation-unfriendly and can be said to have a permutation disability that prevents them from supporting polymorphic modeling.

Examples of behaviors 607 that can occur after a model permutation is complete involve a reset of the model to its previous form 617, i.e., its previous formulas just prior to the last change event, or selectable undo options to reconfigure the model into a different form such as a reset of the model to its original formulas 615, or the application of optimization and/or constraint processing 619. The user may select from the following undo options 621: reset to previous formula, reset to previous data, reset to original formula, reset to the last snapshot of the model formulas or to the last snapshot of the formulas and data.

Figure 7B:
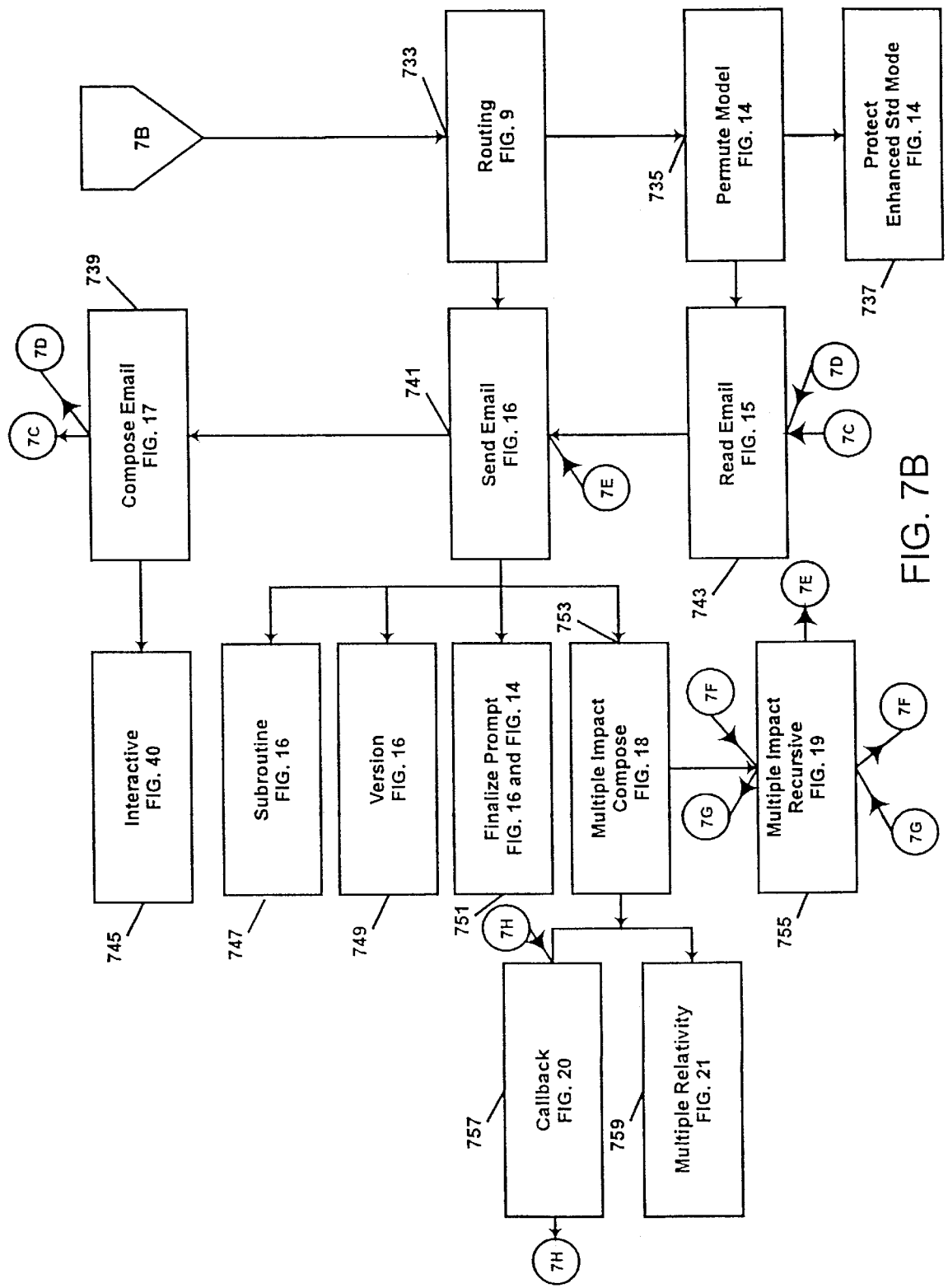
Figure 7C:
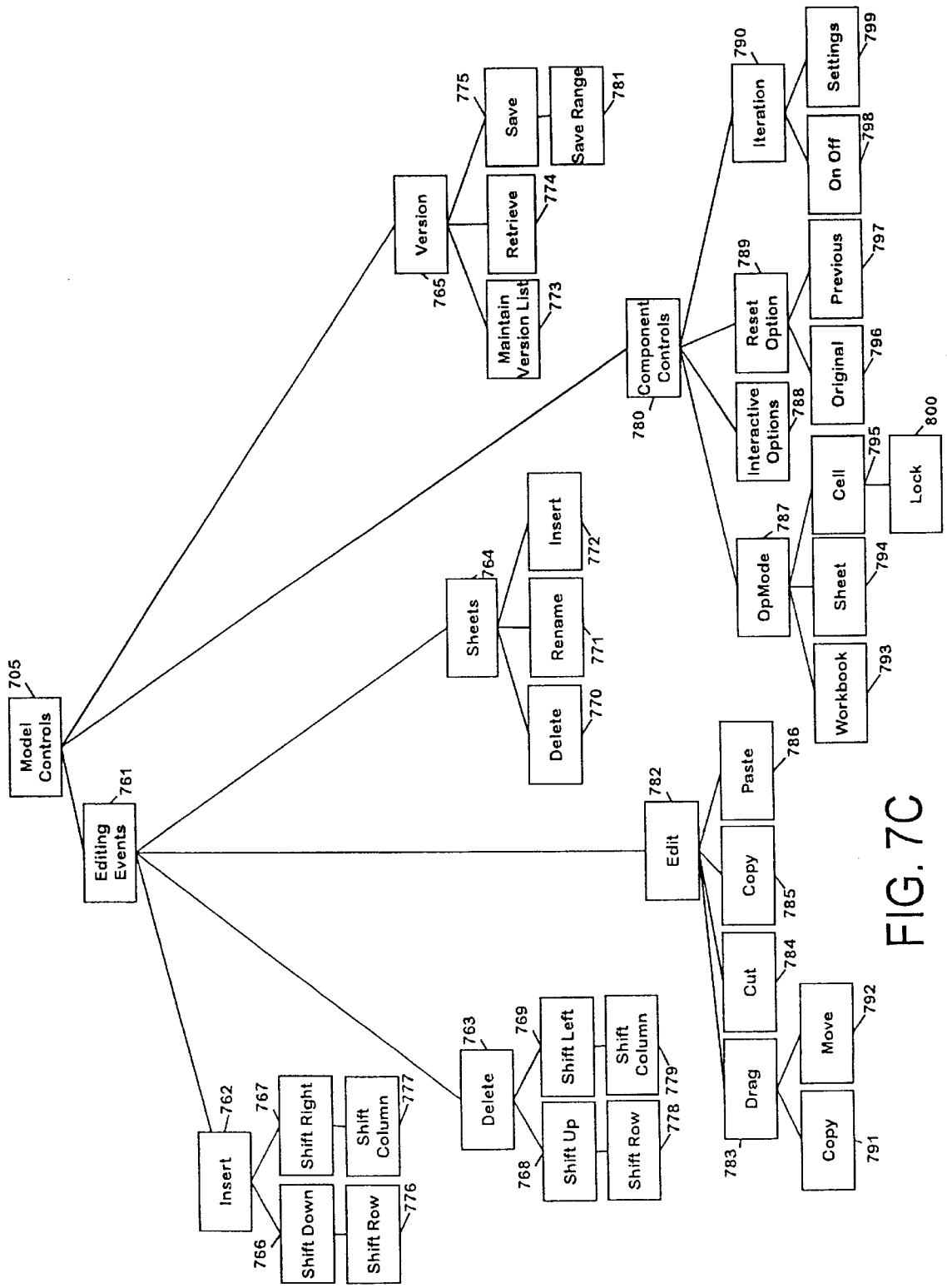

FIGS. 7A–7C are block diagrams used to illustrate how the subroutine processors of the present invention are organized in a hierarchy. At the top of the hierarchy is the event processing subroutine 701. The event processing hierarchy subroutine 701 calls one of two subsidiary subroutines, the application event processor 703 or the cell event processor 713. The application subroutine calls one of four subsidiary subroutines, model controls processor 705, permute controls processor 707, undo controls processor 709, or the constraint controls processor 711. The cell event subroutine 713, can call any one of four subroutines, the edit events processor 715, the undo events processor 717, the permutation events processor 719, or the constraint events processor 721. The edit events processor 715 can in turn call set formula processor 723, set text processor 725, set number processor 727, set independent processor 729 or set constraint processor 731, or the clear cell processor 732.

The hierarchy continues in FIG. 7B with the routing processor 733. The routing processor can call the permute model subroutine 735 or the send email processor 741. The permute model processor can call either the enhanced standard mode 737 or the read email processor 743.

The read email operation calls only the send email processor 741. The send email operation 741 is a central dispatch center and can call numerous operations based upon the permutation type, i.e., compose email processor 739, subroutine processor 747, version processor 749, prompt processor 751, or multiple impact compose processor 753.

Compose email processor 739 calls interactive processor 745 to prompt for missing targeting information in a permutation control and then via 7C, calls read email processor 743. If the workbook that is being addressed by the email message is an external workbook, compose processor 739 executes an external message to call a different workbook's instance of read email via 7D. Multiple impact compose processor 753 prepares a distribution list and passes first to multiple impact recursive processor 755 and for call back types follows up with post processing by giving the list to callback processor 757. Multiple impact compose processor 753 also makes use of multiple relativity processor 759 to generate some of the weighted values needed by the allocation methods of the invention.

Both multiple impact recursive processor 755 and callback processor 757 can call themselves for each item in the list they were given via, 7G and 7H respectively. In addition, multiple impact recursive processor 755 can send external email messages to other instances of itself in other external workbooks as indicated by the exit and reentry of 7F. The reentry is to a different instance of the same operation. Multiple impact recursive processor 755 can also call send email via 7E.

The hierarchical structure of the processors used in the invention, as shown in FIGS. 7A and 7B can be used as a reference to understand how the subroutines processors of the present invention interrelate. These subroutines processors are described in detail herein below.

The hierarchy continues in FIG. 7C with the model control events processor 705. Exemplary model controls include editing events processor 761, component controls processor 780, and version controls processor 765.

The editing events processor 761 include insert processor 762, delete processor 763, edit processor 782, and sheet operations processor 764. These particular processors are very significant. Current art spreadsheets have no permutation control, no original state control, and no constraint control. Therefore, every editing event that occurs in a polymorphic spreadsheet has additional responsibility. Each event must correctly maintain relative and fixed cell references throughout each of the cell structures, i.e., for current content, and future content.

The insert events processor 762 include: shift cells down 766, shift cells right 767, shift the entire row down 776, and shift the entire column down 777. Insertions can move cells right or down based on the user selection. It moves the content of existing cells, and then inserts empty cells. The polymorphic insert operation uses syntax parsing routines to scan the content of the cell data structure. It begins with the cells farthest to the right or to the bottom and moves toward the insertion point. It goes by column if the insertion option was columnar, and by row if the insertion option was by row. The operation adjusts the existing cell references in every model cell. The operation revises the content in the cell data structure to reflect the horizontal or vertical offset created by the insertion of new cells.

Deletion events 763 include: shift cells up 768, shift cells left 769, shift rows up 778, and shift columns left 779. Deletion moves cells up or to the left and discards the contents of the cells. To the far right or to the bottom, cells will become empty that once had values. The polymorphic deletion moves the entire content of cells, clears empty cells, then, it parses the entire content of the cell data structure to adjust cell references. Some cell references may become invalid because they refer to deleted cells. In this event, it sets the impact type to prompt, i.e., [prprompt]. Then, in subsequent operations, it prompts the user for revised content.

Editing operations 782 use a clipboard memory location to store and retrieve cell content. The drag 783 operation allows the user to select a range of cells, and then copy them, 791, by dragging the cursor across the display screen to a new location. It then copies the content into the empty cells between the selection and the insertion-point of the drag operation.

The drag operation also allows the user to move the cell content 792. The selection is not copied. It deletes the content of the previous selection and places the contents in the new location.

The clipboard operations include cut 784, copy 785, and paste 786. However, the clipboard of current art is not able to manage the polymorphic cell content correctly. The permutation control structure, the original state structure and the constraint structure must be added as content to the clipboard data structure.

Using the EFS format of the invention, or horizontal storage format, the invention can use a text only clipboard format to manage the cut operation 784, the copy operation 785, the paste operation 786, and the drag operation(s) 783. The horizontal storage format, in combination with the enhanced syntax of the invention, provides a means to store the complete polymorphic content of the cell to the operating system clipboard, and a means to retrieve that information. It then uses the enhanced syntax to parse the information, and separates it into various storage locations based upon the structure of the cell. It also evaluates relative cell location references for the entire content of the cell data structure. The operations replace incorrect references with correct references where possible and reclassify cell content type identifiers based upon the content of the cell. Thus, the invention applies the relative cell reference maintenance of the present art to the entire polymorphic cell structure.

The enhanced syntax of the invention addresses the need to give spreadsheet functions permutation-aware behaviors. For example, it maintains a list of functions and their inverse function. For each entry in the table, a subroutine or function is listed that can convert one functional expression into the other. So, the new formula operation of FIG. 11 derives inverse equations and it uses this lookup table to replace one function with its inverse. For example, the equation A2=ln (A1) is inverted in the invention to A1=exp(A2). Besides the inverse function table, the invention carries out permutation behaviors for certain functions. For example, the 'sum' function automatically generates a sibling list. When a multiple impact cell contains a sum function, the function can service the operation with the sibling list it needs to distribute its value. Further, certain of the multiple impact operations are, in themselves, functions in the invention. The invention furthers the art with permutation-aware translations of spreadsheet functions; it carries out functions with permutations enhanced behaviors; and, certain functions support specific permutation events.

The enhanced syntax parsing operations that include the enhanced operations of spreadsheet functions interact with the polymorphic cell content that is placed into and retrieved from the clipboard. The polymorphic strategies are applied to the cell content after a paste operation to validate the content. The new formula operation of FIG. 11 may be used to generate valid content if current and future content conflicts. In this way, the invention provides a polymorphic, permutation-enabled clipboard, permutation-aware functions, permutation behaviors for functions to do, and specific functions for permutation events.

Sheet operations 764 include: delete 770, rename 771, and insert 772. Again, the effect of these sheet operations is to move cell content. The sheet operations 764 move entire pages of cell content to new locations depending upon the event. A sheet deletion 770 may invalidate equations that reference the sheet. It may change the address of existing cells. The rename-sheet event 771 will replace every instance of the previous sheet name in cell contents with the new sheet name. Insert 772 gives cell contents a new location and affects relative references throughout the model. Therefore, the polymorphic spreadsheet moves the entire contents of the cells to their new relative location. It parses the cell's entire content to adjust relative references. It marks invalidated content by changing the permutation type identifier or the constraint type identifier or cell type identifier. The operation replaces the old sheet name with the new sheet name in whatever location it appears.

The component controls 780 include the operating mode selection 787, the interactive-options 788, the reset-options 789, and the iteration control 790. The operating mode selection attribute toggles the polymorphic mode 203 and the enhanced standard mode 219. The operating mode can apply to the workbook as a whole 793, a particular sheet 794, or a particular cell 795. The cell can override the operating mode if the cell is locked 800. The interactive options 788 for single impact cells are, suspend operation entirely, suspend interactivity for a selected range of cells, suspend interactive inheritance so that callback interactivity does not occur, or allow interactivity without limitation so that it always occurs. Reset options 789 can be set to original 796 or previous 797. The reset attribute is present at both the cell and at the component level. The component level takes precedence. If the component level is neutral, or off, then the cell level takes precedence. Iteration controls 790 include a switch 798 to start or stop iteration, and user definable settings 799 for the maximum number of iterations and the maximum change amount. The iteration control is used to control circular references.

The version control 765, operates on alternate versions of a model. The invention gives the user control over multiple versions. It provides the ability to maintain the model's list of versions 773, retrieve a version 774, save a version 775, and save a partial model, or range of cells, as a version 781.

In current art spreadsheets the term 'version' is used to refer to numerical results or numerical 'scenarios'. In the present invention the term version, or polyversion, is used to refer to alternate model logic content, i.e., alternate model form, content, or formulas, as differentiated from the numerical results. The object of current art spreadsheet is to generate various numerical scenarios, while the object in a polymorphic spreadsheet is to generate various model forms.

Maintenance of relative cell references is known in the art. However, the polymorphic content of the cell data structure is not known to the art. The polymorphic operations of the cell in the invention will, sometimes, require additional processing by the new formula operation of FIG. 11. The new formula operation maintains a valid content for both the current and future positions of the cell's permutation control. Therefore, the invention advances the art to provide permutations enabled operations of insert 762, delete 763, edit 782, and sheet 764 event processing. It enhances the clipboard to contain the cell permutation content. It enforces the strategies of the polymorphic paradigm. It maintains not only current cell content but also future cell content for every event that moves cell content from one location to another.

The invention provides operating mode controls 787, interactive option controls 788, reset options 789, and iteration controls 790. Some of these controls also appear in the cell data structure. Specifically, the operating mode 787, the interactive 788, and reset 789 attributes are also stored within the cell. Controls at the component level 780 take precedence over the attribute cell level. If the component level is neutral, the cell level attribute takes precedence. In addition, the invention provides tools for the definition, maintenance and control of multiple model versions to be applied to a single set of spreadsheet data via various version controls 765.

Figure 8:
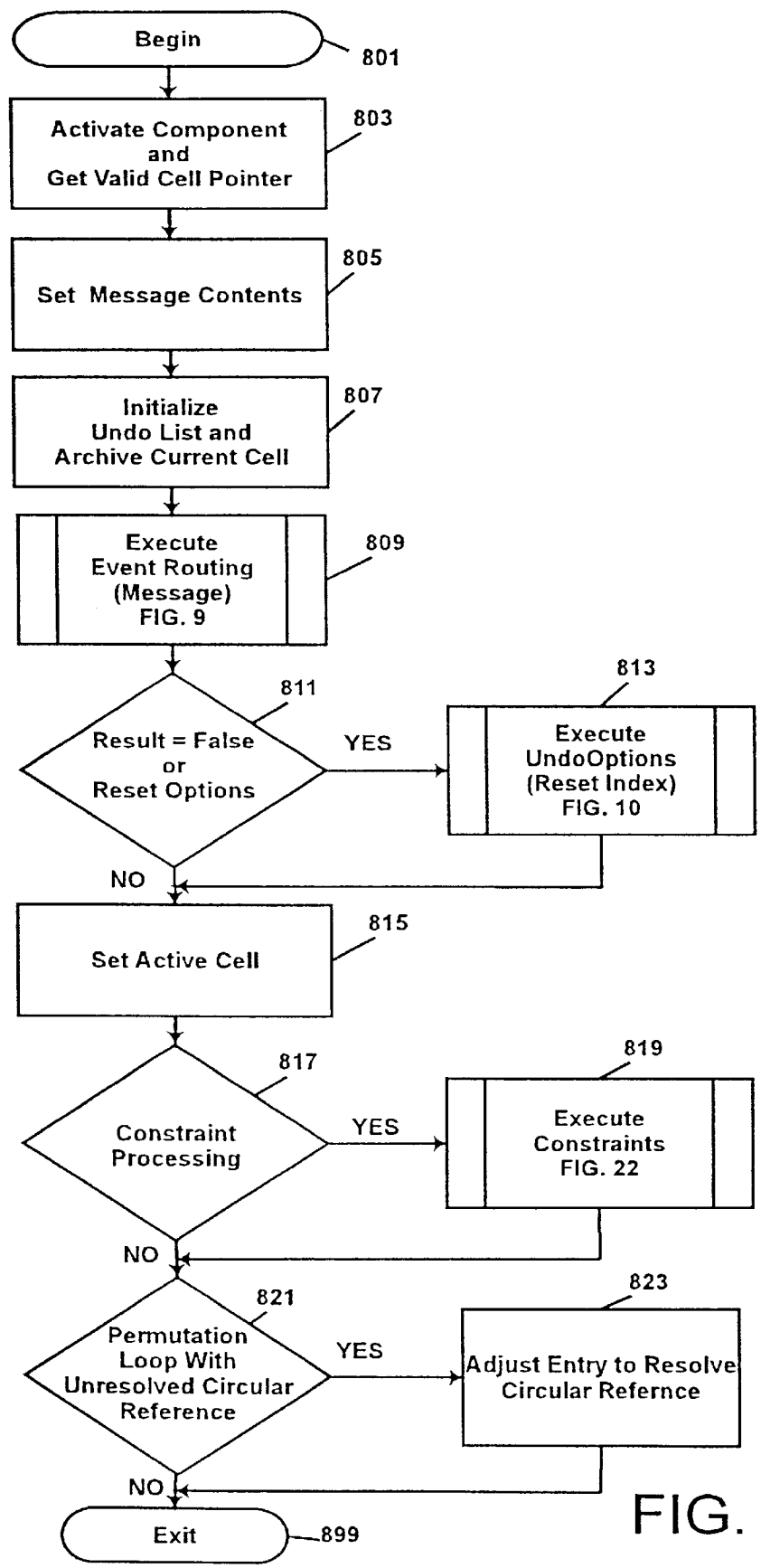
FIG. 8 is a flowchart of a cell event process.

The cell event processor is shown in FIG. 8. Cell events are entered in a terminal block 801. The activate component operation of process block 803 initializes component active variables to the value of true; stores the current automatic recalculation flag and sets its value to false; stores a list of selected sheet numbers in an array, setting the many sheets selected variable to true if more than one is selected or false if not; and obtains a valid cell pointer for the sheet, row and column location of the current edit event by initializing a new memory storage location or retrieving the existing memory location for the cell.

The various operations that support the cell events of FIG. 8 utilize a single, standardized message structure to pass email messages among the cell's permutation processing routines. The structure of the email message is: (a) from cell pointer, (b) to cell pointer, (c) previous cell pointer, (d) message contents, (e) a message type identifier, and (f) the horizontal or (g) vertical permutation control and (h) associated structure identifier. These attributes support single impact cells, while multiple impact cells and external impact cells require the additional attributes of (i) a Boolean column offset control, (j) a multiple impact node list, and (k) the number of nodes in the list.

The email message structure is implemented in the invention as an object class. The object class provides access to the information fields stored in the object that support read write operations as known in the art. The object class definition is shown below. The operations performed by the object on its attributes are standard input output and field assignment operations as practiced by those skilled in the art.

```
Email Message Object Structure
tEmailMessage1 = Class
    private
        FFCell:             pPolymorphicCell ;
        FTCell:             pPolymorphicCell ;
        FPrevious:          pPreviousPolymorphicCell ;
        FContents:          String ;
        FCType:             ShortInt ;
        FStructure:         ShortInt ;
        FHorizontal:        String ;
        FVertical:          TStringlist ;
        FTrigger:           Char ;
        {Multiple Impact}
        FSHOWOFFSETDLG:     BOOLEAN ;
        FG1:                TMultipleImpactNodeList ;
        FMAXNODE:           INTEGER ;
        Procedure SetTCell (Item: pPolymorphicCell) ;
        Procedure SetFCell (Item: pPolymorphicCell) ;
        Procedure SetPCell (Item: pPreviousPolymorphicCell) ;
    public
Property FCell: pPolymorphicCell read FFCell write SetFCell ;
Property TCell: pPolymorphicCell read FTCell write SetTCell ;
Property PCell: pPreviousPolymorphicCell read FPrevious write
        SetPCell ;
Property Contents: String read FContents write FContents ;
Property CType: ShortInt read FCType write FCtype ;
Property Structure: ShortInt read FStructure write FStructure ;
Property EFS: String read FHorizontal write FHorizontal ;
Property EDS: TStringList read FVertical write FVertical ;
Property Trigger: Char read FTrigger write FTrigqer ;
Property ShowOffsetDlg: Boolean Read FShowOffsetDlg write
        FshowOffsetDlg ;
Property MaxNode: Integer read FMaxNode write FMaxNode ;
Property G1: TMultipleImpactNodeList read FG1 write FG1 ;
Procedure SetContents(nContents: String ; nCType: ShortInt) ;
Procedure SetPControl (nHorizontal: String ; nVertical:
        Tstringlist ; nTrigger: Char) ;
end ;
```

In a process block, 805, the email message structure is initialized and populated with the current cell pointer in both the caller and receiver positions. The contents of the edit string from the formula bar or cell entry is placed in the message contents attribute. The contents type identifier is assigned after the contents are evaluated and a routine selected to be called. The type identifier of the routine called is then placed in the storage location. Since there is no predecessor event, the initialization of the events permutation control involves setting both the horizontal, EFS, and the vertical, EDS, permutation structures to a null value or empty and a permutation identifier type of empty.

A global undo list attribute is initialized in a process block 807 and a cell object containing the complete information defining the cell at this moment, before any updates occur, is stored into the undo list. A pointer to this previous instance of the cell is updated in the email message structure as the from cell. Updates to the cell itself that occur at a later time are pointed to by the to cell pointer of the email structure. Thus the email message provides a rapid access directory to the previous instance of the cell's attributes and contents as well as the current cell status dynamically as it changes from one operation to the next.

The event routing operation of execution block 809 transmits the email message to a dispatching operation of FIG. 9. The dispatching operation evaluates the contents of the email message and determines a routing to the routines which support the processing of these contents.

In a decision block 811, the results of these operations are evaluated. If an error has occurred, or if one of the valid reset options is set in either the cell reset option attribure or the component reset attribute, the undo operation of execution block 813 is activated.

In decision block 811, the component attribute takes precedence over the cell attribute. If the component attribute is neutral, then the cell attribute is controlling. The process block 815 resets the active cell and any initialized sheet selections. If the user has selected a cursor moves down, cursor moves right or cursor moves to last permutated cell the cursor is placed on the display screen according to the selection.

A decision block 817 performs a test to identify the state of the component level constraint control attribute. If the constraint mode of operation is active the constraint processing in execution block 819 is activated. The constraint processing will interact with the user to determine the parameters required to execute the constraints. The constraint execution block 819 performs an iterative sequence of model permutations using the permutation enabled cells and methods of the present invention for additional computational results.

Decision block 821 tests for an exception where a permutation loop has an unresolved circular reference. The permutation loop can return cell contents via an email message that result in a calculated cell value that differs from the entered value. In process block 823 the entered value is adjusted until the calculated value equals the entered value. This exception usually results from constraint formulas entered as in-cell formulas that generate circular references. If the constraint processing is active, it will automatically prevent this exception. If constraint processing is not active then this exception is handled via process block 823. The operation of FIG. 8 then exits via terminal block 899.

Figure 9A:
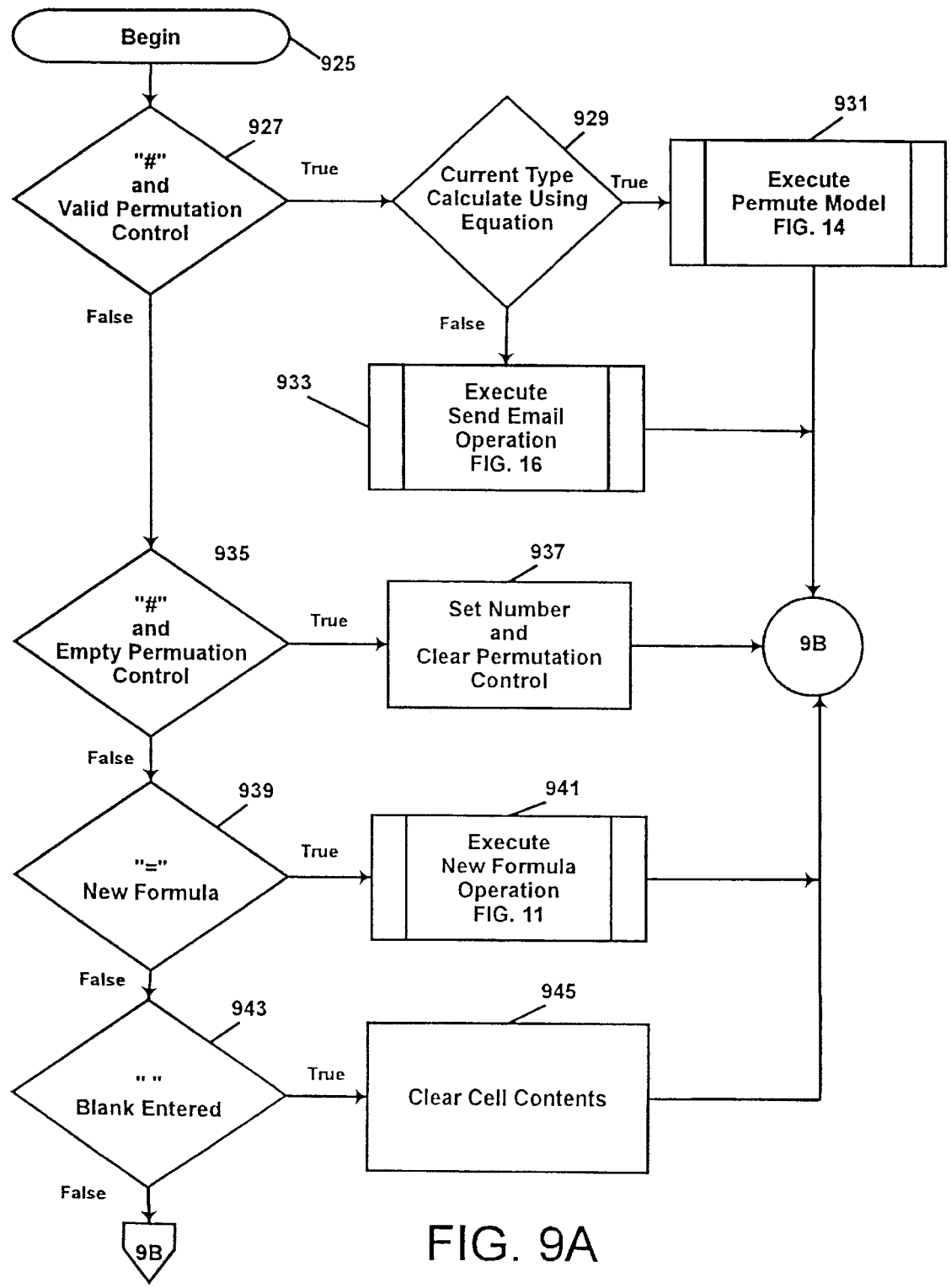
FIGS. 9A and 9B are a flowchart of an event routing process.
Figure 9B:
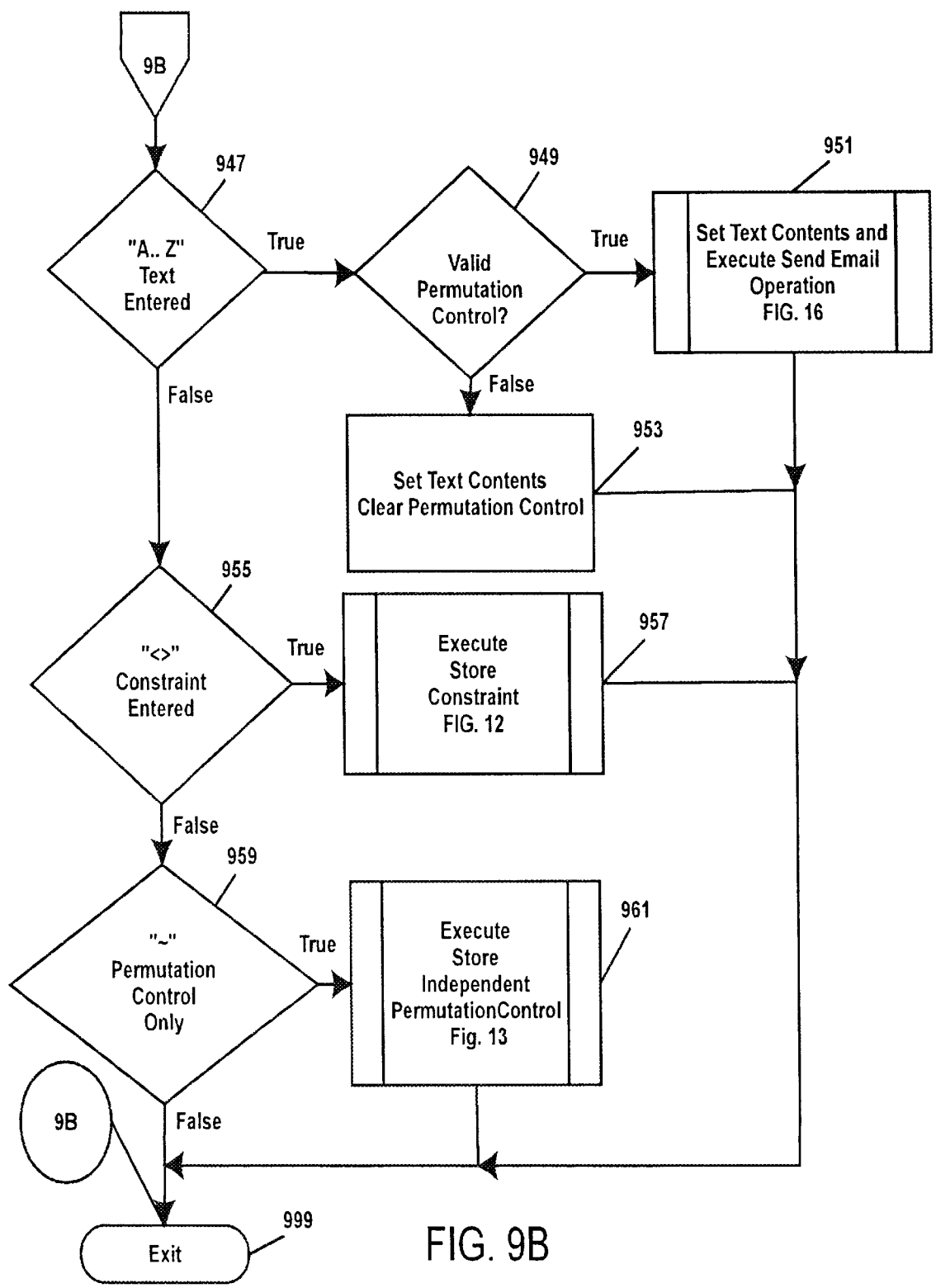

FIGS. 9A and 9B are a block diagram depicting the event routing processor entered via terminal block 925. In a decision block 927 a test is performed to determine if the entry is a number into a cell that contains a valid permutation control, i.e., the permutation control is a valid impact type and the content is not empty. The permutation control type is a single character or integer indicia of the impact cell type. The permutation control may be incomplete. If complete, in decision block 929 a further test is made to determine the current content type of the cell. If the cell is calculated or a dependent cell then the permute model operation is executed in execution block 931. If the current cell type is independent, i.e., contains a number the send email operation is activated in execution block 933. When either of these routines is complete processing terminates via terminal block 999.

If decision block 927 evaluates false, a next decision block 935 tests for a valid number with an empty permutation control in the current cell. If true, then the value entered is posted to the cell content in process block 937. The permutation control is also cleared, and processing exits via terminal block 999.

If decision block 935 evaluates false, a next decision block 939 tests for the presence of a current new formula as indicated by the equal sign found in the first position of the edit string entered by the user. If true, then the new formula operation of execution block 941 is activated. When completed, processing exits via terminal block 999.

If decision block 939 evaluates false, a next decision block 943 tests the contents of the edit string for a null or blank content. If true the cell is cleared of all permutation control content. Processing then terminates via terminal block 999.

If decision block 943 evaluates false, a next decision block 947 tests for alphabetic content of the edit string. If true then a next test in decision block 949 is performed to determine if the cell contains a valid permutation control. If true the content of the cell is set to the text value of the edit string in execution block 951 and the send email operation is activated in execution block 951. If the decision block 949 evaluates false, then the cell is set to the text value of the edit string and the permutation control is cleared in process block 953. Execution block 951 and process block 953 exit upon termination via terminal block 999.

In a next decision block 955 a special control character or menu command is identified that indicates the user has entered a constraint. When this event is true, the execution block 957 executes and the information entered is stored in the constraint control. When completed the process exits via terminal block 999.

In a next decision block 959 a special control character or menu command is identified that indicates the user has entered a permutation control as future content to be stored in the permutation control. When this event is true, the execution block 961 executes and the information entered is stored in the permutation control. When competed the process exits via terminal block 999.

The polymorphic enabled undo and reset options of the invention are shown in a block diagram of FIG. 10. Shown is an overview of the circumstances that lead to the activation of the reset to previous operation 1011 and the reset to original model operation 1017.

The reset to previous operation 1011 is responsible for resetting a cell's contents to its previous contents based upon the value contained in a reset index that is passed to the operation as a parameter.

The reset to previous operation 1011 is recursive, i.e., it repeatedly calls itself to reset each cell that is found on the undo list 300 until it reaches the end of the undo list.

The reset to original model operation 1017 is responsible for resetting the entire contents of the model to its original form, i.e., the original state control maintained by the new formula operation of FIG. 11.

The reset to previous operation 1011 is activated by the user interface undo 1007, by the user interface 1013 and delete 1015 controls or by the cell routing event 811 of FIG. 8. The reset to original model operation 1017 is activated only by the undo selection controls 1009.

A user selection of the undo control 1007 will activate a selection control 1009 where the user can choose among the undo options: rstformula, rstformuladata, rstdata, or rstoriginalformula, rstSnapshot.

If the rstoriginalformula control option is chosen the reset to original model operation 1017 is executed, otherwise the reset to previous operation 1011 is executed. The rstoriginalformula constant causes the reset to original model operation to reset the entire model to the original state control maintained by the new formula operation of FIG. 11.

When the reset to previous operation 1011 is activated by the user selection of the undo control 1009 the rstformula constant causes the reset to previous operation to reset only the model's formula using the cells found in the undo list. The rstformuladata causes the reset to previous operation to reset both the formulas and data for cells found on the undo list. The rstdata causes the reset to previous operation to reset only the data found in the undo list.

When the reset to previous operation is activated by the user selection of the delete 1013 control and the local result variable in the delete operation 1015 is false, i.e., the delete operation failed for any reason, then the undo operation 1009 is activated. It is passed the rstformuladata constant as a parameter. Then, reset to previous operation 1011 resets every cell found in the undo list 300 to its previous permutation control content.

The cell routing event 811 of FIG. 8 activates the undo operation 1009 based upon the values contained in the local result variable 1001, the component level reset option attribute 1003, and the cell level reset option attribute 1005.

If the cell event that is activated in the cell event routing operation 811 returns a result of false 1001, then the reset to previous operation is executed 1011. The undo operation 1009 is passed a constant of rstformuladata. The rstformuladata constant causes the reset to previous operation 1011 to reset both the model's formula and data.

The reset option attributes at the component 1003 and cell level 1005 are also evaluated for the cell event routing routine 811. The combined result of the two attributes as shown in the table below determine if the reset to previous operation 1011 is executed. The component level attribute 1003 takes precedence and if the component level is neutral then the cell level attribute 1005 takes precedence. The reset to previous operation 1011 is passed a constant parameter based on the precedent attribute reset option, i.e., rstformula or rstoriginal. The rstformula constant causes the reset previous operation to reset only the model's formulas using the undo list 300 while rstoriginal executes operation 1017.

In summary, the cell routing event 811 of FIG. 8 may activate the undo options 1009 and pass a parameter to access either reset to previous operation 1011 or the reset to original operation 1017. When a false result is returned at 1011 by the cell event that it activated, the undo option is rstformuladata causing the reset to previous operation 1011 to reset both formulas and data for all cells on the undo list 300. If the user has set the cell reset after permute attribute 1005 to true, or if the user has set the component reset after permute attribute 1003 to true, then the reset option index is set to the precedent attribute's value of rstformula or rstorignnal and is passed as a parameter to the undo options operation 1009.

The reset to previous operation 1011 can also be activated by the undo controls 1009 which passes it a constant of rstformula, rstformuladata, rstdata to reset formulas only, or rstsnapshot. The undo operation 1009 can also activate the reset to original model operation 1017 when the user selects the undo control 1007 signifying rstoriginal.

Finally, the reset to previous operation 1011 can be activated when the delete controls' 1015 delete operation returns a false result. The rstformuladata constant is passed via the undo options routine 1009, to reset both formulas and data.

Figure 11A:
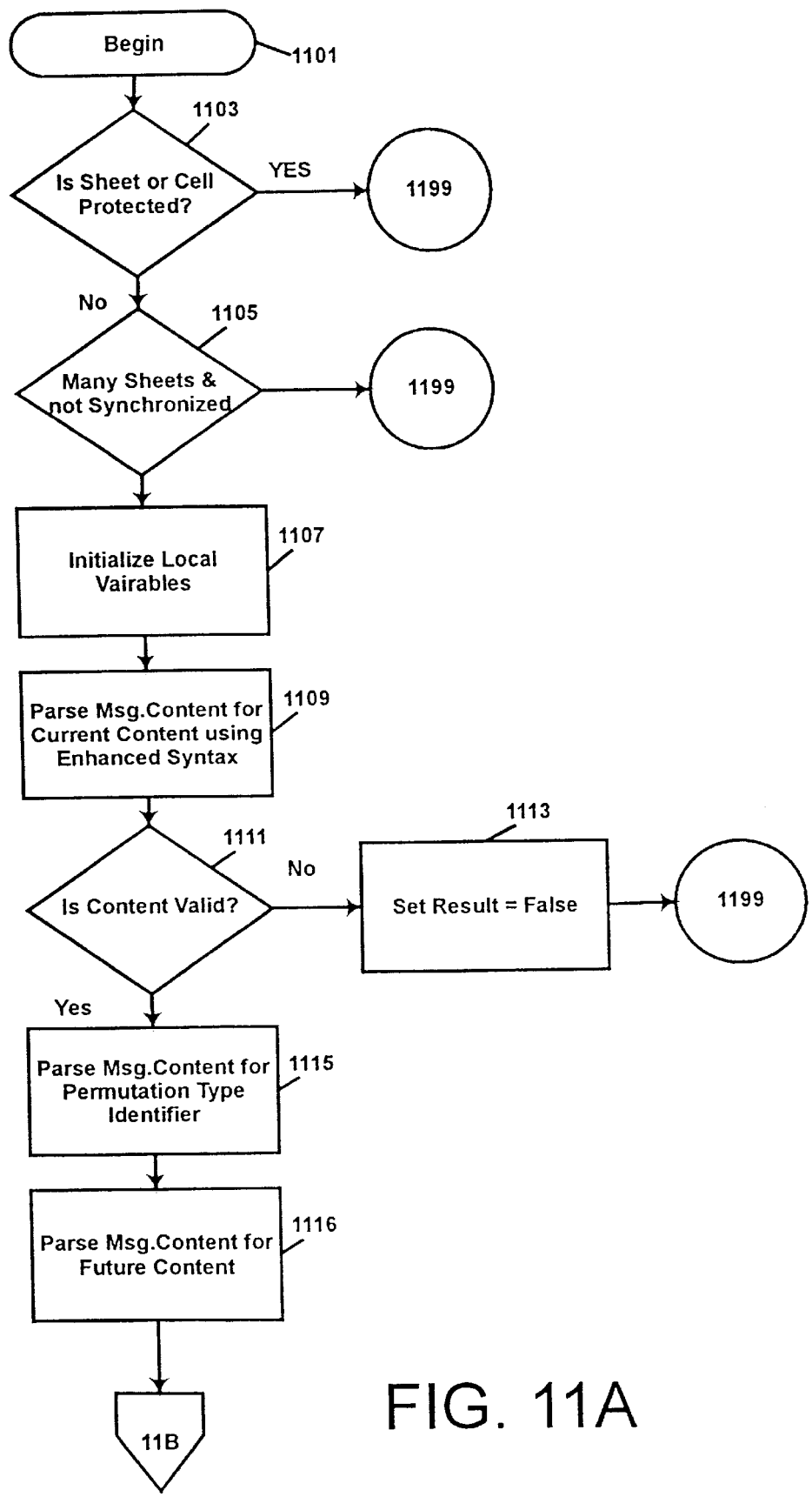
FIGS. 11A and 11B are a flowchart of a new formula process.
Figure 11B:
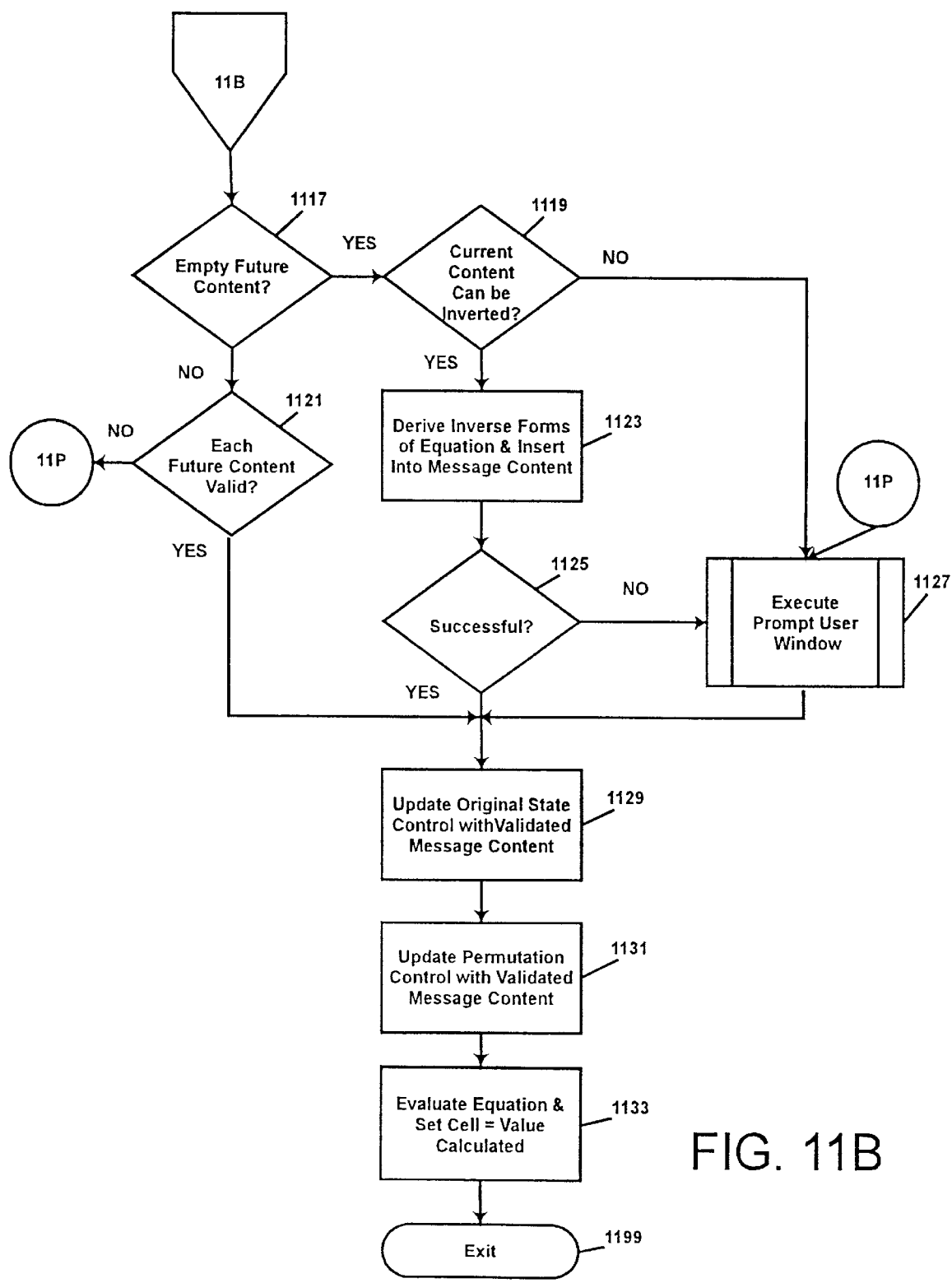

FIGS. 11A and 11B are a flow diagram of the new formula operation. It is entered via a terminal block 1101. A first test is performed in a decision block 1103 to determine if either the current workbook, sheet or cell are locked, i.e., protected from all input. If evaluated true, the operation is exited via terminal block 1199. If evaluated false, processing continues in a next decision block 1105 where a test is made to determine if multiple sheet selections are in effect and the content of the cells on the selected sheets are synchronized, i.e., the cells on all of the sheets must be of the same type. If the cells are not of the same type the sheets are deemed to be not synchronized. If not synchronized the operations are terminated and exited via terminal block 1199. If the cells are synchronized, or if there is only a single sheet selected processing continues in process block 1107 where local variables are initialized.

Local variables used to evaluate the new content include a conversion table that is used by the inverse function operation to derive alternative inverse forms of the equation entered, a local current content string, a local permutation type identifier, and a local future content string. Several Boolean operators are also initialized and used as needed to control process flow.

In process block 1109 the email message content that was edited into the cell by the user is parsed using the enhanced syntax of the invention to extract the current content portion of the message content. This content should represent a new dependent formula for the current cell.

A test is performed in decision block 1111 to determine if the content of the parsed formula string is valid. If it is not valid the result of the new formula operation is set to false so that the calling operation will trigger the reset options and the cell will be reset to its previous state. The operation then exits via terminal block 1199.

If the new current content string is valid then the message content is parsed in process blocks 1115 and 1116 for the impact type and for the future content, respectively, using the enhanced syntax of the invention. The user can enter the future content into the cell or leave the future content blank. If the future content is blank, a decision block 1117 determines that the future content needs to be derived for the user. A test is performed on the current content in decision block 1119 to determine if the current content equation is of a class that can be inverted by the software. If it cannot, processing passes to the prompt user window of execution block 1127 where the user is asked to provide the information necessary to finalize the permutation control content future portion. If the equation is a class that can be inverted then an inversion operation of process block 1123 is executed. A decision block 1125 performs a test to determine if process block 1123 was successful. If not, processing is passed in execution block 1127 to the prompt user window where the user is asked to complete or finalize the future content of the permutation control. It is possible for the user to cancel the operation of the prompt window. In this event, the impact type is set to a constant value [prprompt] to indicate that the permutation control has not been finalized. The impact type of [prprompt] will result in the prompt window executing in subsequent operations should this cell be hit by an impact event. This information is sufficient to complete processing and the cell content is updated in process blocks 1129, 1131, and 1133. If the inversion of the equation was successful in decision block 1125 or the user has already provided valid input as verified in decision blocks 1117 and 1121 then the cell content is updated. Process block 1129 updates the cell's original state control, process block 1131 updates the cell's permutation control, and process block 1133 evaluates the current content equation and updates the cell's value with the calculated value which is displayed on the display screen. Processing then terminates and exits via terminal block 1199.

When the system automatically inverts the equation in process block 1123 for the user, it creates a list of equations representing an inverse form for every precedent cell found in the current content equation. It also sets the permutation control identifier to a constant value of [prsingle] or single impact. When the user finalizes the permutation control's future content in execution block 1127, the permutation identifier is set by the user at that time.

In summary, the user may enter only current content into the formula edit-bar or in cell edit field, and the operations of the new formula processor shown in FIGS. 11A and 11B will attempt to generate the permutation control content for them. If the automated process fails, is then the user is queried in process block 1127 for the missing content. If the content is not finalized in process block 1127 the cell is identified as requiring finalization at a future time. When the automatic inversion is successful the impact type is set to single impact. When the user enters both the current content and the future content simultaneously, that content is validated in decision block 1121. If it is not valid the user is queried in execution block 1127 to finalize the content. When valid content has been established, the original state control is updated 1129, the permutation control is updated 1131 and the current content equation is evaluated, that is the cell is set to the value calculated and the screen updated with the new value. The operation then exits via terminal block 1199.

Figure 12:
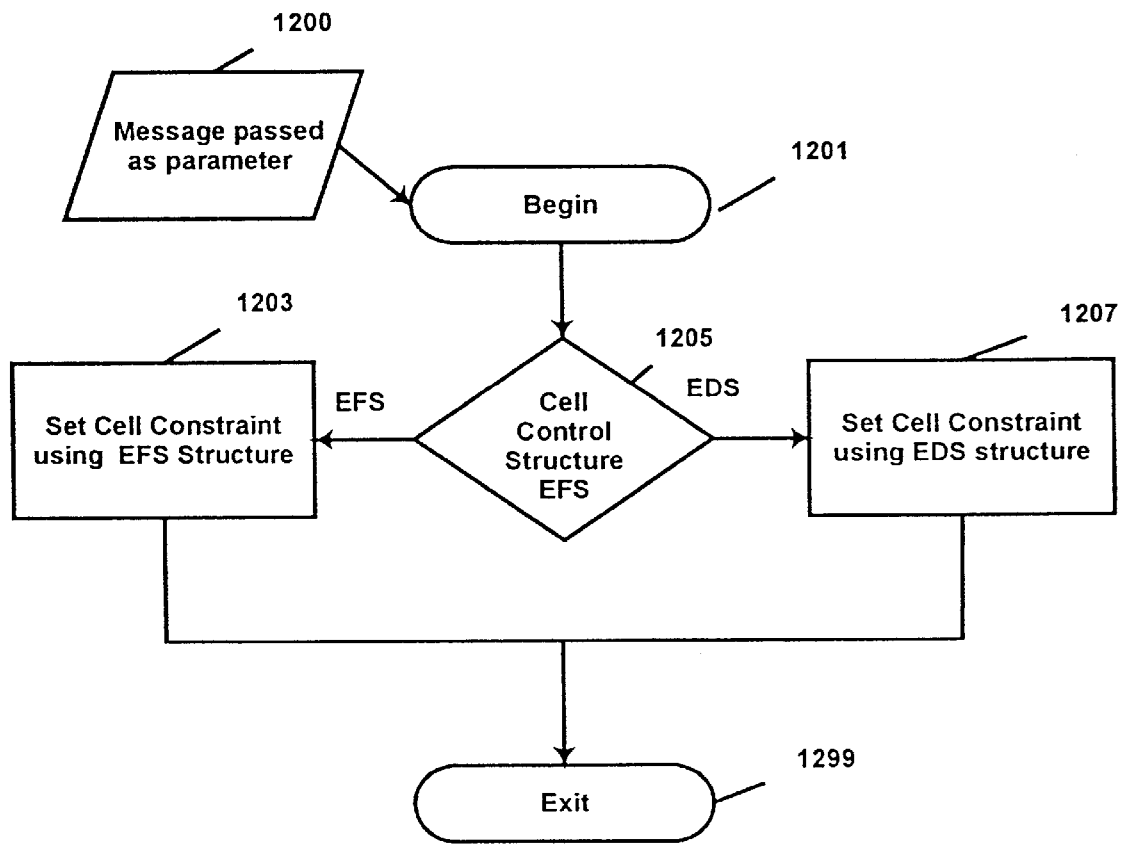
FIG. 12 is a flowchart of a constraint control update process.

The constraint edit event, shown in FIG. 12, is entered via a terminal block 1201. A test is performed in decision block 1205 to determine the control structure for the cell's constraint control. If the structure is evaluated as "EFS" then the process block of 1203 updates the cell's constraint control with the content of the message parameter 1200 passed to the operation. If the structure is evaluated as "EDS" then the process block 1207 updates the cell's constraint control with the content of the message parameter 1200 passed to the operation. The operation terminates via terminal block 1299.

Figure 13:
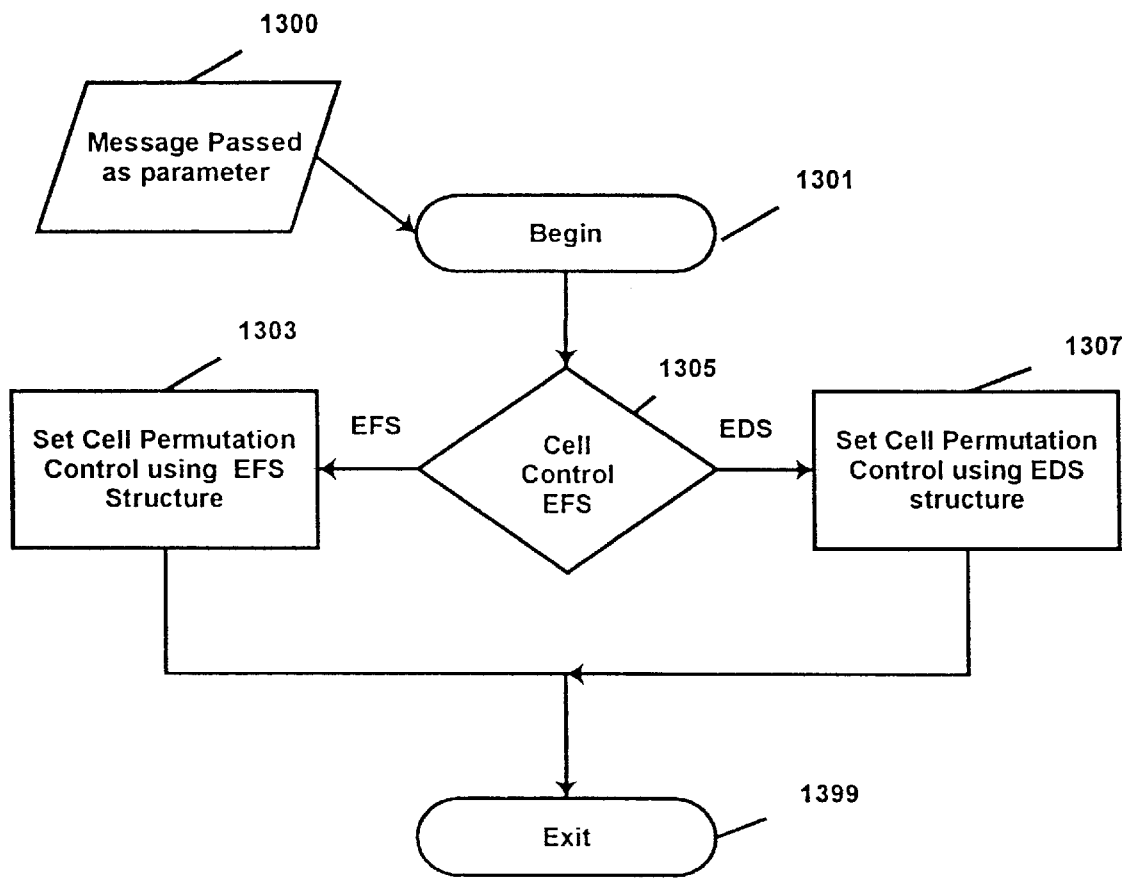
FIG. 13 is a flowchart of a independent permutation control update process.

The set independent permute edit event, shown in FIG. 13, is entered via a terminal block 1301. A test is performed in decision block 1305 to determine the control structure for the cell's permute control. If the structure is evaluated as "EFS" then the process block of 1303 updates the cell's permutation control with the content of the message parameter passed to the operation. If the structure is evaluated as "EDS" then the process block 1307 updates the cell's permutation control with the content of the message parameter 1300 passed to the operation. The operation the terminates via terminal block 1399.

Figure 14A:
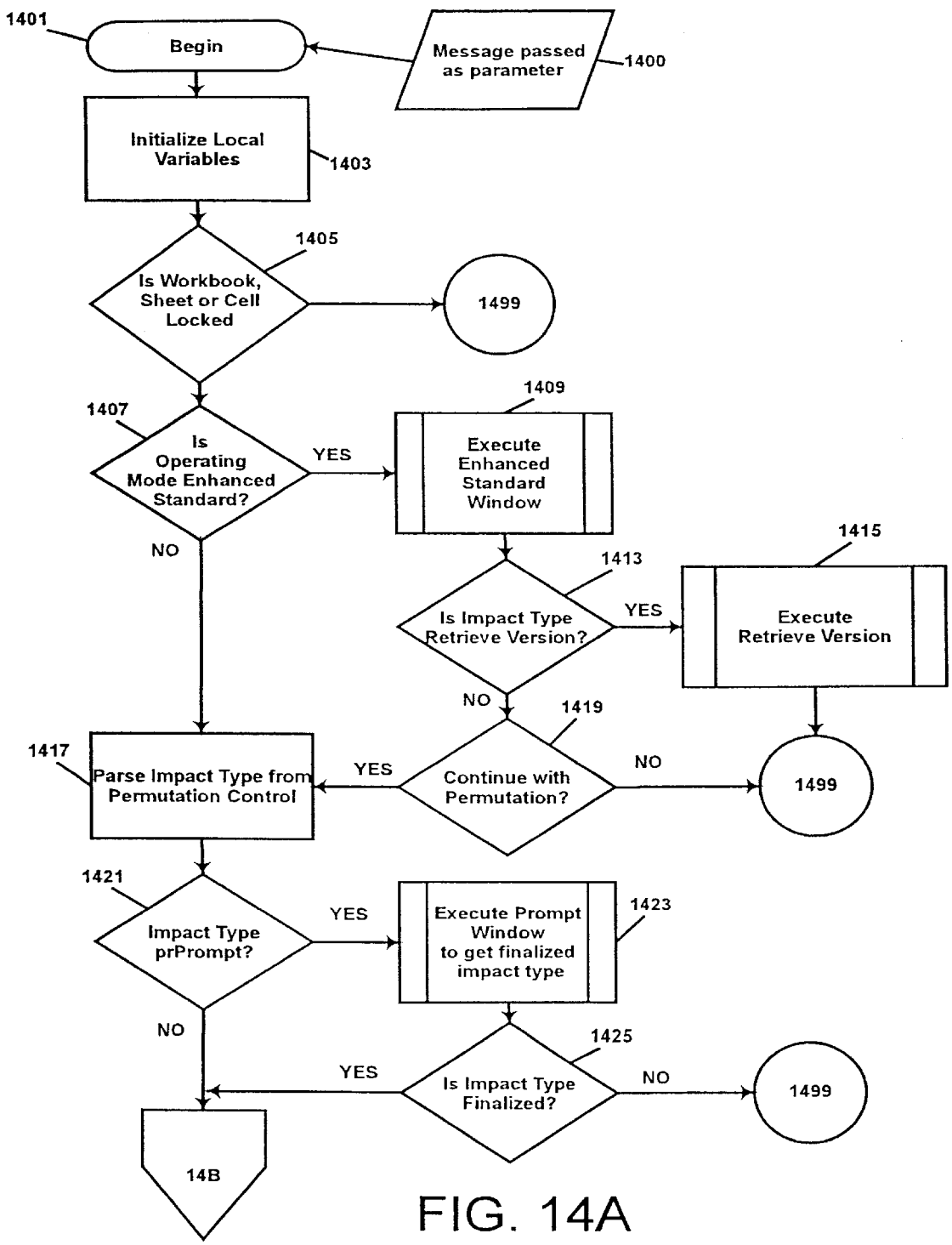
FIGS. 14A and 14B are a flowchart of a permute model process.
Figure 14B:
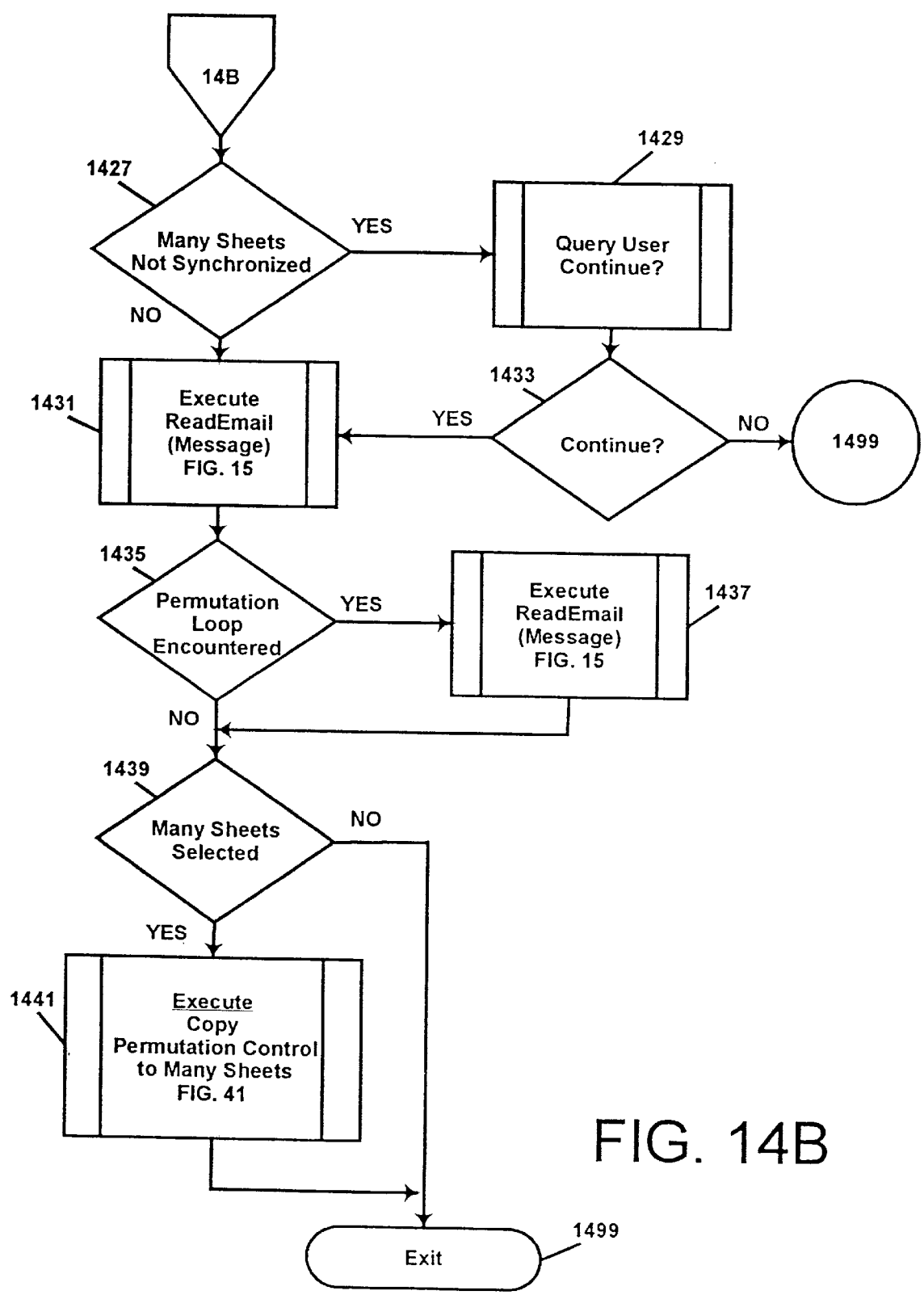

The permute model event, shown in FIGS. 14A and 14B, is entered via terminal block 1401. An email message content 1400 is passed in as a parameter for use by the operation. Local variables are initialized in a process block 1403 which include local boolean operators to facilitate the operation of the decision blocks. A test is performed in decision block 1405 to determine if the workbook, sheet or cell is locked. If locked then the process is exited via terminal block 1499.

If not locked, a next decision block 1407 determines if the enhanced standard mode of operation is in effect for the component or for the cell, with the component level taking precedence over the cell level. If the enhanced standard mode is the operative selection in decision block 1407 then the enhanced standard mode window is executed in execution block 1409. The user is provided several options including retrieving an alternative version, cancel the edit, or continuation of the permutation process. In decision block 1413 a test is performed to determine if the selection is the retrieve alternative version. If it is, then execution block 1415 is executed loading the selected alternate model version into active memory and then exiting via terminal block 1499. If not, a next test in decision block 1419 is made to determine if processing should continue. If not, processing terminates via terminal exit 1499. If continuation of permutation processing is selected in execution block 1419 or if the permutation mode is detected in decision block 1407 then processing continues in block 1417 where the permutation control is parsed to extract the impact type identifier.

A test is performed in decision block 1421 to determine if the impact type is the constant [prprompt]. If so, the execution block 1423 is activated to prompt the user for information needed to finalize the impact content of the permutation control. After the user completes this operation the impact type is, again, tested in decision block 1425. If the impact type is now valid processing continues, else processing terminates via terminal block 1499.

If a valid impact type is found in decision block 1421 processing continues in FIG. 14B, with a test in decision block 1427 to determine if multiple sheet selections are in effect and if the cells on those sheets are of the same type, i.e., synchronized. If the cells are not synchronized a query is made to the user in execution block 1429 to determine if processing should continue anyway. A test is performed in decision block 1433 on the user response, if continue is false then processing exits via terminal block 1499, else processing continues and the read email operation is executed in execution block 1431. The message content 1400 is passed as a parameter to the read email operation.

When read email returns control, a test in decision block 1435 is made to determine if a permutation loop occurred. A permutation loop results when the original impact cell has its permutation control reset to its original content after the permutation sequence initiated by read email in execution block 1431 completes. If a loop condition is found the read email operation is reinitiated in an execution block 1437 in order to synchronize the cell contents within the model.

When read email returns control or if decision block 1435 does not encounter a permutation loop, a decision block 1439 tests to determine if multiple sheet selections are in effect. If evaluated true then the execution block 1441 triggers the copy to many sheets operation which copies the entire contents of the permutation control from the visible cell to the invisible cells for each selected sheet. When this operation is complete, or if this operation is not executed processing terminates via a terminal block 1499.

Figure 15A:
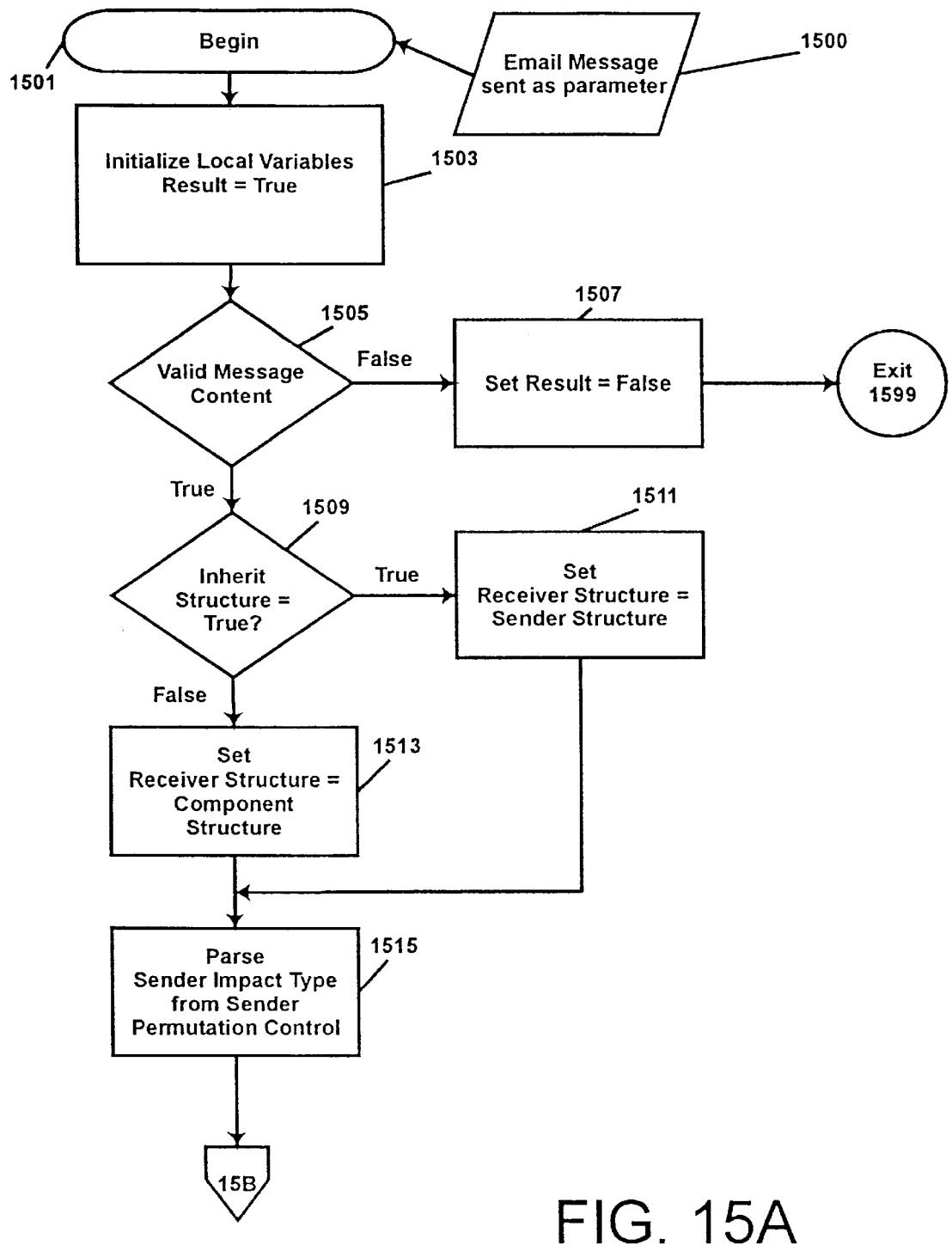
FIGS. 15A–15C are a flowchart of a read email process.
Figure 15B:
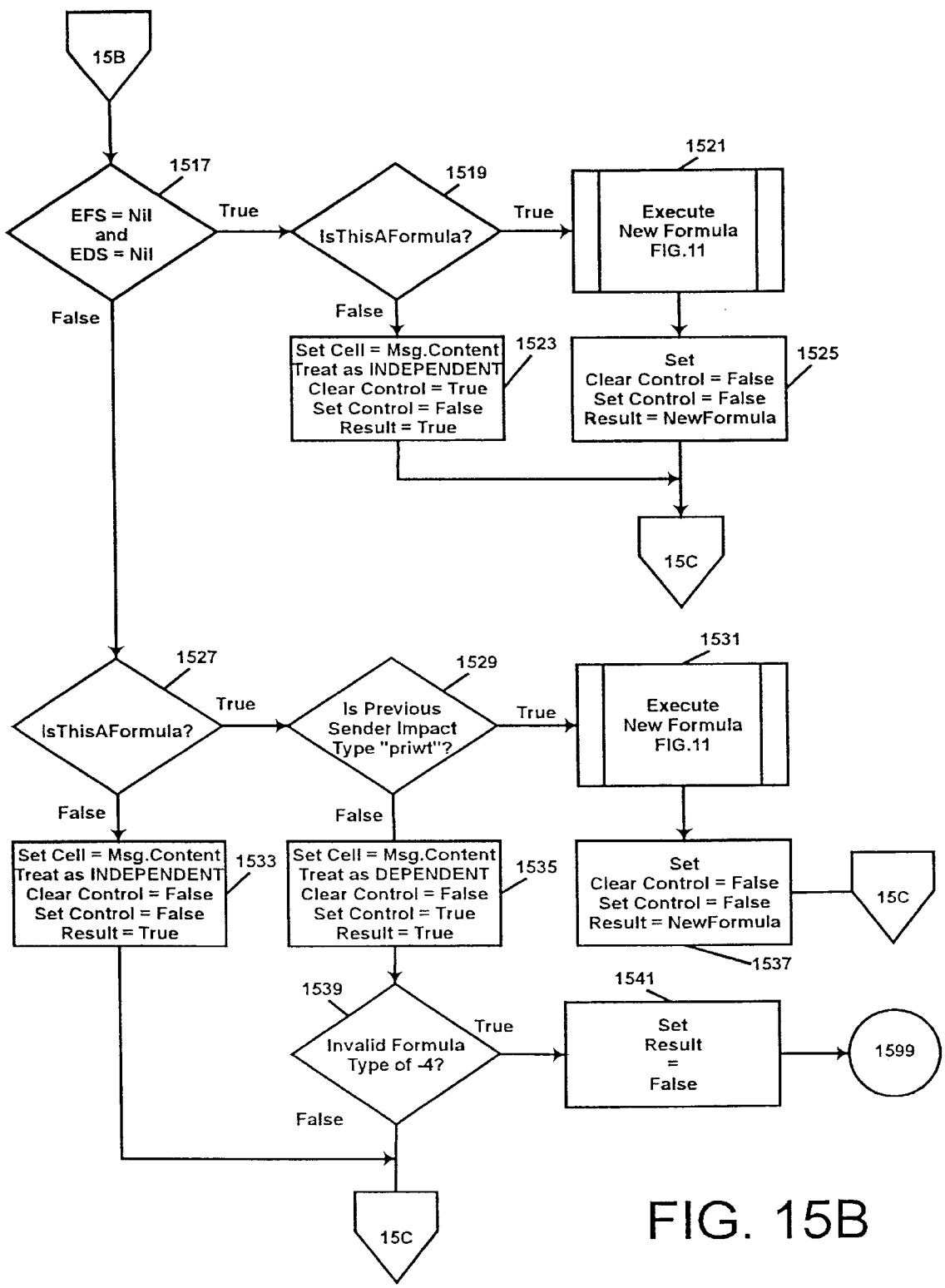
Figure 15C:
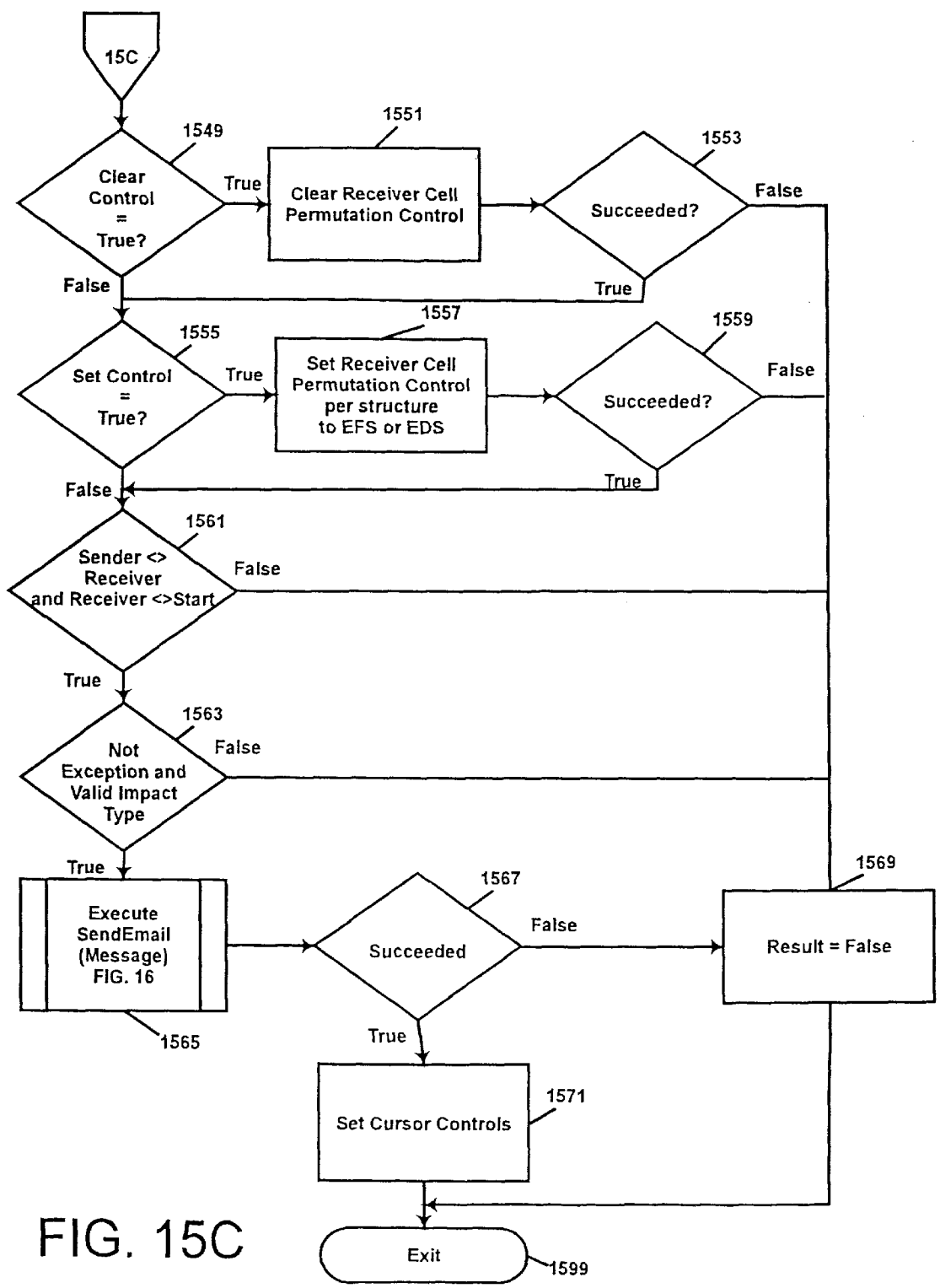

The read email operation of FIGS. 15A–15C operates on only single impact and single impact subtypes. It is important to note that the receiver cell is archived in the calling operations of either the cell events operation of FIG. 8, 807, or the compose email operation of FIG. 17, 1725.

The read email operation only operates on the local sheet's data and is meant to perform two updates. First it updates the current content of the receiver cell's permutation control and then it updates the future content of the receiver cell's permutation control.

There are just three kinds of current content updates that can occur. An independent content update, a dependent content update, and a new formula update via FIG. 11.

There are just three kinds of future content updates that can occur, clear the permutation control future positions and set the permutation identifier to a constant of [prblank], do nothing to the future positions, or update the future positions with the EFS or the EDS message content and append the impact identifier, that is also passed by the email message impact type attribute, to the receiver cell's future content in the permutation control.

All incoming messages are classified as either coming from a cell that has a valid trigger or coming from a cell that does not have a valid trigger. The combinations of the above possible outcomes are shown diagrammatically in FIGS. 15A and 15B.

The read email operation of FIGS. 15A and 15B is entered via terminal block 1501. A process block 1503 initializes the local result variable to true. If any of the operations within read email fail, the result variable will be set to false.

The read email operation is a function that returns the boolean value of the result variable to the operation that activated it. In this way, the reset operations of the cell events operation of FIG. 8, 813 can be triggered. Two local boolean operators are used to determine the behavior with regard to the permutation control: clear control and set control. Each boolean operator is associated with an operation of the same name. Depending upon the nature of the update being done to the cell these boolean operators will allow or disallow the operation of the same name after the cell is updated for the proper kind of content in future positions of the permutation control.

Read email is considered to be a local workbook operation. Operations that involve external workbooks are routed to the external workbook from the compose email operation of FIG. 17 and only local operations can arrive here. If the current workbook instance is the external workbook, then the operation of this process is local to the external workbook and it operates on the external workbook data. When control returns from the external workbook, only local processing is transferred to the local instance of the operation. The local instance only operates on its own data.

In a process block 1505, the content of the email message 1500 is validated. The sender and receiver cell pointers must be valid. The message's contents attribute should not be empty. The message's permutation control contents in both the EFS format and the EDS format may be empty or nil respectively. The empty or nil values are intentionally placed in these attributes of the message in the permute model operation of FIG. 14 to identify the original impact cell that started the permutation process. These values will be used to help identify the source of the information in the message, and thus, to determine the kind of maintenance to perform on the permutation control. If an invalid pointer or an empty content is found the result variable is set to false in process block 1507 and. the operation exits via terminal block 1599.

A decision block 1509 tests to determine if the component level inherit structure attribute is set to true.

If true then the receiver permutation structure attribute is set in a process block 1511 to the value of the sender permutation structure attribute. If the inherit attribute is set to false the receiver structure is set to the value in the component level structure attribute in a process block 1513, since the component structure attribute represents the default mode of operation in effect at the time.

A process block 1515 parses the sender permutation control to identify the sender impact type identifier. If this identifier is a constant value of [priwt], i.e., an independent impact cell with a valid permutation control, then special update processing will be activated in a later step 1529. It is the sender's previous cell instance that is queried to obtain this impact type identifier.

In a series of steps the receiver cell's current content will be updated. A first decision block 1517 tests the message EFS and EDS content. If both are empty or nil then decision block 1519 tests for the presence of a formula. If a formula is found then the new formula operation of FIG. 11 is executed in an execution block 1521. Normally, this event will not happen because new formulas are routed directly to the new formula routine of FIG. 11 directly from the cell routing operation of FIG. 9A, 941. However, it is also valid to route new formulas directly to the read email operation where execution block 1521 will perform the routing task. There are both advantages and disadvantages to each alternate treatment. Usually, the new formula is treated as an independent event but in FIG. 15 it would be treated as a permutation event. Therefore, if the receiver cell had a valid permutation control, instead of discarding it, it would be used to permute another cell. There are dangers associated with this behavior however that outweigh the benefits. Conceptually, execution block 1521 is a valid outcome that should appear as a part of the flow, but it is important to understand that it is generally not appropriate to use it because of the additional model permutation impact that it has. A new formula is most appropriately treated as an independent event and not as a permutation event. When new formula completes, process block 1525 sets the clear control to false, the set control to false and the operation result to the result of the new formula operation. These values are evaluated in subsequent steps.

When decision block 1519 tests the message contents and finds an independent content, such as a number or text, it uses process block 1523 to set the cell contents equal to the message contents. It sets the clear control variable to true, the set control to false, and the result of the operation to true. Thus, the receiver cell, in this instance, is transformed into an independent cell and its permutation control will be cleared later, in step 1551. Therefore, in block 1523 the cell content of the first cell in the undo list is updated. The permute model event of FIG. 14 specifically set the origination cell email message EFS and EDS content to empty to cause the process to arrive at this update location.

If the decision block 1517 finds valid content in the EFS or EDS message attributes it performs a next test in decision block 1527 to determine if the content of the email message is a formula. If true, it performs a next test in decision block 1529 by testing the previous sender cell's impact type that it retrieved in process block 1515. If the impact type is the constant value [priwt], i.e., it is an independent cell that has sent this email message, processing will transfer to the execution block 1531 where the new formula operation is passed the email message contents. The new formula operation of FIG. 11 will then complete or finalize the receiver cell contents, the permutation control content and original state content for the cell. Since the formula content that is passed to the receiver cell is not inherited or connected to any other cell, it represents an independent formula. The receiver cell needs to analyze it just as if the user had typed it into the cell, while in this case it is another cell that is, in effect, typing the formula into the receiver cell. Therefore, the new formula event is used to finalize the receiver cell's controls. In process block 1537, the clear control is set to false, the set control is set to false, and the operation result is set to the return value of the new formula operation. Since the new formula operation has already set the permutation control, it is not cleared or updated. If the new formula operation was successful, then the read email operation will return a true value and continue processing. If the return value from new formula 1531 was false then that value will be carried forward and eventually will lead to a termination of the process. Processing then continues via connector 15C.

If the constant [priwt] is not found in decision block 1529 the process block 1535 updates the receiver cell current contents as a dependent cell, sets the clear control to false, sets the set control to true and sets the operation result to true. In this case, the sender is not an independent cell, it is a dependent cell. Therefore, the inherited relationship with the sender is automatically built into the contents of the sender cell's previous permutation control. When those contents were converted into the email message EFS and EDS attributes, the precedent relationship that exists were contained therein. As a result, the permutation control for this receiver cell will be set later in the flow at process block 1557 using the content of the email message provided by the sender cell's previous instance. In a decision block 1539 the result of the update to the receiver cell tests for an invalid formula of type −4. An invalid formula will trigger process block 1541, the operation result is set to false and the operation exits via terminal block 1599. If the formula is valid processing continues via connector block 15C.

If the content of the message is not a formula in decision block 1527, then the process block 1533 sets the cell contents as an independent type, sets the clear control to false, the set control to false, and the operation result to true.

The read email operation continues in FIG. 15C. The clear control is tested in decision block 1549. If it was set to true in the preceding the receiver cell's permutation control is cleared of all future content and the permutation type identifier is set to a constant value of [prblank]. A test is performed at each step to insure that success has occurred in decision block 1553. A false result exits via terminal block 1599 otherwise processing continues.

Processing continues with a test in decision block 1555 and if the set control was set to true in the previous process the receiver cell's permutation control future values are set using the EFS or the EDS message content based upon the current structure control set earlier in process block 1557. A test is made in decision block 1559. An unsuccessful result sets the return value to false in process block 1569 and processing exits via terminal block 1599, or processing continues successfully in decision block 1561.

The next series of decisions are to pre-qualify the previous receiver's permutation control content for further cell permutations. First, the test in decision block 1561 looks to see if the receiver cell is the origin or start cell on the undo list. If it is, then the result is set to false in process block 1569 and processing exits via terminal block 1599. If the receiver is not the origin cell, then a next test is made in decision block 1563 to insure that the previous sender and the previous receiver are not identical since that would represent an invalid operation, and the impact type in the previous receiver cell's permutation control is evaluated along with the contents of the future contents of the control to determine that the control's content qualifies for continued operation. If all of these conditions are met then the execution block 1565 passes the email message and control over to the send email operation. When the send email operation returns it passes back a return value of true or false that is evaluated in decision block 1567. If false, the exit is via process block 1569 and terminal exit 1599, if true the exit is via process block 1571 where the cursor is placed on screen at a location selected by the user and the exit is via terminal block 1599.

Figure 16:
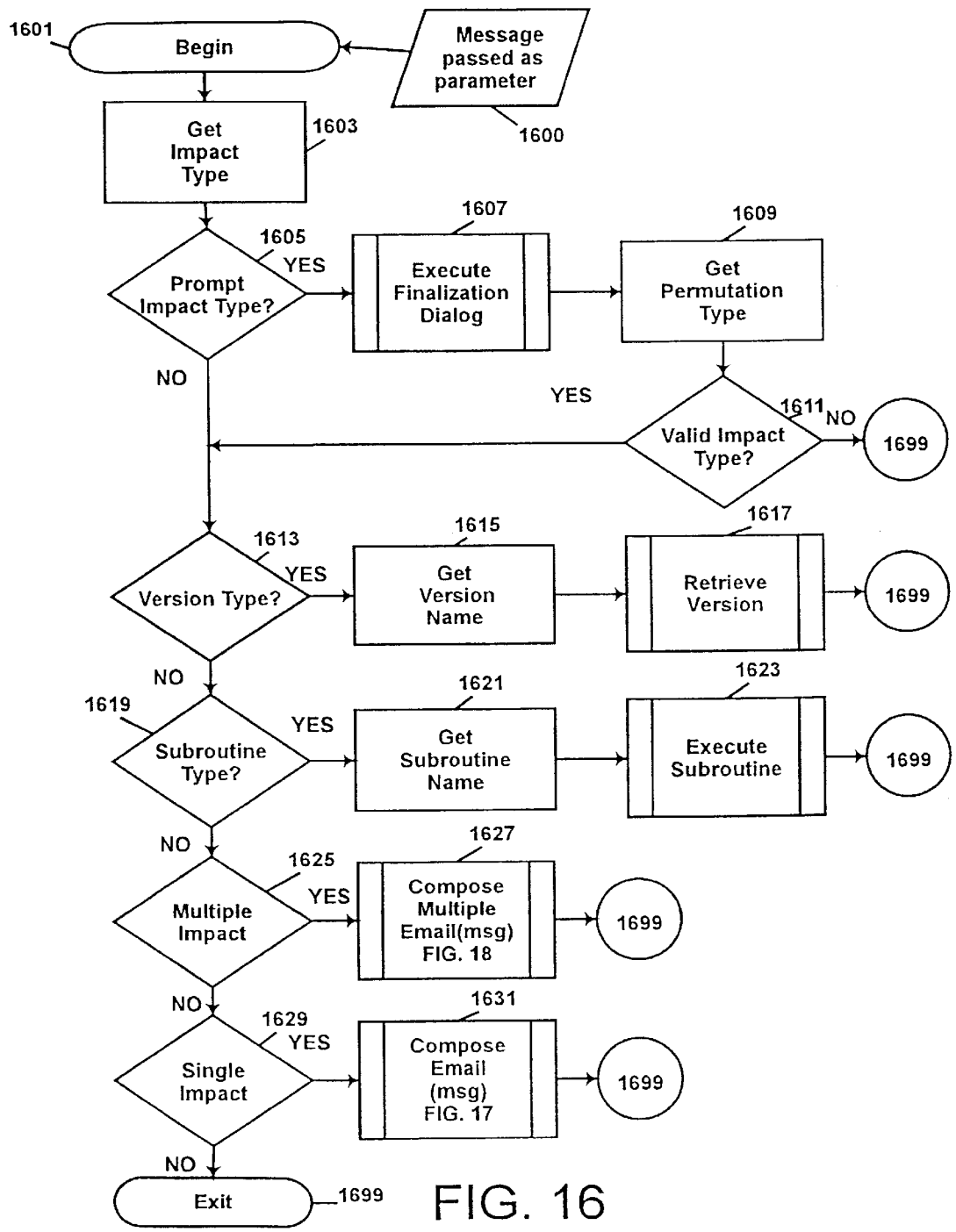
FIG. 16 is a flowchart of a send email process.

The send email operation of FIG. 16 is a routing operation. It is passed the email message as a parameter 1600 and is entered via a terminal block 1601. A process block 1603 retrieves the current impact type from the cell identified in the message as the sender cell or "from" cell. A decision block 1605 tests for an impact type of the constant value [prprompt]. If found the execution block 1607 queries the user to select and finalize the permutation control. When complete, the process block 1609 re-retrieves the permutation control identifier, or impact type, and in decision block 1611 re-evaluates it to determine if it is valid. If the impact type is not valid processing terminates via block 1699.

If the impact type is valid, i.e., it was found in the list of valid impact types, processing continues with a decision block 1613 for the version impact type. If found a process block 1615 retrieves the version name identifier from the content of the sender's permutation control. The named version is then retrieved in an execution block 1617 and processing terminates via terminal block 1699.

If a version type is not found then processing continues and a decision block 1619 tests for a subroutine type. If found, a process block 1621 retrieves the subroutine name identifier from the content of the sender's permutation control. The named subroutine is then retrieved and executed in execution block 1623 and processing terminates via terminal block 1699.

If a subroutine type is not found processing continues with a decision block 1625 where a multiple impact type is tested. The multiple impact types appear as a set of constants that contain the valid multiple impact types and the valid multiple impact call back types for group processing, i.e., the constant values are [prequal, prpercent, prweight, prweight %, prweightpartial, pruserdefined, prequalcb, prpercentcb, prweightcb, prweight % cb, prweightpartialcb, pruserdefinedcb]. If a valid multiple impact type is identified, then processing continues in execution block 1627 where the compose multiple email messages is executed. It is passed the message parameter 1600. When completed processing terminates via terminal block 1699.

If no valid multiple impact type is found then the valid single impact types are tested in decision block 1629. Valid single impact types constant values are, [priwt, printeractive, printeractiveoncb, printeractivecb, printeractiveoncboff, printeractiveoff, prsingle]. If found in this set of constants the compose email operation is executed via execution block 1631. When processing of this operation is complete the exit via terminal block 1699 is taken.

Figure 17A:
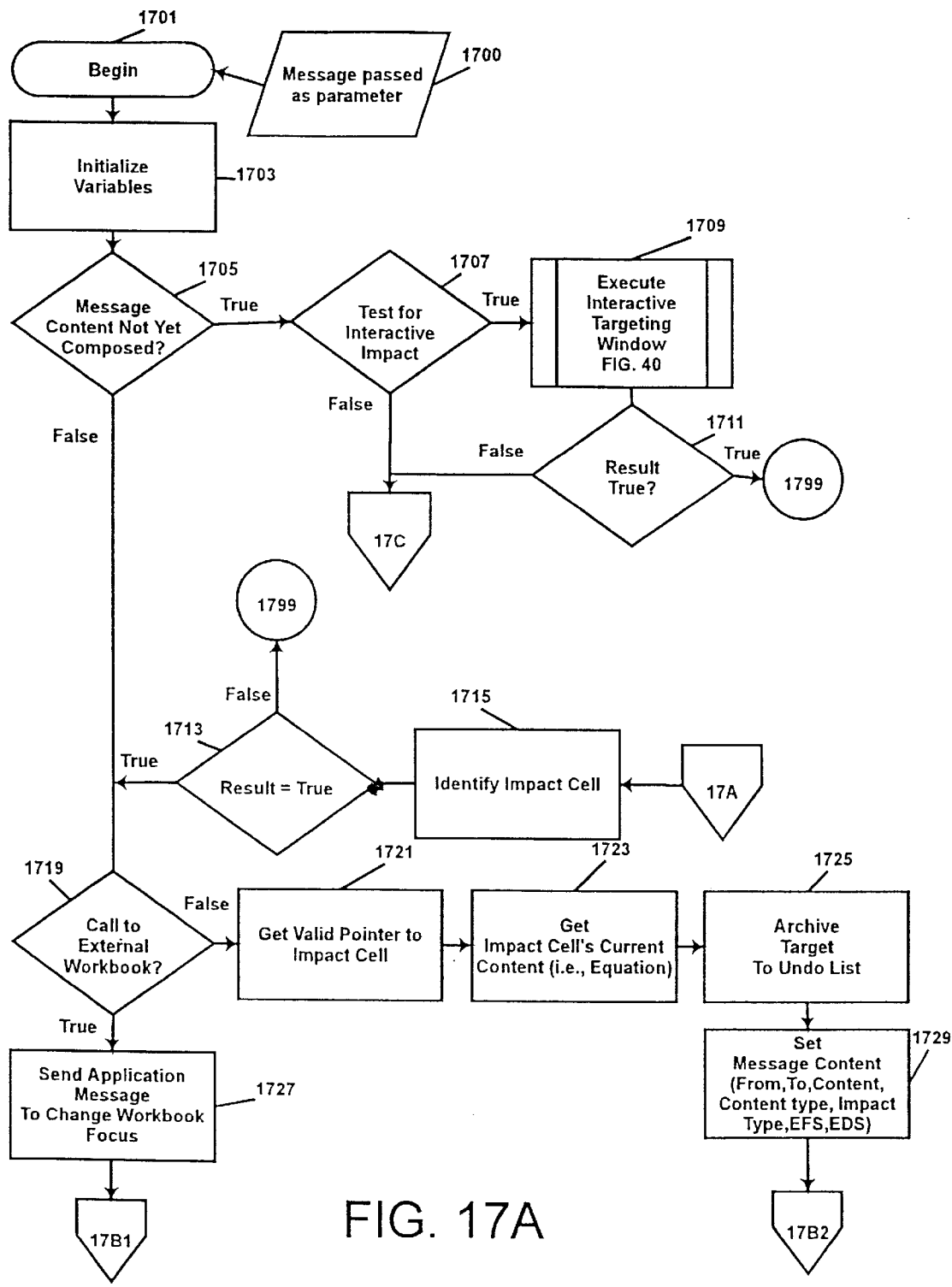
FIGS. 17A–17D are a flowchart of a compose email process.
Figure 17B:
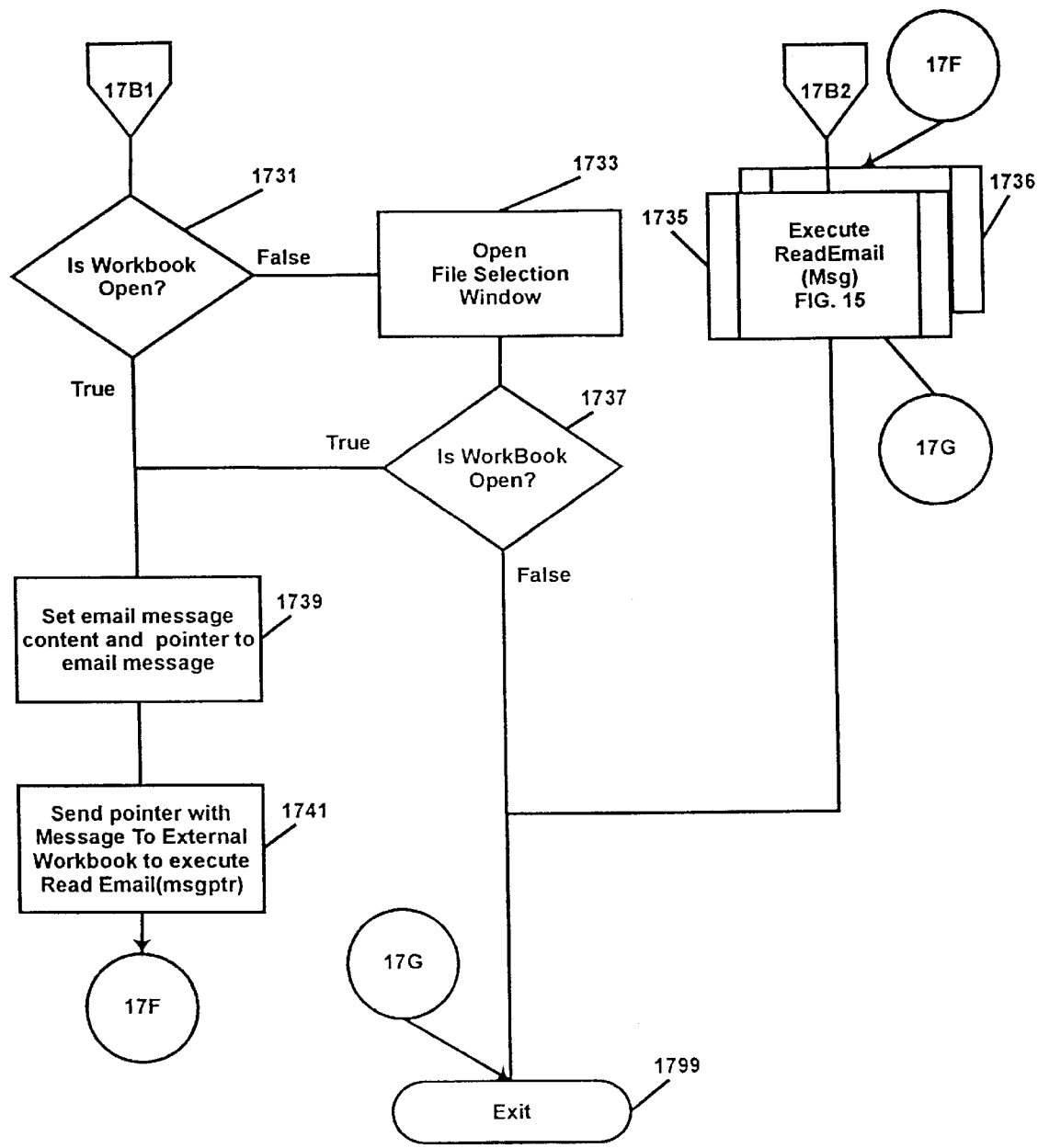

The compose email operation is shown in the flow diagram of FIGS. 17A and 17B. It is entered via terminal block 1701 and is passed the email message as a parameter.

In a process block 1703, it initializes local variables, result is set to a value of true, title is set to the current workbook title, target title is set to the message.sender cell's title, a local EDS format variable is instantiated, caller cell pointer is set equal to the current cell instance of the sender cell, and a table is initialized for the content exchange process.

A test in decision block 1705 looks at the email message EFS and EDS contents. If these contents already exist then processing will proceed to decision block 1719 where the current and sender cell workbook titles are compared. If the contents have not yet been composed, then a test in decision block 1707 is performed to determine if the impact type of the sender cell is one of the valid interactive types, i.e., [printeractive, printeractiveoncb]. If so an interactive targeting window is displayed for the user to make a selection in execution block 1709. When targeting is complete processing returns to decision block 1711 where a false result will exit via terminal block 1799. When the result is true processing moves to FIG. 17C, in a decision block 1751 where the structure of the senders's (previous instance) structure determines whether the EDS vertical 1755 or the EFS horizontal 1753 process will be used to generate the content for the email message EFS and EDS content. Note that the steps beginning at process blocks 1755 and 1753 will both result in a valid content for both structures. If the EFS structure is developed first, it then converts itself into the EDS format so that both formats are available to the next operation. If the EDS structure is developed first, it then converts itself into the EFS format so that both formats are available to the next operation.

The following steps retrieve the message.receiver cell's (previous instance) permutation control content and use it to initialize a local EDS format variable EDS_V1. The EDS_V1 variable is used to assemble the new permutation content that will be passed to the next receiver cell that has not yet been identified. The contents of the current and the first future positions of the message.receiver permutation control are swapped, or exchange positions, and then the remaining future positions from the permutation control are appended. If the message.receiver cell is an interactive type the type identifier to pass to the next receiver cell is toggled to the interactive callback type, and vice versa.

Figure 17C:
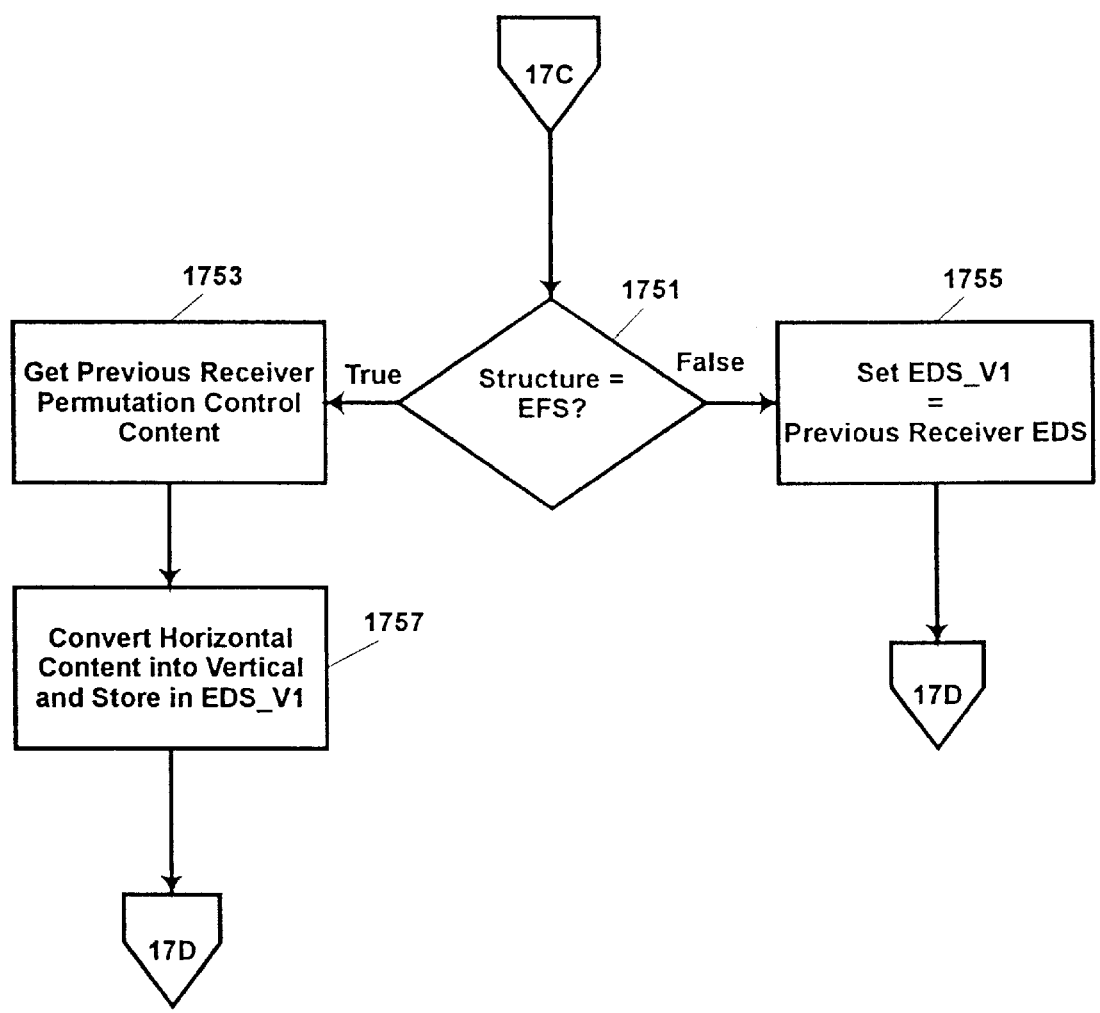
Figure 17D:
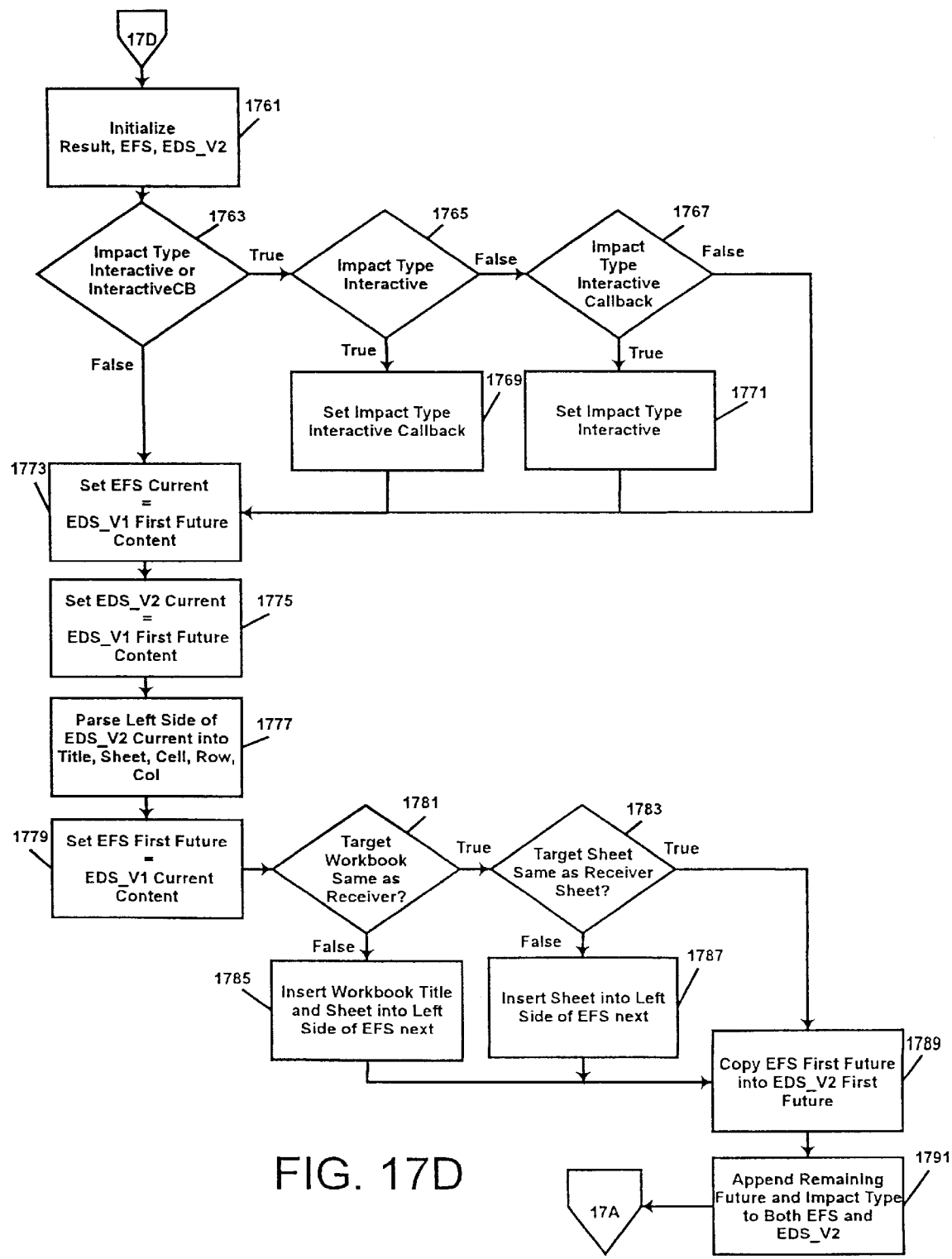

The detailed operations shown in FIGS. 17C and 17D are as follows. In process block 1755, the message.receiver EDS format is copied in its entirety to the EDS_V1 variable. If the decision block 1751 identifies the message.receiver structure as EFS, then process block 1753 retrieves the permutation control content in the EFS format. Then in process block 1757, this format is converted and stored in the EDS_V1 variable in the EDS format. From this point forward the EDS_V1 local variable is used to generate the new contents in the EDS_V2 local variable.

In process block 1761, the result variable is set to true, the local EFS format variable is set to empty and the EDS_V2 variable is instantiated. A decision block 1763 identifies the message.receiver cell's impact type. If it is an interactive type constant of [printeractive, printeractivecb] then the decision blocks 1765 and 1767 are used to toggle the current value into its opposite value in process blocks 1769 or 1771 respectively. Thus a [printeractive] becomes [printeractivecb] and vice versa. This value is stored in the message.impacttype attribute.

In a series of steps, the current content and the first future position exchange places and are placed in the EDS_V2 variable and the EFS variable. In process block 1773 the EFS variable is set equal to the first future position of the EDS_V1 variable. In process block 1775, the EDS_V2 has the same information added to it as its first entry.

In process block 1777, the left side of the first entry equation is parsed in order to extract title, sheet, cell, row and column address identifiers. In process block 1779, the EFS variable has the current content position of the EDS_V1 variable concatenated to it. So it now contains the message.receiver first future content, followed by the message.receiver.current content. In a series of cell address location tests, decision blocks 1781 and 1783 determine if a prefix is necessary before the cell's row and column address. If the new receiver target workbook is the same as the old receiver workbook in decision block 1781 then no prefix for the workbook is needed. If they differ the prefix containing the workbook title and sheet name are inserted into the left side the EFS equation. Or, if the titles match but the sheet names in decision block 1783 do not match, then the prefix of just the sheet name is inserted in process block 1787 into the left side of the equation in front of the cell row column address. If both the workbook and the sheet are matched, then no prefix is inserted and processing proceeds in all three cases to process block 1789 where properly addressed equation from the EFS format is inserted to the EDS_V2 variable.

Finally, in process block 1789, the remaining future positions of the EDS_V1 variable and the impact type identifier are transferred to both the EFS and the EDS_V2 variables. These variables and the impact type identifier will be used to update the message record in process block 1729 shortly. At this point, the current and future positions have been swapped. The left side address of the current position has been updated if it does not match the title or sheet of the first future position. The remaining future positions have been added behind the first two entries and the type identifier has been added last. Both the EFS horizontal and the EDS vertical contain the same information and can be used as the content of the email message that compose email of FIGS. 17A–17D is assembling.

The process now returns via page connector 17A to FIG. 17A where process block 1715 looks at the contents of the EDS_V2 current contents and identifies the new receiver cell. A decision block 1713 looks at the contents that will be used to update the email message to verify that it is all correct. The sheet, row, column of the target cell is valid, the EFS and EDS_V2 content is present and identical, etc. If everything is not in order processing exits via terminal block 1713. If everything is in order then processing moves to decision block 1719 where the title of the target cell workbook, that was just extracted, is compared to the current workbook. If the titles match then local processing will ensue. If they do not then external processing will proceed.

In the event of external process via decision block 1719, a message is sent to the application in process block 1727 to order the activation and refocus to the external workbook of the new receiver or target cell. Processing moves now to FIG. 17B via connector 17B1 and a test is performed via decision block 1731 to determine if the external workbook is open. If not, an open file window allows the user to select and open the proper workbook in process block 1733. When completed the decision block 1737, again, tests for an open external workbook. If it is still not open, then processing terminates via terminal block 1799. If it is open in either decision block 1731 or 1737 then the content of the email message is updated with the EFS, EDS_V2, and impact type in process block 1739 and a pointer to the information is generated that can be passed to the external workbook. In process block 1741, the external workbook is sent the message to execute the read email operation of FIGS. 15A–15C in execution block 1736, using the information contained in the email message pointed to by the pointer that is sent. Execution block 1736 is shown as a separate instance of the read email operation as it exists in a separate instance in computer memory in the external workbook. Instance will operate on the external workbook data. When it is complete it will return via connector 17G and terminate via terminal block 1799.

In the event that the decision block 1719 finds a match between the titles, the local workbook will be used for the following operations, beginning with process block 1721 where a valid cell pointer is now generated to the new receiver cell. The current content of the EDS_V2 variable is also parsed to obtain the formula content of the current position that will be used to update the message.content field. Then, in process block 1725 the current target cell is archived to the undo list, thus preserving for future reference the contents of its control structures and current values, etc. The email message content is now completely updated with all of the information about the new receiver or target cell. But first, the message.sender is set equal to the message receiver. Then the message.recevier is set equal to the target cell pointer to the undo list instance of the previous target cell content. This is critical. The previous instance of the target cell is the basis for future permutations to be executed in the read email operation of FIGS. 15A–15C. The email message is updated with the EFS and EDS_V2 contents, the message.contents are set to the formula content derived earlier, the message.typeid is set to the impact type retrieved from the old receiver permutation control, and may have been swapped from or to an interactive call back type in process block 1769 or 1771. The email message now contains the old receiver as the sender, the new receiver or target cell as the receiver (pointer to the previous instance on the undo list), the formula content, and valid EFS and EDS formatted permutation control contents. These contents will be used in the next operation to permute the target cell into a new form. Processing no moves to FIG. 17B, execution block 1736, where the local instance of read email of FIGS. 15A–15C is executed.

Compose email returns to the calling operation the result of the email operation. This enables the reset options of permute model of FIG. 14 to execute if the read email operation returns a false value. In any event, compose email exits via terminal block 1799.

Compose email is called only by the routing operation of send email FIG. 16. It serves the purpose of reordering the content of the old receiver's previous (undo list instance) permutation control, parses the control to identify the target cell and impact type, archives the target cell (if local), composes the email message with all of the content necessary to transform the target cell with new content, swaps the interactive and interactive callback types, and dispatches the email message either locally or externally for processing by the read email operation. So, the read email operation is responsible for the update of the impact or target cell's current and future content. The send email operation is responsible for routing processing to the various types of operations supported by the different impact types, i.e., prompt, multiple impact, polyversion, subroutine, and single impact. Compose email is responsible for composing the email message content for single and interactive and independent single impact types and routing the message locally or externally. Again, it is critical that the email message carry the pointer to the previous instance of the target cell contents stored in the undo list. This is the location where the permutation control content is found that is used to generate the cell contents for the cell permutations.

Figure 18:
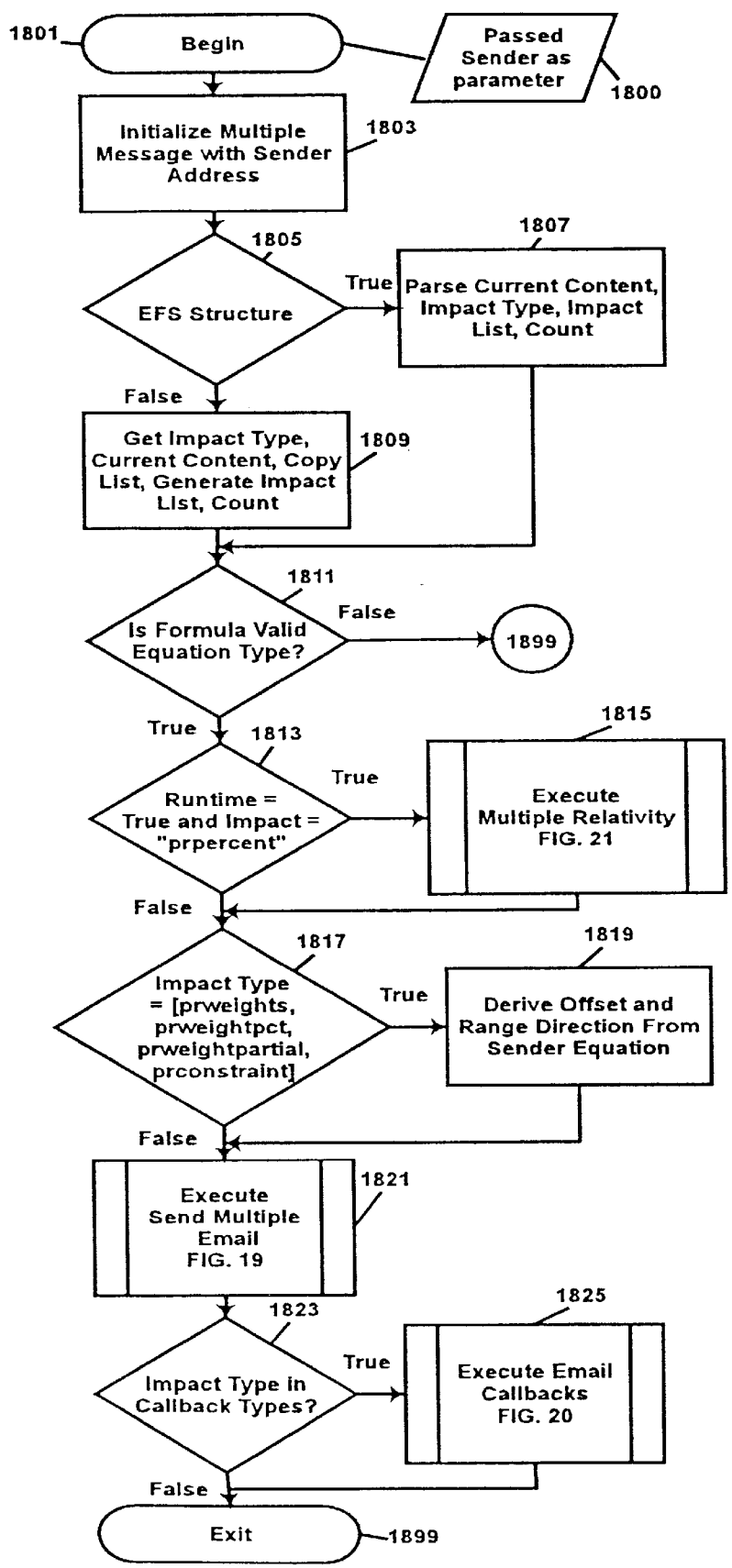
FIG. 18 is a flowchart of a compose multiple impact process.

The compose multiple email operation is shown in a flow diagram of FIG. 18. It enters a terminal block 1801. The calling routine passes email message that contains a pointer to the sender cell. It then updates, in process block 1803, the message structure for the multiple impact operations that it will call. It initializes cell address information variables for the sender or parent cell, i.e., title, sheet, row, column, cell, etc.

Decision block 1805 queries the cell's structure. It parses an EFS structure in process block 1807 into the current content, impact type, impact list and count of impact content. The operation parses an EDS structure in process block 1809 into the same list of contents. It adds these items of information to the email message structure. Decision block 1811 tests for a valid equation type, i.e., only summation equations can be treated as multiple impact events. When the test is false the operation ends and exits via terminal block 1899. Decision block 1813 queries the impact type for a constant value of [prpercent]. When found, the execution block 1815 executes the multiple relativity operation to calculate percent weights to use in the current allocation process.

In decision block 1817, it queries the impact type for a constant value of either [prweights, prweightspct, prweightspartial, prweightcontraint]. When found the process block 1819 derives the column or row offset between the current cell and the weight range cell found in the cell formula. It stores this information in the email message structure that it passes to the next operation where it can be of use.

In execution block 1821 the send multiple email operation of FIG. 19, takes control until it is complete. An operation in the send multiple email operation updates a list of the sibling cells involved in the operations that occur. This node list is included in the email message structure as the message.nodelist attribute. This information returns in the email structure when the execution block 1821 ends. Then in decision block 1823, the impact type from the sender cell is queried for a valid callback impact type. The list of valid callback types are: [prequalcb, prpercentcb, prweigthcb, prweightpctcb, prweightpartial, pruserdefinedcb, and prconstraintcb]. When it finds a valid callback type, the execution block 1825 begins the email callback operation of FIG. 20. The email callback operation notifies each sibling that the parent has retrieved its computational information, or been reinstated, so that they no longer need to perform computational tasks. Therefore, they change form from a dependent to an independent cell during the operation of the callback operation of execution block 1825.

When the callback operation is finished, processing ends and the operation exits at terminal block 1899. In summary, the compose multiple email operation assembles the parent cell permutation control content into its component address and equation parts, plus a node list attribute, into an email message that it can pass to the two routines that it triggers, the send multiple email operation of execution block 1821 and the conditional execution block 1825 email callback. It prepares several operation specific information content for the percent and the weight operations. It also receives back from the send multiple email operation of FIG. 19, a list of siblings, that is used and generated only when the parent itself contains a valid callback permutation type identifier.

The results of its operation is the initiation, but not the execution of, the distribution of multiple cell contents to multiple cells, and the conditional reversal of dependent cell content for sibling cells. The actual cell updates occur in the send multiple email operation of FIG. 19 and the callback operation of FIG. 20.

FIGS. 19A–19D is a flow diagram of the send multiple email operation. The compose multiple email operation starts this operation to distribute more than one set of cell contents to more than one cell.

Entry via terminal block 1901 includes parameters of an email message structure containing the parent cell address and permutation control contents. The calling operation also passes three additional parameters: an item index, a local operation only boolean variable, and a count of the number and positions of future content in the parent permutation control. The operation recursively parses the contents of the parent permutation control, extracts each index item, derives new contents, and distributes the revised content to the cell(s).

Decision block 1903 decides if the index count is less than or equal to the number of future content positions in the parent permutation control stored in the count parameter. A false result exits the operation via terminal block 1999.

A next decision block 1905 decides if the local operation only boolean operator is true. This shows that the information for steps 1909–1913 have already been processed in a previous instance of the operation and processing can jump directly to process block 1917.

In a series of steps in process block 1909–1913, the operation parses the parent permutation control. It identifies the content to operate with using the index that points to it. Then it separates the cell address from the new content that it will place in the cell. The operation parses this cell address and contents using the enhanced syntax of the invention to derive title, sheet, row, column, cell, and content attributes.

Decision block 1913 compares the current workbook title and the workbook title for the target cell. When a mismatch occurs, process block 1915 updates the email message structure. The message content that it updates is the target cell content that it just parsed in process block 1994 of FIG. 19E. It dispatches a message to the application. The application then changes the active workbook to the target workbook.

Decision block 1995 tests if the target workbook is open. If not, the process block 1996 provides a means for the user to retrieve the workbook. The workbook can be on the local or a remote computer site such as a world wide web site. The decision block 1997 again tests if the target workbook is finally open, if not, processing ends and the operation exits via terminal block 1999. The failure to retrieve the workbook will return a false result to every prior operation so that the model will be reset to a previous form.

When decision block 1995 or 1997 determine the target workbook is open, it updates the message content and a local operation only boolean is set to a value of true. Then it retransmits the information via process connector 19A. The retransmission, however, does not arrive at the current instance of the operation in computer memory. Instead, the transmission goes to the instance associated with the target workbook. In this way the process can continue, uninterrupted, i.e., causing a permutation of an external workbook besides the local workbook. The operations in the target workbook (at connector 19A of FIG. 19A), are identical to the operations that start with terminal block 1901. However, they operate on two separate sets of data in computer memory. Each affects only its own data set.

Figure 19A:
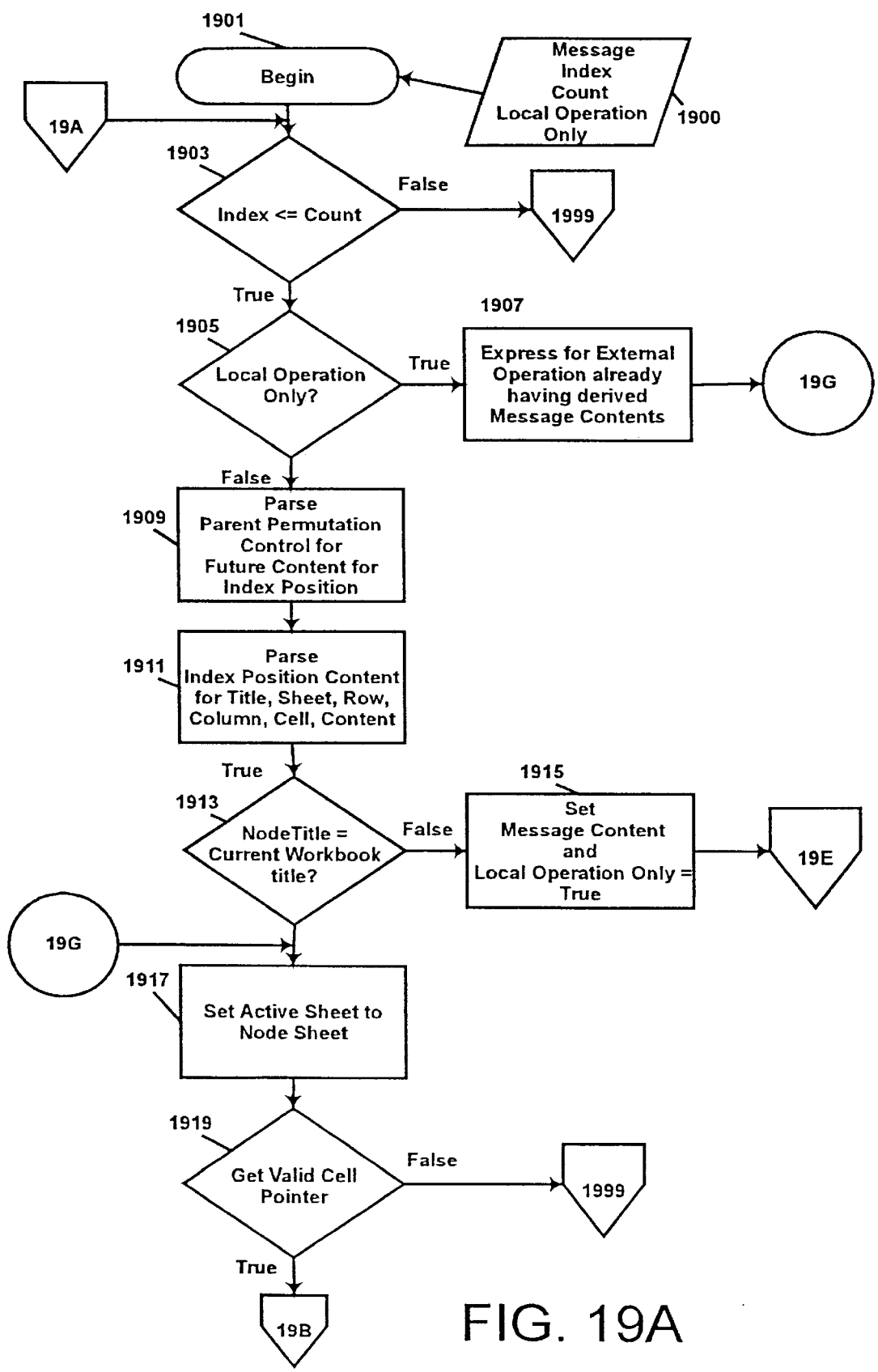
FIGS. 19A–19E are a flowchart of a send multiple email routine.

The external operation of 19A FIG. 19A, can pass over steps 1909–1913 since the value contained in the boolean operator, local operation only, is true. The necessary information exists in the email message structure and the process can jump from connector 19G at process block 1907 to 19G at process block 1917. When the external operation is complete, return occurs via FIG. 19D, connector 19H. The process then increments the index in process block 1989 and processing continues locally.

When the target cell is found on the active workbook in decision block 1913, the process block 1917 sets the active or workbook sheet to the target cell's sheet. The process establishes a valid cell pointer in decision block 1919. If it finds an invalid pointer, the operation ends via terminal block 1999.

Figure 19B:
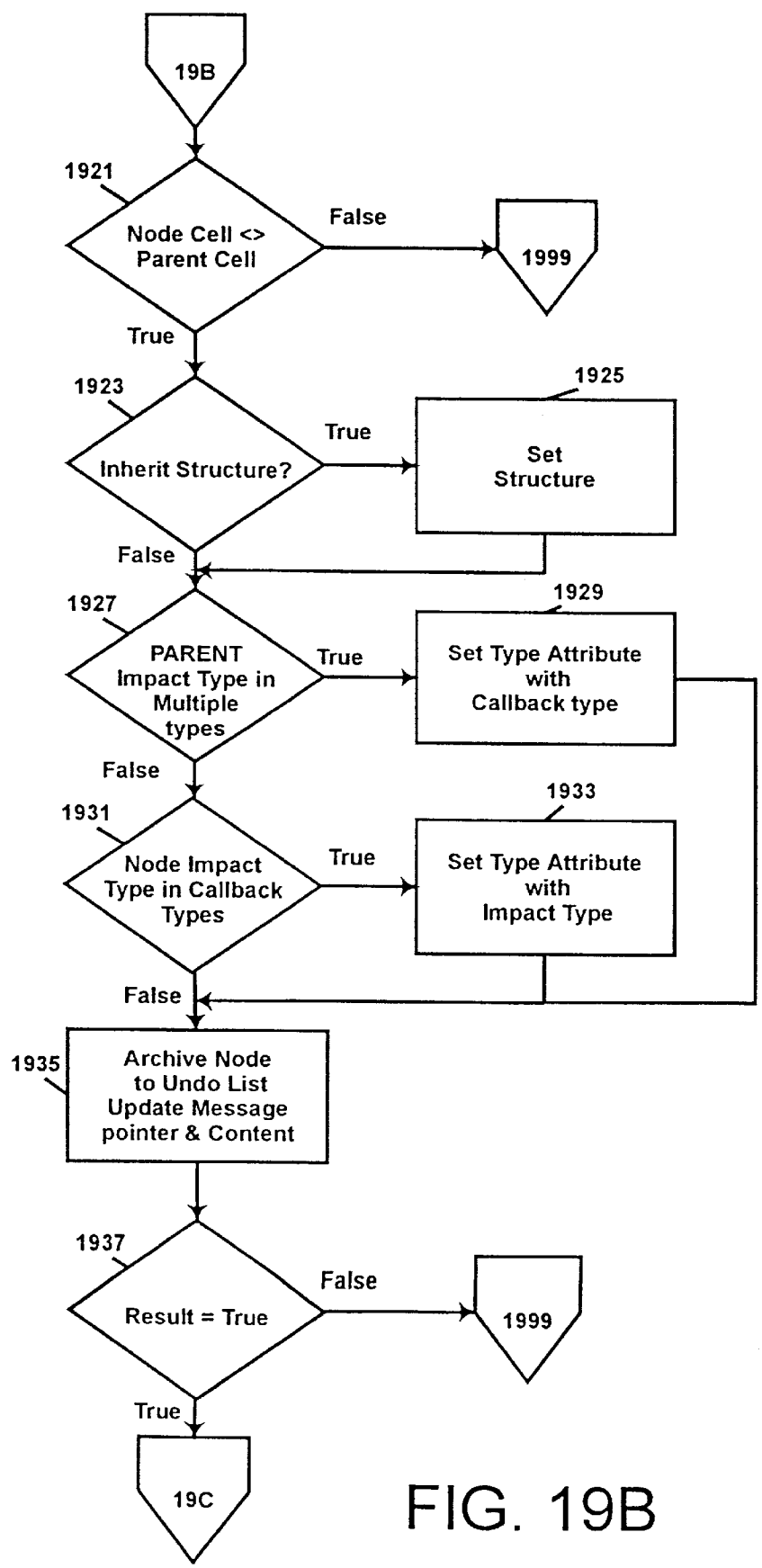

The next decision block in FIG. 19B, 1921, decides if the target cell is identical to the parent cell. Users are free to enter any cell content into the permutation control. They may overlook the fact that the cell being entered is the parent cell itself. This is an invalid entry. Decision block 1921 tests for this error and ends processing via terminal block 1999 if it occurs.

A next test in decision block 1923 tests if the storage format for the permutation control by system default or by inheritance by the target cell from the parent cell. Process block 1925 sets the structure attribute of the target to that of the parent.

The process continues in a decision block 1927 to test the parent cell impact type for a multiple impact type. When the decision block is true, process block 1929 sets a local variable or type attribute to the inverse or callback value for the current impact type. The operation subsequently uses this local type attribute to update the target cell permutation control. For example, the constant for the equal allocation method is [prequal]. Its inverse is [prequalcb]. The local impact type is set to [prequalcb] when the parent type is [prequal]. The reverse is also true. If the impact type is a callback type, then decision block 1931 determines that process block 1933 should operate. It exchanges the callback type for its reciprocal multiple impact type, i.e., [prequalcb] becomes [prequal]. This is the case for each valid multiple impact type. This is a list of the valid types and their inverse: [prequal, prequalcb, prpercent, prpercentcb, prweight, prweightcb, prweightpct, prweightpctcb, prweightpartial, prweightpartialcb, pruserdefined, pruserdefinedcb, prconstraint, prconstraintcb].

Switching between the impact type and its inverse is the means to decide when to notify the group of siblings about a change event, or, if it is a means of deciding if this is the initial event of a parent, delegating out its computational responsibilities to its children and then forgetting them.

The process archives the target cell to the undo list in process block 1935. It stores the pointer to the cell's memory location in the cell data structure and in the email message structure. It also updates the email message structure for the new parsed content from the permutation control of the parent that is to be placed in the cell. An additional set of email message structure attributes for the impact type, the EFS format, and the EDS format is set to the values: [prblank], empty, and nil respectively. The empty content is of no concern here, however, since compose email, FIG. 17, derives these attributes in later operations.

Decision block 1937 insures that the preceding operations are successful. If they are not, processing ends via terminal block 1999.

Figure 19C:
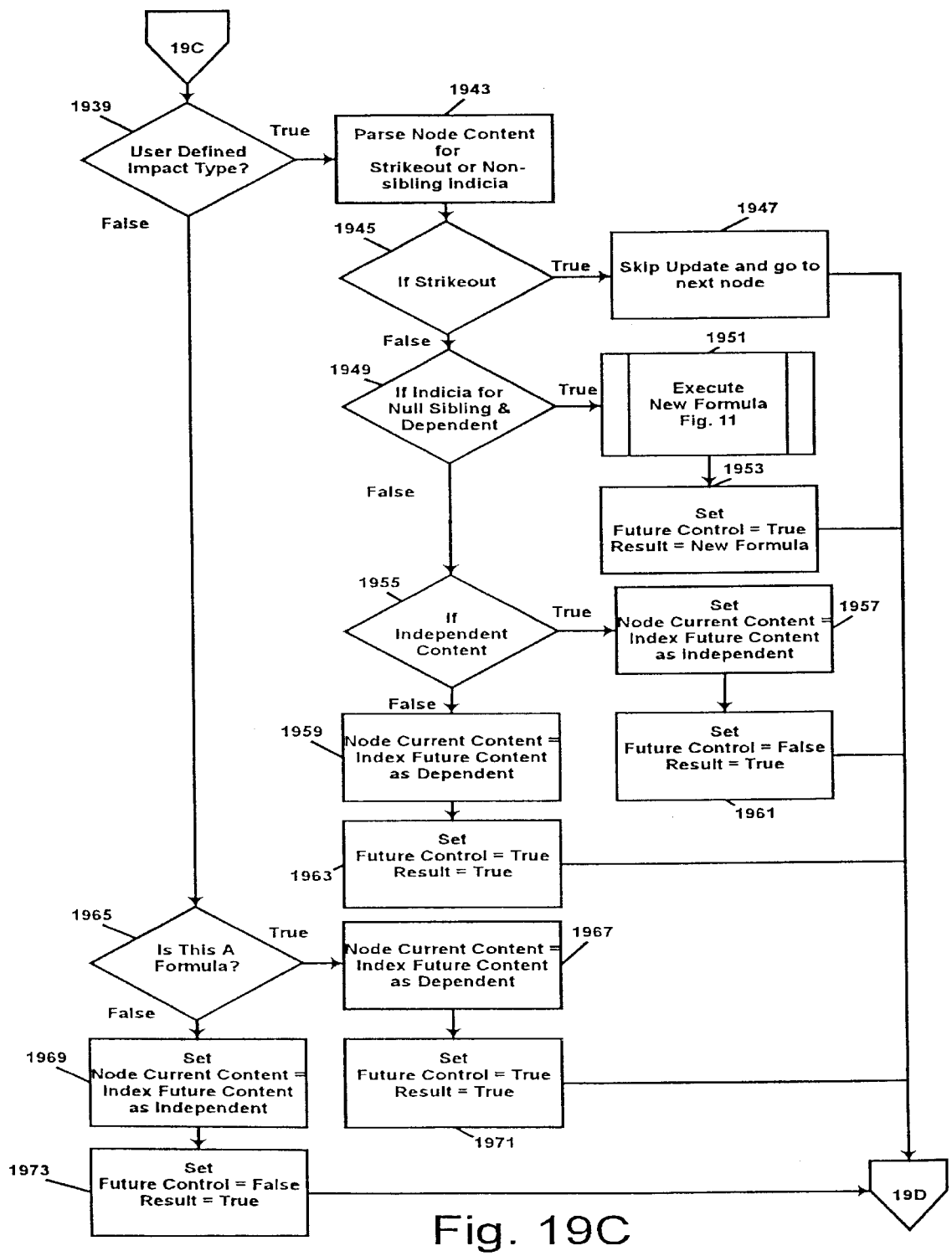

FIG. 19C is where the operation updates the current target cell content. Decision block 1939 tests for a user defined impact type. When found the process block 1943 parses the content that is to be placed into the cell in search of a strikeout or a null sibling indicia embedded in the syntax of the content. A next decision block 1945 determines a strikeout character. If found, it skips the current target cell update and the process advances to the connector 19D of FIG. 19D, where processing continues.

Decision block 1949 identifies null sibling indicia. When found an execution block 1951 submits the contents of the email message to the new formula operation of FIG. 11. When the new formula operation completes, control returns and process block 1953 sets a future content boolean operator to true and places the result of the new formula operation in the result operator. Processing then continues via connector 19D to FIG. 19D.

A next test is made in decision block 1955 to determine the independent nature of the content, i.e., that it is not a formula or equation. It updates the independent content of the cell's current position of its permutation control in process block 1957. Hence, the future content from the parent becomes the current content. of the child or target cell. The update routine used is that which is appropriate for independent cell content. The control operator for the update of the future content is set to a value of false and the result operator is set to true. Then, via the connector 19D to FIG. 19D, the process continues.

When the content is dependent in decision block 1955, i.e., it is a formula or equation, it updates the target cell's current content with the formula in process block 1959. Dependent content results in the evaluation of the equation to calculate the cell's current value. It then displays the cell value on the display screen. The future control operator is set to true in process block 1963 and the result is set to true. The process continues via connector 19D to FIG. 19D.

When the test in decision block 1939 does not yield a user defined impact type of [pruserdefined, pruserdefinedcb], a next decision block 1965 determines the formula content. If the content is dependent in decision block 1965, a process block 1967 evaluates the formula, stores it in the cell data structure, and displays the value on the display screen. The future content control is set to true and the result is set to true in process block 1971. If the content is independent content in decision block 1965, the independent update process of block 1969 places the content in the cell. Then in process block 1973 the future content control is set to a value of false and the result is set to true. Operations then continue via connector 19D to FIG. 19D.

Figure 19D:
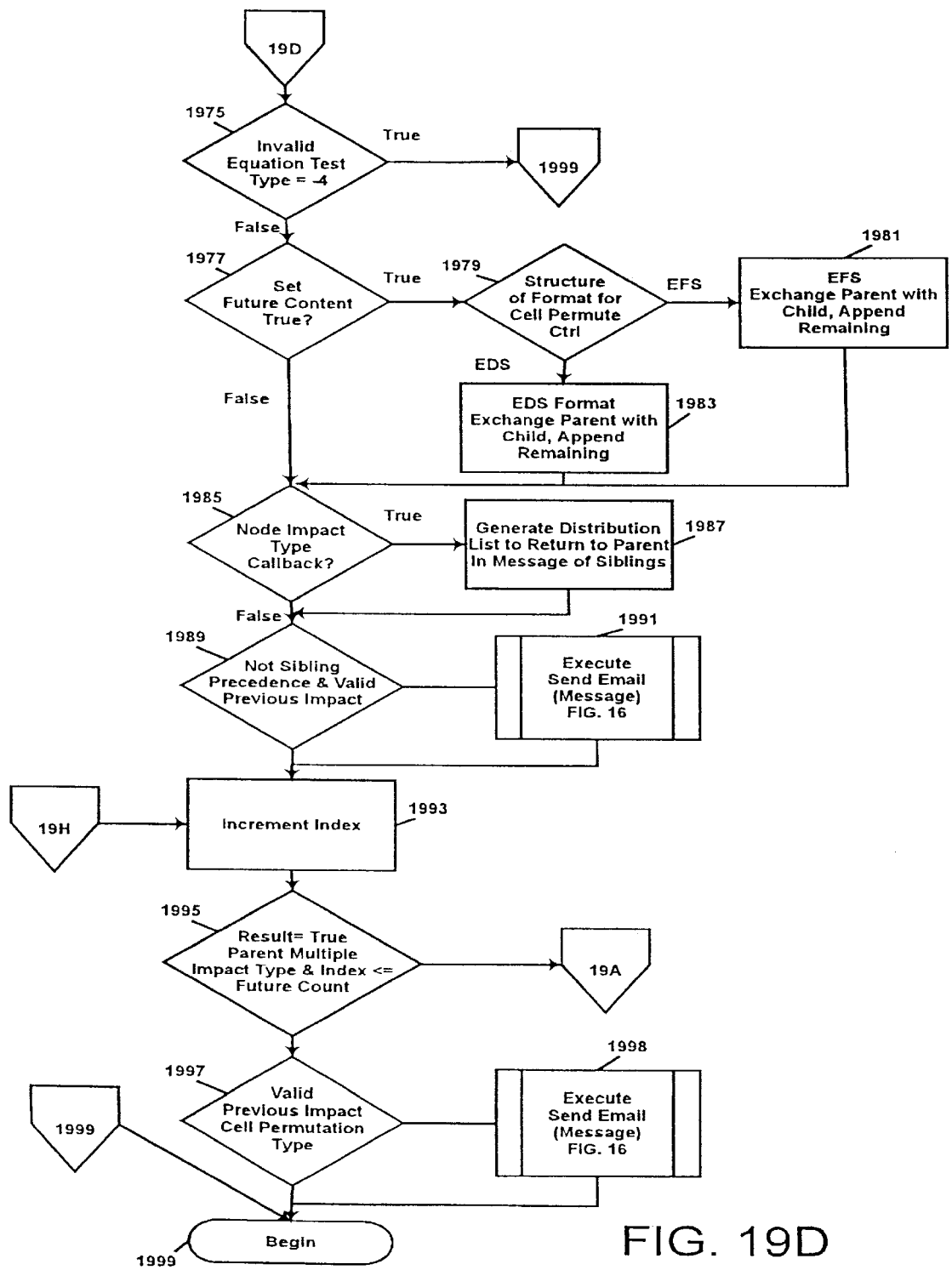
Figure 19E:
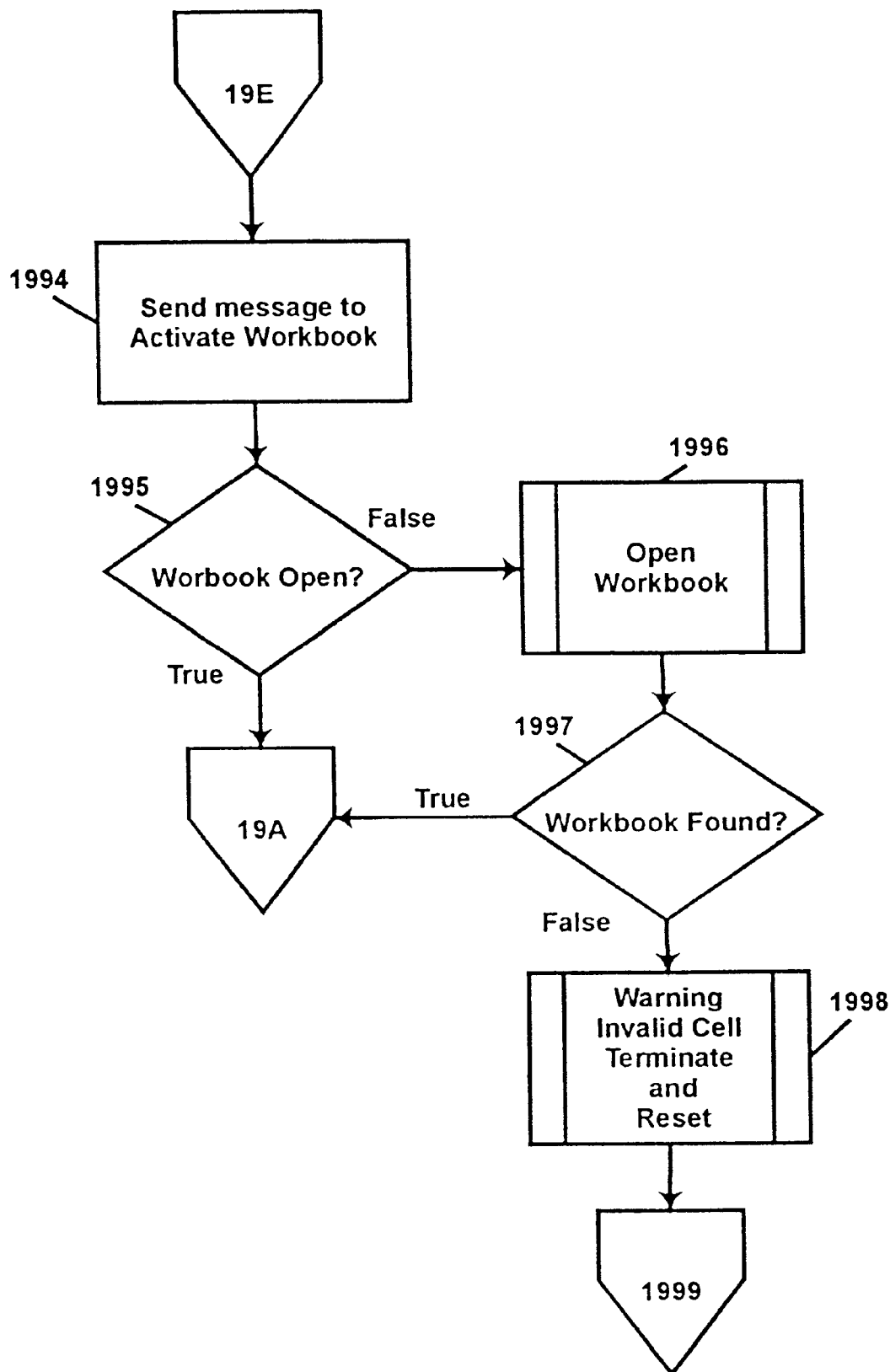

The operation also tests for invalid formulas as identified in decision block 1975 of FIG. 19D, with a cell type of −4. This is an invalid result and the process ends via terminal block 1999. The operation will return the value of false to the calling operation(s) to reset the model to a previous state.

Decision block 1977 evaluates the future control to determine update behavior for the future positions of the target cell's permutation control. The cell's structure attribute, which was set in decision block 1923 of FIG. 19B, determines in decision block 1979 the format to use for the future content that will be placed in the target cell's permutation control.

The EFS, or horizontal structure, in process block 1981 uses a horizontal format for the information it derives. In process block 1981, the content of the parent permutation control is first copied. Then it exchanges the current content, or parent position and the future position of the current index or child position. It appends the other siblings to the remaining future positions. Thus, it passes all of the content of the parent permutation control and accounts for every child. Hence, every child has the information necessary to both reallocate the computational responsibilities to the parent, and also to notify their siblings of the event. The operation also places the permutation identifier type, that was set in process block 1929 or 1933, into the permutation control of the target cell's data structure.

The process block 1983 does the same function as process block 1981 with the exception that it stores information vertically in a string list or link list structure as known in the art. The parent and child positions are swapped, the siblings (or other independent content, the user defined impact type can provide) are then appended, the type identifier added, and all of this information is stored into the permutation control of the target cell in the cell data structure in computer memory.

When the processes of blocks 1981 or 1983 are complete, or when the future control is false in decision block 1977, the process performs a test in decision block 1985 to identify a valid callback type in the parent type identifier. When the parent type is a callback type, it means that the parent is one of the sibling cells. It means that the parent is being sent its original content because the child is changed by another event. The child is responsible to the parent to compile a list of the siblings that need to be notified in this event: The process block 1987 generates a node list of the sibling cells that it derives from the content being placed into the current position of the target cell. The node list is stored in the message structure. The message structure is available to the calling operation, and therefore, has access to this information. The present operation is called by the compose multiple impact operation of FIG. 18. The node list is generated here, then used by the compose multiple impact operation to notify the sibling cells of the parent callback via the callback operation of FIG. 20.

When the node list operation is complete, or when decision block 1985 determines that the parent impact type is not a callback type, the index is incremented in process block 1993. Then a test is used in decision block 1995 to insure that all prior operations are valid, i.e., the result is true, the parent impact type must be in the list of valid multiple impact types, and the new index must be less than or equal to the number of nodes in the parent permutation control. Then the operation resubmits a request to itself via connector 19A, so that it can operate on the next index item from the parent permutation control, and so on, until the last item in the list is complete.

The position of the final behavior of this operation is significant. Each recursion of this operation will be completed until the very last one. Then, in the reverse order the decision block 1997 tests for a valid permutation trigger in the previous, undo list version of the target cell. When found, the execution block 1998 activates the send email operation. The send email operation of FIG. 16 will route the email message content for further cell permutations. When the send email operation returns, the current operation exits via terminal block 1999.

When the blocks 1997 and 1998 are placed immediately before process block 1989, a different order of processing results. The comparison of the two locations for the operation of blocks 1997 and 1998 are as follows.

If placed before the recursion the permutation of non sibling cells will occur at the time each sibling is updated and before the next sibling is processed. In the second instance, every sibling will be updated for both current and future content first, and only then are the remaining permutations carried out throughout the remainder of the model.

In the first instance the permutations of the remainder of the model will occur in the order of the sibling list. In the second instance the permutations will occur in the reverse order of the sibling list. Both positions work correctly, however, there may be a class of problems where order of precedence would require a choice between these two locations and the resultant change in processing order. A control attribute at the component level and a boolean decision block in both the prior and post recursion positions can make this operation selectable to the user.

The reverse order has the advantage that all of the siblings are processed as a group before alterations are made to other cells. This localizes the group processing and segments it from the remainder of the model.

When the decision block 1997 and process block 1998 have been evaluated the operation exits via terminal block 1999. In sequence, then, each sibling operation exits via terminal block 1999 as a result of the recursive nature of the operation in a reverse order until the very first sibling exits and processing of the entire operation is complete.

To summarize, the send multiple email operation of FIGS. 19A–19E is recursive. It begins with a parent impact cell. The parent cell permutation control contains a multiple impact type identifier. This means that every one of the entries in the parent cell permutation control future positions will receive an email message causing it to change content, unless the strikeout indicia is present. For each entry in the future position(s) of the parent cell permutation control, the operation parses the content, identifies the target cell and replacement content, addresses the target cell, archives the target cell, updates the target cell, and conditionally updates the future position(s) of the target cell permutation control. The operation derives the content that it places in the target cell permutation control from the parent permutation control. It changes the order of this content, so that the parent becomes the child and the index to the child content becomes the parent. It then appends the remaining contents in the order in which it appears. The operation performs other specialized operations such as swapping the impact type and callback type, swapping the callback type with the impact type, conditionally, it generates a node list for use in a callback operation, it addresses cells in external workbooks in the same fashion as in the local workbook, and selects an update mode for the current content of the target cell consistent with the content type that it places there, i.e., so independent content is treated as independent content, so that dependent content is evaluated for the new cell value and displayed on screen, so that strikeout content is passed over, and so that dependent null sibling content (an equation without a parent) is treated as a new formula. It submits the new dependent content to the new formula operation so that it can correctly update the content for both the current and future position(s) of the target cell permutation control.

Figure 20:
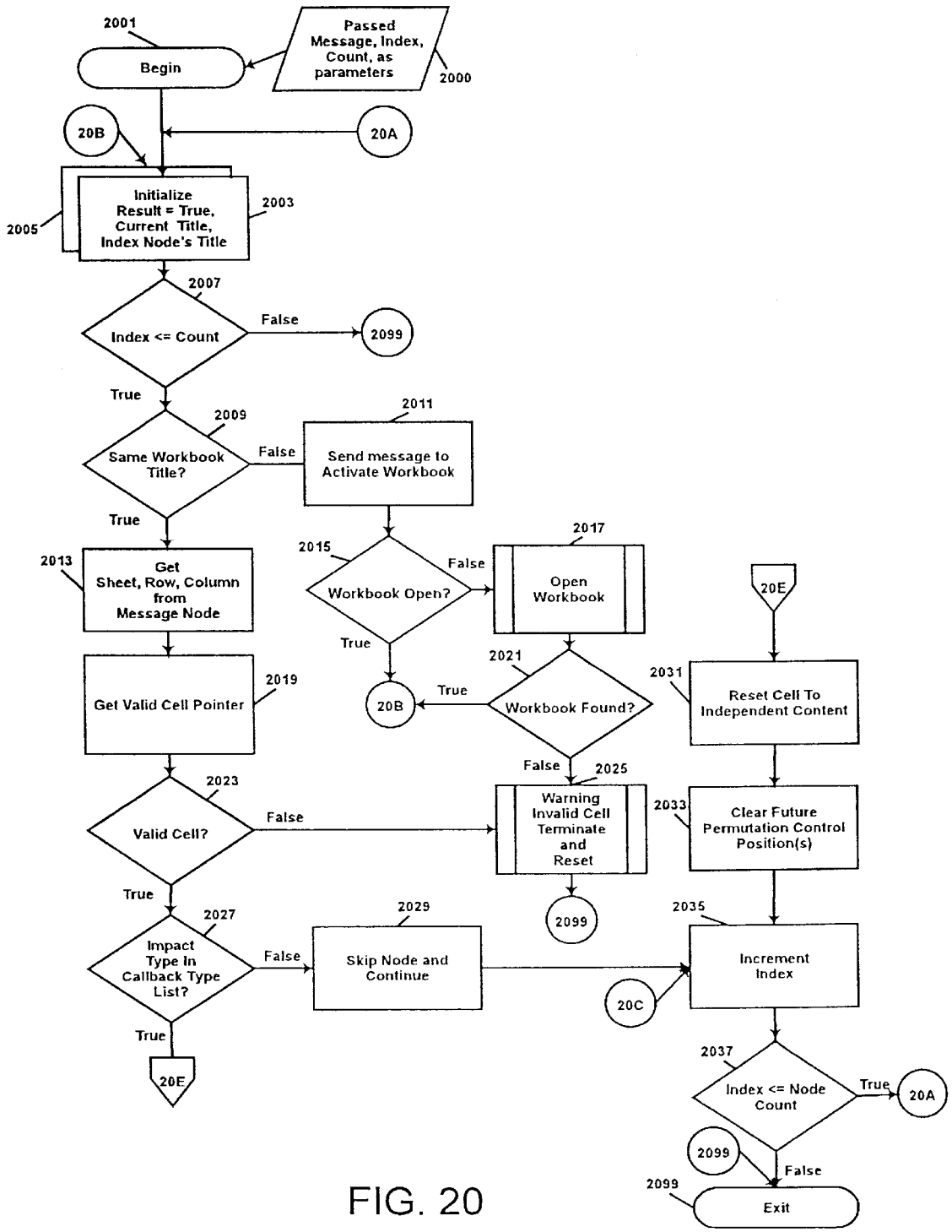
FIG. 20 is a flowchart of a multiple callback routine.

FIG. 20 is a flow diagram of a callback process. The callback process enters via a terminal block 2001. The calling operation passes message structures 2000. Message structures contain a node list and a pointer to the parent cell. An item index points to a node in the node list and a count index gives the number of nodes in the list.

Process block 2003 sets the operation result variable to a boolean value of true. A current title variable is set to the current workbook title and the process retrieves the workbook title of the indexed node from the message node list 2000.

In a decision block 2007 a test determines if the index is valid, i.e., it is less than or equal to the count of the items in the list. If the end of the list is found, processing exits via terminal block 2099.

Processing continues for valid index items in decision block 2099 where the process compares the current workbook title and the node's workbook title. If they do not match, the process block 2011 sends a message to the application with instructions to actuate the node's workbook. A decision block 2015 tests to decide if the workbook is open. If it is not already open an execution block 2017 allows the user to open the workbook. The workbook can be on the current computer hard disk, another computer's hard disk on a network, or on a remote site computer accessed via the world wide web. Decision block 2021 decides if the node's workbook is now open, then processing continues in a process connector 20B. If the workbook is not open then the operation warns the user in execution block 2025. It terminates the process, the result of the function is set to a value of false, and the model is reset to its previous form.

When the node's external workbook continues the process via connector 20B at process block 2005, it operates using a separate instance of the callback operation. This instance resides in a different part of the computer memory. The operations performed on the external workbook are identical to the operations performed on the local workbook. However, the external operation operates on the external workbook data and the local operation operates on the local workbook data. The external operation return to the local operation occurs at connector 20C, process block 2035, that increments the index to point to the next node in the list.

If the title comparison finds a match in decision block 2009 then in process block 2013 the process extracts node's sheet, row, and column address information. A valid cell pointer is retrieved to the node in process block 2019 and a decision block 2023 tests to insure the pointer and cell address are valid. If invalid, the user is warned in execution block 2025 where the process is terminated and the result of the operation is set to a value of false and the exit is made via terminal block 2099.

With a valid cell pointer processing continues with a decision block 2027 that extracts the impact type of the node, using the node pointer and the permutation control content of the node cell to determine if the cell's impact type is a valid callback type. The set of valid callback type constants is: [prequalcb, prpercentcb, prweightcb, prweightpctcb, prweightpartialcb, pruserdefinedcb, and prconstraintcb. These include five multiple allocation types [prequalcb, prpercentcb, prweightcb, prweightpctcb, prweightpartial], a user defined type [pruserdefinedcb] and the constraint multiple impact type [prconstraintcb].

For user defined and constraint processing a strikeout type, [prstrikeout], can be used so that a given entry can be skipped without being affected by operation at decision block 2027. The strikeout impact type is particularly useful to the constraint processing where alternative forms of a model are iterated to test various results. Hence, certain portions of a cell's permutation control can be temporarily deactivated while others remain activated. This provides additional combinations and permutations of the model in accordance with selections made by the user or operations of the invention. The strikeout is indicated by a single character indicia in the cell content such as enclosing the contents in braces, i.e., '{A3=A1+A2}' or as a prefix to the equation itself, such as, A3={A1+A2.

If the type found is not a valid callback type process block 2029 skips the entry and passes processing directly to process block 2035 where the item index is incremented and tested in decision block 2037 to insure that the index is less than or equal to the number of items in the list. Then in process connector 20A, the callback operation recursively calls itself to repeat its process for the next item in the node list, until it encounters the end of the list.

If the type found in decision block 2027 is a valid callback type then process block 2031 resets the contents of the node to an independent form, i.e., if an equation is found in the current portion of the cell's permutation control, it is replaced with the text, number or other independent content of the cell. Then in process block 2033 the future positions in the permutation control are set to empty or cleared. The item index is incremented in process block 2035 and processing continues for each node in the message node list until decision block 2037 ascertains that the end of list has been found and processing terminates via terminal block 2099.

In summary, the multiple impact callback operation of FIG. 20 is executed by the multiple impact compose operation of FIG. 18. When the parent cell allocates a portion of its value to a group of precedent cells, these cells must be subsequently treated as a group. These precedent cells are termed siblings.

The parent cell delegates its computational responsibilities to the members of the group as a whole. Later, if an impact event causes one of the siblings to return these computational responsibilities to the parent cell, then every sibling cell in the group must be notified. The parent cell now reclaims the computational role and each sibling in the group forfeits its computational role. All of the sibling cells in the group are converted from dependent computational cells to independent content cells in process block 2031. The dependent formula found in the current content position of the permutation control in each sibling is replaced with the independent content of the cell, i.e., text, number, or other independent content. The future content position(s) of the permutation control are set to empty. The permutation control identifier is set to a constant [prblank]. When the operation converts the entire list of sibling cells in the message 2000 from dependent to independent cell status the process exits via terminal block 2099 and control returns to the multiple impact compose operation of FIG. 18.

The multiple relativity operation is shown in a flow diagram of FIGS. 21A–21E. It enters via terminal block 2101. The operation result attribute updates to a value of true and the offset attribute updates to an initial value of zero. A first decision block 2105 compares the active workbook to the sender cell workbook name. The sender cell is passed to the operation as a parameter from the calling operation.

When decision block 2105 finds a name mismatch process block 2107 sends an email message to the application telling it to activate the external workbook. Process block 2111 then sets the contents of the email message into a form to transmit to the external workbook. In decision block 2113, a response from the application indicates if the workbook is open. If it is not, an execution block 2115 provides a means for the user to select and load the workbook. The workbook can be located on a local computer, or on a remote computer such as via access on a network, for example, the world wide web. A second test is made in decision block 2119 to determine that the workbook is open. If it is not open, then the process exits via terminal block 2199 and returns a false value for the operation to the calling event. When the workbook is open in decision blocks 2113 or 2119, a process block 2123 sends a message with the sender cell information to the external workbook. The external workbook then activates via connector 21A. When the external operation is complete in decision block 2129, the process terminates and exits terminal block 2199. The external multiple relativity operation is identical to the local instance. However, it operates on a different set of data located in the external workbook instance.

In decision block 2105, a name match means that processing will continue with the local workbook. A test in decision block 2109 evaluates the content of the parent cell formula. If it is of a class that can be correctly operated upon then the process continues in process block 2117. If not, the process exits via terminal block 2199. Only summation equations are valid for multiple impact events.

The process block 2117 initializes a local formula variable to hold the sender cell current formula. An execution block 2121 then parses the formula and translates its elements into a node list table with the cell's current value to provide a lookup table for the events that follow. Process block 2125 tabulates the number of nodes in the table and a total variable to contain the sum of the node cell's current values.

In decision block 2131, a valid multiple impact weight type is tested. The list of valid constants are [prweight, prweightcb, prweightpct, prweightpctcb, prweightpartial, prweightpartialcb]. When one of these values is found, the execution block 2133 displays an input means for the user to select a column or row offset, and enter the offset value. This offset is used to calculate the position of the cells that contain the values to use in the weight calculations, relative to the present cell location.

Figure 21A:
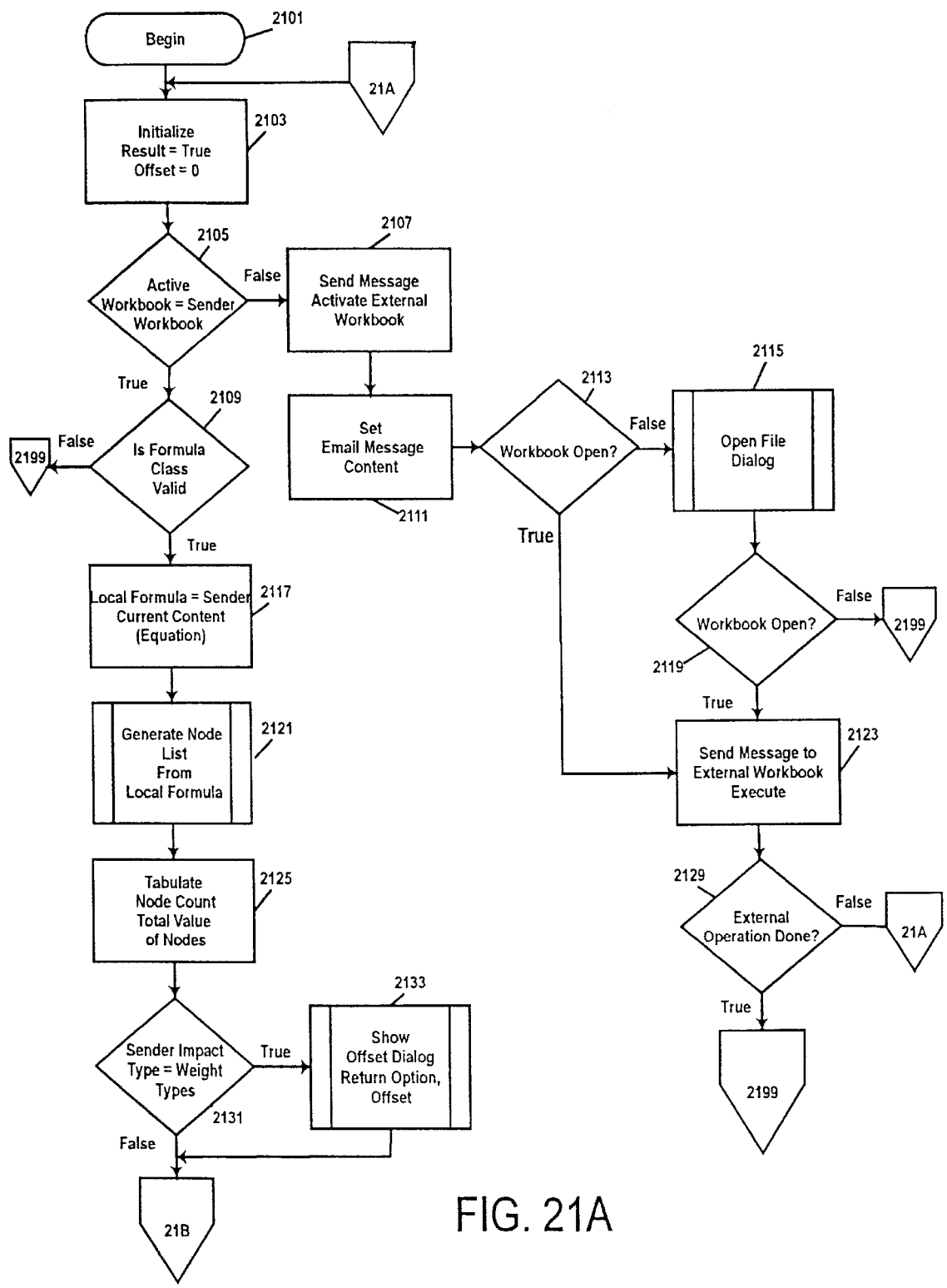
FIGS. 21A–21E are a flowchart of a user defined multiple impact routine.
Figure 21B:
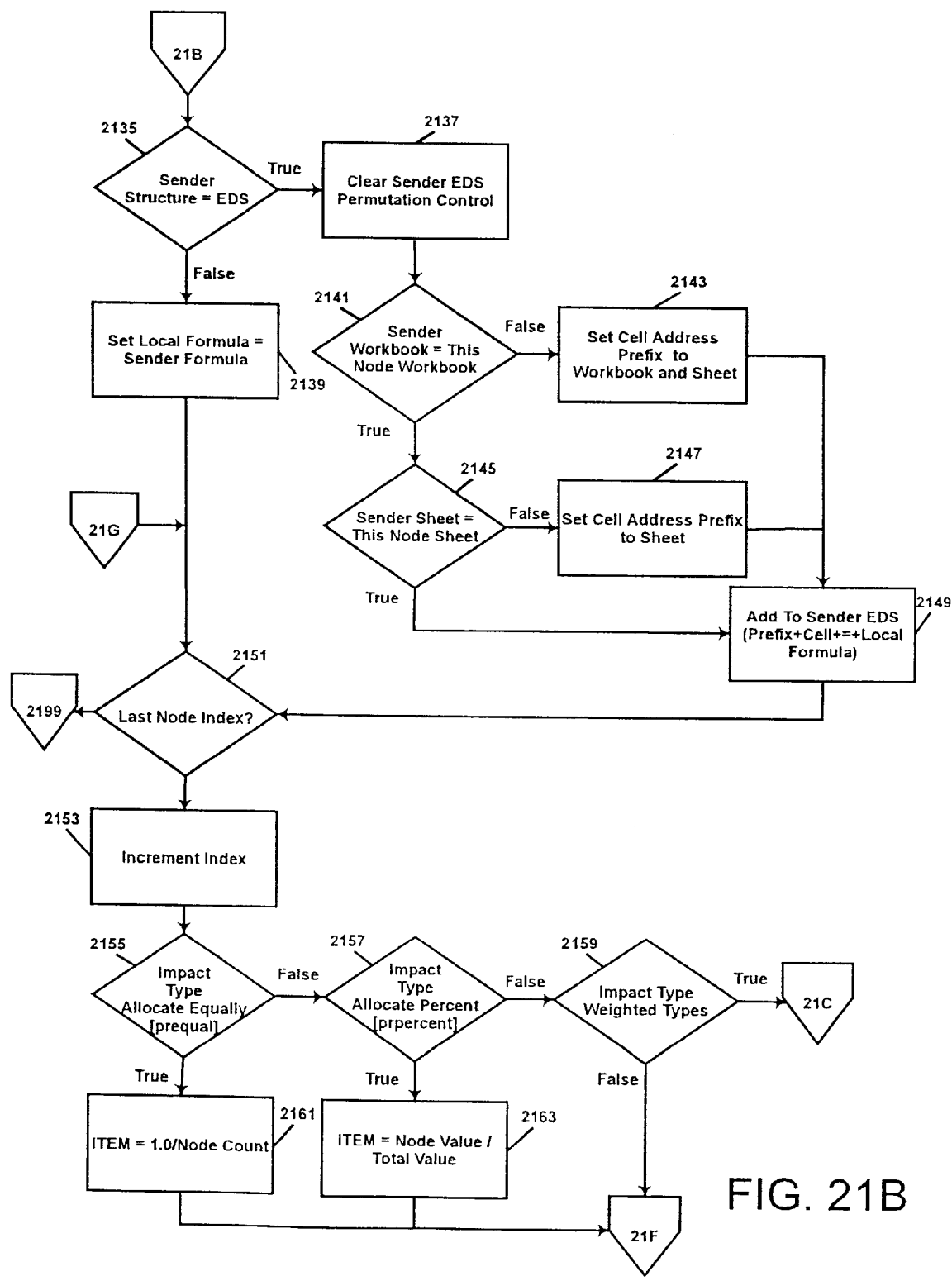
Figure 21C:
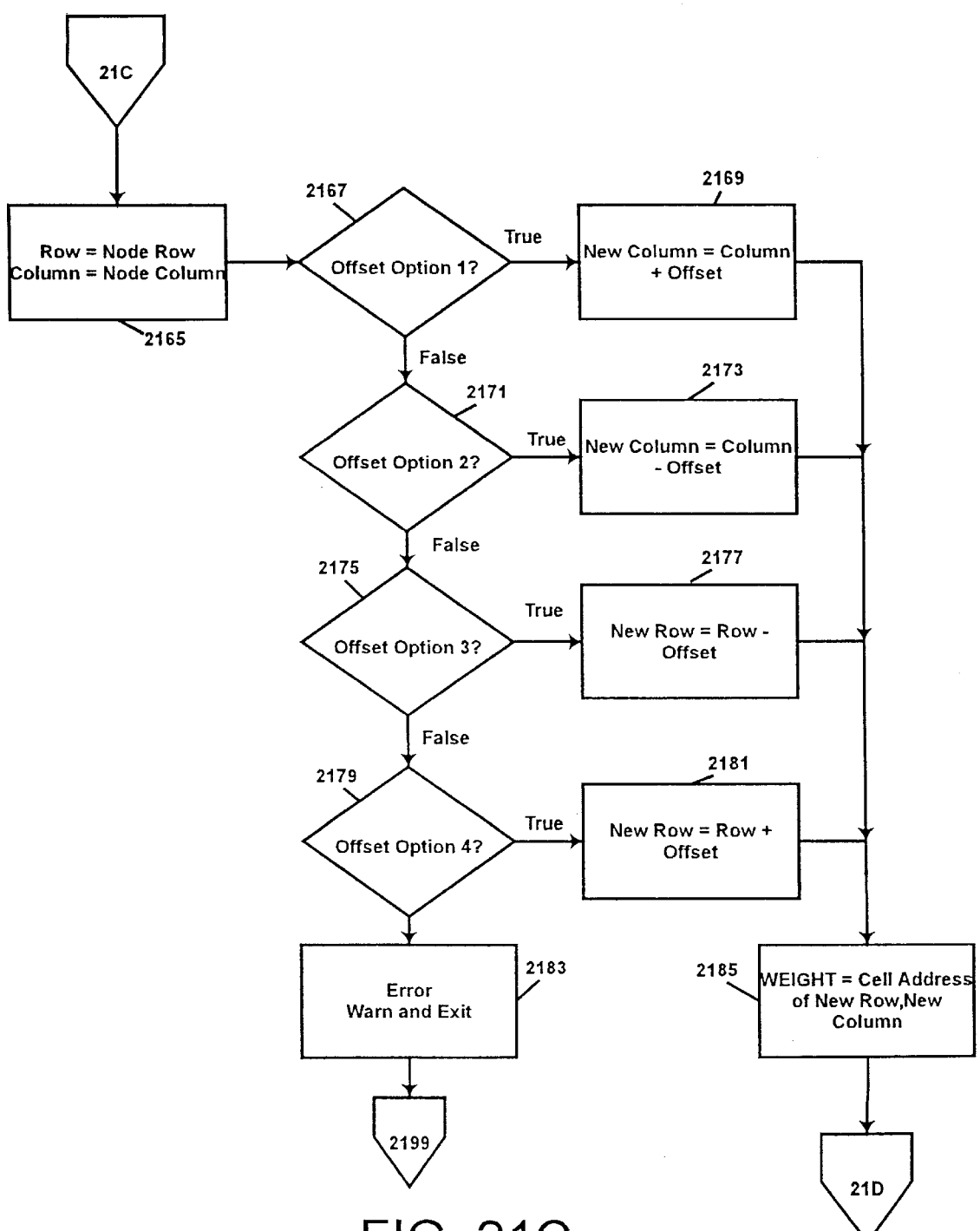

The process continues in FIG. 21B. A decision block 2135 identifies the sender permutation control structure and routes the process to the process block 2137 for the EFS format and to the process block 2139 for the EDS format. In process block 2139 the local formula variable is set equal to the content of the sender formula. In process block 2137, the EDS format is cleared, or emptied. Then in a series of steps in decision blocks 2141 and 2145, and process blocks 2143, 2147 and 2149, the content for the EDS format derives. The test in decision block 2141 compares the node title to the sender title. When they differ the prefix to the cell address is set to the title and sheet of the sender cell in process block 2143. When the sheet names do not match in decision block 2145, the cell prefix is set to the sheet name in process block 2147. Then in process block 2149, the prefix for the sender cell and cell address of the sender cell are combined with the formula content of the sender cell and are inserted into the EDS string list data structure.

The process continues with a processing loop that starts with the first node and continues until it reaches the last node via decision block 2151. When the loop is finished, it exits via terminal block 2199. The purpose for the loop is to derive a list of future cell content for the sender cell's permutation control. There will be one entry for each precedent cell in the sender cell formula. The formula that determines the proportion of the sender cell's value to allocate to the node cell is derived in the steps which follow.

The node index is set to the first node in process block 2153, and incremented in each processing loop to point to the next node in the node table that was generated in process block 2121. Decisions are made to determine the allocation method for the formula derivation in decision blocks 2155, 2157 and 2159, 2187 of FIG. 21D and 3113 of FIG. 21E.

Decision block 2155 identifies a sender cell impact type split evenly among the cells. In process block 2161 it sets the equation item equal to the value of one divided by the node count. This item will be used later to assemble a formula.

When the decision block 2157 identifies the allocate as a percent of previous impact type the process block 2163 sets the formula item to the node value as a percent of the total value calculated from the node table in process block 2121.

Processing is a bit more elaborate for the weighted multiple impact types. In decision block 2159, all of the valid weighted impact types result in continued processing via connector 21C.

The process continues with the weighted multiple impact types of weighted, weighted percent and weighted partial. The weighted type uses the value stored in the offset cell. The weighted percent type calculates the offset cell value as a percent of the total for all of the offset cells. The weight partial type allows the user to interactively delete a cell or cells from the allocation list. The result is the total allocation of the sender cell value, but not all of the precedent cells receive a part of that allocation. This can be very useful when one of the precedent cells refers to another of the precedent cells in its formula. So, an allocation to one cell will lead to the calculation of the value in the other cell. Therefore, no amount needs to be allocated to the cell containing the precedent cell reference. This type of circumstance is encountered during constraint processing. The result of this type of operation during constraint processing may not be the end point of the process. This method is a useful intermediate step.

The process for weighted impact types activates process block 2165. A local row and column variable are set to the values of the node row and node column from the node table. In a series of tests in decision blocks 2167, 2171, 2175 and 2179, the offset option provided by the user determines if the offset column is to the right or left in process blocks 2169 and 2173 respectively, or above or below in process blocks 2177 and 2181 respectively, the sender cell location. The new row and new column are used to identify the cell address of the offset cell. In process block 2185, a local weight variable is set equal to the cell address of the offset cell, using the new row and new column generated by the user offset selection.

Figure 21D:
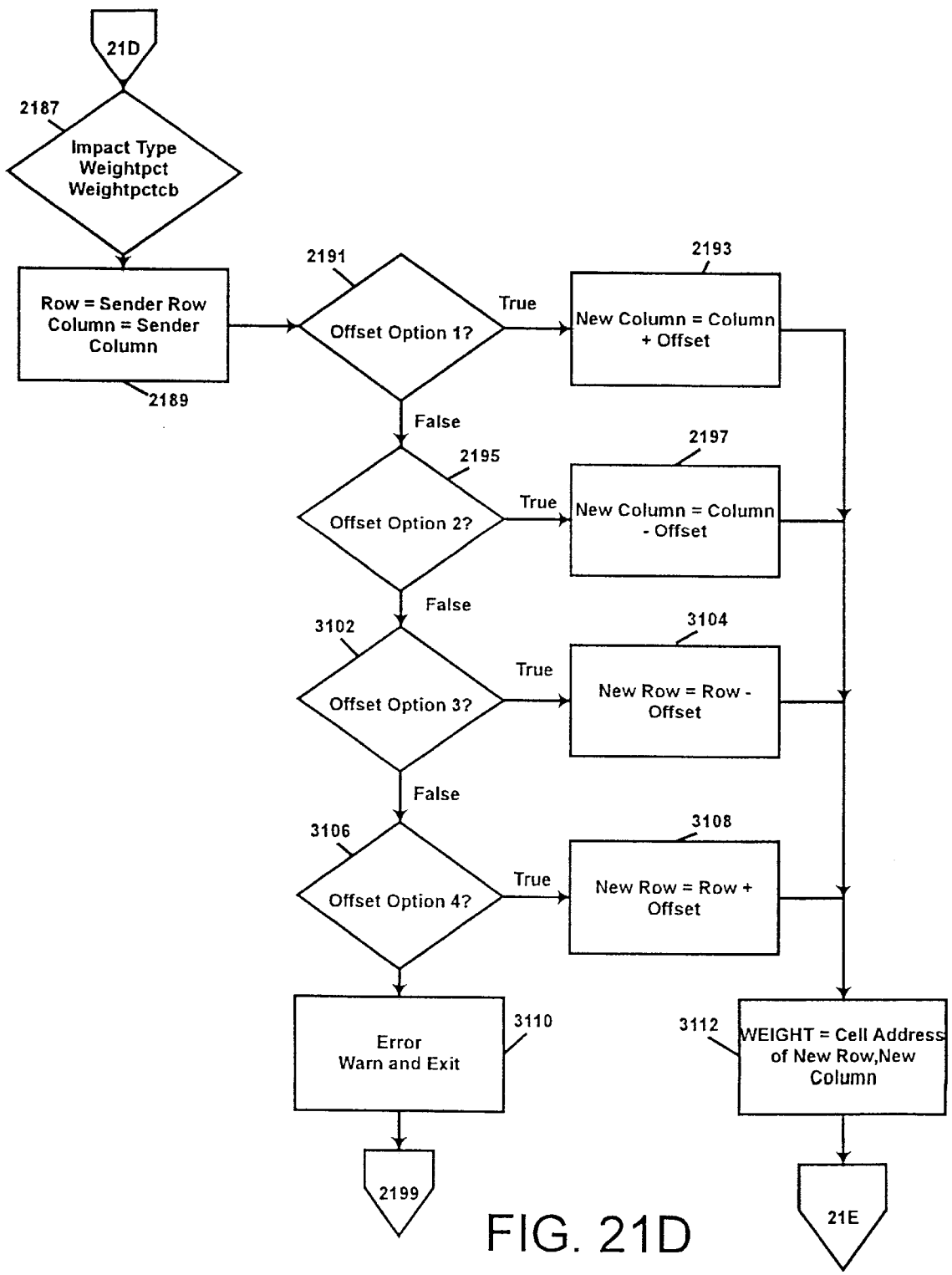

The process continues in FIG. 21D where decision block 2187 tests of the weight percent impact type or its callback type. When found the local row and column variables are set equal to the sender cell's row and column address. The location of the offset cell adjacent to the sender cell provides a relative cell address for the total value of the nodes in the node table. In decision blocks 2191, 2195, 3101, and 3105, the offset type the user entered is evaluated. The offset option determines if the offset column is to the right or left in process blocks 2193 and 2197 respectively, or above or below in process blocks 3103 and 3107 respectively, the sender cell location. The new row and new column are used to identify the cell address of the offset cell containing the total for the node cells. The content of the weight attribute is a cell address. It will be used in process block 3121 to derive a new formula.

Figure 21E:
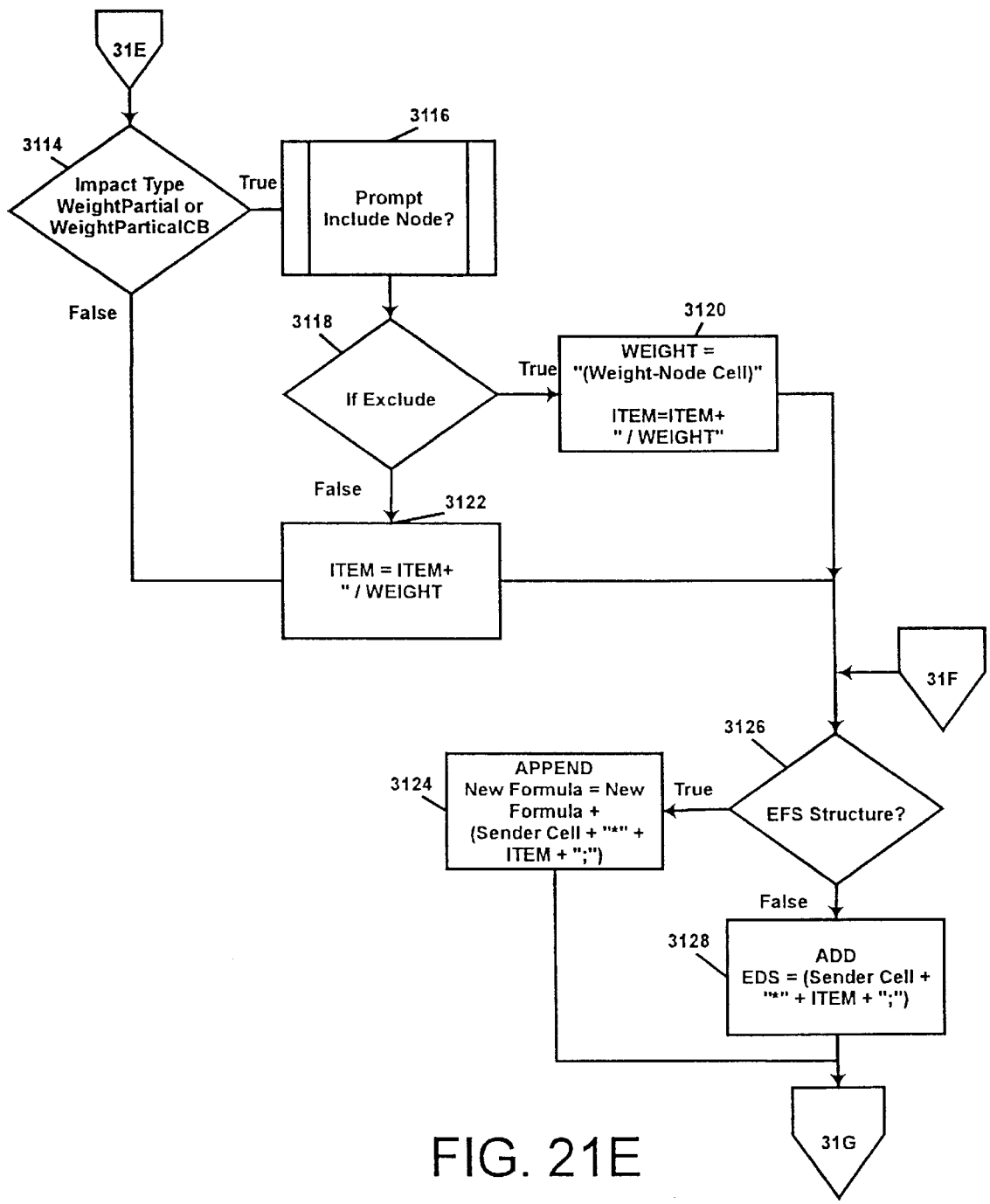

In FIG. 21E, the process continues in a decision block 3113. The weight partial or its callback type will append additional information to the weight item already developed in the preceding block 3111. The weight partial impact type via decision block 3113 activates an execution block 3115 for interaction with the user. The user is given the option to include or exclude each node from the allocation method under development. In decision block 3117, when the user response evaluates to exclude, the process block 3119 performs two actions. First, it appends information to the weight attribute which contains a cell address. Specifically, it adds a subtraction sign and the node cell address. The excluded node value is thereby excluded from the total value when percent allocation amounts are determined. This particular allocation method is utilized by the constraint processing. Due to the circular permutation reference that has need of this process, the calculated model will not necessarily return the value entered by the user into the sender cell. The constraint processing makes use of this consequence during iterative processing to eventually arrive at a result that does return the value entered. When an allocation occurs, the sender's total amount will be allocated to only included cells. When the cell is selected to be included in decision block 3117, the process block 3121 sets the item equal to the item itself with an equal sign and the cell address stored into the weight attribute appended. This completes the derivation of the allocation formula. Keep in mind that the split equal or the split percent item value is a string representation of a numerical percent rather than a cell address.

In decision block 3125 the cell's storage format for the permutation control determines the form the new equation will take in the cell's permutation control. The EFS, or horizontal format is updated in process block 3123, or the EDS, or vertical format is updated in process block 3127. The process then continues via connector 21G to FIG. 21B, where the decision block 2151 tests the index value. When the last node is updated the operation exits via terminal block 2199.

Figure 22A:
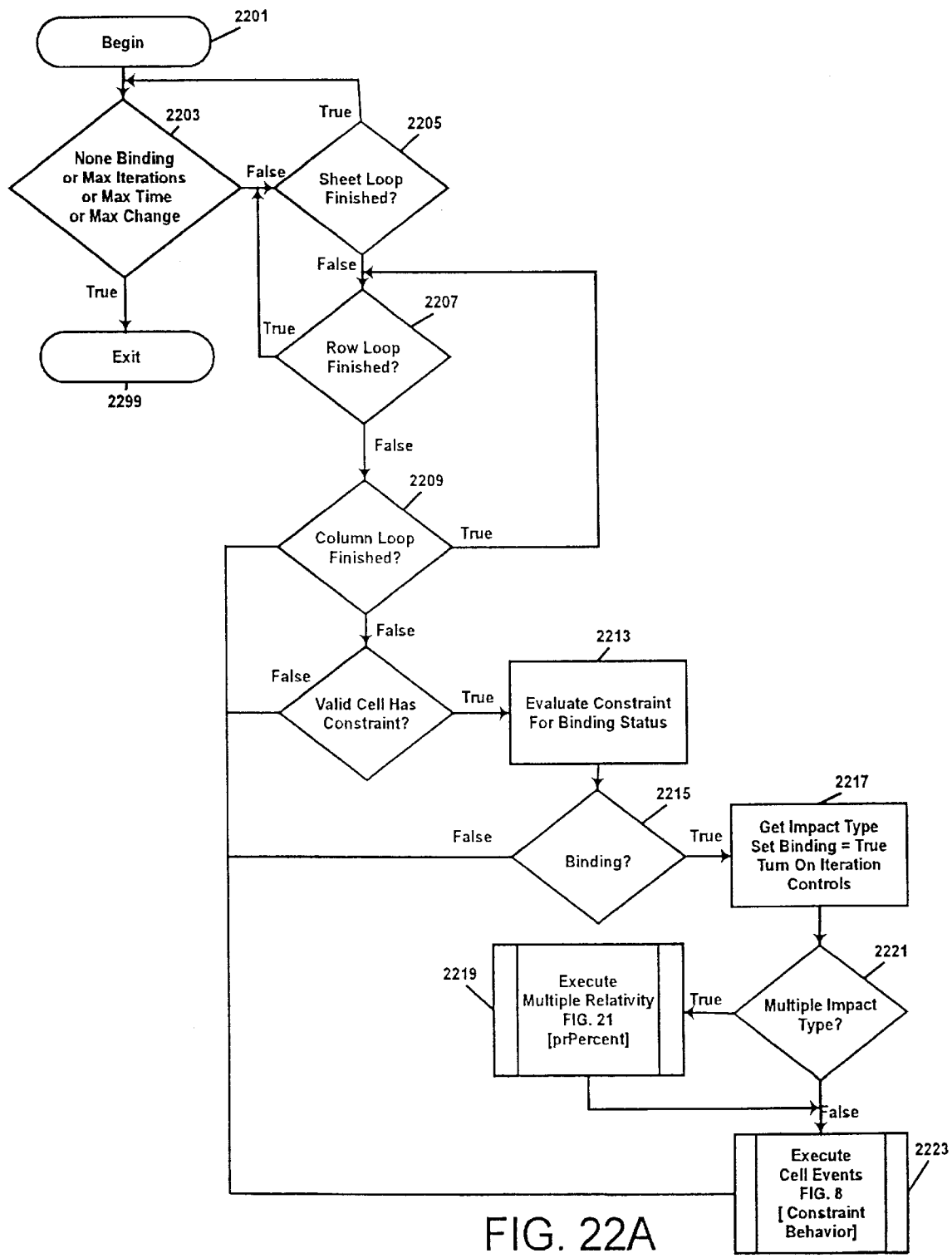
FIGS. 22A and 22B are a flowchart of a constraint process.
Figure 22B:
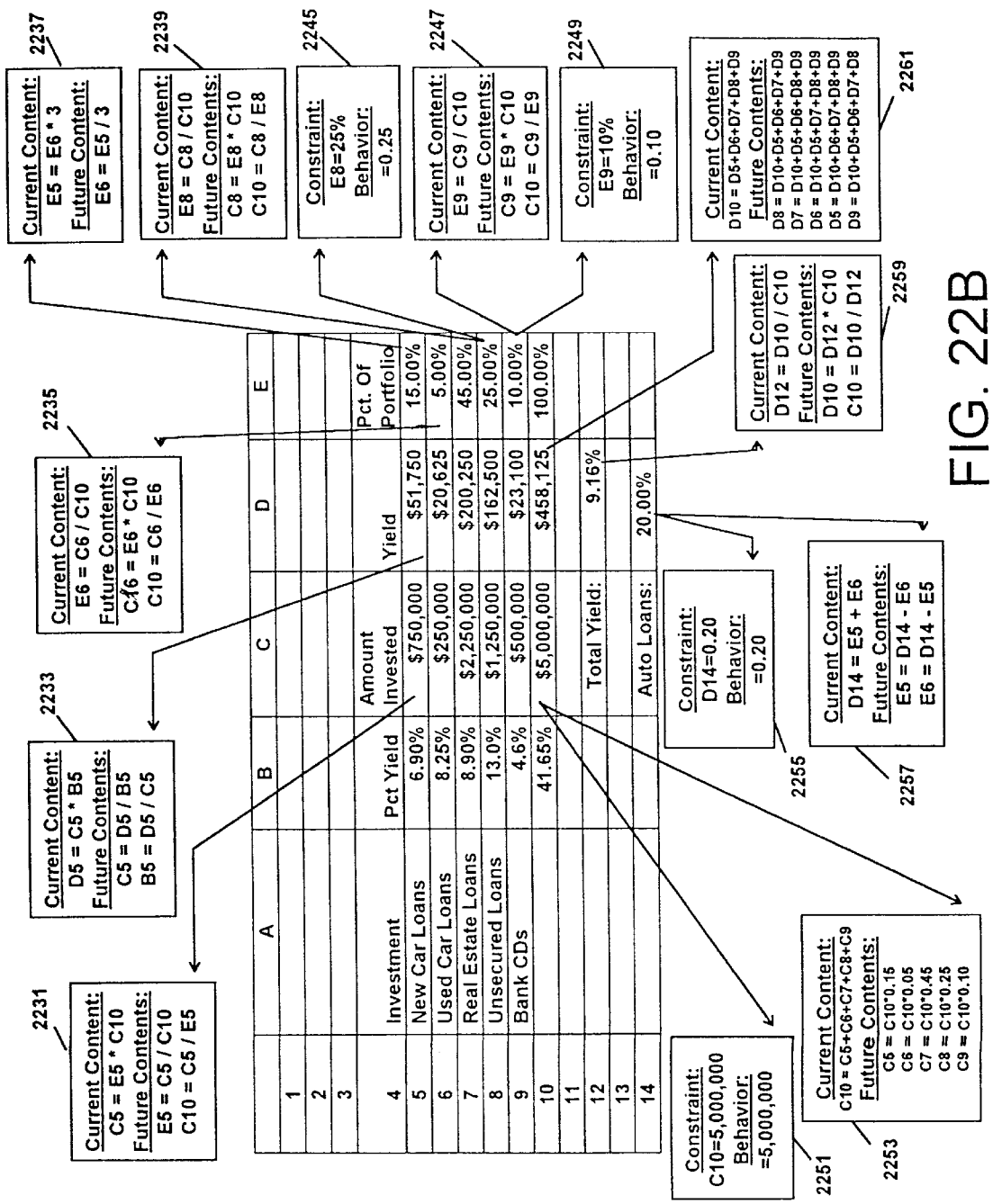

FIGS. 22A and 22B are a flow diagram and a block diagram of a constraint operation and an application of the constraint operation to an example model. The operation enters via terminal block 2201, and a local boolean variable called 'binding_boolean' is set to a value of true. A test is performed in decision block 2203 to determine if the binding_boolean variable is false, if the maximum iterations have been reached, if the maximum time has been reached or if the maximum change has been reached. If there are no binding constraints or any of these iteration control limits have been reached, then the operation exits via terminal block 2299. Otherwise processing continues via a series of loops.

Decision block 2205 starts a sheet loop. For each sheet in the model the constraint operation will continue until the last sheet has been processed and control returns to decision block 2203.

If the current sheet index needs to be processed, decision block 2207 starts a row loop. For each row on the current sheet index the constraint operation will continue until the last row on the sheet has been processed and control returns to decision block 2205.

If the current row needs to be processed, decision block 2209 starts a column loop. For each column in the row, the constraint operation will continue until the last column on the row has been processed and control returns to the row loop decision block 2207.

When the sheet, row, and column need to be processed a decision block 2211 tests the current cell address for a valid pointer and a valid constraint control. If no constraint control contents are found then control returns to the column loop control of decision block 2209.

If a valid pointer and a valid constraint are identified in decision block 2211 then a process block 2213 evaluates the constraint to determine if the constraint is binding and when it is binding, it derives a constraint behavior from the constraint rule and places it in the first future position of the constraint control for the current cell.

Next, a decision block 2215 tests the results of process block 2213. If the constraint is not binding control returns to the column loop of decision block 2209.

If the constraint is binding then the process block 2217 sets the local binding_boolean variable to true and retrieves the current impact type from the cell's permutation control. The iteration controls are also activated so that any circular references in formulas will be iterated when model recalculations occur. In a next decision block 2221, the impact type is evaluated. If the type is one of the multiple impact types, with the exception of the user defined type, [prUserDefined], then an execution block 2219 executes the multiple relativity operation of FIG. 21. The multiple relativity operation of FIG. 21 is passed a parameter constant value index for the percent of previous operation, i.e., [prpercent], which causes the current cell to be converted into a percent multiple impact type. In this case, since constraint processing seeks to allocate an amount among cells, the percentage allocation is dynamically recalculated just before executing the cell event of execution block 2223. As the constraint process iterates via decision block 2203, the most recent allocation percentages are recalculated prior to passing the constraint behavior to the binding constraint cell in process block 2223. This allows the operation of FIG. 22A to converge on a final allocation percentage.

The operation of the cell events of FIG. 8 in execution block 2223 is passed the constraint behavior that was derived from the constraint rule in process block 2213. In this way, the content of the current binding constraint cell is passed a new value within the limits of the constraint rule. Thus, the callable interface of the invention is used to insure that the operation to update the cell is performed in accordance with the polymorphic standards within the invention, i.e., the entry of the constraint behavior into the cell may cause model permutations if it triggers an impact event. When the cell event completes its operations, control returns to the column loop of decision block 2209.

When every sheet, row and column of the model has been processed for binding constraints via decision blocks 2205, 2207 and 2209, control then passes to the decision block 2203. The constraint operation will be repeated in decision block 2203 until one of the limiting iteration controls or the binding_boolean variable indicates completion of the iterative processing or no binding constraints. The operation then exits via terminal block 2299.

The model that results from constraint processing is a permutated model and this model will always be a valid model. Therefore, the calculated numerical results will always be valid for the final model. The numerical results of the final model may be optimal if the user properly constructed the model. The numerical results of the final model may be less than optimal if an optimal result cannot be achieved by the model as the user constructed it. The numerical result of the model may be constrained by circular references in the constraints that are in conflict if conflicting constraints are entered by the user. In any event, the final allocation method is visible and controllable by the user via direct display or edit of the permutation control and the constraint control contents.

The application of the constraint processing of FIG. 21A continues in FIG. 21B with an example of a correctly constructed model that is capable of producing an optimized result. It is also an example of a model that users can operate in both the non-constraint and the constraint mode of operation. The example that follows is the constraint mode of operation.

The example of FIG. 22B illustrates how to use the invention to perform an optimized goal seek. The objective is to maximize the return on an investment portfolio. The portfolio consist of several investments, each of which has different yields. In addition, there are some constraints that involve reducing risk and diversification goals. Without such constraints, a portfolio problem becomes very simple, i.e., put all the money in the investment with the highest yield.

The portfolio in the example is five million dollar 2247 and 2249. It is invested with the following constraints:

The amount invested in new car loans must be at least three times the amount invested in used-car loans. There are two kinds of constraints used in the model. The first are in-cell formula constraints and the second are in-cell constraint rules. The car loan constraints are entered as in-cell formula constraints as follows: cell E5 2237 contains a formula, E5=E6*3, and cell C5 2231 contains a formula, C5=E5*C10. Each cell also contains future contents, i.e., cell C5 also contains E5=C5/C10 and C10=C5/E5, while cell E5 also contains E6=E6/3. When model permutations occur these future contents are used to change the model form. These cell formulas represent an in-cell formula constraint because they create a circular reference. C5 2231 refers to cell E5 2237, cell E5 2237 refers to cell E6 2235. Cell E6 2235 refers to cell C6, and cell C10. Since 2231 includes both cell C10 and cell E5 in its current summation and in its future permutation contents, a circular reference results.

The car loans should make up at least fifteen percent of the portfolio. This constraint is added to cell D14 2257 as D15>=0.15 2255 in the current constraint position and is translated into the constraint behavior of =0.15 in the first future position. When the constraint is binding, the constraint behavior is entered into the cell by the constraint operation of FIG. 22A. This will generate a model permutation.

Because unsecured loans are the highest yield, a diversification constraint is applied. Unsecured loans should make up at least, but not more than twenty five percent of the portfolio. This constraint is entered into cell E8 2245, as E8=0.25. The constraint is translated into a constraint behavior of =0.25 and placed in the first future position of the constraint control. When the constraint is binding, this constraint behavior is entered into the cell by the constraint operation. This will generate a model permutation.

At least ten percent of the portfolio should be in bank CDs. It is also obvious that the bank CDs are the lowest yield investment with less than a five percent yield (4.6%). Therefore this constraint is entered into cell E9 2249 as E9=0.10. This constraint is translated into a constraint behavior of =0.10 and placed in the first future position of the constraint control. When the constraint is binding, this constraint behavior is entered into the cell by the constraint operation. This will generate a model permutation.

The cell C10 is a summation cell 2253 of the values in cells C5 through C9, i.e., C10=C5+C6+C7+C8+C9. At design time the permutation type is set to the [prweightpct] permutation control type. Thus, the percent yields in column B are used to weight an allocation of an entry into cell C10 of five million. This permutation type will yield a different set of numerical results during non-constrained operation, from those that will be generated during constraint enabled operation. Cell C5 also contains a constraint 2251 equal to this investment amount, i.e., C5=5000000. This constraint will generate the results shown in FIG. 22B when constraint processing is enabled. The constraint rule is translated into a constraint behavior of =5000000 during constraint processing and is placed in the first future position of the constraint control. When constraint processing is triggered this constraint is binding, and this constraint behavior is entered into the cell C5 by the constraint operation. This will generate a model permutation.

Cells D5 2233 through D9 contain a current content formula in permutation control of column B times the amount in column C. For example, C5=D5*B5, and so on for each cell in column D. Cell D10, 2261, is a summation cell with a current content formula of D10=D5+D6+D7+D8+D9. Cell D10 is set as a single impact cell, i.e., [prsingle], targeting cell D8. Since unsecured loans represent the highest yield of thirteen percent, the obvious choice is to allocate a targeted yield to the highest return. This represents a default behavior when no constraints are applied. There is no constraint on this cell.

Cell E10, is a summation of the percent column E. Cell E5 has already been set equal to cell E6 times 3. Cells E6, 2235, through E9 are set equal to the yield of column D divided by the total investment of cell C10, 2253. These equations, i.e., E6=D6/C10, and so on, reside in the current position of the permutation control for each cell. Each of these cells is also a single impact cell, i.e., [prsingle]. Thus, a value entered into cell E6, 2235, can be targeted to permute cell D6 or cell C10. The current selection is D6, which is the first future position in the constraint control. The two alternate future permutation content are: D6=E6*C10 and C10=D6/E6. A corresponding pair of alternate future permutation content for the single impact type is contained in cells D7 through D9.

As mentioned above, cell C8 2245 and cell C9 2249 also contain constraint information. Cell C8 shall be less than twenty five percent and cell C9 shall be ten percent.

Cell D12 2261 is a total yield and contains a current position formula of D10/D10. It is also a single impact permutation control, i.e., [prsingle], with a pair of alternate future position equations: D10=C10*D12 and C10=D10/D12. There is no constraint on this cell.

Cell D14 2257 is the total percent in auto loans and contains a current position formula of E5+E6. It is also a single impact permutation control, i.e., [prsingle]. It contains two future positions: E5:=D15−E6 and E6=D15−E5. The active permutation selection is E5. This cell also contains a constraint and constraint behavior. The constraint 2255 is set to D15=0.20 and the constraint behavior is translated as =0.20. The amount of auto loans is both minimum constrained and maximum constrained by the value of 0.20, since both types of car loans represent lower yields, and since the allocation between the two car loan types is set in cell E5 as three times E6.

In a first operation without the constraints enabled, when the portfolio amount is entered into an unconstrained model in cell C10, the amount is allocated based upon the percent yields in column B and the calculated results are shown in the table below. These results will differ from the constraint enabled results of FIG. 22B because the constraints are not operational and the allocation method is the weighted percent type:

| Investment | Pct Yield | Amount | Yield | Percent |
|---|---|---|---|---|
| New Car Loans | 6.9% | $2,079,832 | $143,508 | 41.60% |
| Used Car Loans | 8.25% | $693,277 | $57,195 | 13.87% |
| Real Estate | 8.9% | $747,899 | $66,563 | 14.95% |
| Unsecured | 13.0% | $1,092,437 | $142,017 | 21.85% |
| Bank CDs | 4.6% | $386,555 | $17,782 | 7.73% |
| Total | 46.7 | $5,000,000 | $427,065 | 100.00% |
| | | Total Yield | 8.54% | |
| | | Auto Loans | 55.46% | |

Next, there are several ways to generate constrained results. The first is to toggle the value of the boolean constraint control to a true value. Then an entry into any cell will cause the constraints to be applied to the model via FIG. 8, cell events FIG. 22A, 2233. Or, simply select the execute constraint command or speed button control to activate the evaluation of the constraints via FIG. 22A.

The constraint evaluation of FIG. 22A first identifies constraint cells, then tests to determine if the constraint is binding. If it is binding then the constraint behavior is derived and used to update the cell using the callable interface of the invention to trigger the appropriate model permutation, followed by a recalculation. The iteration controls are automatically turned on so that any circular references in formulas will be iterated.

This process is repeated for each constraint cell that is binding. The entire process is repeated in its entirety in an iterative fashion until there are no binding constraints 2303, the maximum number of iterations has been reached or the minimum change amount is achieved. The constrained results are shown in FIG. 22A.

With constraint processing toggled to the on or true setting, a value of 100% entered into cell D12, total yield, will be constrained to the value of nine and sixteen one hundredths (9.16%), as shown. A value of five million placed in cell C10 will also generate the same result.

The constraint operation has also performed a unique task. It has updated cell C10's permutation control type identifier and contents. The type has been set to the percent allocation type and the future positions are filled with the final allocation percentages that the constrained model generated. By opening a display dialog the user is able to view the contents of the permutation control as shown in the table below. These system generated entries are editable by the user.

| |
|---|
| C10=C5+C6+C7+C8+C9 |
| C5=C10*0.15 |
| C6=C10*0.05 |
| C7=C10*0.45 |
| C8=C10*0.25 |
| C9=C10*0.10 |

In a next analytical process, the user can turn off the constraint processing, enter a new total portfolio amount of cell C10, and it will be allocated according to the optimal percentages found in cell C10's permutation control. This is an added benefit of having the result in an alternate model form, rather than just calculated results in cells.

In the foregoing, the user entered information into the cells. This information included both permutation control and constraint control contents. The permutation control contents included the current cell contents, system generated future cell contents, and a selection of a permutation control type for certain cells. The constraint control contents included a current constraint and a derived or user editable constraint behavior.

The model was executed in both an unconstrained and a constrained mode of operation. In both modes of operation, entries into the cells can result in model permutation resulting from the occurrence of impact events. Entering five million into cell C10 is an example of an impact event that can cause model permutation. An entry of 100% into cell C12 is an example of an entry in constrained mode that is an impact event that caused model permutation that was followed by constraint processing. The constraint process iterates creating numerous model permutations and recalculations and uses the iteration controls to recalculate circular references. When the constraints are no longer binding or a limitation as set by the user is reached, processing stops. Additionally, a color or other indicia can be displayed on the display screen to identify cells where the constraint was binding and was applied.

In every case, the user's primary interaction is directly with the cells on the display screen. Both the permutation behavior and the constraint behaviors are cell behaviors.

Thus, it is possible to achieve a constraint processing that provides goal seeking in a form that is polymorphic. The polymorphic operations of the invention increase the speed and ease with which goal seeking types of analysis can be achieved. The emphasis in a polymorphic goal seek is to permute the model, rather than on achieving a specific numerical outcome. This outcome may be optimal if the model is properly structured. The model outcome is visible to the user as the content of the permutation control and constraint control of the invention. The numerical results have greater meaning when the model that generated them is visible, and less meaning when they are calculated by an unseen computation algorithm beyond the user's control.

The numerical results of the polymorphic model result from the generation of a new model form. That model form makes the allocation method used to achieve the result both visible and editable, and therefore the results are more understandable and flexible. Additional computational alternatives exist for any model content the user may choose to provide, without the limitations of fixed logic.

The user may choose to keep the constrained model or reset the model to the original or previous form, or turn constraint processing on or off, or edit the constrained model to achieve additional new model forms.

Polymorphic goal seeking is used to determine an allocation method among many cells to achieve an analytical result, with or without certain constraints. The goal in the polymorphic paradigm is to generate the appropriate model permutations to arrive at a constrained model, without being limited to just that model.

Figure 23:
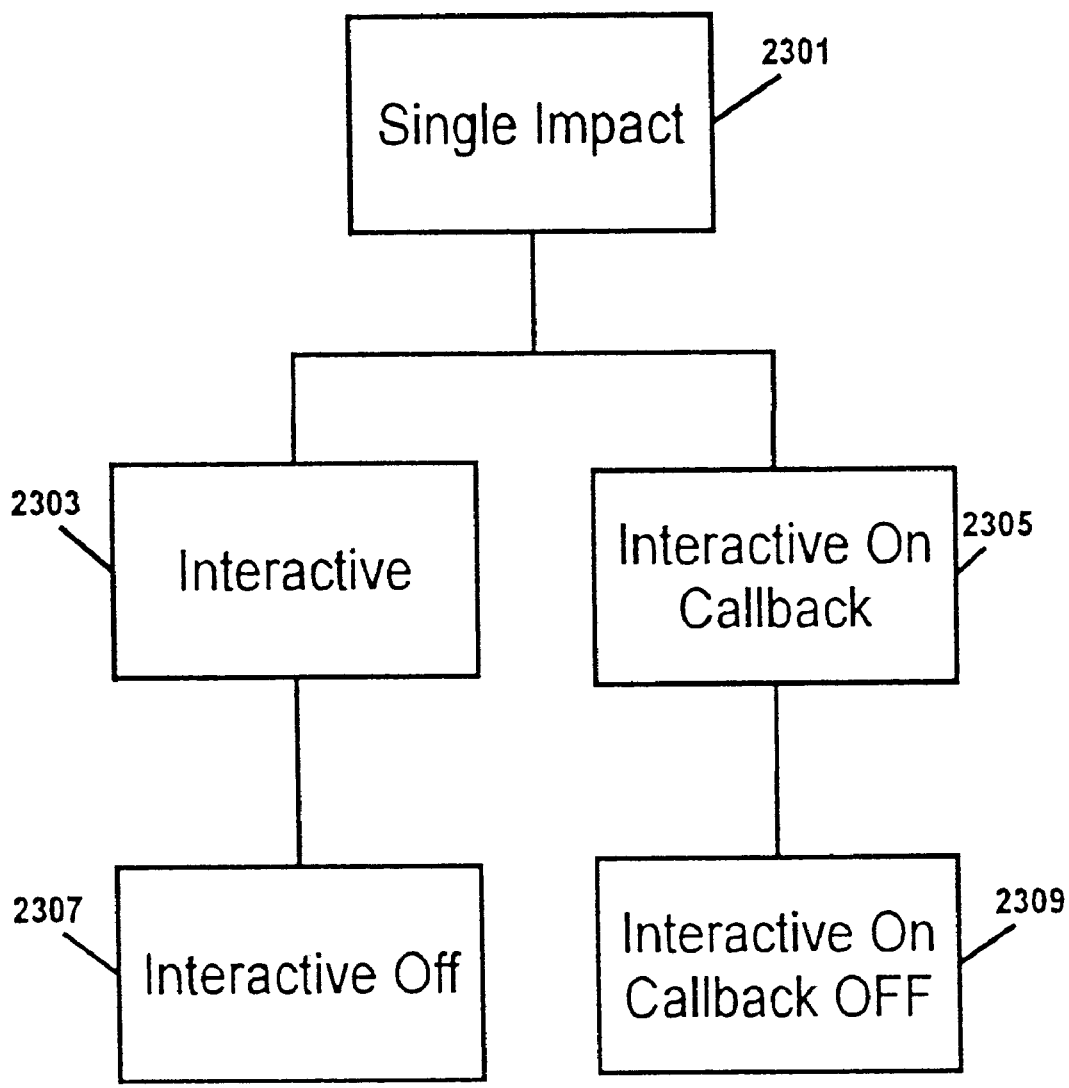
FIG. 23 is a block diagram of interactive single impact permutation behaviors.

Interactive impact cells have a special significance in the invention. FIG. 23 is a block diagram of this special type of single impact cell 2301. Interactive impact cells are single impact cells that can interact with the user at runtime. The user can create an interactive impact cell at any time by using a menu command, speed button or other control device to select the interactive impact cell type. The cell type selection is stored in the cell's data structure. The interactive impact cell may be one of four types, i.e., interactive 2303, interactive on callback 2305, interactive off 2307, or interactive on callback off 2309.

During model permutation, when an interactive impact cell type is encountered an interactive display allows the user to select an impact cell. The impact cell becomes the selected one a plurality of cells that are displayed on the display device. The selected impact cell is then used as the basis for subsequent model permutations. The impact cell may also inherit the interactive type, so that the receiver cell has its type changed during the model permutation process. Thus, the cell affected can, optionally, also become an interactive impact cell.

When selecting an interactive impact cell type, the user is given a choice between two types: interactive 2303 and interactive on callback 2305. This selection is made using an interactive display on the display device and the selection is stored on the cell data structure. These selections provide two alternate interactive behaviors.

On one hand, the interactive type will only activate the interactive display for the current cell. The interaction is not inherited. Callback operations will not result in a runtime prompt.

On the other hand, The interactive on callback type will prompt for the current cell at the current time and for the impact cell at a subsequent time. It is an inherited type.

Thus, the interactive on callback type provides an ongoing opportunity for the user to select among a plurality of impact cells and thus many alternative pathways through the model, without being limited to returning along the same path from whence it came. Direct user control over these model permutation behaviors for interactive impact cells is further enhanced as follows.

In a large model, the number of interactive cell types may result in many interactive controls and many displays that require the user to make a selection. The number of responses that need to be made may be more than the user wishes to deal with.

In this case, a group of cells may be selected and reclassified as interactive off cells 2307, interactive cells where the interactive control display has been suspended, or interactive on callback off 2309, i.e., interactive callback cells where the interactive control display has been suspended.

These two additional types of interactive selections allow the user to suspend the interactive selection control from operating on a single cell or a selected group of cells, without losing the ability to reinstate their interactive status when desired.

To reinstate their interactive status the user would select a range or group of cells. One or more of these cells may have been temporarily suspended as interactive cells (interactive off or interactive callback off) and toggle their interactive status back to a value corresponding of interactive or interactive on callback respectively.

The combination of component level control and cell level control over interactive selection displays provides a smooth and efficient operation of the model permutation process that is under the complete interactive control of the user.

Selections may be made to allow or disallow the interactive control display at the cell level for individual cells, at a group level for groups of cells, or for the entire scope of the model at the component level.

At the component level the interactive control display can be toggled on or off, while at the cell level, the impact type may be set to one of several values in order to control the operation of the interactive selection display. Again, the four valid types are, interactive 2303, interactive on callback 2305, interactive off 2307 and interactive on callback off 2309.

Figure 24A:
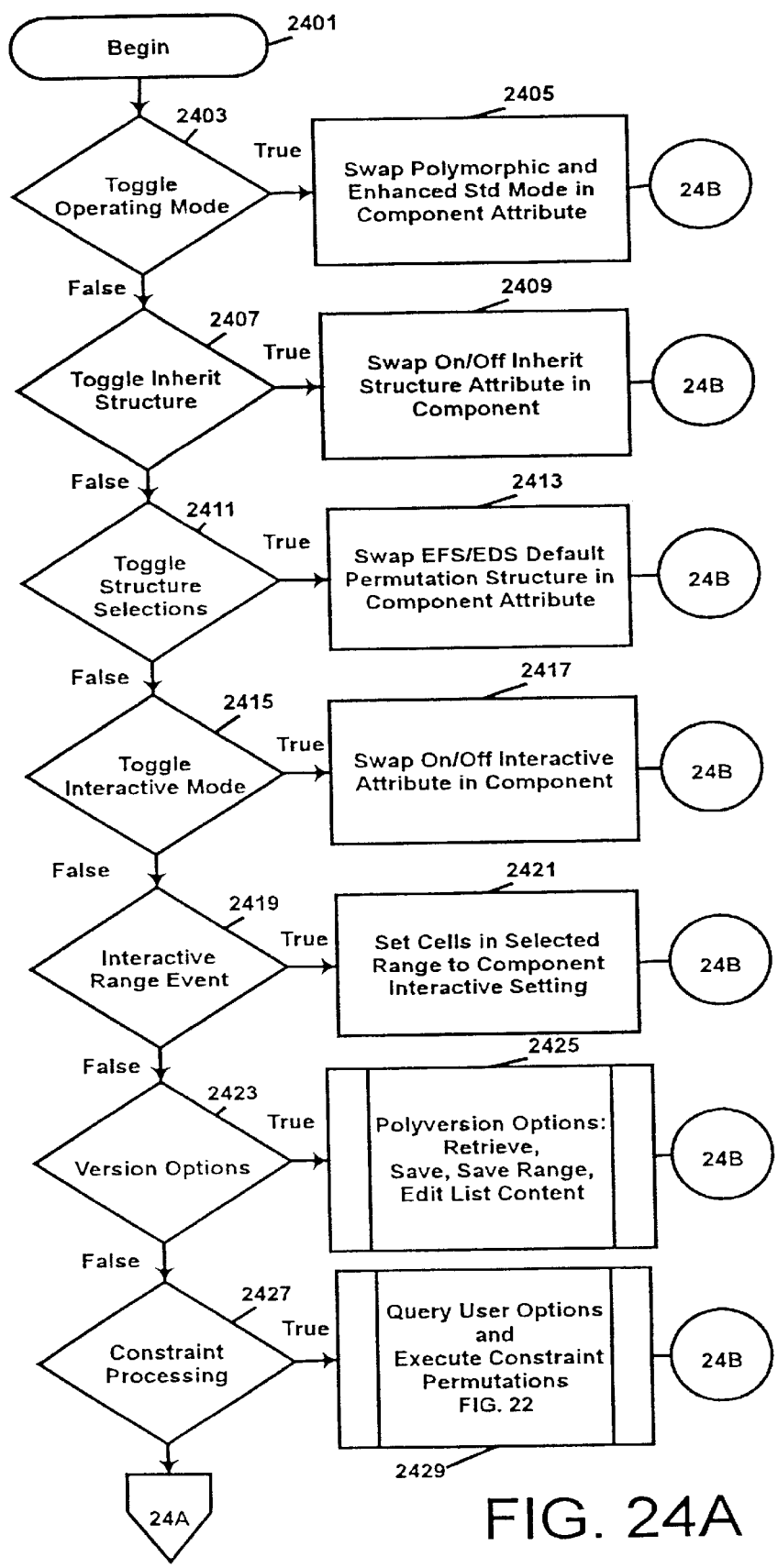
FIGS. 24A and 24B are a flowchart of a model event process.
Figure 24B:
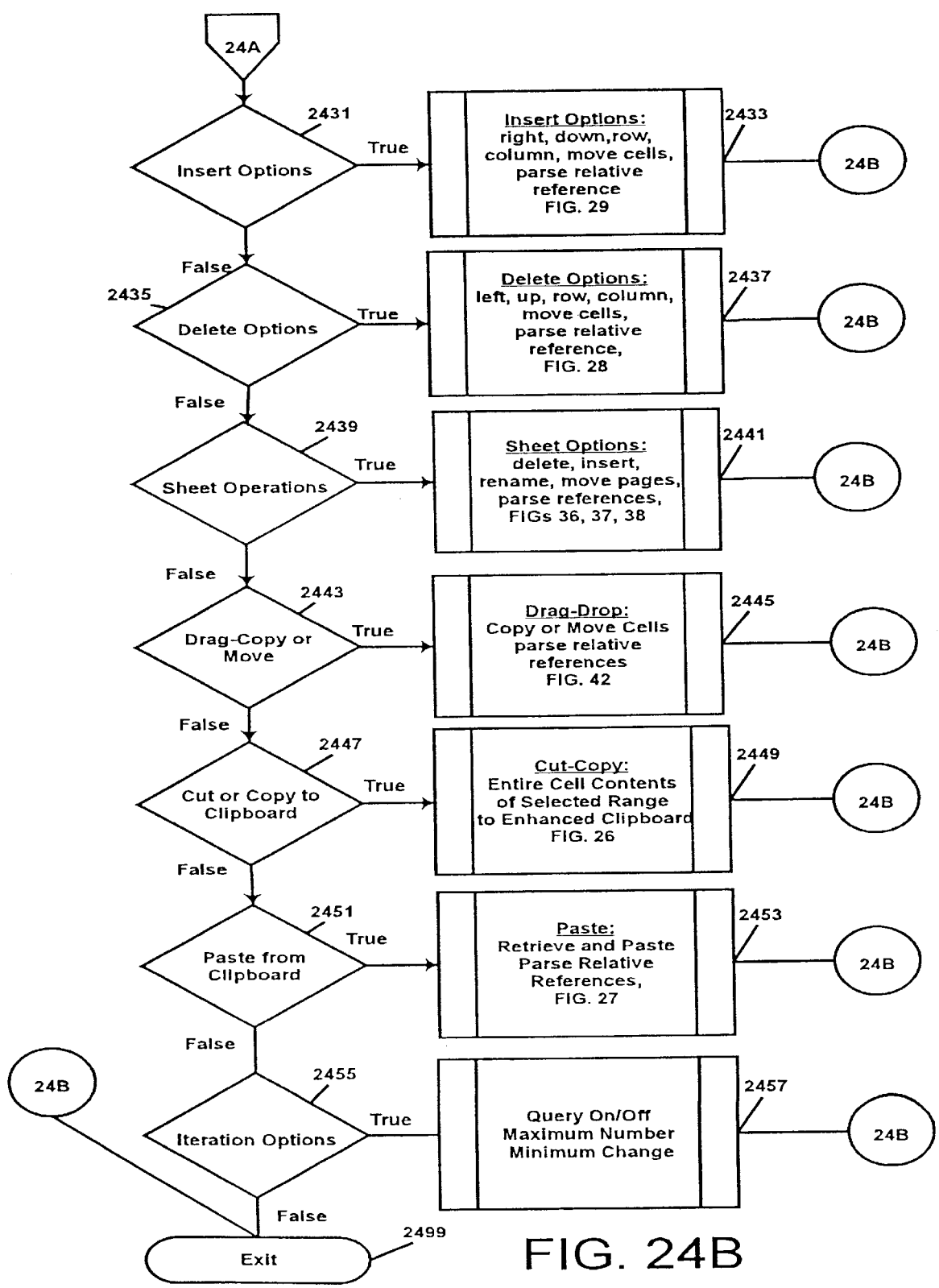

FIGS. 24A and 24B are flow diagrams of model control events. It enters via terminal block 2401. Decision block 2403 retrieves the current value in the component operating mode attribute, in a process block 2405 replaces the value with its reciprocal value, and stores the information back into the component data structure. The operating mode can be applied to the entire model, the current sheet or sheet selections, or just the current cell or a selected range of cells. The event loop exits via terminal block 24B, 2499.

Decision block 2407 retrieves the component inherit structure attributes. In a process block 2409 the current value is toggled to the opposite value. The result is stored in the component data structure. The structure inheritance attribute determines if the receiver cell in a permutation event will inherit the storage structure of the sender cell for the permutation control. The event loop exits via terminal block 24B, 2499.

Decision block 2411 retrieves the current value of the structure attribute from the component. In a process block 2413 it swaps the current value for its opposite and stores the value back into the component. The structure value provides a default value used to decide the structure of the permutation control for newly created cells. The event loop exits via terminal block 24B, 2499.

Decision block 2415 retrieves the current value for the iteration attribute. In process block 2417 it toggles the value to its opposite and stores the information back into the component data structure. The interactive mode attribute controls the display or suppression of the interactive runtime impact targeting display. The event loop exits via terminal block 24B, 2499.

Decision Block 2419 retrieves the current range selection and the current interactive attribute from the component. It then stores that value into the cell data structure for the cells in the range in process block 2421. This operation provides a single selection interface for a plurality of cells, so that a single operation does many tasks for the user. The event loop exits via terminal block 24B, 2499.

Decision block 2423 responds to the version control options of the invention. In a process block 2425, the selection parameter or index of the version option selected by the user is passed to the version control. The version options include saving the current version, retrieving a version, saving a selected range of cells into a version file, or editing and maintaining the list of version files. The event loop exits via terminal block 24B, 2499, when the user completes the appointed tasks.

In Decision block 2427, the constraint processing operation is triggered by the user. In a process block 2429 a query is used to confirm constraint processing parameters, such as, maximize, minimize, value, and number of permutations. The constraint processing then permutes and recalculates the model iteratively. It then displays the results on the display screen, and exits via terminal block 24B, 2499.

Event decision block 2431 responds to the user selection of the insert operation. In a process block 2433 the parameter passed, or index, identifies the option such as right, down, row, or column for the operation. The contents of the model cells are moved. It updates the relative cell references in the entire content of the cell data structure. If the current position results differ from future position results, it submits the current content to the new formula operation to resolve the conflict. Finally, the blank cells are redisplayed relative to the insertion point. The process then exits via terminal block 2499.

The delete event triggers decision block 2431. In a process block 2437 the parameter passed or index identifies the option of left, up, row or column for the operation. The contents of the deleted cells is discarded. The position of remaining cells are moved. It updates the relative cell references in the entire content of the cell data structure, and, in the event that current position results differ from future position results, it submits the current content to the new formula operation to resolve the conflict. In the event the conflict cannot be resolved the impact type for impact cells is set to the prompt type for interaction with the user. Finally, the blank cells are redisplayed in their relative position to the insertion point. The process then exits via terminal block 2499.

Decision block 2439 responds to the selection of a sheet operation by the user. It points to an execution block 2441 where the parameter for the nature of the operation identifies the actions to be executed. Delete, rename, and insert operations result in moved cell contents, a parse operation to maintain relative cell addresses, and conflict resolution for conflict between current and future cell content via the new formula operation of FIG. 11. When the sheet operation is complete processing exits via terminal block 2499.

The mouse down and mouse up events interactively retrieve the current range of cell selections. In the event of a drag-copy or drag-move operation the mouse up event triggers an event identified in decision block 2443. The drag-copy and drag-move events execute in execution block 2445. In the move event, the previous cells are cleared, the new contents pasted into the selected range, and the cell content is revised to maintain relative cell references. Certain cells will require that their content be resubmitted to the new formula operation of FIG. 11 in order to resolve content conflicts and to finalize permutation control information. Some cells may require interaction with the user to finalize the permutation control information. When the operation is complete, processing exits via terminal block 2499.

Decision block 2447 identifies clipboard cut or copy events. The selected range is transferred to the clipboard. Each cell's permutation control, original state control and constraint control is formatted into a form that can be stored and retrieved from the clipboard. The location from which the information was derived is stored along with the cell information so that the paste operation can operate more easily. Again, when processing is complete the operation exits via terminal block 2499.

The paste operation is detected in decision block 2451. In a fashion like the other operations that move cell content, the paste operation is executed in execution block 2453. The clipboard content is parsed into the component information necessary to populate the cell data structure. Relative cell references are updated, and any conflicts remaining are submitted to the new formula operation of FIG. 11. The processing terminates via terminal block 2499.

The iteration controls are accessed via a user selection detected in decision block 2455. The execution block 2457 allows the user to select the on/off indicator, the maximum number of iterations and the minimum change parameter. When selections are completed processing exits via terminal block 2499.

Figure 25A:
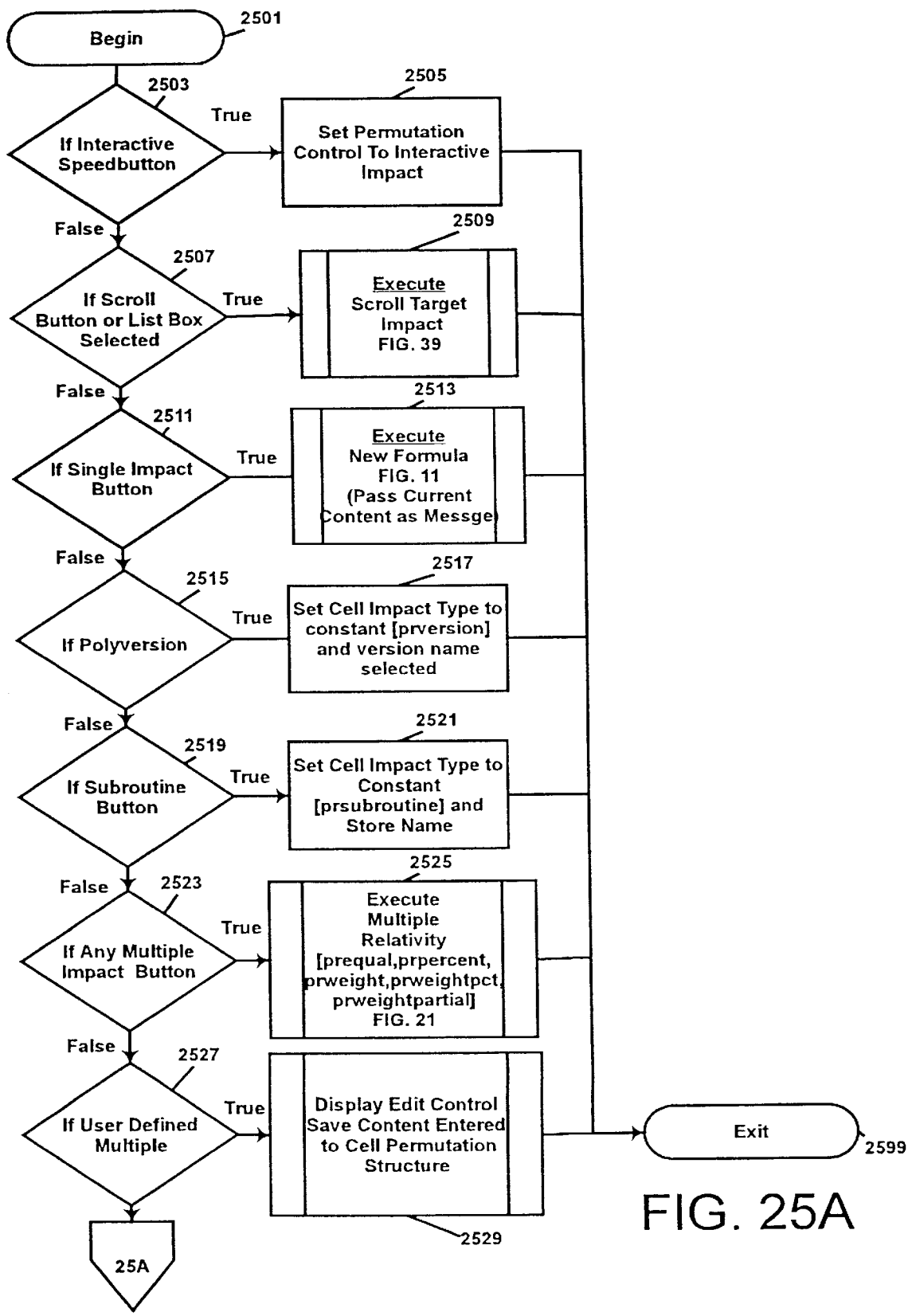
FIGS. 25A and 25B are a flowchart of a permutation control process.
Figure 25B:
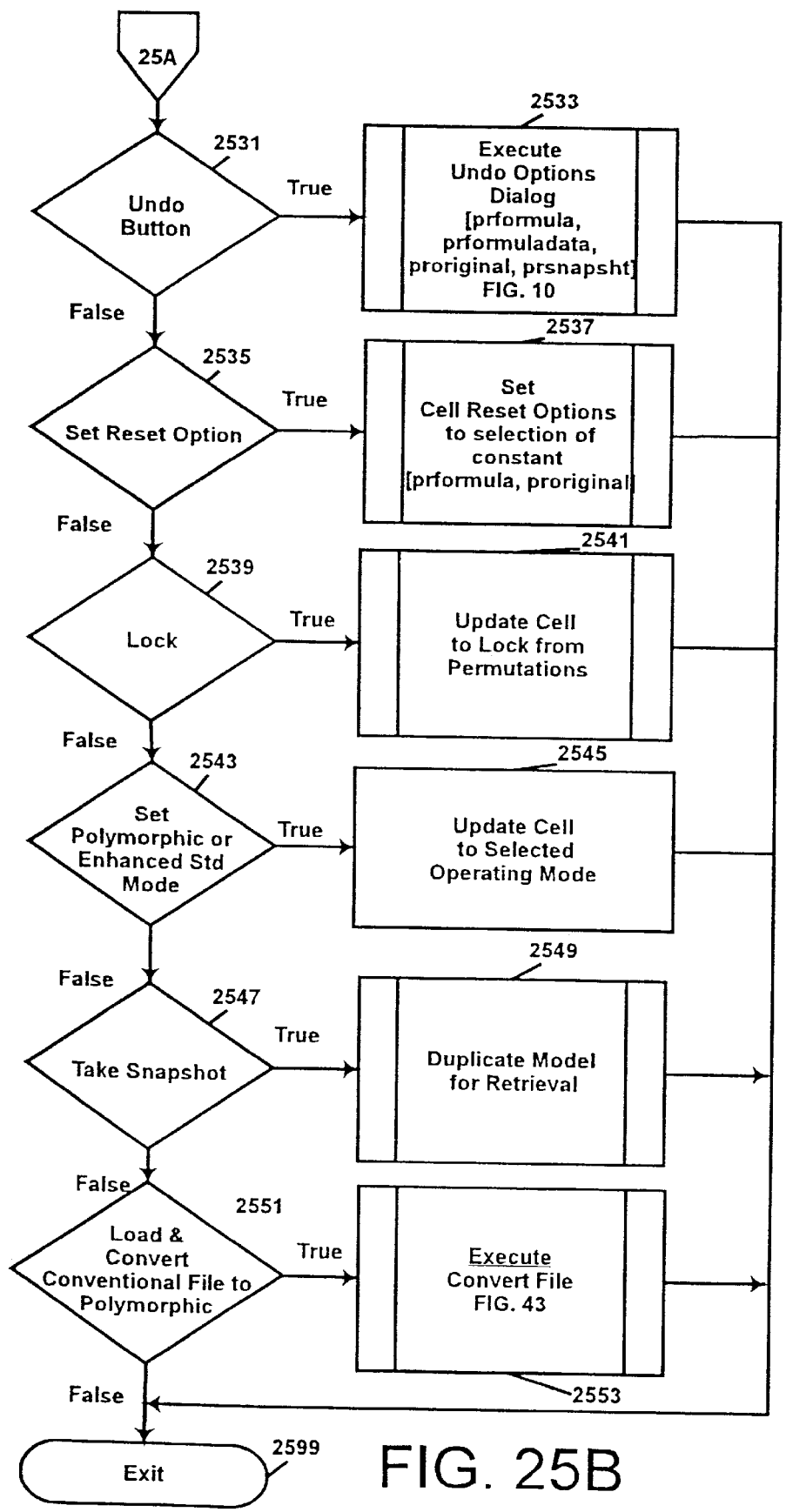

FIGS. 25A and 25B are permutation event processing diagrams. It enters via terminal block 2501. Decision block 2503 tests the sender event to identify the interactive speed button or menu command. If detected a process block 2505 sets the permutation control identifier for the current cell to the interactive impact type. The process then exits via terminal block 2599.

The process continues in decision block 2507 where the scroll or list box selected events are identified. These events are routed to process block 2509. The scroll or list box selection result in a reordering of the permutation control contents. For the list box, the index item selected is swapped into the first future position of the permutation control. For the scroll operation, the last future position is moved to the first position and the remaining entries are pushed down in the stack. The new selection appears on the display screen in the list box text display. The process then exits via terminal block 2599.

The single impact command or speed button event triggers decision block 2511 to activate process block 2513. It uses the new formula operation of FIG. 11 to evaluate the contents of the cell. Thus, converting the cell into a single impact type. When new formula completes, the process exits via terminal block 2599.

The polyversion event is tested in decision block 2515. When found, the process block 2517 provides an input means for entering a version name into the permutation control of the current cell. The permutation identifier is set to the polyversion type via a constant value of [prversion]. The process then exits via terminal The subroutine event is tested in decision block 2519. When found, the process block 2521 provides an input means for entering a subroutine name into the permutation control of the current cell. The permutation identifier is set to the subroutine type via a constant value of [prsubroutine]. The process then exits via terminal block 2599.

Decision block 2523 evaluates the list of valid multiple impact types. When one is identified, it is passed to the execution block 2525 for processing. The execution block 2525 executes the multiple relativity operation of FIGS. 21A–21E. The multiple relativity operation determines the content for the cell's permutation control. The permutation identifier is set to the value passed by the decision block 2523. Then the operation exits via terminal block 2599.

Decision block 2527 tests for the user defined multiple impact event. It routes to execution block 2529 where a control display provides an input means for the user to directly edit the content of the permutation control. When user interaction completes, the process In decision block 2531, a test identifies the undo event. It routes to execution block 2533 where a control display provides an input means for the user to select an undo method. When user interaction completes, the undo operation selected is instantly performed. The model is reset to a previous state based upon the user selection. The process then exits via terminal block 2599.

A next decision block 2535 identifies the reset option menu command or speed button. When it detects this event it routes to a execution block 2537. The index of the reset option menu identifies one or the other of the two reset options, i.e., the constant value of [prformula], [proriginal], or [rstnone]. This constant value is stored in the component attribute of the same name. This reset option takes precedence over the cell attribute of the same name. The process then exits via terminal block 2599.

Decision block 2539 tests for a sender event of lock. When found, it activates a process block 2541. The cell permutation identifier is set to a constant value of [prlock] in the cell data structure. Subsequent permutation events that attempt to modify this cell's contents will be rejected and the model automatically returned to the previous state. The process then exits via terminal block 2599.

When decision block 2543 identifies the operating mode event the process block 2545 updates the component operating mode attribute to a selection of polymorphic or enhanced standard. The value in this attribute can be toggled between the two options. The current value is replaced with the other value. The process then exits via terminal block 2599.

A decision block identifies the take snapshot event. When found, it activates the execution block which replicates the entire model in an alternate storage location in computer memory. This snapshot of the model is then available to the undo options 2531 to reset formulas, data, or both, back to the moment the snapshot was taken.

Decision block 2551 responds to a user request to lad a conventional spreadsheet file into memory and convert it into a polymorphic model. Decision block 2551 executes the convert file processor of FIG. 43. When the file is successfully loaded and converted control returns to the event processor and the exit is via terminal block.

Figure 26:
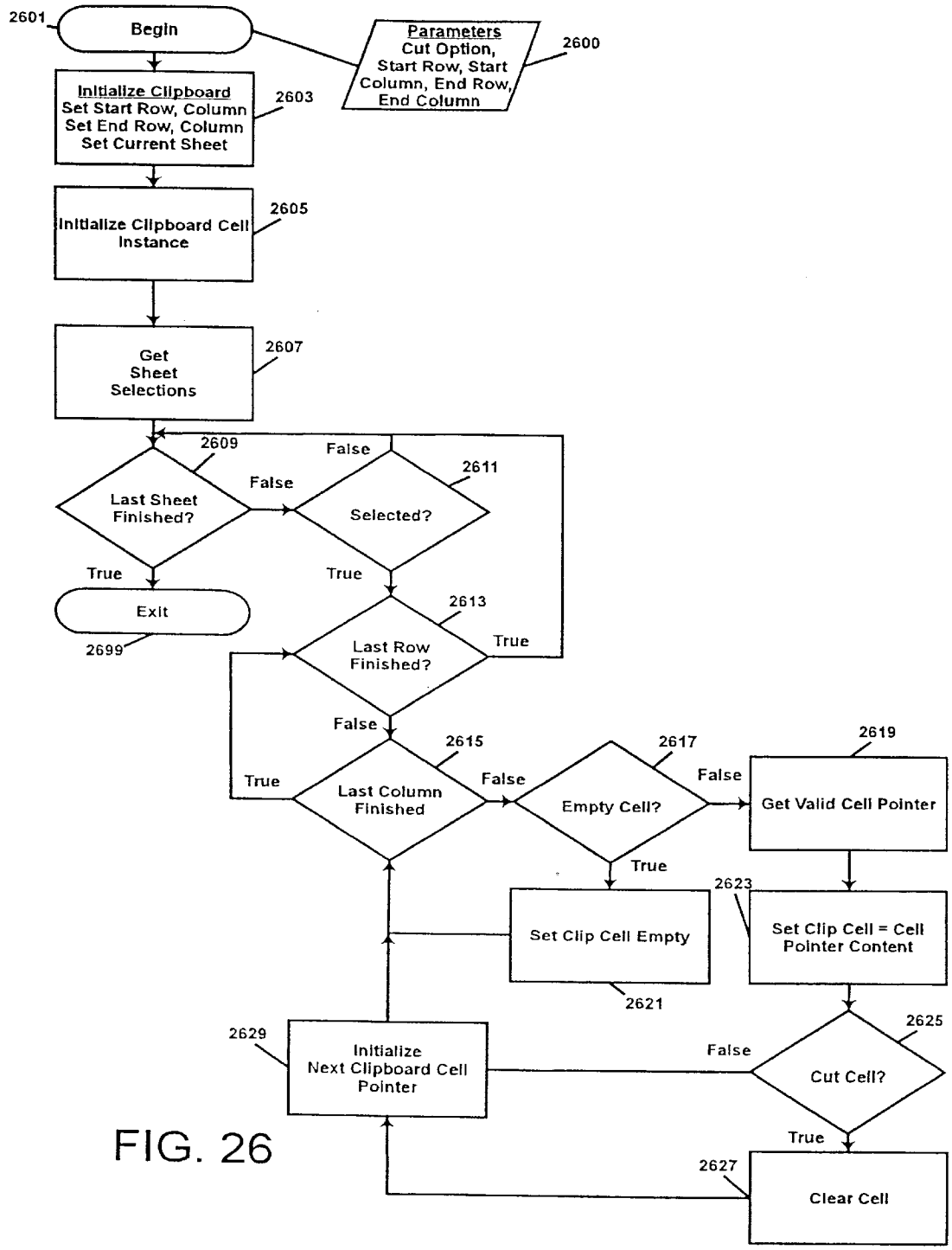
FIG. 26 is a flow diagram of a cut or copy to clipboard processor.

The flow diagram of FIG. 26 is a clipboard cut-copy operation. The operation uses the component parameters 2600 cut option which is a boolean true or false value, and integer values for the start row, start column, end row and end column to identify a set of cell contents to copy or cut to the clipboard. The operation enters via terminal block 2601. In process block 2603 and 2605, the clipboard is cleared and initialized and a first cell instance is instantiated. In process block 2607, the current sheet selections are retrieved.

In a series of steps, the selected range of cells is cut or copied to the clipboard. The entire contents of the cell is copied. This includes the permutation, constraint, and original state controls of the present invention.

In a processing loop, decision block 2609 tests for the completion of the last selected sheet. When complete processing terminates via terminal exit 2699. When incomplete a next test in decision block 2611 tests for a selected sheet. If not selected, the sheet index increments and control returns to decision block 2609. If the sheet index is a selected sheet in decision block 2611 a next test in decision block 2613 is a processing loop for the row range of the current selection. If the last row in the selection has been processed control returns to the sheet decision block 2609. If the row requires processing then a column decision block 2615 is a processing loop for each column in the selected range of cells. If the last selected column is complete the processing returns to the row decision block 2613. If the column requires processing then a next test in decision block 2617 tests for an empty cell. If the cell is empty, the contents are skipped in process block 2621 and control returns to the column decision block 2615. If the cell contents are not empty then a process block 2619 obtains a valid cell pointer to the cell's contents. Next, in process block 2623 the current clipboard cell is set equal to the contents of the cell. Finally, a test in decision block 2625 tests the cut option parameter 2600 to determine if the cell contents should be deleted. If true then process block 2627 clears and deletes the cell contents. Then processing returns to the column decision block 2615 via process block 2629 where a next clipboard cell is instantiated and the current clipboard cell's pointer to the next clipboard cell is updated with the new pointer.

When every cell in the selected range has been copied to the clipboard, and optionally cut or cleared, the operation exits via terminal block 2699. The enhanced clipboard of the present invention contains the permutation-enabled cell content of the invention.

Figure 27:
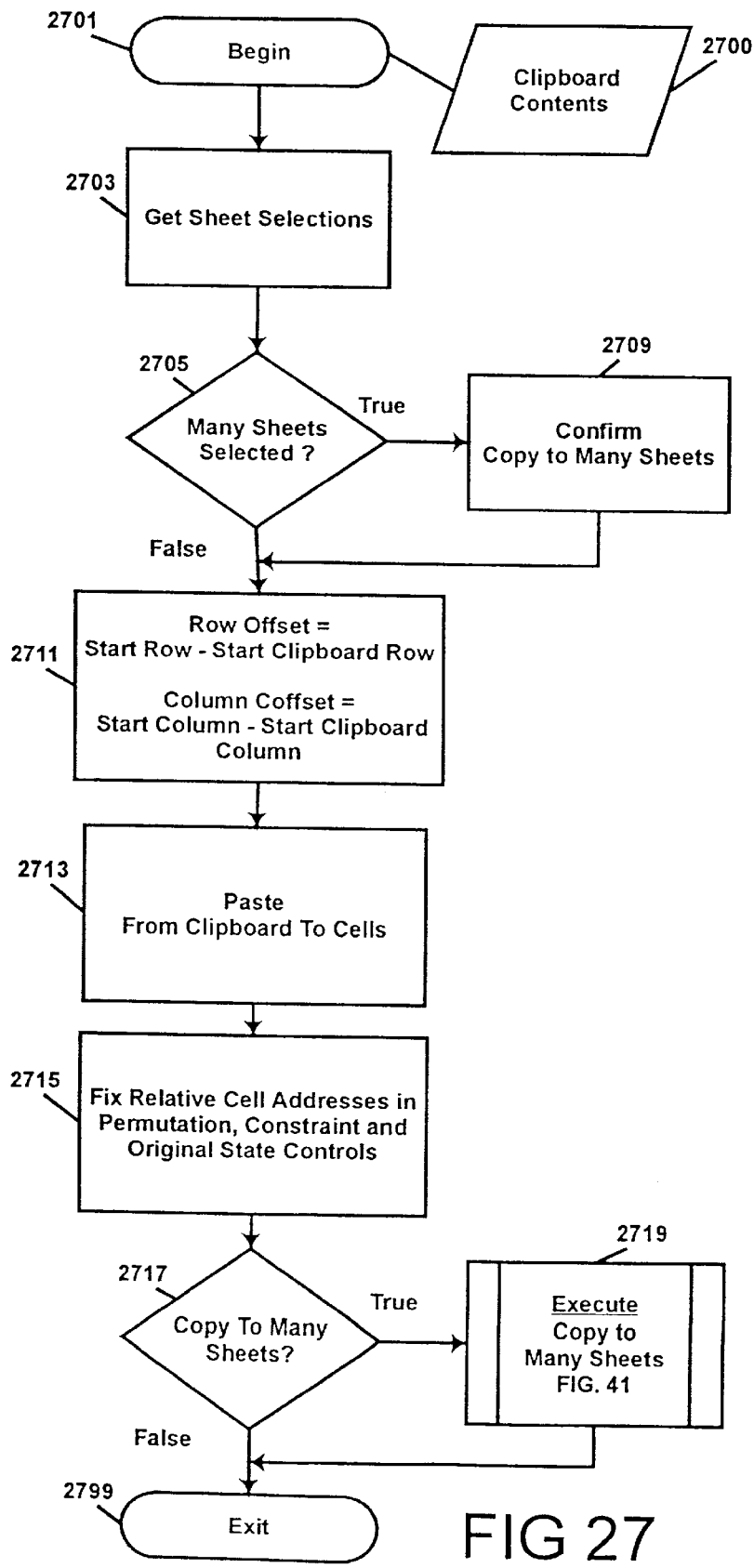
FIG. 27 is a flow diagram of a paste cells from clipboard processor.

The flow diagram of FIG. 27 is a paste operation. It uses the contents of the clipboard 2700 as an input parameter. The clipboard contains the original sheet identifier, and the original range selection, i.e., start row and column and end row and column, followed by a linked list of cell contents. The complete contents for each cell is contained on the clipboard, which includes the permutation, constraint, and original state controls of the present invention.

The operation enters via terminal block 2701. A first process block 2703 gets the current sheet selections. If many sheets are selected, a decision block 2705 routes processing to process block 2709 where the user is asked to confirm or dis-affirm the paste operation to all of the selected sheets.

Processing then continues in process block 2711 where a column and row offset are calculated. The row offset is equal to the start row of the current selection minus the start row of the selection found on the clipboard. The column offset is equal to the start column of the current selection minus the start column of the selection found on the clipboard. This offset is used in process block 2715 to maintain or reset the relative cell addresses in the pasted permutation, constraint, and original state controls.

In process block 2713, the contents of the clipboard are placed into the active worksheet beginning with the current selection start location. Then in process block 2715, the relative cell addresses are maintained or reset, using the row and column offsets calculated in process block 2711. The permutation, constraint, and original state control content is maintained for each cell that is pasted into the active worksheet. Thus, the pasted cells.

In a decision block 2717, the user's affirmation or dis-affirmation of the copy to all selected sheets of process block 2709 is tested. If true, then the process block 2719 copies each pasted cell to every selected sheet and processing exits via terminal block 2799.

The flow diagram of FIGS. 28A–28G are a delete operation. The user can select among four options, shift left, shift up, shift row, or shift column. The index associated with the option selected by the user is passed to the operation as a parameter 2800. The operation also uses the start row and column, (R1 and C1), and the end row and column, (R2 and C2), of the current range of cells selected. These values are maintained at the component level and are accessible by this operation as parameters 2800.

In a series of steps, in blocks 2807–2813, the delete operation will operate on every sheet that is currently selected 2807. It will first update the entire model to note the deleted cells in every formula where these cells may appear by placing a value of "#REF" in place of the cell address 2809. It will then delete the cells in the range selected 2811, and finally moves all remaining cells up or left to fill the vacated spaces 2813. In the process, every cell address, in every cell, in every cell control is maintained for the relative cell addresses caused by moving the cell. When every selected sheet has been processed the operation exits via terminal block 2899.

The details of the delete operation are shown in the diagrams of FIGS. 28A–28G. The operation begins via terminal block 2801. In a first process block 2803 the row and column offsets are calculated (Row Offset=R2−R1+1 and Column Offset=C2−C1+1). Next, in a process block 2805, a prefix variable is initialized to a value of the current sheet name with an exclamation point appended to it. The prefix is needed when the cell address being replaced occurs on the non-visible selected sheets.

The sheet loop of decision block 2807 will repeat the entire operation of FIGS. 28B–28D, 2809, 2811, and 2813, for each sheet that is currently selected by the user.

When the sheet is selected in decision block 2807, the deleted cell references are updated with "#REF". This procedure is shown in FIG. 28B. In process block 2815 the delete option index is evaluated and, based upon its value, a set of first row, last row, first column and last column (RF, RL, CF, CL) variables are set to determine the range of the cells that are being deleted.

In a series of steps, each cell that is being deleted is identified, and the entire model is scanned. Every occurrence of the deleted cell will be set to a value of "#REF". A row loop is established in decision block 2817 and a column loop is established in decision block 2819 to loop through the list of cells to be deleted. When the list of cells is completed the operation continues via off page connector 28C. When a given cell needs to be processed, a first process block 2821 sets a temporary string variable equal to the old cell address of the current row and column as set by the row loop 2817 and the column loop 2819. A new cell address is set equal to a value of "#REF".

Next, in a series of processing loops, every cell in the model is evaluated. In the sheet loop decision block 2823 the sheet number is incremented until every sheet in the model has been processed. When completed, control returns to the column loop of decision block 2819 so that the process can proceed to the next cell address that is deleted. If the sheet needs to be processed, a next test in decision block 2825 determines if the loop sheet index is not equal to the current sheet that is visible on the display screen. When the sheets do not match the process block 2827 sets the old cell address equal to the prefix set in process block 2805 plus the old cell address set in process block 2821. References to the old cell on non-visible sheets will contain the sheet prefix, which becomes a part of the string that will be replaced by the "#REF" content.

Processing continues with a row loop decision block 2829, a column loop decision block 2831, and a valid cell pointer decision block 2833. The pointer for the old cell, represented by a row and column designation, is tested in 2833. If it is valid then the execution block 2835 executes the exchange operation of FIG. 34. The exchange operation takes two parameters, the old cell and the new cell. It replaces the old cell content with the new cell content in the permutation, constraint, and original state controls found in the designated cell. The column loop 2831 and the row loop 2829 continue until every cell on a given sheet has been scanned for any occurrence of the deleted cell. Then control returns to the sheet loop 2823.

When every cell on every sheet for the current delete cell has been processed, control returns to the column loop of decision block 2819. When the column loop for deleted cells is complete control returns to the row loop of decision block 2817. When the row loop of decision block 2817 is completed, every deleted cell will have been replaced throughout the model with the "#REF" designation. This means that the reference to the old cell is no longer valid because the cell has been deleted.

Figure 28A:
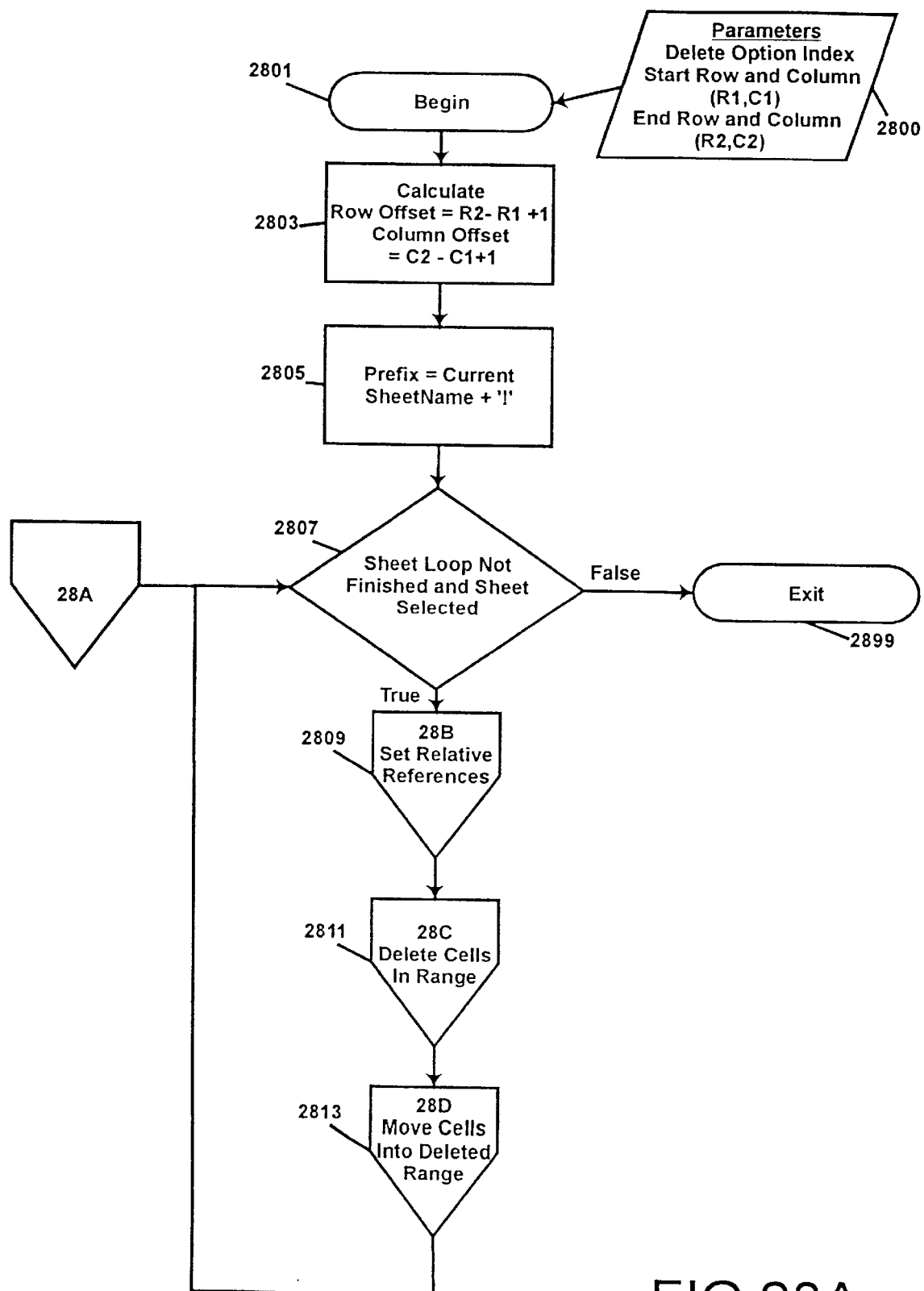
FIGS. 28A–28G is a flow diagram of a delete processor.
Figure 28B:
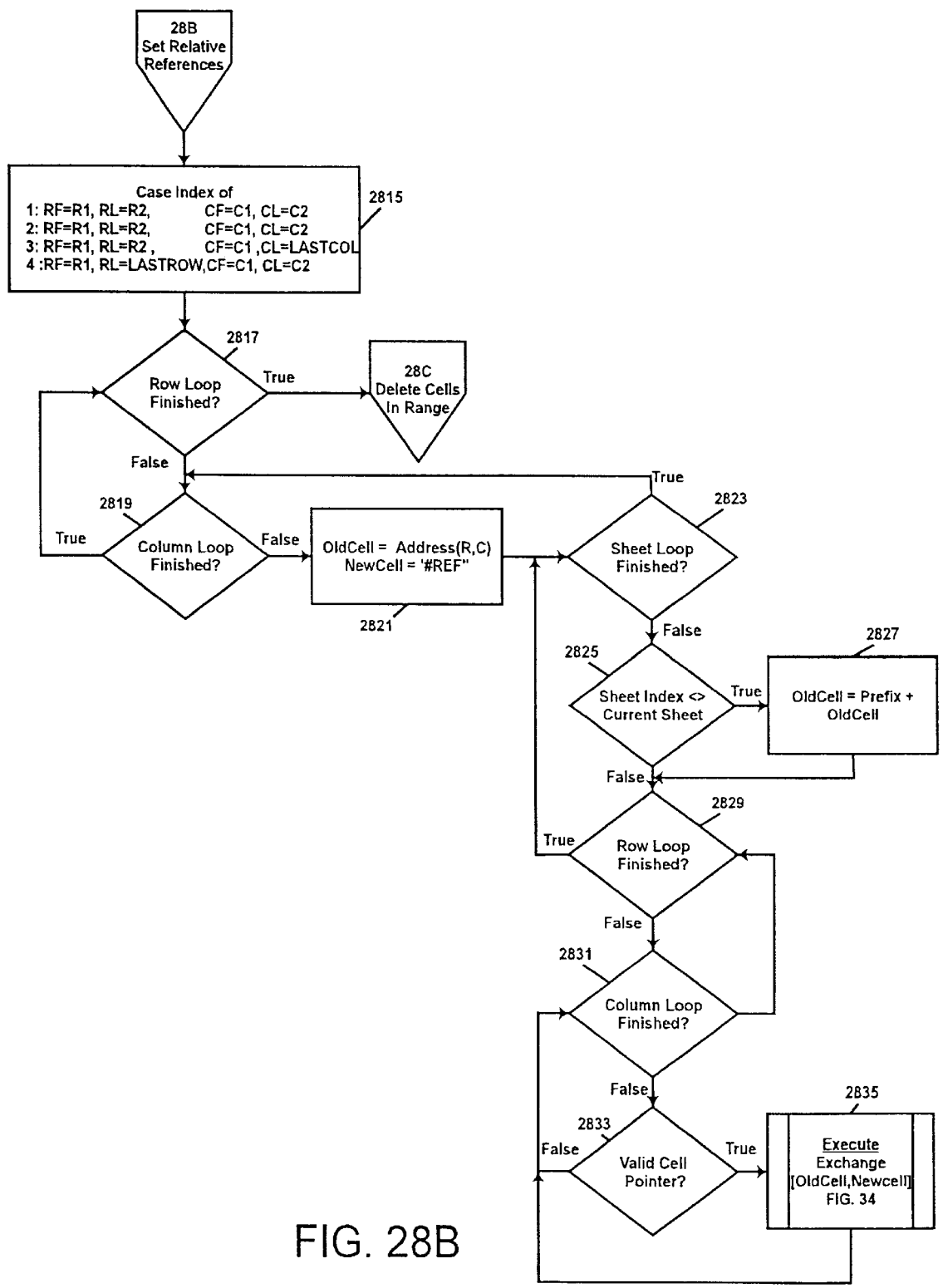
Figure 28C:
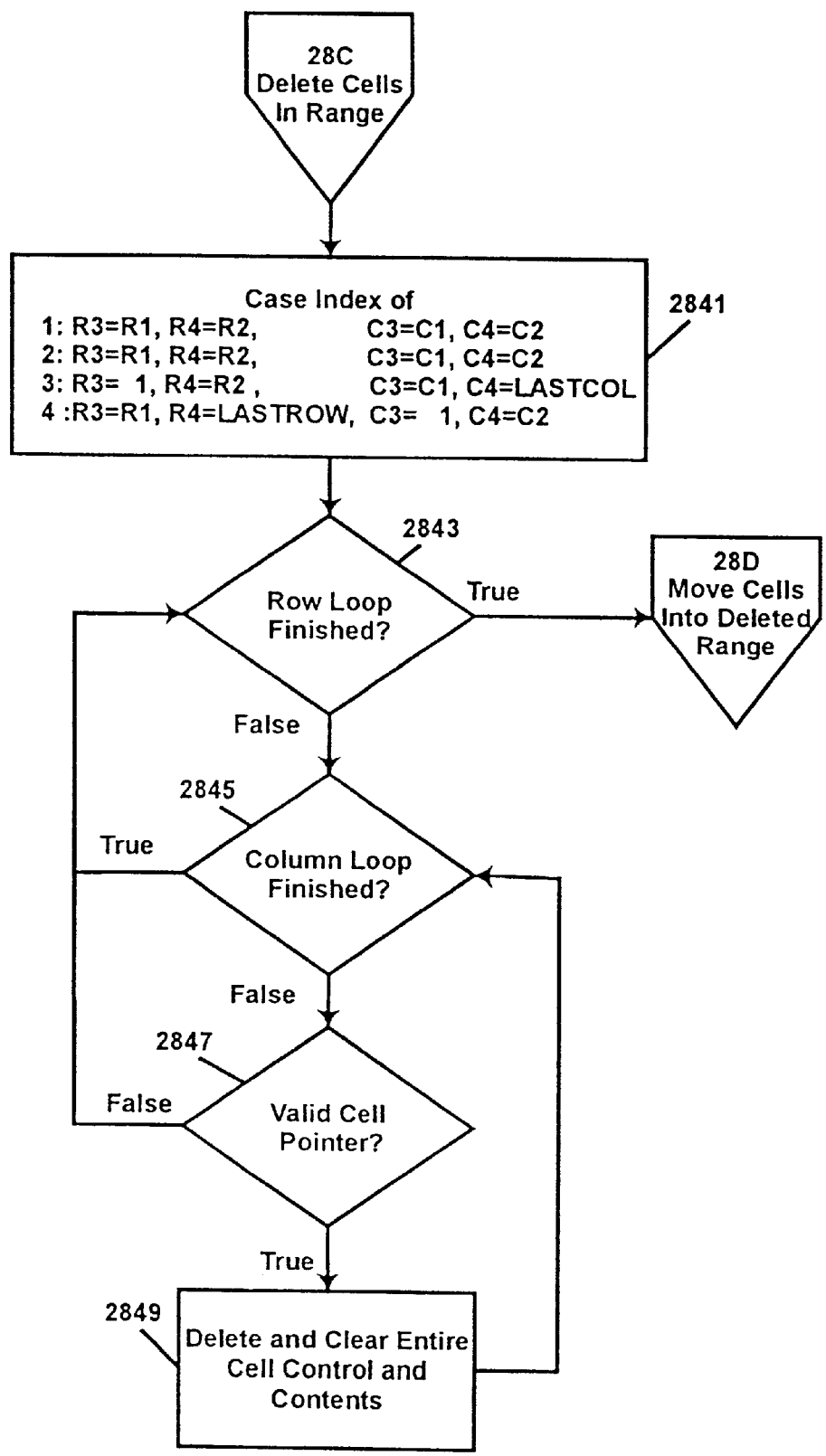

Processing then passes to the delete cells in range operation of FIG. 28C. A first process block 2841 uses the delete option index to determine the values of four local integer values, R3, R4, C3, and C4. These values represent the from/to rows and from/to columns that define the scope or range for the next operation which is to delete and clear the entire contents of the cells being deleted. When the row or column options are selected, the range is larger along one dimension of the two-dimensional grid of cells than just the selected range of cells highlighted by the cursor control. Thus, the index value of three or four span a wider range of cells that are to be deleted than the selected range of cells.

In a row loop of decision block 2843, a column loop of decision block 2845, and a valid cell pointer decision block

2847, the selected range of cells as identified by R1, R2, C1, C2, are cleared and deleted. When every selected cell has been cleared, processing continues via off page connector 28D.

Figure 28D:
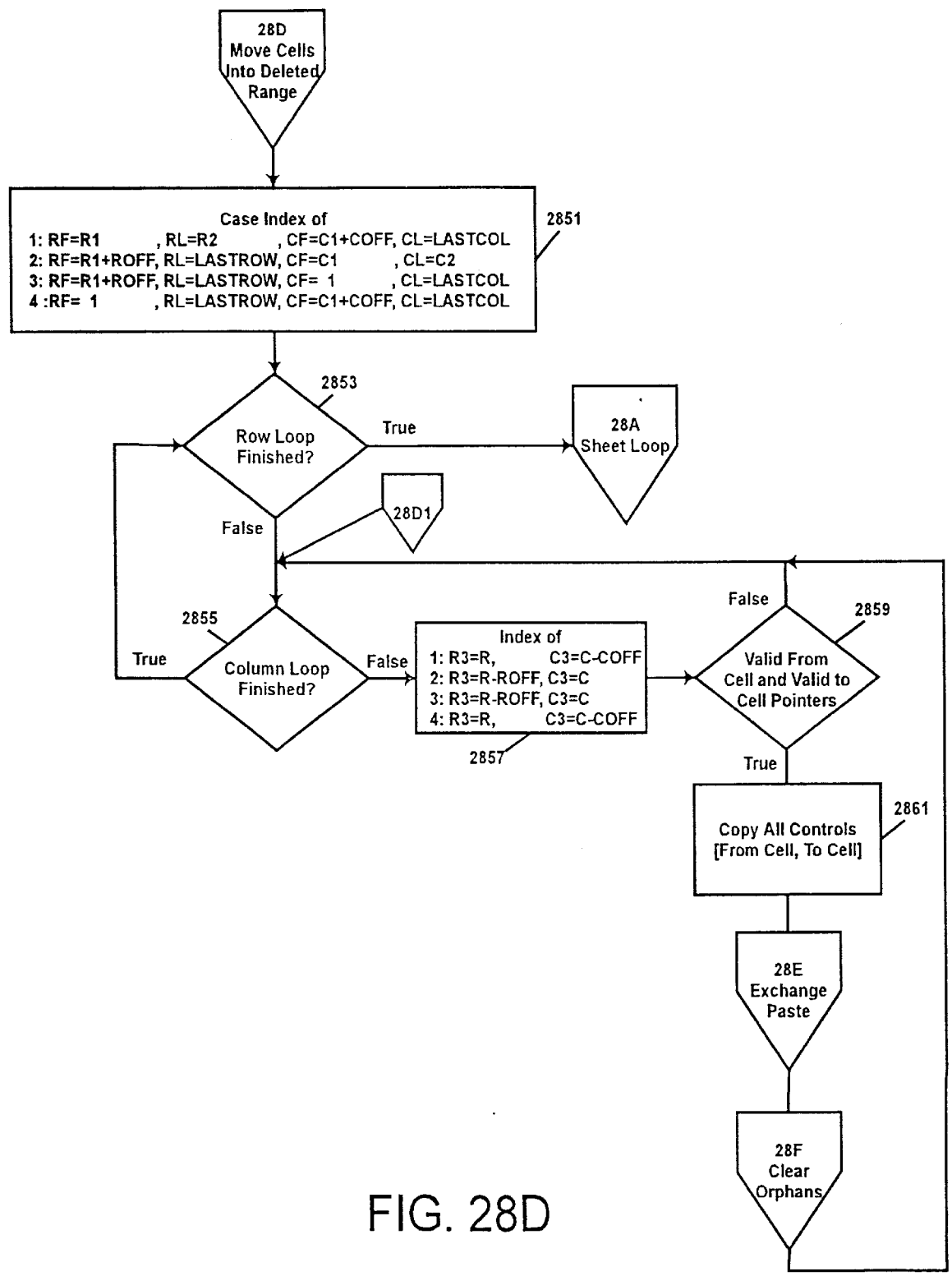

The operation of FIG. 28D serves the purpose of moving the contents of the remaining cells on the sheet into the space vacated by the deleted cells. It performs several critical tasks. It will copy the entire content of each cell in the selected range from its old location to its new location. For each cell that is moved, it will adjust the relative cell addresses. Finally it will clear any orphan cells. Since the cell contents are copied to a new location, the old location may need to be deleted. The outer edges of the sheet that have been vacated by cells moving up or to the left need to be cleared.

In a first process block 2851, the delete option index is used to set the first row, last row, first column and last column range for the operation (RF, RL, CF, CL). A row loop in decision block 2853 and a column loop in decision block 2855 repeat the subsequent operations until every cell on the current sheet has been processed. When every cell for the selected sheet index of decision block 2807 has been processed, control is returned to the selected sheet index loop via off page connector 28A. While cells need to be processed, a series of operations are performed as follows.

In a process block 2857, two local variables, R3 and C3, are set based upon the delete option index value. These values are used to identify the correct offset for the from-cell and to-cell address that will be revised in order to maintain the relative cell address references. In decision block 2859, both the from-cell address, using the row loop 2853 and column loop 2855 address, and the to-cell address using the offset row and column addresses, R3 and C3, are tested to insure that both are valid cells. If they are not control returns to the column decision loop 2855 and a next cell is selected. If both of the cell pointers are valid, then the process block 2861 copies all of the contents in the from-cell to the to-cell address. Then, the operations of FIG. 28E and FIG. 28F are performed in sequence.

Figure 28E:
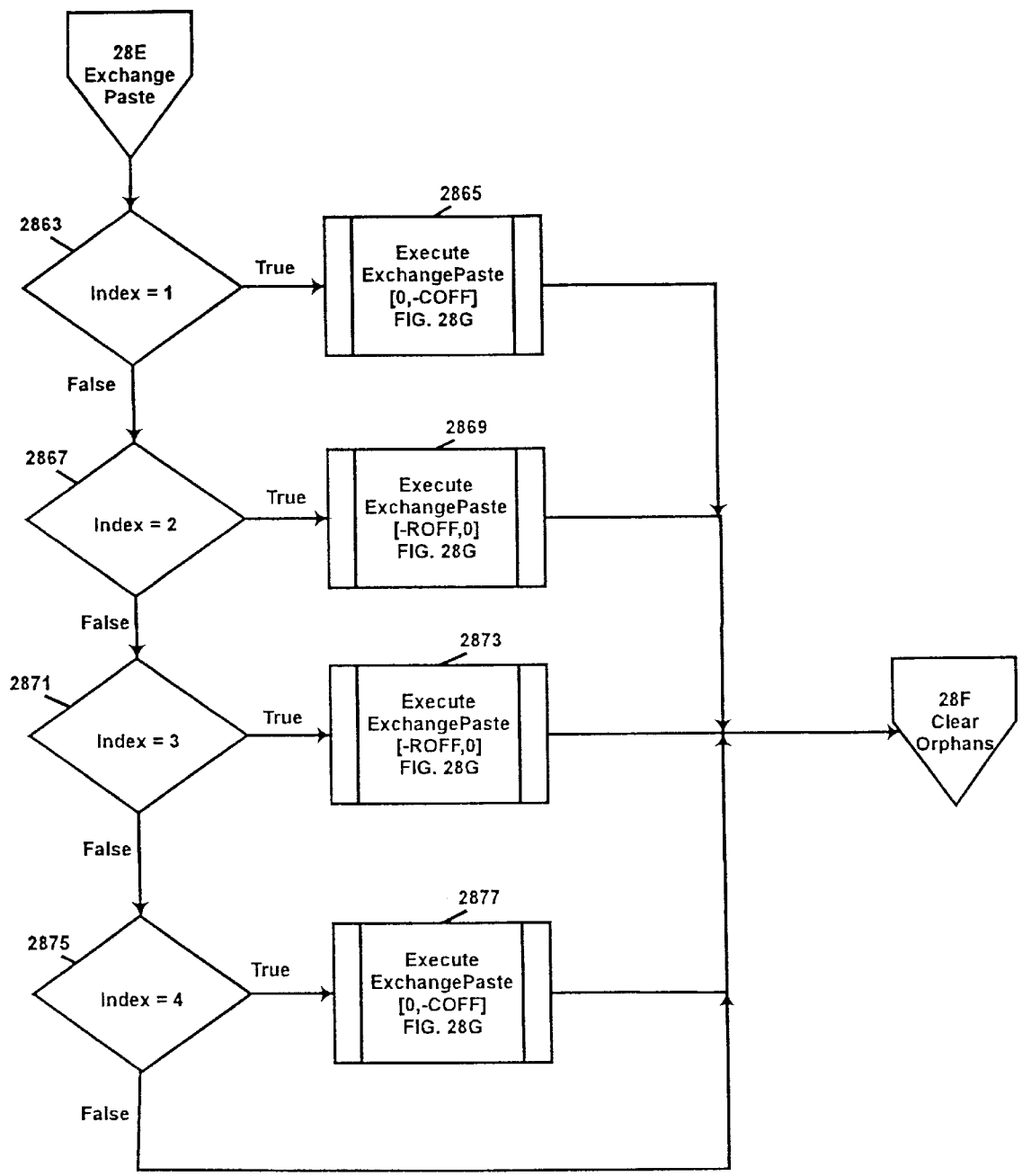
Figure 28F:
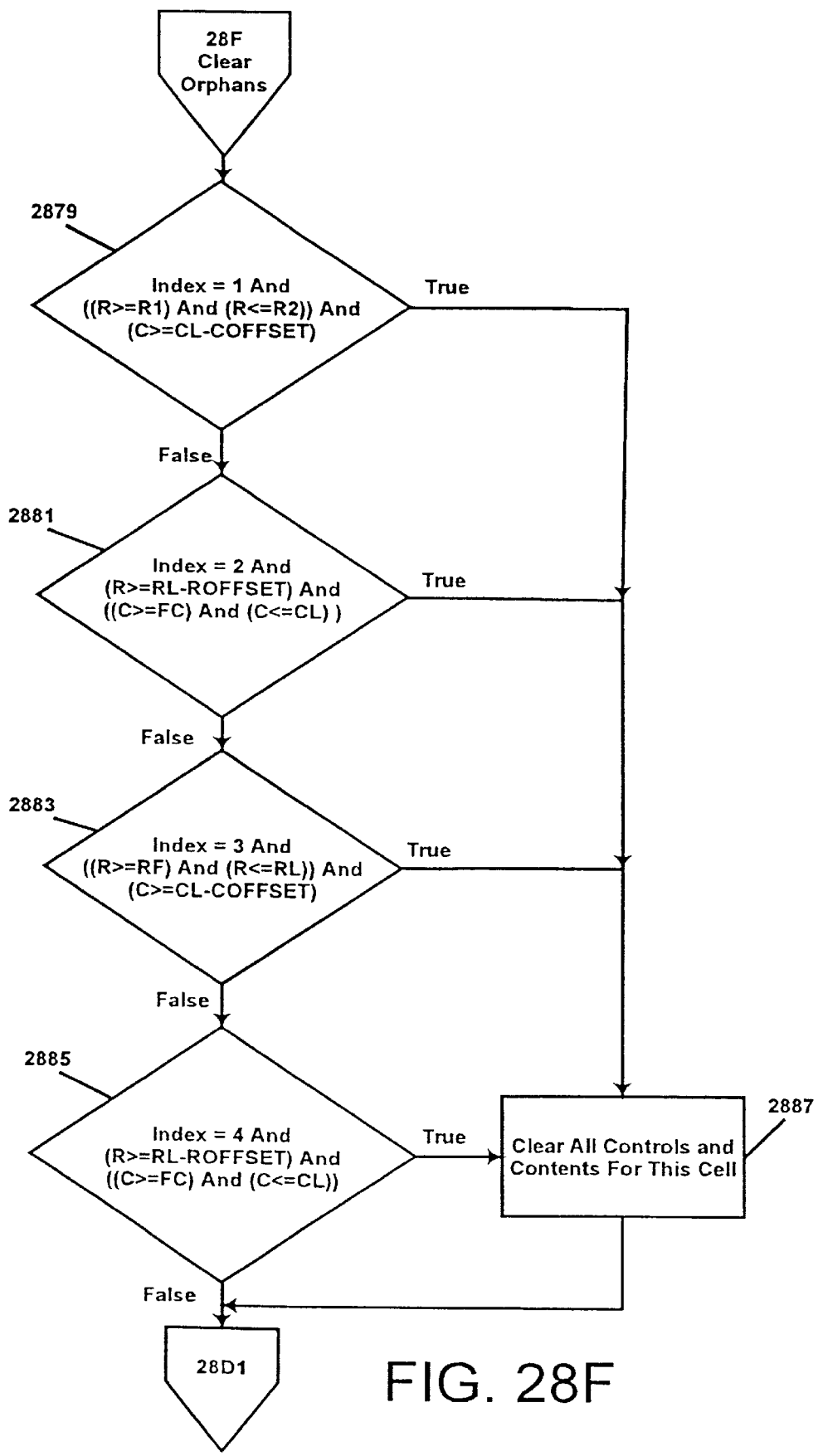
Figure 28G:
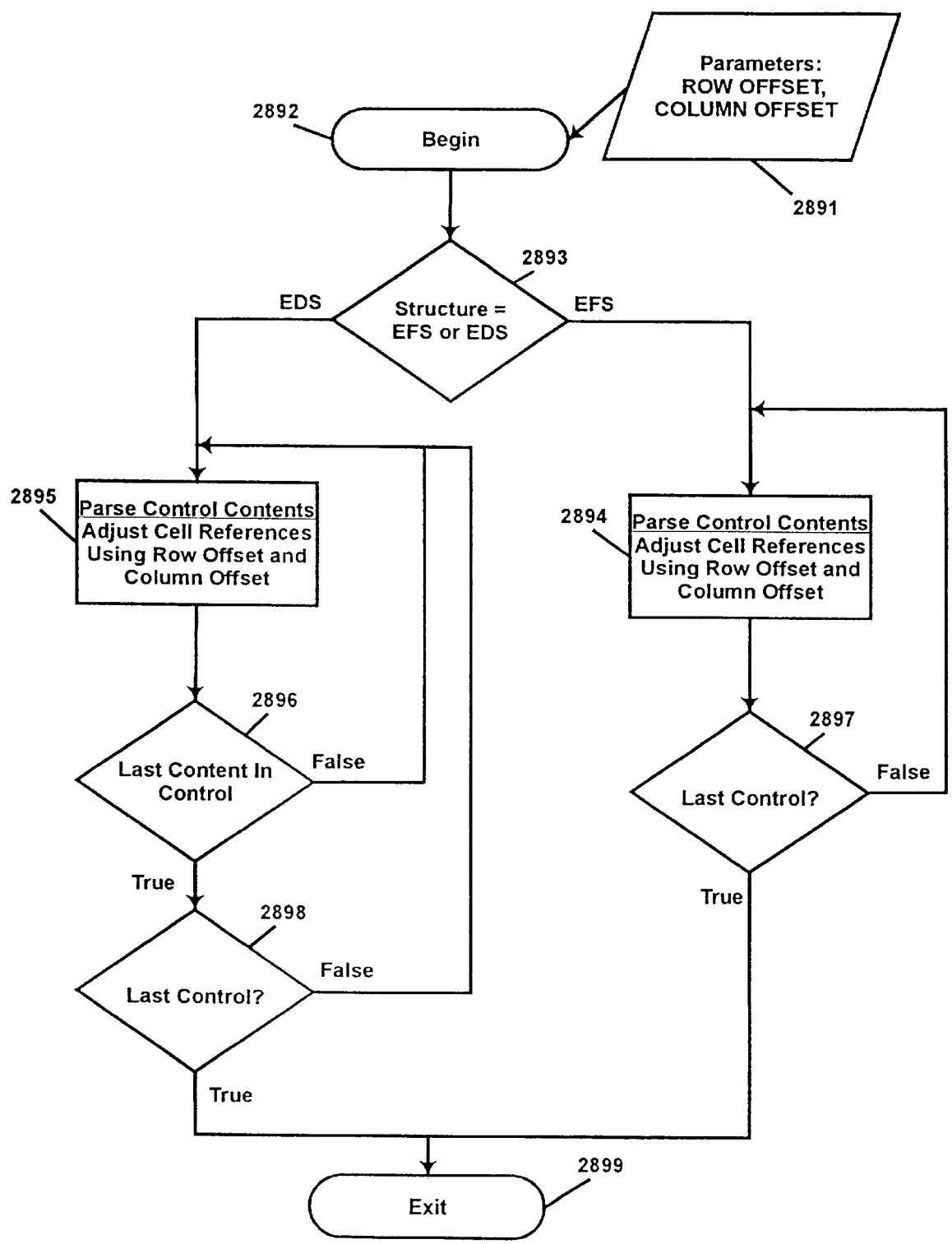

FIG. 28E is a flow diagram of the delete operation's exchange paste process. In a series of decision blocks, 2863, 2867, 2871 and 2875, the delete option index is evaluated. In each case, the operation of FIG. 28G will be executed, however, the parameters passed to that operation will vary depending upon the user's selection as indicated by the delete option index. When the index is equal to a value of one in decision block 2863, the execution block 2865 passes a zero value for the row offset and the negative value of the column offset to the operation 2865 of FIG. 28G. When the index is a value of two in decision block 2867 the exchange paste operation 2869 of FIG. 28G is passed the negative value of the row offset and a zero for the column offset. When the index is a value of three in decision block 2871 the exchange paste operation 2873 is passed the negative value of the row offset and a zero for the column offset. When the index value is a value of four in decision block 2875 the exchange paste operation of execution block 2877 is passed a zero value for the row offset and a negative column offset value.

The exchange paste operation of FIG. 28G adjusts every cell reference in the cell formulas found in all of the controls, i.e., the permutation, constraint and original state controls, using the relative cell reference of the row or column offset value passed into the operation as a parameter. Thus, every cell address found in all of the cell's controls are adjusted to their new location, relative to their old location.

When the operation of the exchange paste execution block 2865, 2869, 2873, or 2877 returns, processing continues via off page connector 28F.

The operation of FIG. 28F is a clear cell operation that is applied to the outer edges of the worksheet where the cells have been moved up or left. The cell contents are first copied up or left in the previous procedures, now the outer edges need to be deleted. FIG. 28F is within the processing loops of the row decision block 2881 and the column decision block 2855, FIG. 28D. Some of the cells processed will not be cleared, i.e., cells not on the outer edge. Therefore, a series of decision blocks, 2879, 2881, 2883, and 2885 are used to test the delete option index in combination with the from-cell address compared to the outer edge of the sheet minus the offset of the cells.

In decision block 2879 the index of one indicates that cells are being moved left for the selected range. The row value set by the row loop of decision block 2883 is compared with the first and last row selected, R1 and R2, and the column as set by the column loop of decision block 2855 is compared to the last column minus the column offset. If the cell is located within this combined range, then the cell is cleared and all of the cell contents and controls are deleted in process block 2887.

If the delete option index is equal to two, then The row value set by the row loop of decision block 2885 is compared with the last row minus the row offset, R1>=RL−ROWOFFSET, and the column as set by the column loop of decision block 2855 is compared to the first and last column of the selected range. If the cell is located within this combined range, then the cell is cleared and all of the cell contents and controls are deleted in process block 2887.

If the delete option index is equal to three, the row value set by the row loop of decision block 2853 is compared with the first row selected, R1, and the last row, RL, and the column as set by the column loop of decision block 2855 is compared to the last column minus the column offset. If the cell is located within this combined range, then the cell is cleared and all of the cell contents and controls are deleted in process block 2887.

If the delete option index is equal to four, then The row value set by the row loop of decision block 2853 is compared with the last row minus the row offset, R1>=RL−ROWOFFSET, and the column as set by the column loop of decision block 2855 is compared to the first column, FC, and the last column, CL. If the cell is located within this combined range, then the cell is cleared and all of the cell contents and controls are deleted in process block 2887.

After the individual cell has been selected to be cleared, in decision block 2879, 2881, 2883 or 2885, or after the cell has not been selected by any of these decision blocks to be cleared, control returns to the column loop decision block 2855 via off page connect 28D1.

When all of the cells on the selected sheet, as set by the row loop decision block 2853 and the column loop decision block 2855, FIG. 28D, are processed, the entire delete operation is complete for the selected sheet of the selected sheet loop of decision block 2807 and control returns via off page connector 28A to FIG. 28A, 2807.

The flow diagram of FIG. 28G is an exchange paste operation. It is used by both the paste operation of FIG. 27 and the delete operation of FIG. 28E. The exchange paste operation uses the row and column offset to change the cell addresses found in the permutation, constraint and original state controls of the cells. It differs from the exchange operation of FIG. 34 because the exchange operation replaces an old cell address with a specific new cell address. The exchange paste operation of FIG. 28G changes every cell reference found by the row and column offset value.

The exchange paste operation receives a row offset and a column offset value as a set of parameters 2891. It enters via terminal block 2892 and a first decision block 2893 tests the storage format structure to determine if the horizontal, EFS, or the vertical, EDS, format is applicable to the current cell. When the EFS format is found the process block 2894 uses string parsing to adjust every cell address found in the entire contents of the first control, the permutation control. In decision block 2897 a test determines if the constraint and original state controls have been processed. If not, the process returns to process block 2894 and the content of the next control is parsed. The cell references in the entire control are adjusted by the row and column offset.

When every control has been reset with the correct relative cell references, as determined in decision block 2897 the operation exits via terminal block 2899.

When the storage format structure in decision block 2893 is EDS, the vertical format, the process block 2895 parses the first content of the permutation control to adjust every cell reference for the row and column offset. In decision block 2896 a test determines if every line in the multiline permutation control has been processed. If not, control returns to process block 2895. When every line of the permutation control has been processed, a decision block 2898 determines if the constraint and original state controls need to be updated. If so, control returns to the process block 2895 and the operation of process block 2895 and decision block 2896 are repeated until the constraint control, and then the original state control are processed. When every cell reference in every control within the cell has been adjusted for the relative cell address references created by moving the cell, the operation exits via terminal block 2899.

In summary, the delete options include shift left, shift up, shift row, and shift column. This selection is applied to every selected sheet. The deleted cell references are updated to a value of "#REF" in every cell reference in every cell control, model wide. The selected range of cells are deleted and cleared. The remaining cells are moved into the space vacated. In the process, the contents of the cells are first copied to their new location, then the exchange paste operation replaces current cell references with new relative cell references based upon the row and column offset that was created by copying the cell to a new location. Finally, the cells along the outer edge that are being vacated by the movement of the cells up or to the left are cleared of all content. The deleted cell references and the relative cell references are updated throughout all cell content and all cell controls via the exchange operation of FIG. 34 and the exchange paste operation of FIG. 28G. In this way, not only current content is maintained, but also future contents, constraint contents, and original state contents are maintained in support of polymorphic and permutation-enabled operations.

Figure 29:
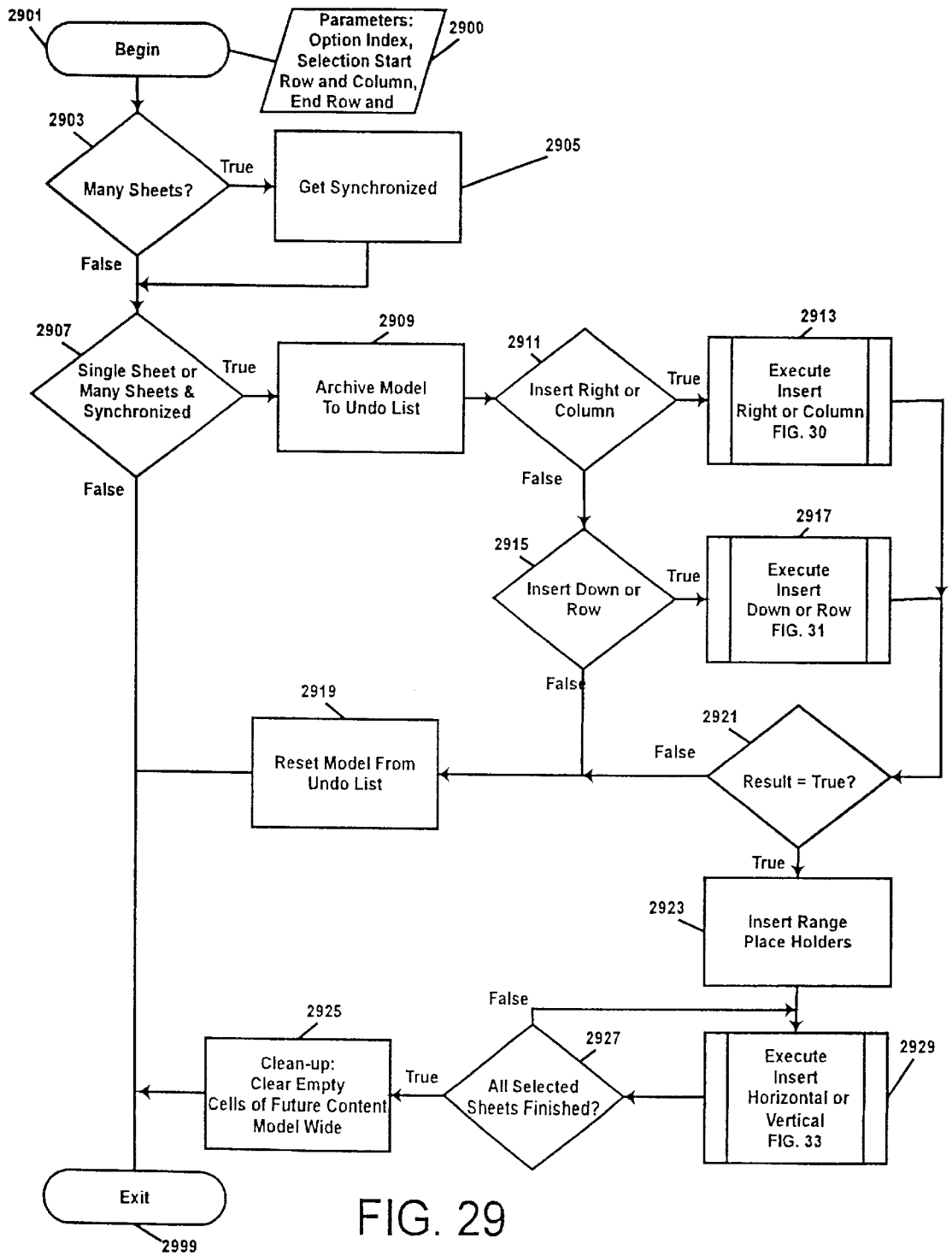
FIG. 29 is a flow diagram of an insert processor.

FIG. 29 is a flow diagram of an insert operation. It is passed an option index as a parameter, and uses component level attributes for the selected-range start row and column and end row and column 2900.

It tests for multiple sheet selections in decision block 2903. With multiple sheets selected it gets the synchronization status in process block 2905. The process will continue, in decision block 2907, only if a single sheet is selected, or if many sheets are selected and the many sheets are synchronized. If the many sheets are not synchronized, i.e., the cell types on each sheet differ, it exits via terminal block 2999.

With synchronized sheets or a single sheet, processing continues in process block 2909 where the current model is archived to the undo list. A next test in decision block 2911 tests if the option index 2900 selects insert move-right or insert-column. If true, then execution block 2913 executes the insert right or column operation of FIG. 30. The operation of FIG. 30 moves cell contents. If decision block 2911 is false, then a next decision block 2915 determines if the insert down or insert row option index 2900 is selected. If true, then execution block 2917 executes the insert down or right operation of FIG. 31. The operation of FIG. 31 moves cell contents. The operations of FIG. 30 and FIG. 31 will move the permutation, constraint, and original state controls for every cell on the current and selected sheets to make room for the insertion of cells.

If the option index 2900 is not matched in decision blocks 2911 or 2915 then the model is reset in process block 2919 and the operation exits via terminal block 2999. After completion of execution block 2913 or 2917, processing returns to decision block 2921. If the result of execution block 2913 or 2917 is false then the model is reset in process block 2919 and the operation exits via terminal block 2999. If the result of execution block 2913 or 2917 is true, then a process block 2923 inserts the new empty cells in the selected range of cells as determined by the selection start and end, rows and columns, or by the insert row or insert column option index 2900. At this point, the cells on the current sheet, and on any selected sheets, have been shifted right or down and new empty cells have been inserted.

Next, in a series of steps, each cell, in each sheet in the workbook is scanned in order to update relative cell references in the permutation, constraint, and original state controls. This operation is performed for every cell that was moved, both on the current sheet, and on any selected sheets.

Figure 33:
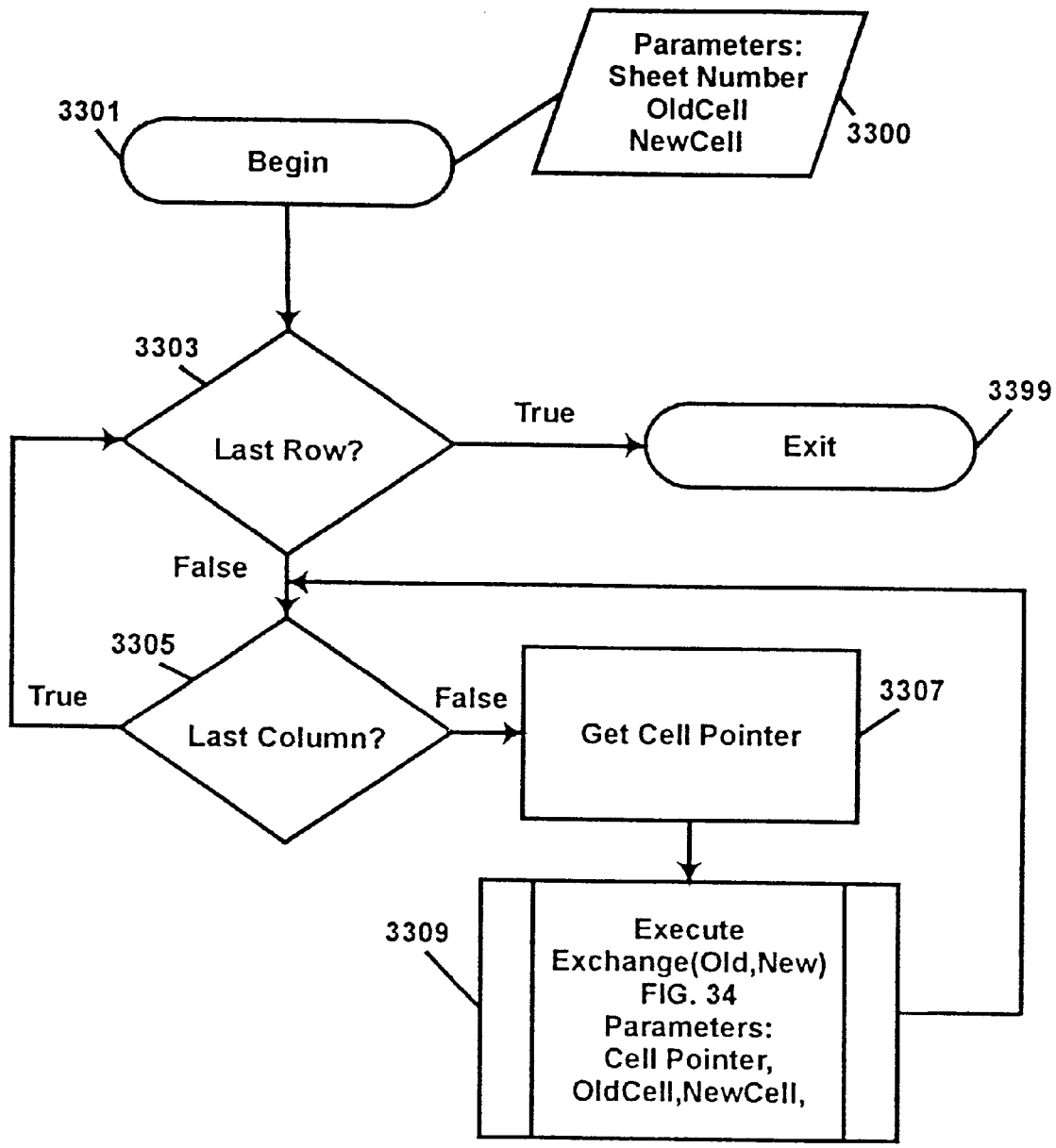
FIG. 33 is a flow diagram of a relative cell sheet insert processor.

In the first step in execution block 2929, the insert horizontal or vertical operation of FIG. 33 is executed for the current active worksheet. The operation of FIG. 33 will update the cell references in the entire workbook for each cell that has been moved on the current sheet. When execution block 2929 is complete, processing returns to decision block 2927 where the sheet index is evaluated. Each selected sheet must execute the execution block 2929 in order to update the relative cell references, model wide, that are affected by each cell moved on each of the selected sheets. When every selected sheet is complete, a final clean up process in block 2925 scans the entire model for empty cells and clears all permutation, constraint or original state controls. The operation then exits via terminal block 2999.

Figure 30:
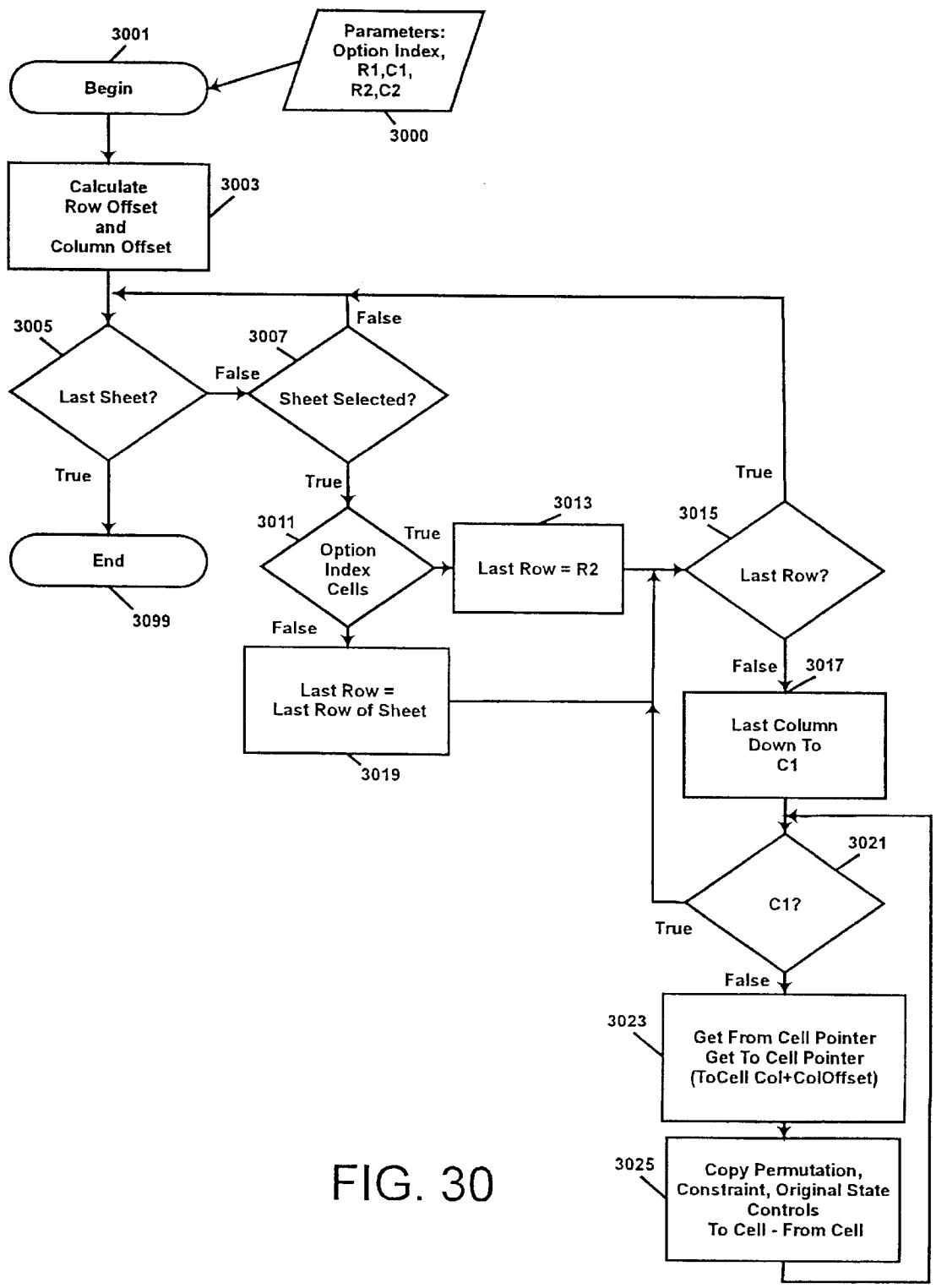
FIG. 30 is a flow diagram of an insert right or column processor.

FIG. 30 is a flow diagram of a insert move-right or insert-column operation. It is passed the option index, start row and column, and end row and column, as parameters 3000: option index, r1, c1, r2, and c2,. A first process block 3003 calculates a row and column of fset by subtracting r1 from r2 and c1 from c2 and adding a value of one.

In a series of steps, every cell on every selected sheet is moved to make room for the insertion of cells. A test in decision block 3005 will exit via terminal block 3099 when the last sheet has been evaluated.

For each valid sheet, a decision block 3007 determines if the sheet is selected. If the sheet is not selected, the sheet index is incremented and the operations of decision blocks 3005 and 3007 are repeated.

When the sheet is selected, in decision block 3007, the option index 3000 is evaluated in decision block 3011. If the option index is set for the entire row then process block 3019 sets the local last row variable to a value equal to the last row on the sheet. If the option index is for the range of cells only, then process block 3013 sets the local last row variable to a value equal to r2, the selection end row.

A decision block 3015 is used to repeat processing until the last row set in process block 3013 or 3019 has been processed. When the last row has been processed, control returns to the sheet decision block 3005. When the row needs to be processed, a process block 3017 sets the local last column and first column variables.

In a loop, decision block 3021 determines if the last column in the row has been processed, beginning with the last column and working back towards the first selected column. Process block 3023 obtains two valid cell pointers. The first pointer is to the old cell using the current loop cell row and column address, and the second pointer is to the new cell location using the current loop cell row and the column plus the column offset to generate the cell address where the cell contents will be moved. In process block 3025, the permutation, constraint, and original state controls are moved from their current location to their new location using the respective cell pointers, old and new. This cell movement makes room for the insertion of cells in the place of the old cell.

When the last column for the row is complete in decision block 3021, control passes back to the row decision block 3015 until every row has been processed. When every row has been processed, processing returns to the sheet decision block 3005. When every cell, for every column on every row of every selected sheet has been moved, the operation exits via terminal block 3099.

Figure 31:
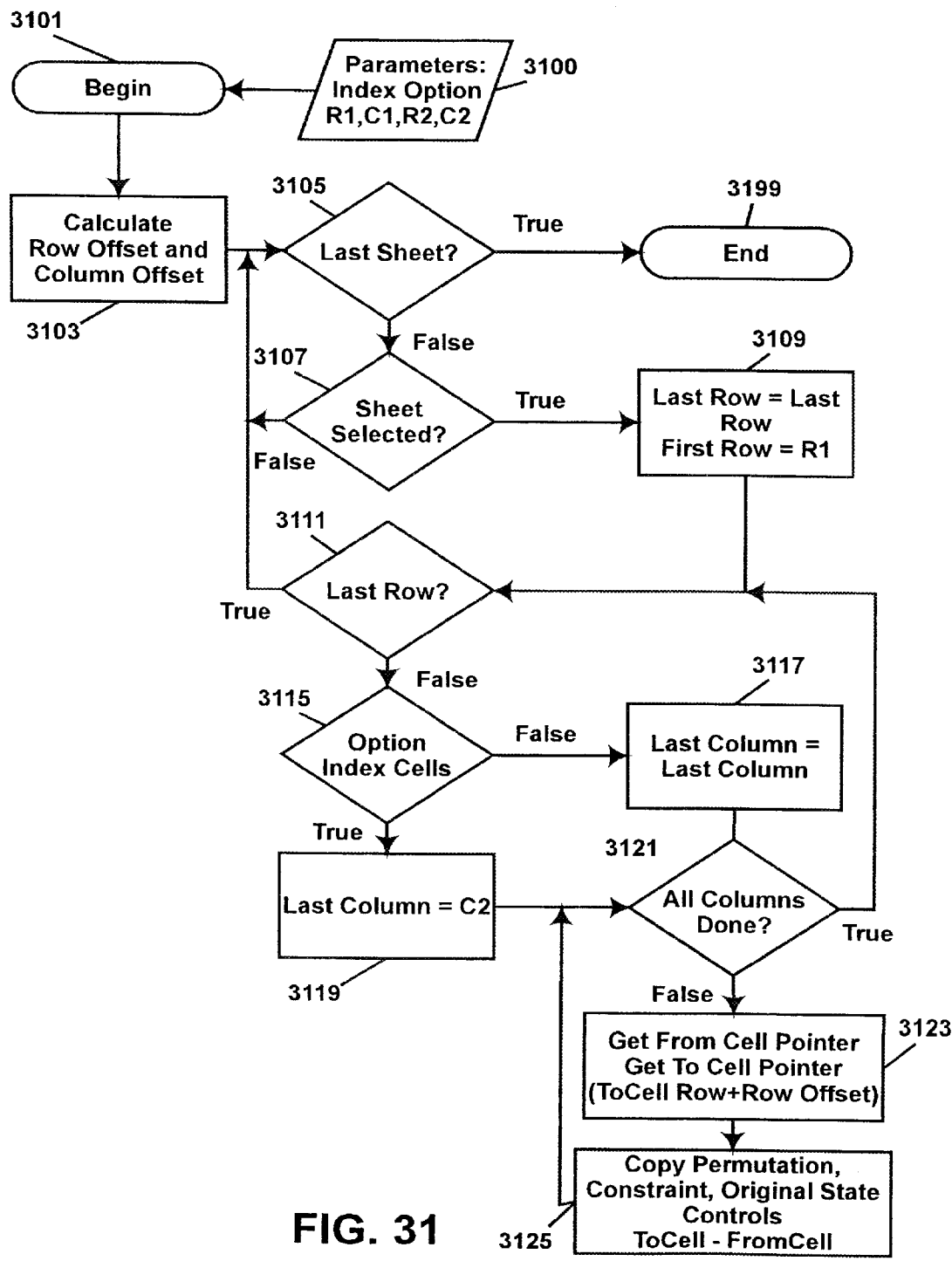
FIG. 31 is a flow diagram of an insert down or row processor.

FIG. 31 is a flow diagram of an insert move-down or insert-row operation. It is passed the option index, start row and column, and end row and column, as parameters 3100: option index, r1, c1, r2, and c2,. A first process block 3103 calculates a row and column offset by subtracting r1 from r2 and c1 from c2 and adding a value of one.

In a series of steps, every cell on every selected sheet is moved to make room for the insertion of cells. A test in decision block 3105 will exit via terminal block 3199 when the last sheet has been evaluated.

For each valid sheet, a decision block 3107 determines if the sheet is selected. If the sheet is not selected, the sheet index is incremented and the operations of decision block 3105 and 3107 are repeated.

When the sheet is selected, in decision block 3107, a process block 3109 sets the last processing row equal to the last row on the selected sheet and the first.

A decision block 3111 is used to repeat processing until the last row set in process block 3109 has been processed. When the last row has been processed, control returns to the sheet decision block 3105. When the row needs to be processed, a decision block 3115 tests the option index 3000 for a value of cells or column. If the index is cells then process block 3119 sets the last column equal to c2, the selection end column. If the index is column then process block 3117 sets the last column equal to the last column for the current row.

Then in a series of steps, each cell in the row, beginning with the selection start column is moved to a new location. Decision block 3121 determines if the cells for all of the columns have been moved. If true, the processing returns to the row decision block 3111. If false, the process block 3123 gets two valid ceil pointers for the current row and column. The first pointer is to the old cell location using the row and column address. The second pointer is to the new cell address using the row plus the row offset and the column to generate the new address. Then in process block 3125, the permutation, constraint, and original state controls are moved from their current location to their new location using the respective cell pointers, old and new. This cell movement makes room for the insertion of cells in the place of the old cell.

When the last column for the row is complete in decision block 3121, control passes back to the row decision block 3111 until every row has been processed. When every row has been processed, processing returns to the sheet decision block 3105. When every cell, for every column on every row of every selected sheet has been moved, the operation exits via terminal block 3199.

Figure 32A:
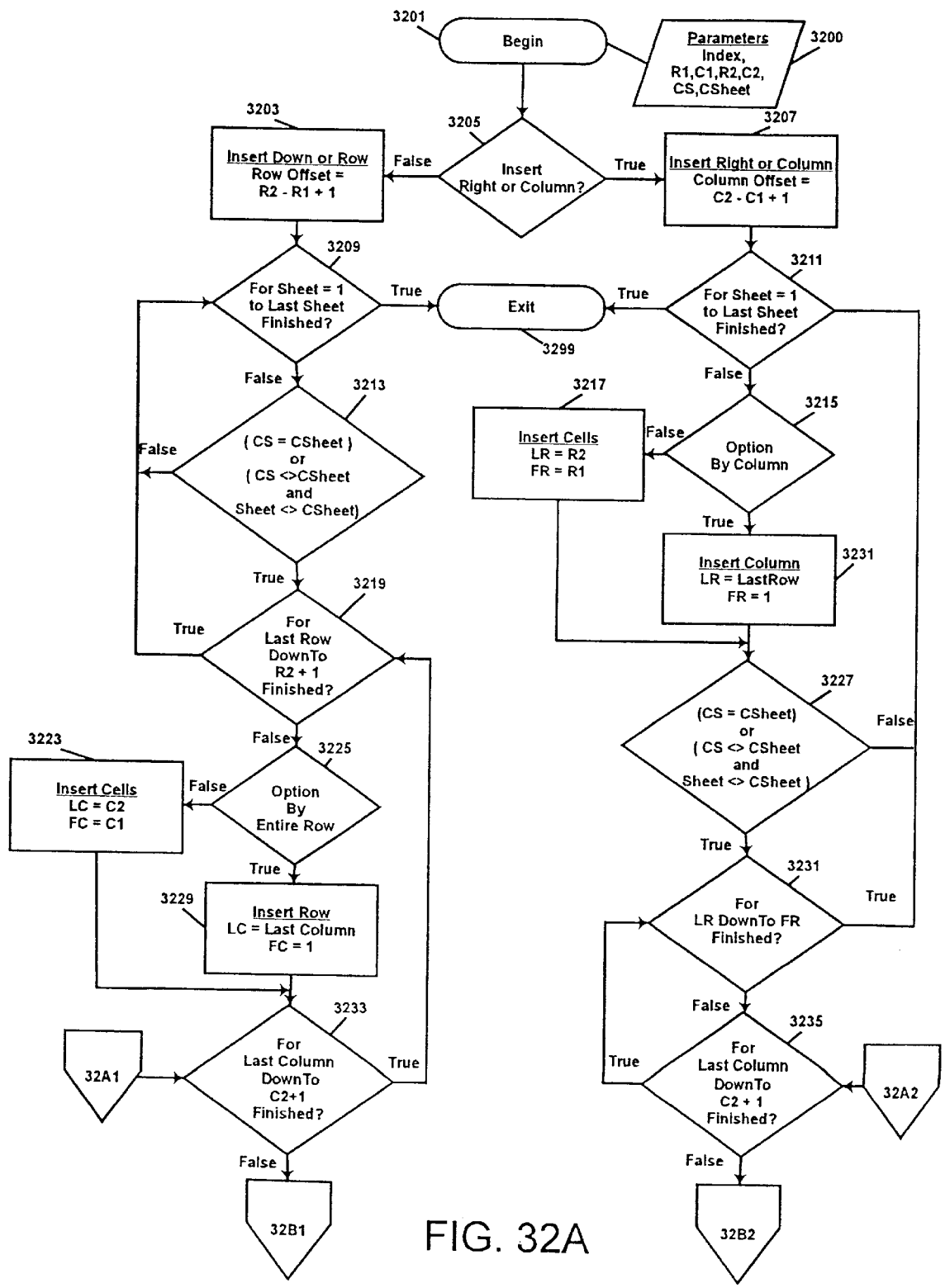
FIGS. 32A–32B is a flow diagram of a relative cell insert.
Figure 32B:
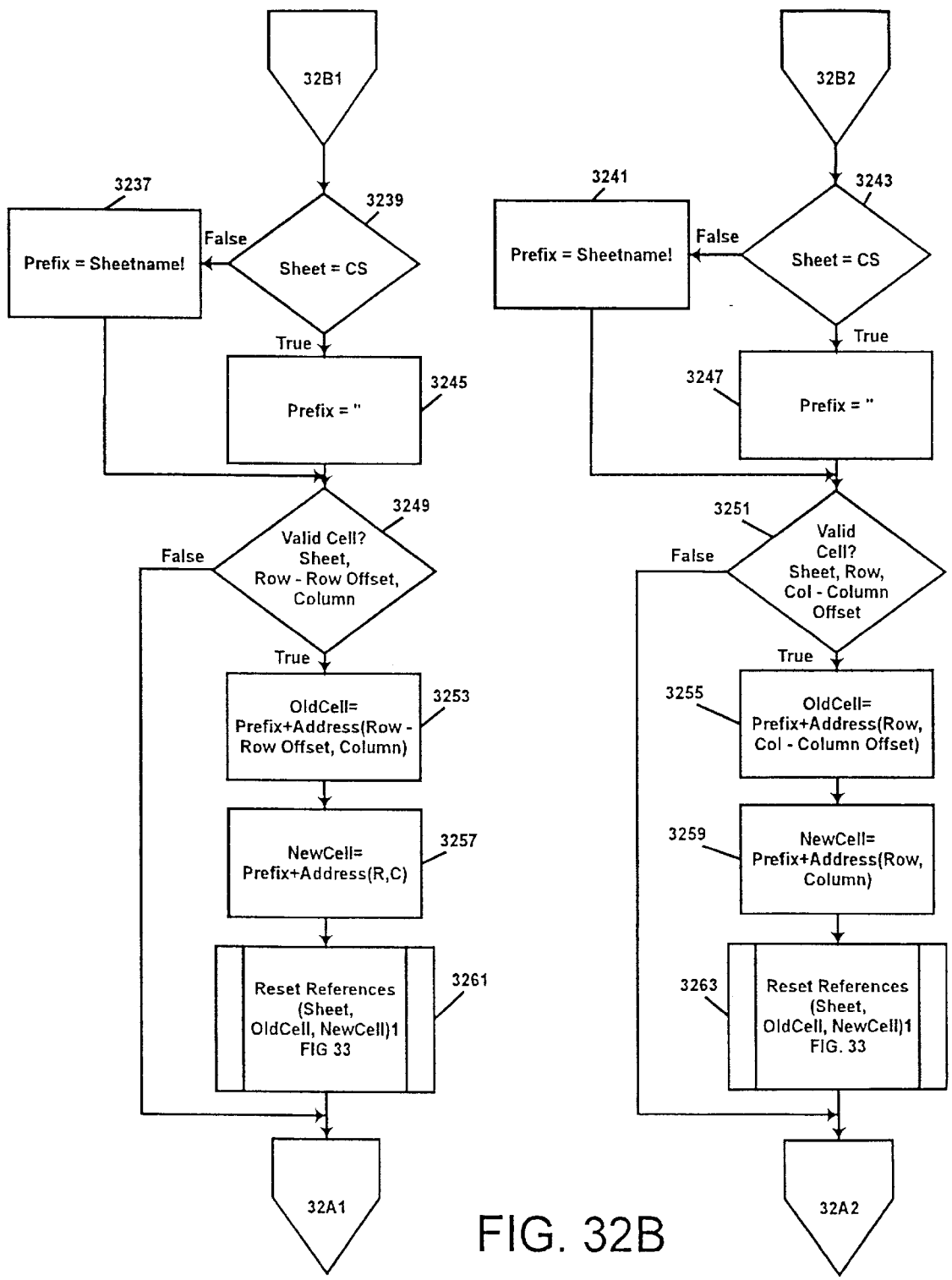

FIGS. 32A and 32B are a flow diagram of an insert horizontal or vertical operation. It is passed parameters 3200 of the option index, and the selection range start row and column and end row and column, as a selected sheet and an active sheet attribute: index, r1, c1, r2, c2, cs, csheet. This operation is called first for the active sheet and then again for each selected sheet. Once the active sheet has been processed, it is screened out for subsequent sheet selections in decision blocks 3223 and 3227.

A first decision block 2305 uses the option index 3200 to determine if a horizontal or a vertical insertion is occurring. If the index is shift right or column then the process block 3207 is executed. If the index is shift down or row then process block 3203 is executed.

For insert right or column a series of steps parse the contents of every cell searching for old cell address in order to replace it with a new cell address. In process block 3207 a column offset is calculated as c2−c1+1.

A loop process decision block 3211 repeats for every sheet until finished and then exits via terminal block 2399. In decision block 3215 the option index by column leads to process block 3231 where the last row is set to equal the last row for the sheet and the first row is set to the value of one. If the decision block 3215 is by cell it leads to process block 3217 where the last row is set equal to the value of r2 and the first row is set equal to the value of r1. The first row and last row determine the range of operation that follows.

In decision block 3227, a test compares the selected sheet, cs, with the active sheet csheet and the sheet loop counter, sheet, with the active sheet. This decision allows the active sheet to be updated, or excludes the sheet index of the active sheet. The active sheet can be processed or the selected sheet can be processed, but do not operate on the active sheet, after it has already been updated.

The row counter and the column counter are incremented and tested in decision blocks 3231 and 3235 to create a loop for each row and column. If the last row has been processed in decision block 3231, then processing returns to the sheet decision block 3211. If the last column has been processed in decision block 3235 then processing returns to the row decision 3231.

When the current row and column selection needs to be processed, off page connector 32B2 leads to the actions of FIG. 32B. In decision block 3243, the sheet index is compared to the selected sheet. If they are equal then the prefix is set equal to the sheet name in process block 3241. If they are unequal then the prefix is set to blank in process block 3247. Processing continues in decision block 3251 with a test for a valid cell address. When the column is adjusted by subtracting the column offset calculated in process block 3207, it can lead to a zero or negative column number. If the new column is zero or negative, the cell is skipped and processing returns via off page connector 32A2.

If the sheet, row and new column generate a valid cell address then a series of steps first generate an old cell address in process block 3255, generate a new cell address in process block 3259 and execute a replacement of the old cell with the new cell in every cell that may be affected by this cell's relocation via execution of the reset references operation of FIG. 33 in execution block 3263.

When processing of execution block 3263 is complete, processing returns via off page connector 32A2 to the next column decision block 3235. Thus, every cell that has been moved, is replaced with its new cell location, in the cell contents of every cell where it is referenced.

If decision block 3205 determines an insert-down or insert-row option then a similar set of operations begin in process block 3203 where a row offset is calculated as r2−r1+1. A loop for each sheet is evaluated in decision block 3209 and when complete it exits via terminal block 3299.

In decision block 3213 the active sheet can be processed or a selected sheet that is not equal to the current sheet so long as the sheet index is not the active sheet. The active sheet should only be processed one time.

Then in decision block 3219 the loop for rows from the last row down to the selection end row plus one is tested. When the row loop is complete control returns to the sheet decision block 3209. Each row in the selected range is processed with a decision block 3225 that determines the column range. If the option index is by entire row, then the last column is set to the last column for the row and the first column is set to equal a value of one in process block 3229. If the option index is by cells, then the process block 3223 sets the last column equal to c2, the selection end column, and the first column equal to c1, the selection start column. These column loop control settings are then used in the column loop 3233. Beginning from the last to the first in the column range processing continues via off page connector 32B1. When the column loop is complete, control returns to the row decision block 3219.

FIG. 32B, decision block 3239 compares the sheet index with the selected sheet. If there is a match the prefix is set to blank in process block 3245. If there is no match the prefix is set equal to the sheet name in process block 3237.

A valid cell test in decision block 3249 will skip over invalid cell addresses caused by calculating a new cell row equal to the row index minus the row offset. Skipped invalid cells continue via off page connector 32A1 to the column decision block 3233.

A valid cell will proceed in a series of steps in process block 3253, generate an old cell address, in process block 3257 generate a new cell address, and in execution block 3261, reset all references to this cell throughout the model, via the reset references operation.

When processing for the individual moved cell is complete in execution block 3261, processing returns via off page connector 32A1 to the column decision block 3233 of FIG. 32A.

When every column in the control range is complete control returns to the row decision block 3219. When every row in the control range is complete control returns to the sheet decision block 3209. When every sheet is complete the operation exits via terminal block 3299.

In summary, FIGS. 32A and 32B generate a new cell address and an old cell address for every cell that has been moved, and pass these changes to every cell that contains a reference to the old cell and replaces that reference with the new cell location.

FIG. 33 is a flow diagram of a replace operation. The replace operation receives two cell addresses as parameters 3300: a sheet number, a from cell and a to cell address. Its function is to scan every cell on every selected sheet and replace every occurrence of the from cell with the to cell address that it finds in the permutation control, constraint control, and original state control.

Figure 34:
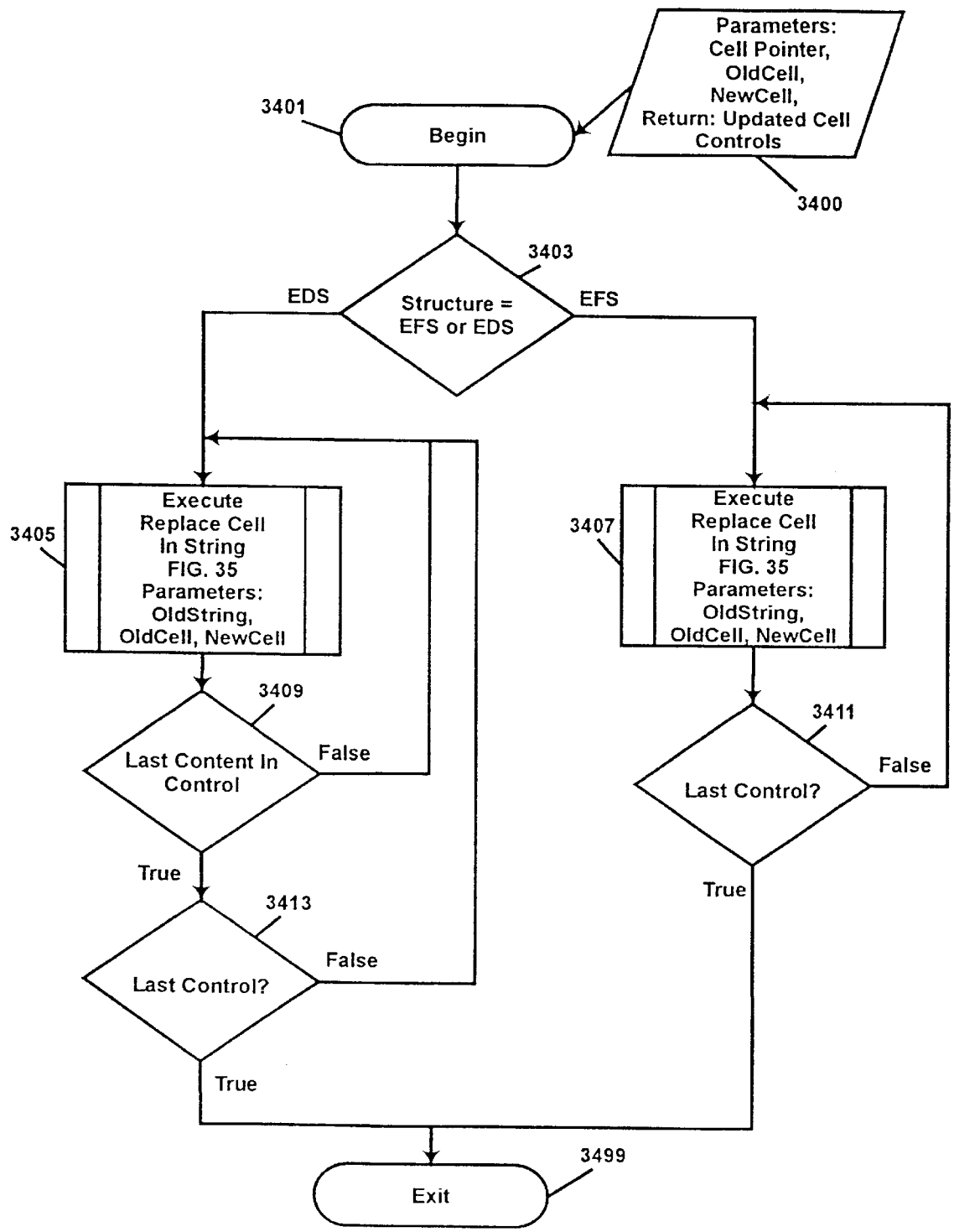
FIG. 34 is a flow diagram of an exchange cell processor.

The replace operation operates on every cell on the selected sheet. In a decision block 3303 the replace operation tests to determine if the last row has been scanned, if so, it exits via terminal block 3399. If not, it will continue in decision block 3305 with a column loop test to determine if the last column has been updated. If the last column has been updated it returns to decision block 3303. If the column needs to be updated, then processing passes to process block 3307 where a valid cell pointer is established to the current sheet, row and column address. Then in execution block 3309 the exchange operation of FIG. 34 is executed. The exchange operation is passed the valid cell pointer, the from cell and the to cell address. The exchange operation of FIG. 34 performs the necessary update, replacing each occurrence of the from cell with the to cell address.

When every cell on every selected sheet is completed, processing exits via terminal block 3399.

Figure 35:
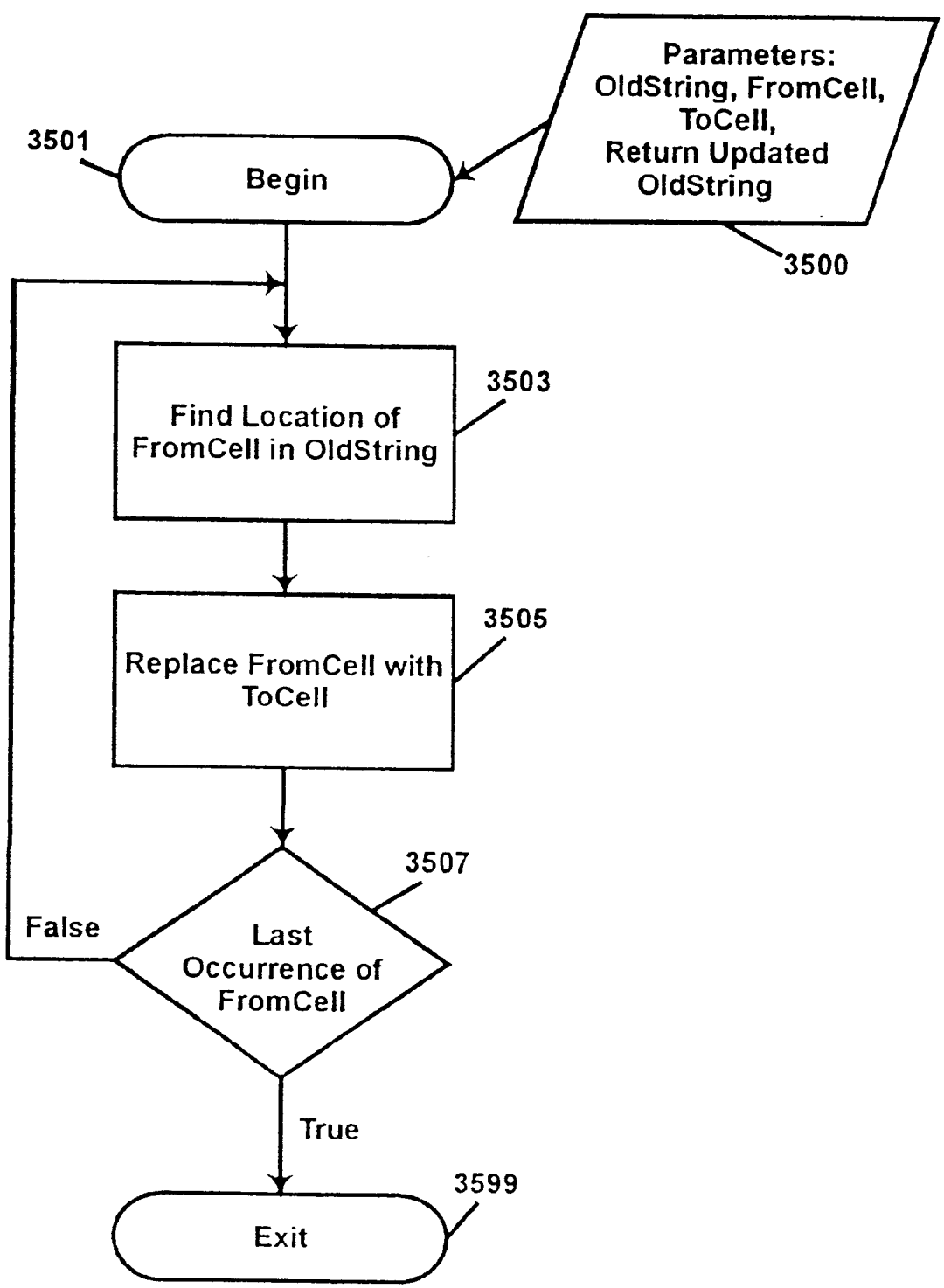
FIG. 35 is a flow diagram of a replace string processor.

The parse control operation of FIG. 34 receives a set of parameters 3400: a valid cell pointer, a from cell and a to cell address. In decision block 3403, the structure attribute of the cell is tested to determine if the storage structure of the cell's controls is of the EFS or the EDS type. If the EFS type then processing continues in execution block 3407 where the replace cell operation of FIG. 35 is executed. The replace cell operation replaces every occurrence of the from cell address with the to cell address in the string it is passed as a parameter. When the replace cell is complete for the first control, i.e., the permutation control, a decision block 3411 determines if the constraint control or the original state control need to be processed. If so, then processing returns to execution block 3407 with the next control as the focus for the operation of FIG. 35 as executed in execution block 3407. When all three controls have been updated, processing returns and the parse control operation exits via terminal block 3499.

If the permutation control structure is the EDS type, then processing proceeds to an execution loop consisting of execution block 3405 and decision block 3409. Each set of cell content that is found in each of the cell's controls in the list structure is passed to the replace cell operation of FIG. 35 in execution block 3405. A test is performed in decision block 3409 to determine if every entry in the list has been updated. When the replace cell is complete for the first control, i.e., the permutation control, a decision block 3413 determines if the constraint control or the original state control need to be processed. If so, then processing returns to execution block 3405 with the next control as the focus for the operation of FIG. 35 as executed in execution block 3405. When all three controls have been updated the operation exits is via terminal block 3499.

The replace cell operation is shown in the flow diagram of FIG. 35. It is passed parameters 3500 of an old string, a from cell address and a to cell address. It returns an updated old string that has the from cell occurrences replaced with the to cell address. In process block 3503 a location of the from cell address is identified. In process block 3505 the from cell address is replaced with the to cell address. In a decision block 3507 a test is made to determine if every instance of the from cell has been replaced, if not, processing continues in process block 3503, until every occurrence is replaced.

Figure 36:
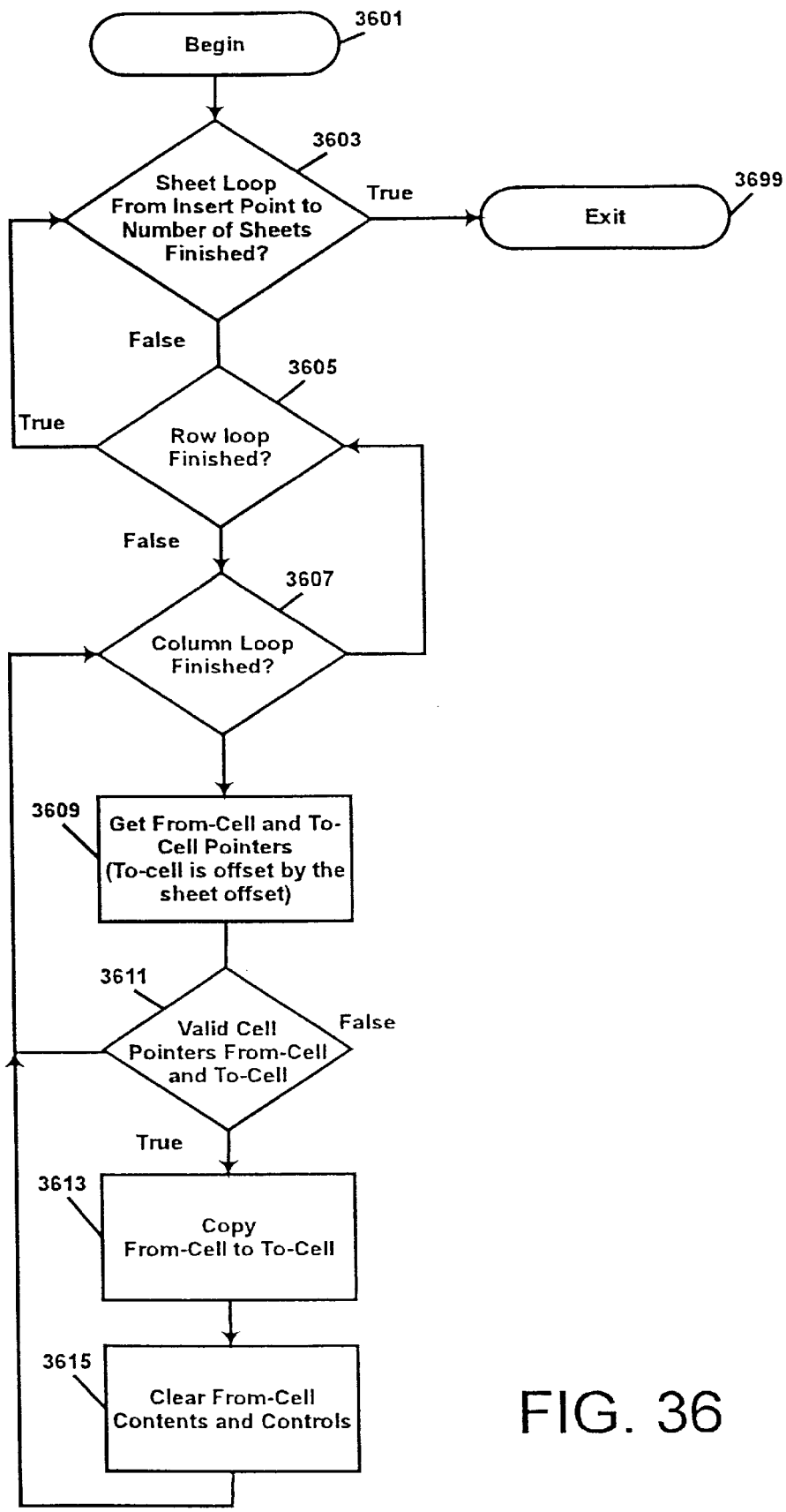
FIG. 36 is a flow diagram of an insert sheet processor.

FIG. 36 is a flow diagram of an insert sheet processor. The insert sheet processor moves the contents of each sheet to the right to make room for a new sheet at the insertion point. If more than one sheet is selected at the time the insertion is made, then the number of positions to the right is equal to the number of selected sheets. The processor works backwards from the last sheet to the insertion point, moving and clearing each cell as it proceeds. The entire contents of each cell is moved, including the permutation control, the constraint control and the original state control.

The processor enters via terminal block 3601 and a sheet processing loop of decision block 3603 tests a current sheet index that is incremented from the last sheet location down to the insertion sheet number. If the insertion point has been reached then the processor exits via terminal block 3699. If the current sheet needs to be processed the row loop of decision block 3605 and the column loop of decision block of 3607 are executed. In process block 3609, a from-cell and a to-cell pointer are generated that are tested in decision block 3611. If either pointer is invalid control returns to the column loop 3607. The to-cell pointer is equal to the from-cell pointer plus the sheet offset which is equal to the number of sheets that are being inserted, i.e., the number of sheets currently selected. If the cell pointers are valid then the from-cell is copied to the to-cell location in process block 3613 and then in process block 3615 the from-cell is cleared of all contents. Then control returns to the column loop decision block 3607 and the next cell is moved, until every column in every row of every sheet from the last sheet to the insertion point has been moved, then the exit is via terminal block 3699.

Figure 37:
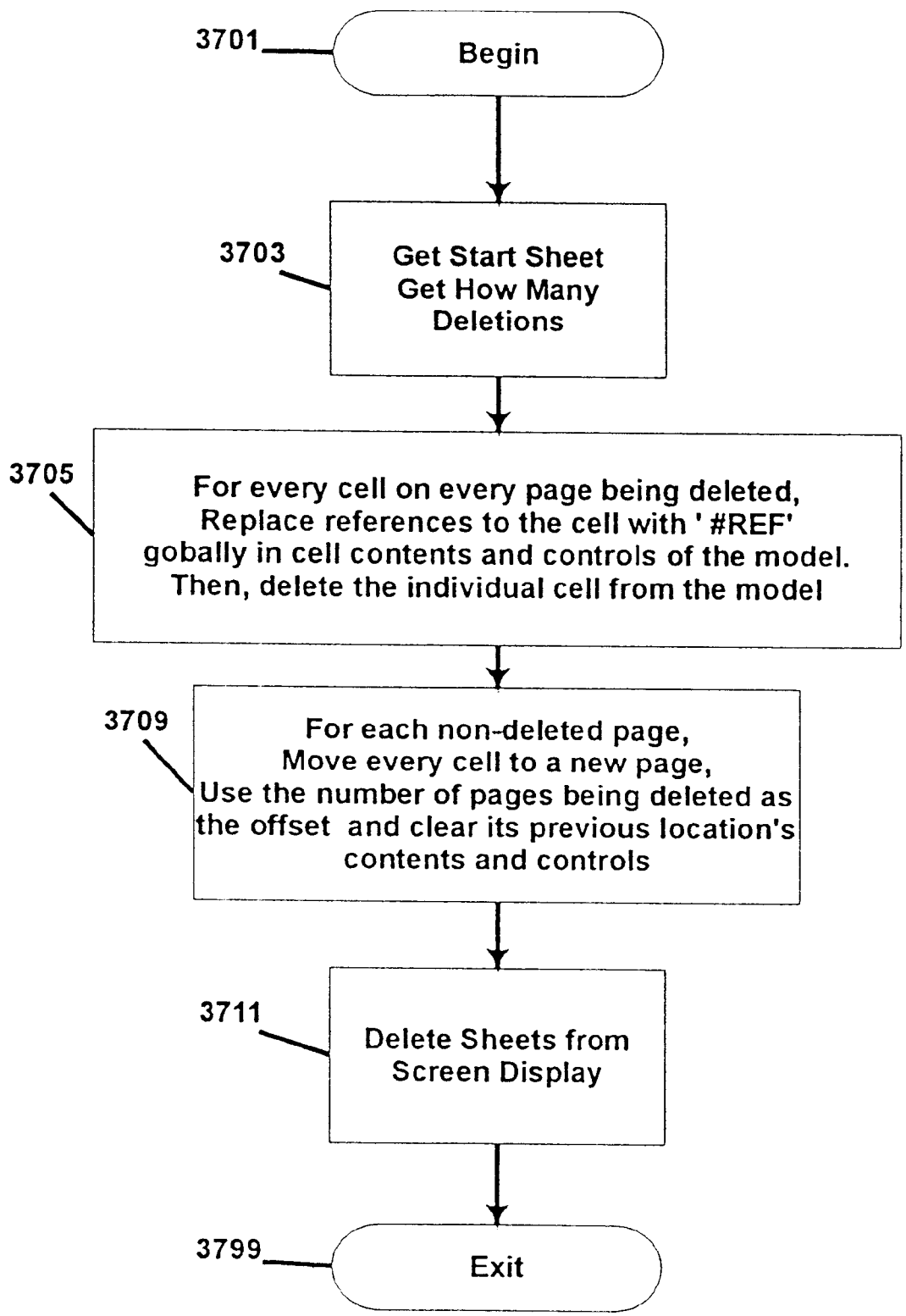
FIG. 37 is a flow diagram of a delete sheet processor.

The flow diagram of FIG. 37 is a delete sheet processor. It enters via terminal block 3701. In a process block 3703 the current sheet selections are retrieved and the number of selected sheets is calculated.

In process block 3705 every cell reference to a cell on a sheet that is being deleted is changed to a value of '#REF', globally, throughout the model. Since the cells on deleted pages will no longer exist in the model, the reference to them are no longer valid. The detailed execution of cell replacements is performed using the exchange processor of FIG. 33 in a manner that is similar to the cell deletion process shown in FIG. 28. When every cell reference for a given cell on a deleted page has been updated with value of '#REF' model wide, the cell is then deleted from the model. When every cell on the selected sheets has been deleted, then all of the pages have effectively been deleted.

Next in process block 3709 the remaining model cells are moved to the left, by the number of deleted pages, to fill in the space vacated by the deleted pages. When the cell is moved, its entire contents, which includes the permutation, constraint and original state controls is moved to a new sheet location. The cell's previous location is cleared of all content, thus, when all of the cells on a particular sheet have been moved the previous sheet is then empty. Each sheet of cells is moved the appropriate number of pages to the left until all of the cells on all of the sheets have been moved.

Since the deleted pages no longer exist in the model a process block 3711 deletes the selected sheets from the screen display sheet control and the processor exits via terminal block 3799. Since the sheet number and the sheet name independent cell identifiers, all of the formulas that contain sheet name references remain valid when the cell contents are moved from one page location to another. Therefore, the sheet number may have changed, but the sheet name did not change. So, the cell contents in the permutation control, constraint control, and original state control remain valid after the cells are moved without further processing.

Figure 38:
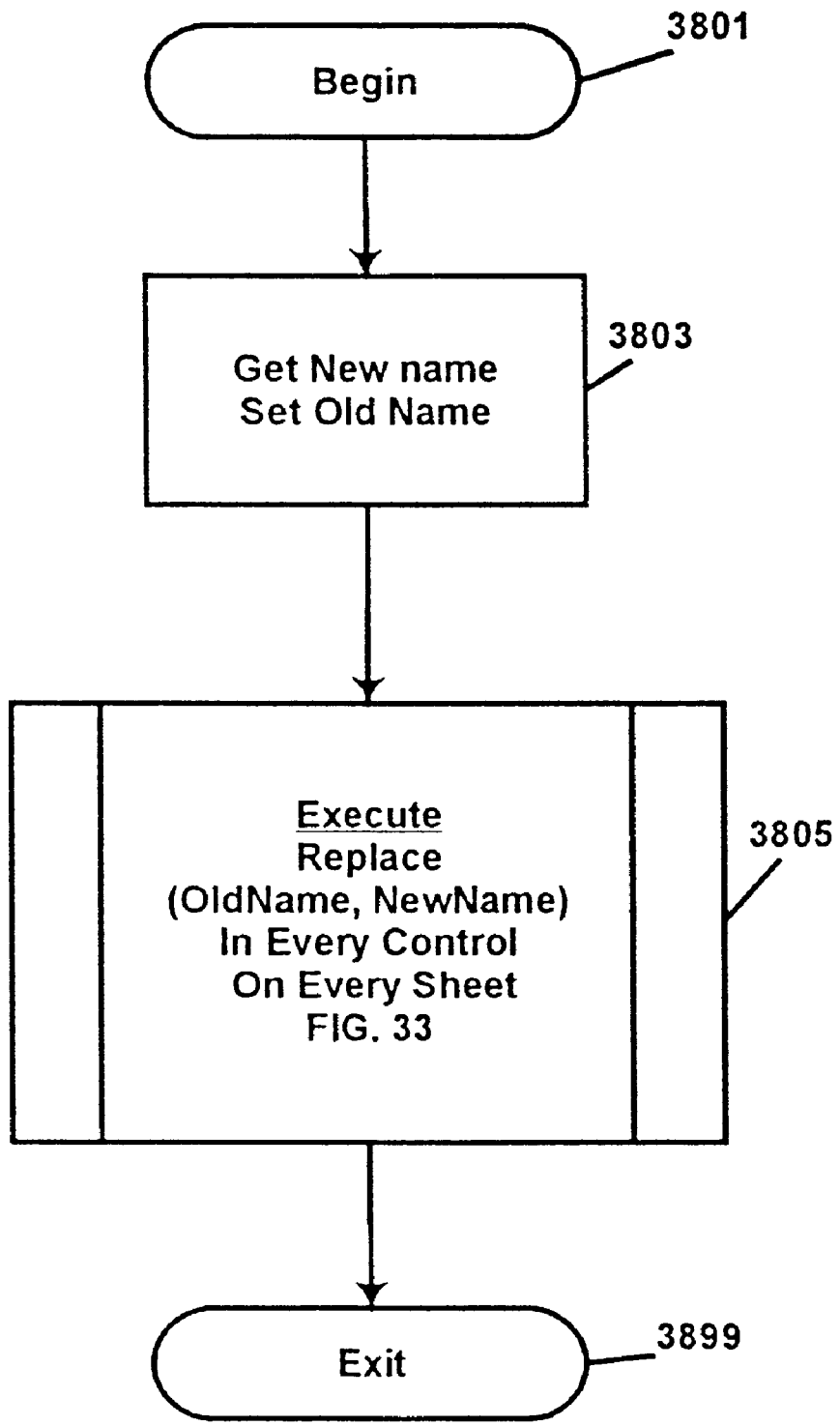
FIG. 38 is a flow diagram of an rename sheet processor.

The flow diagram of FIG. 38 is a rename sheet processor. It enters via terminal block 3801 and in process block 3803 it retrieves the new sheet name from the user entry and the previous or old sheet name for the selected sheet. Then in an execution block 3805 the replace processor of FIG. 33 is executed. The new name and the old name are passed as parameters. The replace processor will scan every cell in the model and replace every occurrence of the old sheet name with the new sheet name in all cell contents. Thus, every reference in the entire model to the old sheet name will be replaced in the permutation control, the constraint control and the original state control of every cell where such a reference occurs. The rename sheet processor then exits via terminal block 3899.

Figure 39:
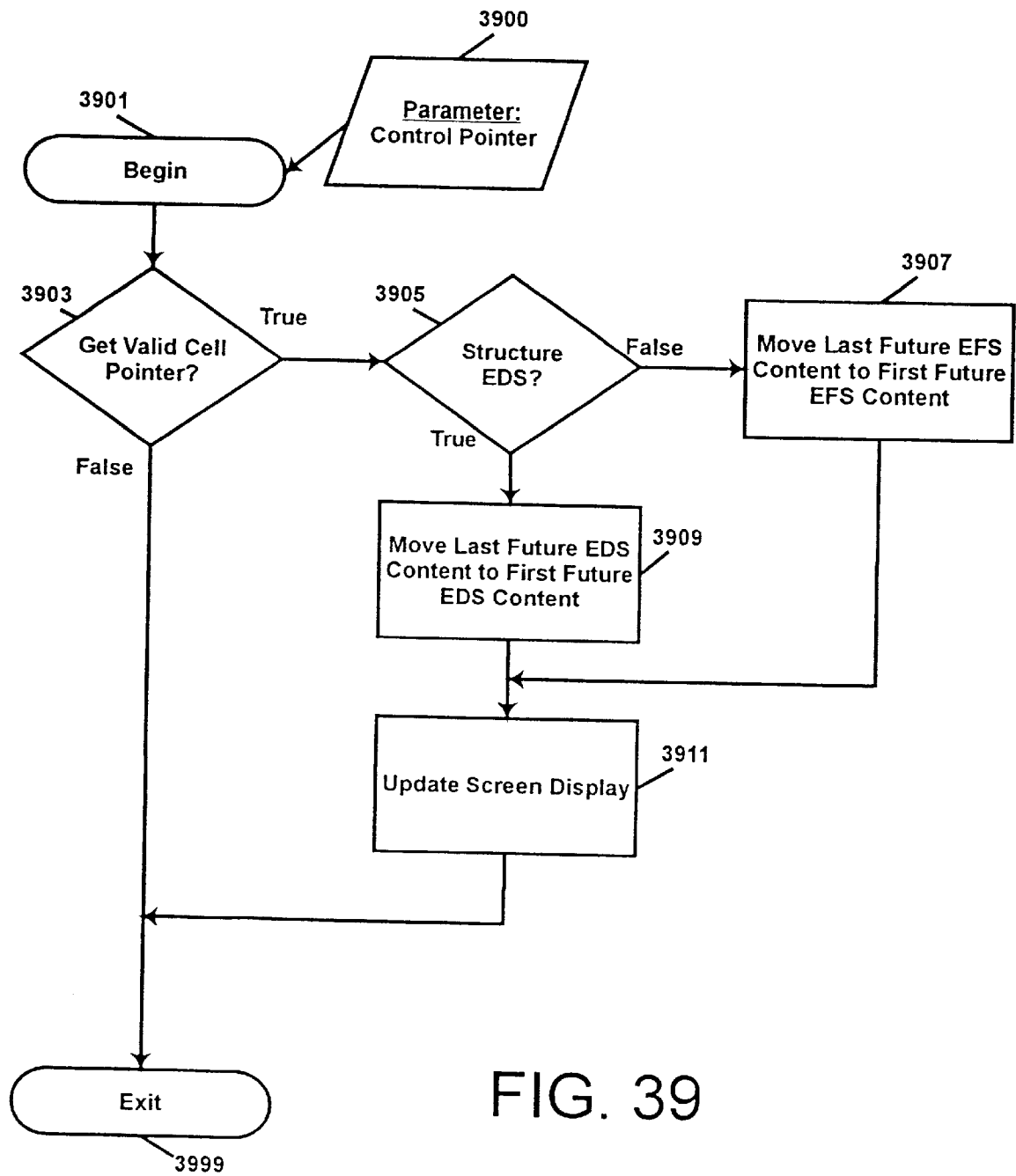
FIG. 39 is a flow diagram of a single impact target cell selection using a scrolling display.

The flow diagram of FIG. 39 is a select impact cell procedure. It is passed a pointer to a screen control 2900 as a parameter. The screen control is drop-down list box that displays the contents of the permutation control. For single impact type cells, the first future content of the permutation control is the current target cell for model permutation. A speed button or command control allows the user to scroll through the list of future content, thus changing the current target cell for model permutation. The procedure of FIG. 39 reorders the contents of the cell's permutation control and redisplays the reordered contents on the screen display.

The procedure begins via a terminal block 3901. A first test is made in decision block 3903 to determine if a valid cell pointer has been obtained. If not obtained, processing exits via terminal block 3999. If a valid cell pointer has been obtained a next decision block 3906 routes processing to process block 3909 if the current structure index for the cell is of the EDS (vertical) type format and to process block 3907 if the current structure index is the EFS (horizontal) type format.

The operation of process blocks 3907 and 3909 each perform the same operation, they move the last future content of the permutation control into the first position of the permutation control. This is like scrolling through the list of future content. Since the first position is used to target the next cell in a permutation event, this action has the effect of re-targeting or reordering the permutation sequence.

In a next process block 3911, the reordered content of the permutation control is redisplayed in the control 3900 on the display screen. The procedure then exits via terminal block 3999.

Figure 40:
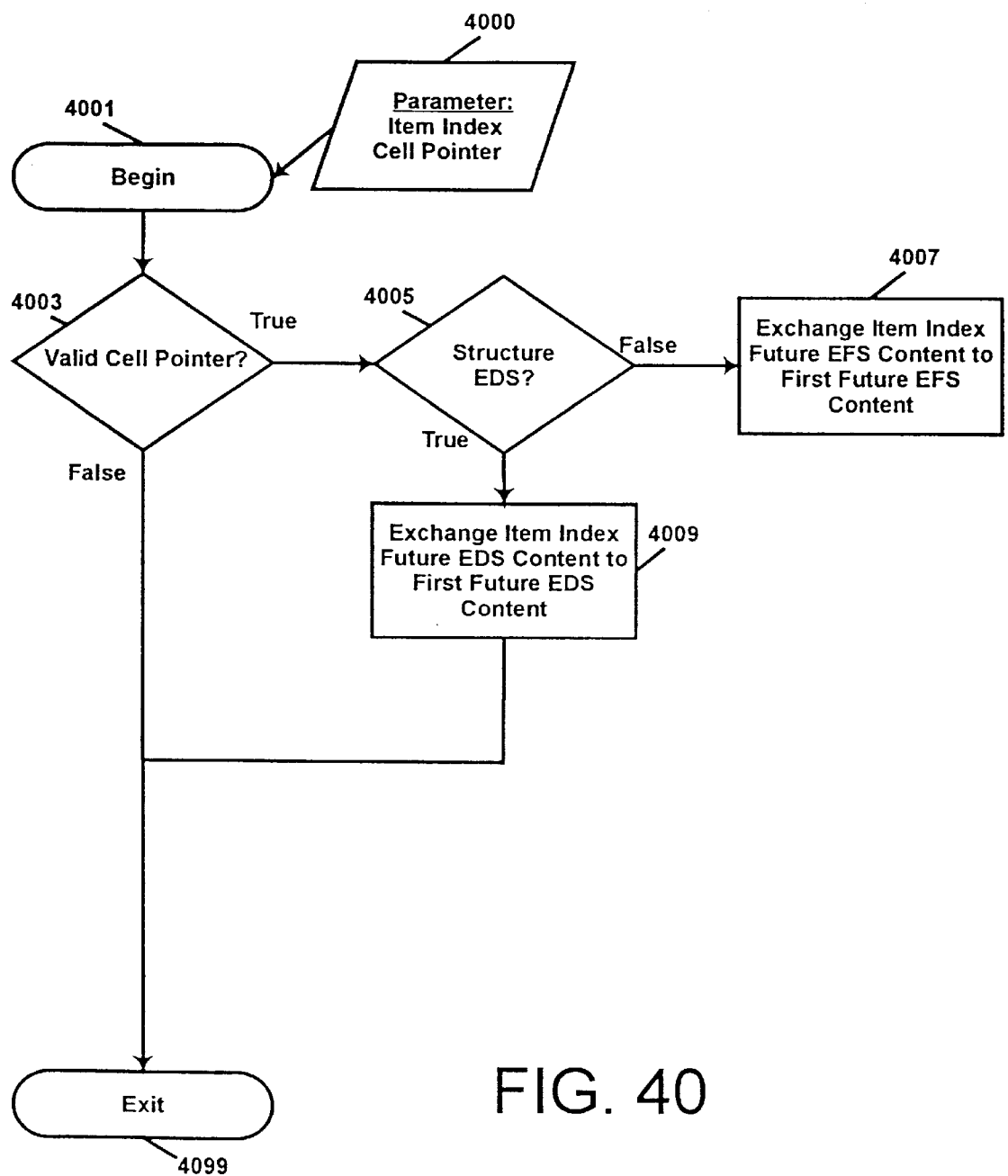
FIG. 40 is a flow diagram of an interactive targeting procedure for the selection of a target cell at runtime.

The flow diagram of FIG. 40 is an interactive select impact cell procedure. It is passed a pointer to a cell and an item index 2900 as parameters. The interactive dialog that triggers this operation displays a drop-down list box that contains the contents of the cell's permutation control. For single impact type cells, i.e., interactive impact cells, the first future content of the permutation control is the current target cell for model permutation. The selection of the future cell content form the list box display sets the item index which is passed to this operation. This index is then used to reorder the contents of the permutation control. Thus, the procedure of FIG. 40 reorders the contents of the cell's permutation control and the reordered contents are used as the run-time permutation operations continue.

The procedure begins via a terminal block 4001. A first test is made in decision block 4003 to determine if a valid cell pointer has been passed. If not valid, processing exits via terminal block 4099. If a valid cell pointer has been obtained a next decision block 4006 routes processing to process block 4009 if the current structure index for the. cell is of the EDS (vertical) type format and to process block 4007 if the current structure index is the EFS (horizontal) type format.

The operation of process blocks 4007 and 4009 each perform the same operation, they exchange the index item of the permutation control with the first position of the permutation control. Since the first position is used to target the next cell in a permutation event, this action has the effect of re-targeting or reordering the permutation sequence. The procedure then exits via terminal block 4099.

Figure 41:
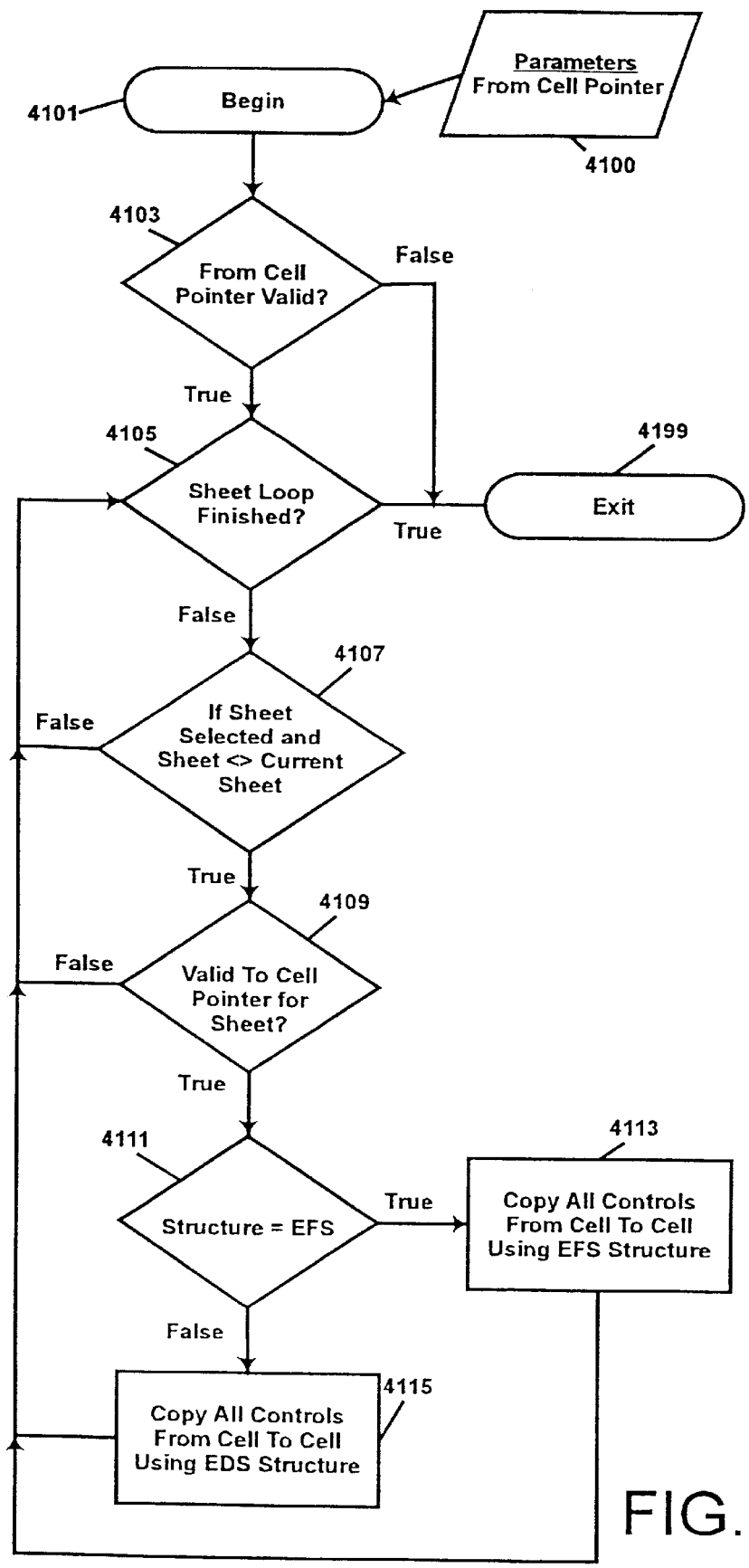
FIG. 41 is a flow diagram of a copy cell to many sheets operation.

FIG. 41 is a flow diagram of a copy cell to many sheets operation. When multiple sheets are selected, edits to a visible cell are automatically copied to the invisible cells. This procedure is passed a cell pointer 4100 as a parameter. The cell pointer is to the edited cell in its final form. A first test in decision block 4103 validates the cell pointer. If it is not valid processing terminates via terminal block 4199.

If the from cell pointer is valid a next sheet loop decision block 4105 repeats the copy operation for each selected sheet. If the last sheet has been processed the processing terminates via terminal block 4199. If the current sheet index requires processing a next decision block 4107 tests if the sheet is selected and if the sheet is not the from sheet, or current visible sheet. If the sheet is not selected or if it is the visible sheet processing returns to the sheet loop decision block 4015 and the next sheet is evaluated.

If the sheet is selected and it is not the current visible sheet then a next test is performed in decision block 4109 to obtain a valid cell pointer to the cell on the invisible selected sheet that corresponds with the cell on the visible sheet. If an invalid pointer is found then processing returns to the sheet control loop of decision block 4105. If a valid to cell pointer is obtained then a next decision block 4111 routes processing to process block 4113 for the EFS (horizontal) storage format or to process block 4115 for the EDS (vertical) storage format. The process blocks 4113 and 4115 perform the same operation, only using a different storage format. They copy all of the control contents, i.e., the permutation, constraint and original state controls, and the reset, structure, and operating mode properties, from the from cell to the to cell. When these process blocks are completed control returns to the sheet loop of decision block 4105.

The operation of FIG. 41 copies the visible cell contents to the invisible cell contents on every selected sheet until the sheet loop of decision block 4105 is complete and then processing exits via terminal block 4199.

The flow diagrams of FIGS. 42A–42E are a drag-drop operation for moving cell contents using the cursor control. The mouse-down event is first shown in FIG. 42A. When the user presses the left mouse button the mouse down event is triggered via terminal block 4201. In process block 4203, the current cell selection is recorded in a beginning range variable stored in the component. The operation then exits via terminal block 4205. The beginning range selection is latter used in comparison to the ending range of FIG. 42B to determine if a move event has occurred.

When the left mouse button is released, the mouse-up event is entered via terminal block 4207 and the ending range is recorded in process block 4209. Then the process exits via terminal block 4211. The beginning and ending cell ranges are stored each time the mouse-down and mouse-up events occur.

Figure 42A:
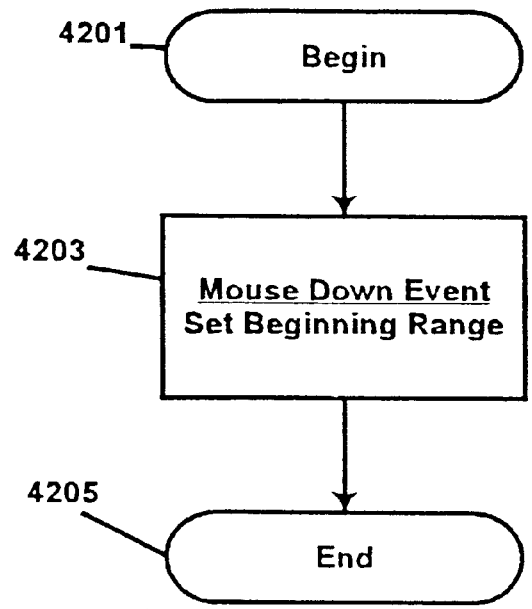
FIGS. 42A–42E are a flow diagram of a drag-drop operation for moving or copying cell contents.
Figure 42B:
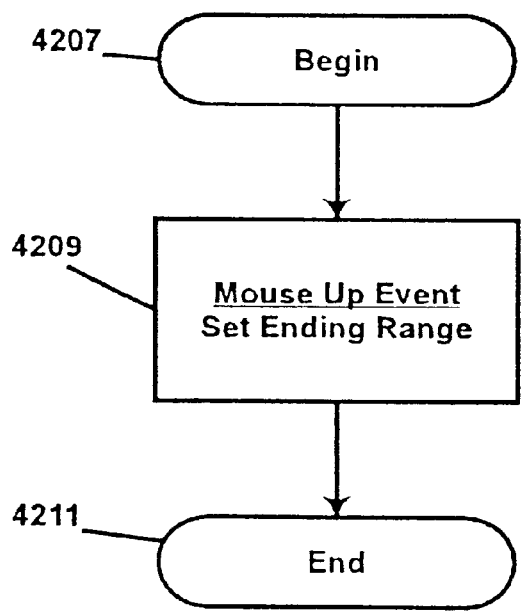
Figure 42C:
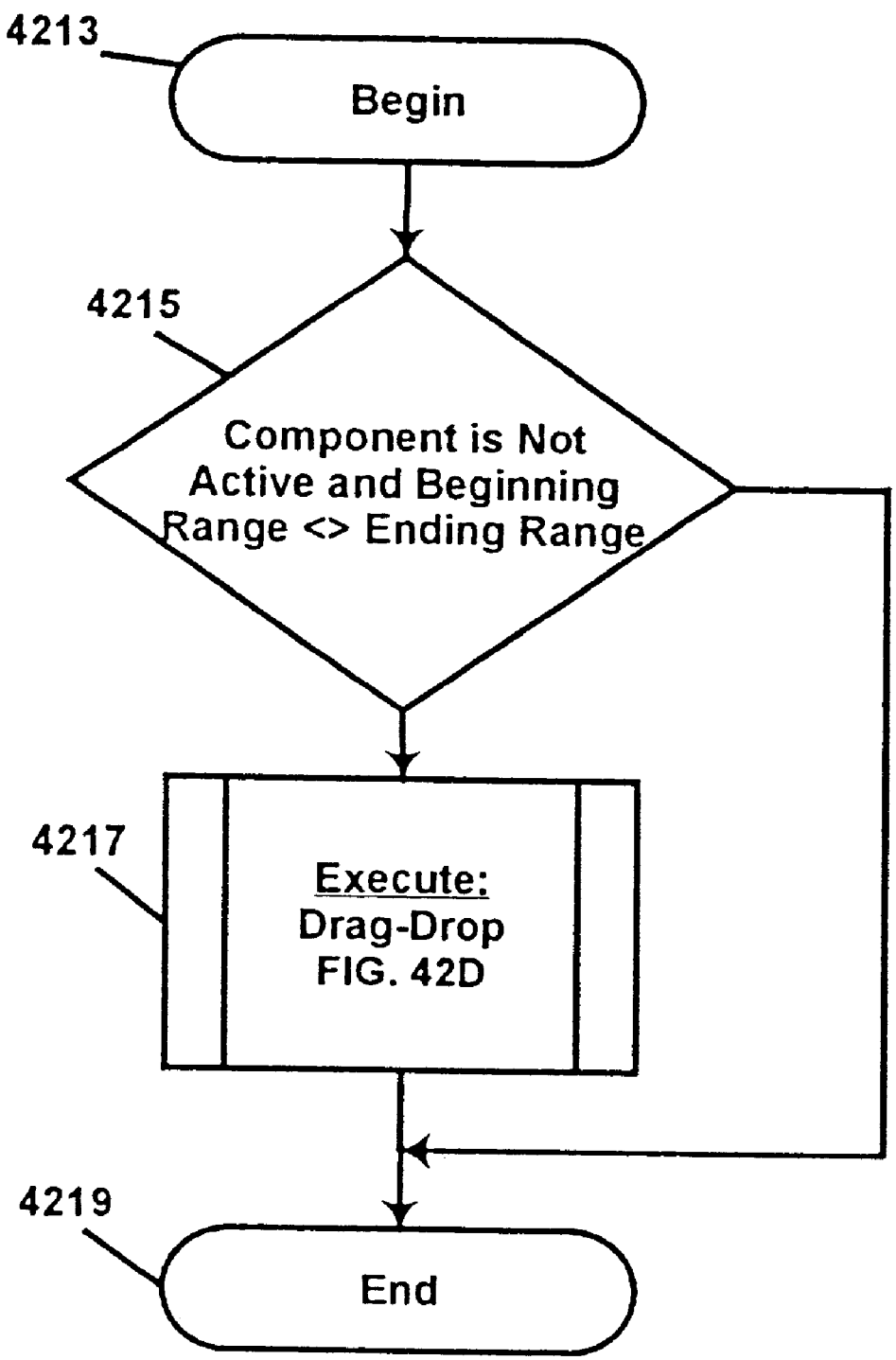
Figure 42D:
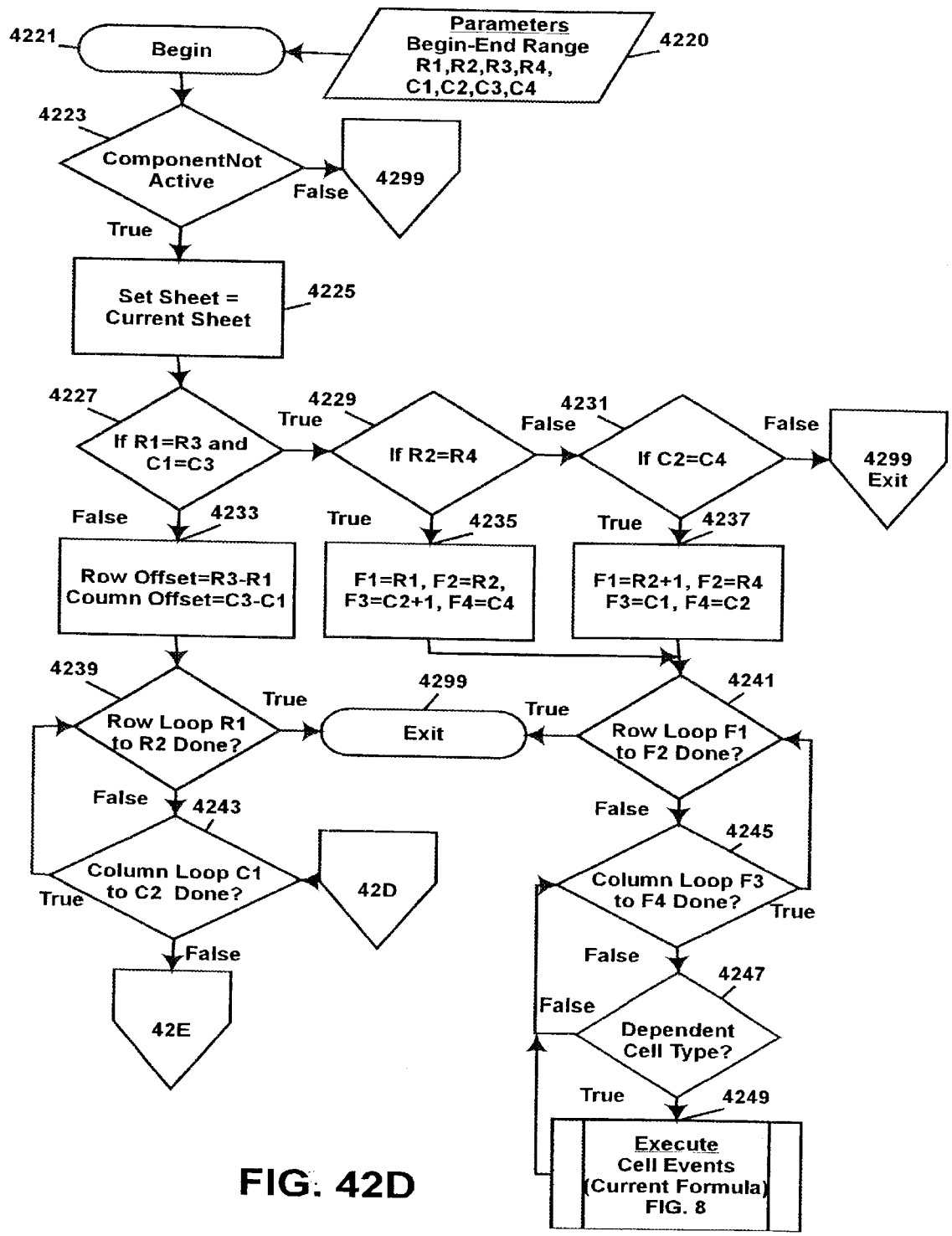
Figure 42E:
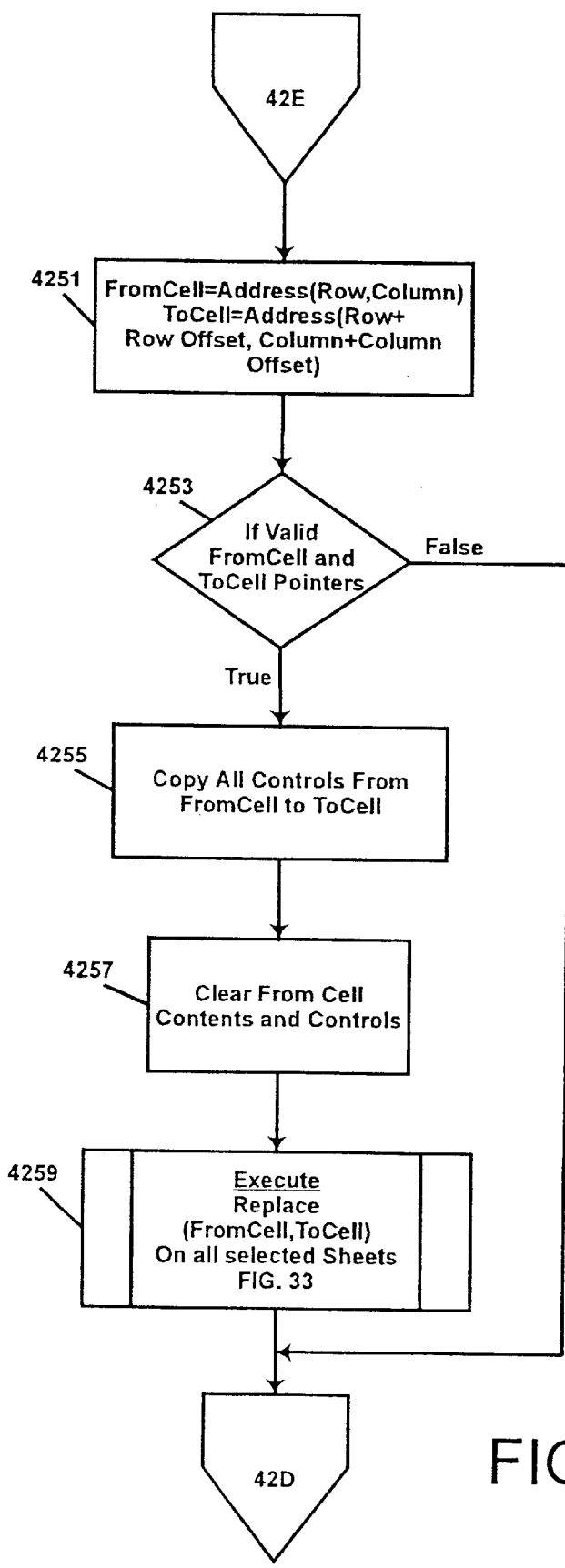

When the recalculate event of FIG. 42C occurs, the drag-drop event will be conditionally triggered based upon the value in the beginning and ending cell ranges from the mouse-down and mouse-up events. The process of FIG. 42C is entered via a terminal block 4213. In decision block 4215 a test is made to determine if the component is already processing other activities and if the beginning cell range and the ending cell range from the mouse events are unequal. If the component is active or the cell ranges are equal the process exits via terminal block 4219. If the component is not active and the cell ranges are not equal an execution block 4217 executes the drag-drop operation of FIG. 42D.

The drag-drop operation will copy or move cell contents based upon the beginning and ending cell ranges. The drag-drop operation of FIG. 42D enters via terminal block 4221 and it is passed the row and column selections for the beginning and ending cell ranges as parameters 4220, R1, F2, R3, R4, C1, C2, C3, C4.

In a decision block 4223 the operation confirms that the component is not already active with other processing. If it is, processing exits via connector 4299 to the terminal block 4299. If the component is not active then a sheet index variable is set equal to the current sheet number in process block 4225.

The decision block 4227 compares the beginning row to the ending row and the beginning column to the ending column. If the beginning cell selections are equal then processing is routed to decision block 4229. If the beginning last row (R2) is equal to the ending last row (R4) in decision block 4229 then the process block 4235 sets the from to range for the subsequent operations, setting a from row and to row (F1, F2) and a from column and to column (F3, F4) set of variables to control the row and column loop that is then activated in decision blocks 4241 and 4245. If the last beginning cell row and the last ending cell row are not equal in decision block 4229 the next decision block 4231 compares the last beginning column to the last ending column. If the columns are equal then a process block 4237 sets the set of local variables (F1, F2, F3, and F4) to control the range of cells that will be operated upon in the row loop of decision block 4241 and the column loop of decision block 4245. If the conditions of decision block 4229 or 4231 are not met an error has occurred and the process exits via connector 4299 to the terminal block 4299.

The decision blocks 4241 and 4245 are a row and column loop that repeat until the last cell in the selected range has been processed. They lead to decision block 4247 where a cell type test is performed. If the cell type for the current row and column index is a dependent type in decision block 4247 then the execution block 4249 executes the cell event operation of FIG. 8. The cell event processor takes the cell current formula as input and will result in the generation of new future cell content in the permutation control's future positions. The process then continues via the column loop of decision block 4245 to the next cell until all columns and all rows in decision blocks 4245 and 4241 respectively are completed. The process then exits via terminal block 4299.

When the decision block 4227 indicates that the beginning cell R1, C1 is not equal to the ending cell R3, C3, a process block 4233 calculates the row offset (row offset= R3–R1) and the column offset (column offset=C3–C1). Then a row loop of decision block 4239 and a column loop of decision block 4243 perform the process of FIG. 42E for each cell address in the range of row R1 to row R2 and column C1 to column C2.

The process block 4251 sets a from-cell local string variable equal to the cell address for the current row, column index of the row loop 4239 and column loop 4243. It also sets a to-cell address adjusting for the offset by row and column, i.e., to-cell=address(row+row offset, column–column offset). Decision block 4253 insures that the cell addresses are valid. If they are not, then the process returns control to the column loop of decision block 4243 via off page connector 42D. If the cells are valid then in process block 4255 the entire contents of the from-cell are copied to the to-cell including the permutation, constraint, and original state controls. In process block 4257 the from cell is cleared of all contents. Thus this branch of the processor represents a drag-move operation. The from-cell is deleted and the to-cell is updated. Then in execution block 4259 the replace operation of FIG. 33 is executed. The replace operation of FIG. 33 is passed the current from-cell and to-cell addresses. It is executed for every selected sheet. It replaces all from-cell references with to-cell references in the to-cell's permutation, constraint and original state controls. When the replace processor of FIG. 33 is completed, control returns via off page connector 42D to the column loop decision block 4243.

When every cell in the range of selected cells in the column loop 4243 and the row loop 4239 are completed the drag-drop processor exits via terminal block 4299. Thus, the drag-drop processor has two primary functions. First, it can copy cell contents while leaving the original contents intact. Second, it can move cell contents, clearing the previous cell locations and adjusting the relative cell address references in the to-cell locations. The relative cell address references are maintained in the entire contents of the cells over the entire model. This includes the permutation control, the constraint control, and the original state control.

In summary, then, the mouse-down and mouse-up events of FIGS. 42A and 42B set a beginning and ending range of selected cells. The end-recalculate event of FIG. 42C performs a test in decision block 4215 that will conditionally execute the drag-drop processor of FIG. 42D. The drag-drop processor is able to respond to the user actions of the drag-copy and drag-move events. When cells are moved it maintains the relative cell address references within the moved cells and over the entire model. When cells are copied, it generates the appropriate future permutation control contents to support polymorphic operation of the new cell contents.

Figure 43:
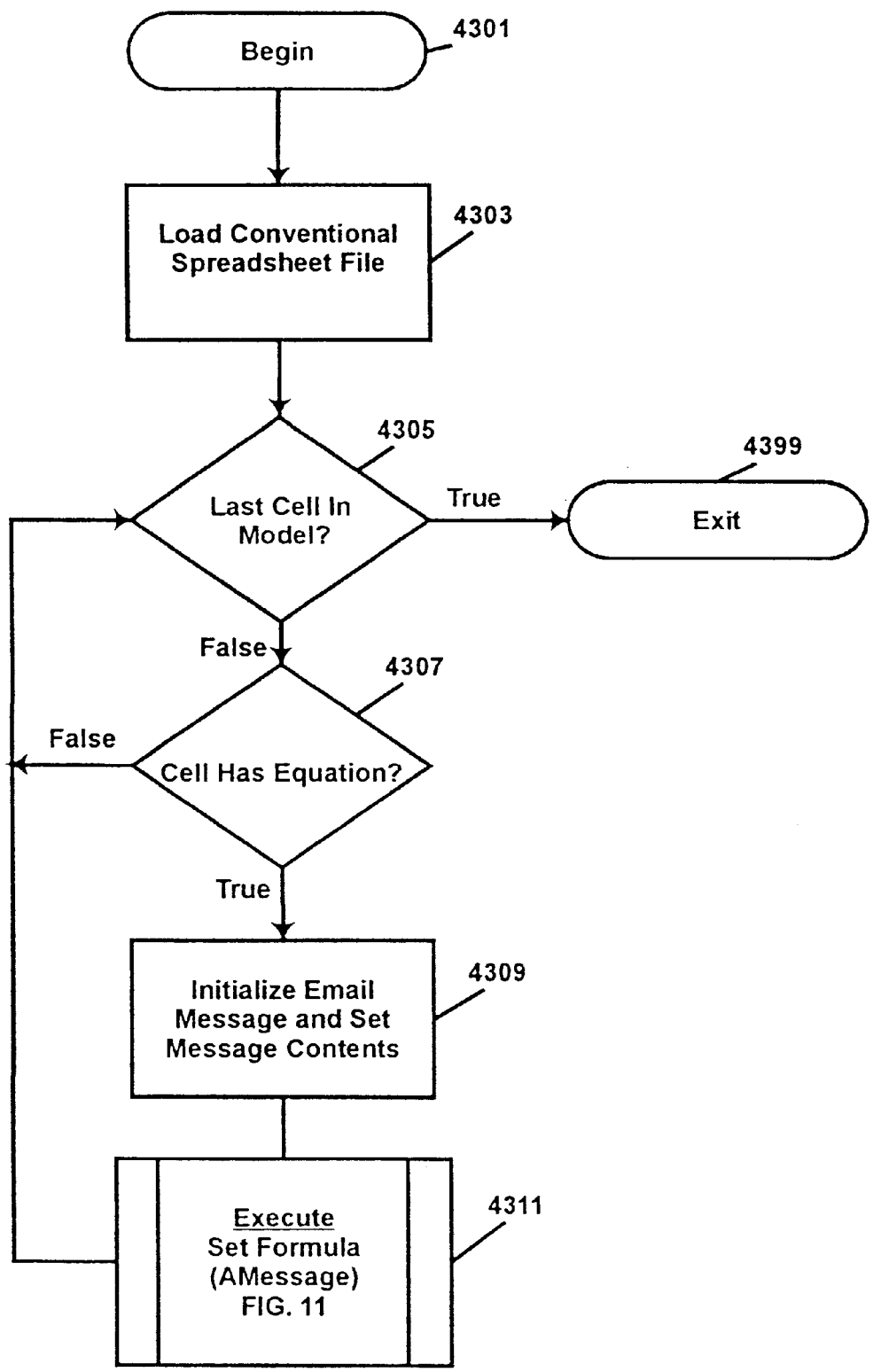
FIG. 43 is a flow diagram of a convert processor for converting a conventional spreadsheet file into a polymorphic spreadsheet.

The flow diagram of FIG. 43 is a processor to convert a conventional spreadsheet file into a polymorphic spreadsheet. It enters via a terminal block 4301. In a process block 4303, a conventional spreadsheet file format is retrieved or loaded from disk into computer memory. A processing loop decision block 4305 tests if the last model cell has been converted into a polymorphic cell. For every cell in the model, the current content retrieved from the conventional spreadsheet file is passed through decision block 4307. If the cell content is an equation then the process block 4309 initializes an instance of the email message format. It sets the from and to cell pointers to the current cell. It sets the contents of the message equal to the current cell formula. It sets the contents type to the formula type. The message is now ready to be sent via execution block 4311 to the set formula processor of FIG. 11. In this way, each formula cell's permutation control is updated to the appropriate current and future contents. The user may be prompted by the new formula operation of FIG. 11 for information to finalize the permutation control. When every cell has been processed, as determined in decision block 4305, the operation exits via a terminal block 4399.

Thus, the file conversion processor of FIG. 43 loads a conventional spreadsheet file into memory, and. then operates on every cell and in particular the equation cells, to establish the polymorphic content of the cells using the callable interface of the invention, i.e., using the set formula event processor of FIG. 11. The result is a conversion of a current-art spreadsheet, into a polymorphic spreadsheet.

Figure 44:
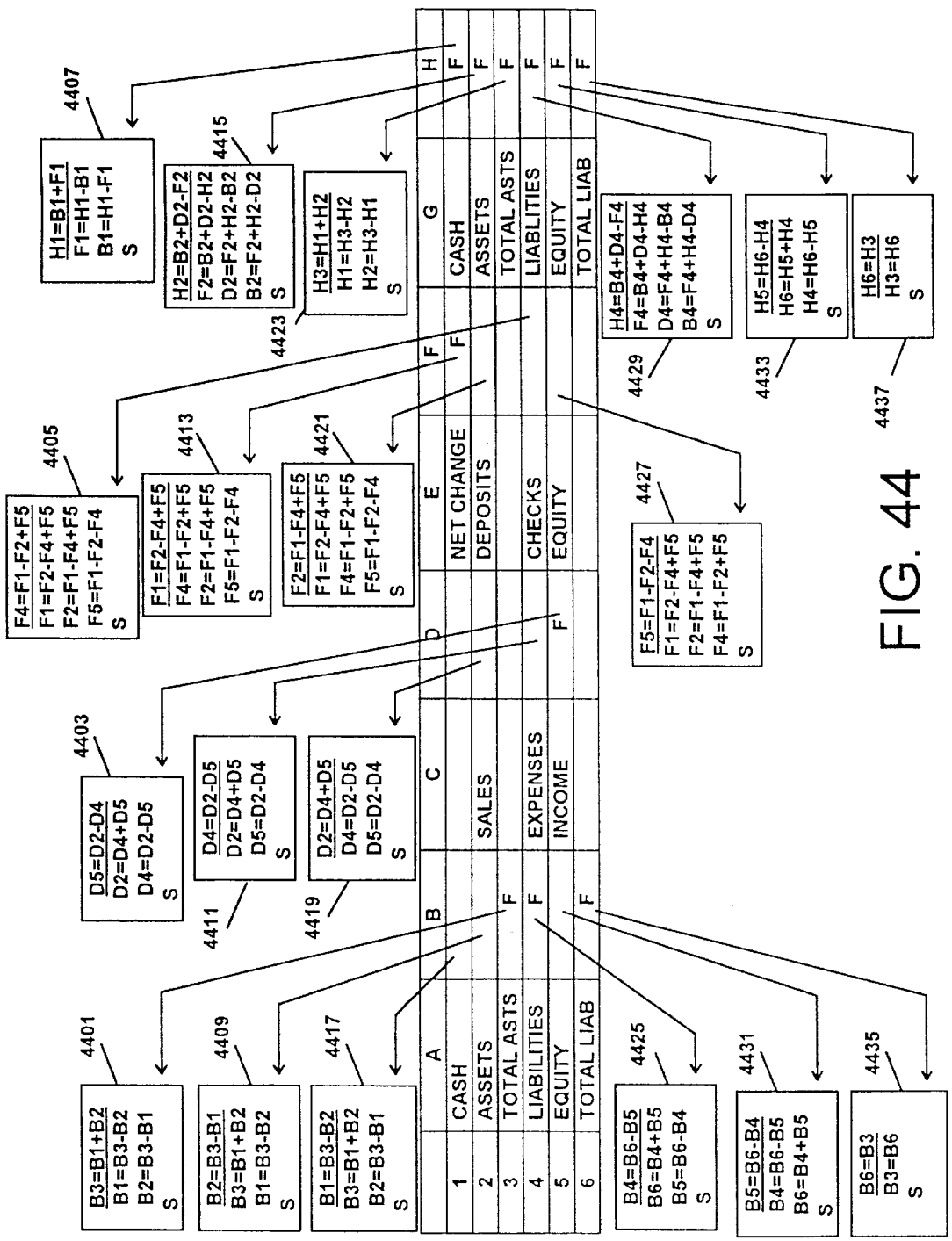
FIG. 44 is a screen bitmap of an example polymorphic financial model.

FIG. 44 is a screen bitmap of an example financial model that illustrates how a single model with eleven dependent formula cells and eight independent input cells can be transformed into more than ninety meaningful formats, without the need for any additional formula entries by the user.

The model consists of a beginning balance sheet, an income statement, a check book statement, and an ending balance sheet.

The beginning and ending balance sheet accounts are cash, assets, total assets, liabilities, equity, and total liabilities. The income statement accounts are sales, expenses and income. The check book accounts are deposits.

On the beginning balance sheet, the user enters an equation into cells B3 (B3B1+B2), 4401, B4 (B4=B6−B5) 4425, and B6 (B6=B3), 4435. The set formula operation of FIG. 11 generates the current and future content of the permutation control as shown in blocks 4401, 4425, and 4435. Each of these cells represents a single impact permutation type. For example, the user can target either cell B1 or B2 with an entry made to cell B3, 4401. The model permutation that would occur for each of these entries, respectively, are shown in blocks 4409 and 4417. In a similar fashion, an entry into cell B4 can target cells B6 or B5. An entry that affects cell B5 will result in the permutation control contents of block 4431. An entry that affects cell B6 will in turn trigger a permutation of cell B3 because cell B6, 4435, contains a valid permutation control in the first future position (B3=B6). A change to cell B3, 4401 will in its turn affect a change to cell B1 since cell B1 is the first future position in the permutation control of cell B3. Since cell B1 is an independent cell with no permutation control the chain reaction of this example ends at cell B1.

There are six alternative computational formats that are automatically available for the beginning balance sheet based upon the three independent input cells and three dependent formula cells initially entered by the user.

The same principles apply to the income statement. A dependent formula is entered into cell D5 (D5=D2−D4) 4403. An impact event of a value entered into cell D5 can target either cell D2 or cell D4. The permuted cell permutation control content for cell D2 or D4 is shown in blocks 4419 and 4411 respectively. Thus, there are three alternate formats for the income statement.

In combination, then, there are six beginning balance sheet models and three income statement models that result in eighteen possible model formats. Just four formulas have been entered up to this point in cells B3, B4, B6, and D5, while the potential number of model formats available is already more than four times the number of formulas entered, i.e., four formulas and eighteen model formats.

A similar analysis of the check book indicates that a dependent formula is entered into cell F1 (F1=F2−F4+F5), 4413. An impact event of a value on cell F1 can be selectively targeted by the user to cells F2, 4421, F4, 4405, or F5, 4427, each block containing the permutation control contents that would result from such an event. There are, therefore, four alternate model formats for the check book statement. In combination with six beginning balance sheet formats, and three income statement formats, and four check book formats, there are now seventy two (72) alternate model formats while only five (5) dependent cell formulas have been entered by the user. All seventy two alternatives are automatically selectable.

To complete the example model, an ending balance sheet is entered by the user. Six dependent formulas are entered into the six ending balance sheet accounts. The permutation control contents for each cell is shown for the cash account in cell H1 in block 4407, for the assets account in cell H2 in block 4415, for the total assets account in cell H3 in block 4423, for the liabilities account in cell H4 in block 4429, for the equity account in cell H5 in block 4433, and for the total liabilities account in cell H6 in block 4437.

The permutation control for each cell contains between one and three cells that can be selected as the target for that particular cell's permutation event. When these individual directional decisions interact in combination, i.e., in a chain reaction, there are more than seven alternate model formats that can result while targeting just the current first future content of the permutation control. For example, cell H2, the assets account 4415, is currently targeted in the permutation control at cell F2, or the deposits account on the check book statement. If the permutation control target were changed by the user, using the targeting processor of FIG. 40, to the next future entry, then cell D2 (sales) on the income statement would be permuted into a dependent type cell with a valid permutation control. There are at least thirteen additional model formats that result from the combined permutations of the first two permutation entries in each cell on the ending balance sheet. Add these to the seventy two combinations already mentioned above and there are at least eighty five (85) equally valid model forms. There are more than 100 possible model forms when one explores all of the possible targeting options that are available to the user.

At this juncture, the model is complete. The user has entered a total of eleven (11) dependent cell formulas and eight (8) independent or input type cells (values). There is a one-to-many relationship that leverages the work done by the user of a factor of at least eighty to one or even one hundred to one, i.e., the user enters eleven (11) equations that represent a single model form and there are more than eighty five alternate model forms that are instantaneously available. Thus, the single model, as entered by the user, can become more than eighty five equally valid model formats via the polymorphic operations of the invention.

The disclosed invention makes it possible for a single set of data to be operated upon by more than one model and for a single user entered model to take on more than one computational form. It makes possible the selection among alternative models to be made based upon the edit field that is entered. That is, the invention enables context-sensitive modeling (case sensitive modeling). Thus, depending on the edit field entered, the invention selects from the available models a version that will allow data to be entered into the current cell.

Furthermore, the disclosed invention supplies the ability to select the default model to be used for each edit field at the time the system is defined and also to provide an option for the user to be prompted at run time to make a selection from the alternative models available. The system is able to derive and to store multiple models, to store a default model selection for each edit field, to store a reminder to prompt the user for a model selection when data is entered into an edit field at run time, and to present a list of alternative models for selection by the user at run time.

It also provides model selection from other system controls other than edit of a single edit field. Every edit field in the entire system is capable of accepting data and selecting among alternative models for the completion of computations as well as able to apply multiple models to a single set of data present in both multidimensional modeling and in spreadsheet applications. Therefore, this invention includes the capability for formula-based operations based on both English language rules and cell address based rules.

In the spreadsheet embodiment, the term cell replaces the term edit field. Therefore, edit field could be described as cells in a spreadsheet or as edit fields in the display screen of a multidimensional modeling application, e.g., financial modeling environment.

The display of a value in a rectangular area on the display screen is an identical function within each of the following: the multidimensional model, relational database management field and a spreadsheet cell, i.e., a cell as presented on the display screen is equivalent to an edit field.

The formulas in a financial model are most often expressed as English language rules applied to variables, periods, or dimensions. The formulas in a spreadsheet model are most often expressed as a function of cell addresses such as A1*A2. While the syntax of the formulas is somewhat different, the function is the same and includes the ability to apply multiple formula sets or models to a single set of data equally in both environments.

The system is, therefore, a context-sensitive modeling environment capable of applying multiple formula sets to a single set of data in whatever presentation format the user is currently working, whether it is an edit field in a modeling environment or a cell in a spreadsheet.

The salient features include an enhanced cell data structure that can accommodate more than one cell in computer memory for each display cell shown on the display screen, the ability to store a default action for every variable or edit field or cell during the design or edit phase of model building, the ability to remind the user to make a selection at run-time, and the ability to present a list of alternatives at run-time and select from that list the desired behavior.

In the context of the following examples using the ROA, PM, ATR, Sales, Net Income and Assets, a context-sensitive model capable of applying more than one model to a single set of data makes it feasible to solve for every possible calculation combination that exists for these six variables. An extension of this approach makes it possible to build a model capable of solving for every possible calculation combination with a large number of variables, even 5000 or more. The potential power for problem solving that this represents is significant. This model can be built in either a spreadsheet or a financial modeling format.

ATR is an abbreviation for asset turnover rate. Asset turnover is the ratio of sales to assets. This relationship can be expressed as the formula: ATR=sales/assets PM is an abbreviation for profit margin. Profit margin is the ratio of net income to sales. This relationship can be expressed as the formula: PM=net income/sales ROA is an abbreviation for return on assets. Return on assets is a ratio resulting from two component parts, the asset turnover rate multiplied by the profit margin. This relationship can be expressed by the formula: ROA= ATR*PM Given the values of sales, assets and net income it is possible to calculate each of these three ratios, ATR, PM, and ROA using the model rules. To enter a value for ROA and solve for PM, however, it is necessary to change the model. ROA will now be an input value and PM is solved for. The new rule is: PM=ROA/ATR In addition, since PM will be changed as a result of the new ROA value, either sales or income must be changed. To change sales the new formula for sales is: Sales=Net Income/PM.

If model number 1 is hard coded in a spreadsheet model, it would be necessary to write a second model to accomplish this second set of calculations. It would also require a means for changing from one set of model rules to another to accomplish a new set of results while operating on the same set of data. This cannot be accomplished in the current art spreadsheet.

These two sets of model rules are not the only possible combinations. Eighteen possible model structures are listed below that combine these six variables. The important consideration in this discussion is the requirement for one set of data to be operated upon by more than just one model to accomplish all eighteen of the possible permutations described, the model in this example being a collection of three input variables and three formula variables.

Examples of the procedures possible using the invention as described in detail above are as follows.

1. Enter values for sales, assets and income. Then enter three formula cells:
   ATR=Sales/Assets
   PM=Income/Assets
   ROA=ATR*PM
2. Set PM impact cell to sales, set ROA impact cell to PM. Enter a value into ROA. The permutated model consists of these three formula cells, the remaining three cells are input cells:
   ATR=Sales/Assets
   PM=Income/Assets
   Sales=Income/PM
3. Enter a value into sales, set impact cell to income. The permutated model consists of these three formula cells, the remaining three cells are input cells:
   ATR=Sales/Assets
   PM=Income/Sales
   Income=Sales*PM
4. Enter PM, impact cell ROA. The permutated model consists of these three formula cells, the remaining three cells are input cells:
   ATR=Sales/Assets
   Income=Sales*PM
   ROA=PM*ATR
5. Enter income, impact cell sales. The permutated model consists of these three formula cells, the remaining three cells are input cells:
   ATR=Sales/Assets
   ROA=PM*ATR
   Sales=Income/PM
6. Enter ATR, impact cell assets. The permutated model consists of these three formula cells, the remaining three cells are input cells:
   ROA=PM*ATR
   Sales=Income/PM
   Assets=Sales/ATR
7. Enter ROA, impact cell PM. The permutated model consists of these three formula cells, the remaining three cells are input cells:
   Sales=Income/PM
   Assets=Sales/ATR
   PM=ROA/ATR
8. Enter PM, impact cell ATR. The permutated model consists of these three formula cells, the remaining three cells are input cells:
   Sales=Income/PM
   Assets=Sales/ATR
   ATR=ROA/PM
9. Enter sales, impact cell income. The permutated model consists of these three formula cells, the remaining three cells are input cells:
   Assets=Sales/ATR
   ATR=ROA/PM
   Income=Sales*PM
10. Enter ATR, impact cell PM. The permutated model consists of these three formula cells, the remaining three cells are input cells:
    Assets=Sales/ATR
    Income=Sales*PM
    PM=ROA/ATR
11. Enter PM, impact cell ROA. The permutated model consists of these three formula cells, the remaining three cells are input cells:
    Assets=Sales/ATR
    Income=Sales*PM
    ROA=ATR*PM
12. Enter income, impact cell PM. The permutated model consists of these three formula cells, the remaining three cells are input cells:
    Assets=Sales/ATR
    ROA=ATR*PM
    PM=Income/Sales
13. Enter assets, impact cell sales. The permutated model consists of these three formula cells, the remaining three cells are input cells:
    ROA=ATR*PM
    PM=Income/Sales
    Sales=Income/PM
14. Enter PM, impact cell income. The permutated model consists of these three formula cells, the remaining three cells are input cells:
    ROA=ATR*PM
    Sales=Assets*ATR
    Income=PM*Sales
15. Enter ROA, impact cell ATR. The permutated model consists of these three formula cells, the remaining three cells are input cells:
    Sales=Assets*ATR
    Income=PM*Sales
    ATR=ROA/PM
16. Enter ATR, impact cell PM. The permutated model consists of these three formula cells:
    Sales=Assets*ATR
    Income=PM*Sales
    PM=ROA/ATR
17. Enter sales, impact cell ATR. The permutated model consists of these three formula cells, the remaining three cells are input cells:
    Income=PM*Sales
    PM=ROA/ATR
    ATR=Sales/Assets
18. Undo the model to original formulas. Enter ATR impact cell assets. Enter ROA impact cell ATR. The permutated model consist of these three formula cells, the remaining three cells are input cells:
    Assets=Sales/ATR
    PM=ROA/ATR
    ROA=ATR*PM The object of the polymorphic spreadsheet is to generate alternative model formats thereby leveraging the productivity of the user, i.e., from one user defined model, into a plurality of alternate model formats. While various outcomes are possible, the primary emphasis is on the generation of the alternate model forms, rather than upon the generation of alternative outcomes. Scenario management and multiple versions are commonplace, however, the polymorphic spreadsheet delivers a one-to-many productivity gain to users on the order of magnitude illustrated above, i.e., as much as eighty five to one, or even one hundred to one, for even the most simple models (i.e., a simple eleven equation and eight input model). The potential productivity gain for even larger models is inestimable and perhaps immeasurable. Whether the plurality of model forms result from automatic, system generated cellular permutations, or from user entered permutation contents, the productivity gains and the analytical gains of the polymorphic spreadsheet of the present invention are significant.

While the above example is given for ease of understanding, i.e., simple accounting problems, the invention is of great use for complex engineering models providing capability of altering model parameters to investigate alternative designs to optimize such designs for safety purposes, environmental purposes, cost purposes, maintenance purposes, and reliability purposes. The analytical gains from such use are evident.

While the invention has been particularly shown and described with reference to a preferred embodiment thereof, it will be understood by those skilled in the art that various changes and modifications in form and details may be made therein without departing from the spirit and scope of the invention according to the following claims.

What is claimed:

1. A machine-implemented permutation method for polymorphic modeling operations utilizing computer elements including display and memory with the capability of permuting a current model, said method comprising:

providing a permutation control for said current model for storage in memory, wherein said permutation control includes providing a data structure for said permutation control with current content, with permutation content of one or more future contents and with a permutation control attribute that signals one of many possible types of permutation operations; and providing a permutation process for reconfiguring the current model to a new model by utilizing said permutation control.

2. A machine-implemented permutation method for polymorphic modeling operations utilizing computer elements including display and memory, said method capable of being used to build a current spreadsheet model and further having the capability of permuting said current spreadsheet model, said method comprising:

providing a permutation control for said current spreadsheet model for storage in memory, wherein said permutation control includes providing a data structure for said permutation control with current content, with permutation content of one or more future contents and with a permutation control attribute that signals one of many possible types of permutation operations; and providing a permutation process for reconfiguring the current spreadsheet model to a new spreadsheet model by utilizing said permutation control.

3. The method of claim 2 wherein said permutation process includes the capability of initiating model permutation through initiating events, said initiating events comprising allowing the entrance of a value into a node that contains a formula to trigger said permutation process; or allowing the entrance of a value into an independent impact node to trigger said permutation process; and for all initiating events, utilizing said permutation control to carry out designated changes in said current model to produce a new model thereby enabling the entrance of data into said new model to calculate results.

4. The method of claim 3 providing an enhanced standard mode of operation wherein said permutation process interactively alerts the user to said initiating events before proceeding with the permutation to allow the user options including halting the permutation process;

allowing the permutation process to proceed; and allowing the user opportunity to alter the permutation control before the permutation process commences.

5. The method of claim 2 wherein said permutation process includes the capability of enabling dynamic user selection of one or more receiver nodes wherein the selection of alternative permutation paths are user controlled for interactive permutation path decisions at run-time.

6. The method of claim 2 providing a polyversion mode of operation wherein said permutation process enables the substitution of a new model version for the current model version.

7. The method of claim 2 wherein said permutation process includes providing for display of said permutation control in a horizontal format for edit-bar interface with the user to enable editing of the permutation control and, alternatively, for display in a vertical format for an edit-list interface with the user to enable editing of the permutation control.

8. The method of claim 2 wherein said permutation process includes providing for incremental model permutations to build a succession of new models to accommodate all possible combination and permutation of form that said current model can take in order to enable the calculation of results on each new model.

9. The method of claim 2 wherein said permutation process includes providing for the maintenance of node references in the permutation control of each cell for operations that transfer or move node content including clipboard operations, multiple sheet selections, drag-copy and drag-move operations, insertions or deletions of node(s), row(s), column(s) and sheets and the renaming of model components.

10. The method of claim 2 including a component form with a callable public interface, said method providing for user callable interface routines that interface with the data structure of the component's nodes to provide polymorphic operation to the component form.

11. The method of claim 2 further providing message enabled nodes capable of communicating with other nodes including nodes at remote sites, composing and sending, receiving and processing messages, said method providing for the generation of permutations locally or at remote locations in accordance with the message.

12. The method of claim 2 which further includes providing for an independent impact node with a permutation control attribute in its data structure which signifies an impact operation and with permutation control that is passed to one or more receiver nodes when a value is entered into the independent impact node.

13. The method of claim 2 which further includes providing for a dependent node with a permutation control attribute in its data structure signifying an impact operation with permutation control that is passed to one or more receiver nodes when a value is entered into the dependent node.

14. The method of claim 2 wherein said permutation process includes the capability of automatically populating the future content of a dependent node from the current content.

15. The method of claim 2 wherein said permutation process includes providing for an enhanced formula syntax that enables parsing of said permutation control to obtain current content, future content and the permutation control attribute.

16. The method of claim 2 wherein said data structure includes a constraint control with a current constraint content, one or more future constraint contents and a constraint type identifier.

17. The method of claim 16
providing for user entry of constraints directly into a constraint control.

18. The method of claim 2 wherein a sequence of permutations stimulated by an impact event on an impact node includes the capability of
archiving the permutation control of said impact node;
updating the current content of said impact node in accordance with said impact event;
evaluating the archived permutation control attribute of said impact node to determine the type of permutation operation;
identifying one or more receiver nodes in accordance with the archived permutation control of said impact node;
for each identified receiver node, reorganizing the archived permutation control of said impact node to swap current and future contents; and
generating a message for each identified receiver node including the reorganized permutation control of said impact node and sending each said message to the corresponding receiver node.

19. The method of claim 18 further including the capability of
receiving said message at said corresponding receiver node;
archiving the permutation control of said corresponding node;
replacing the permutation control of said corresponding receiver node with the reorganized permutation control of said impact node contained in said message;
evaluating the permutation control attribute of the archived permutation control of said corresponding receiver node to determine the next type of permutation operation, if any;
if a further permutation is indicated, identifying one or more subsequent receiver nodes,
for each identified subsequent receiver node, reorganizing the archived permutation control of said corresponding receiver node to swap current and future contents;
sending a subsequent message including the reorganized permutation control of said corresponding receiver node to one of the identified subsequent receiver nodes and continuing the permutation operation; and
if a further permutation is not indicated, acting in accordance with said permutation control of said corresponding receiver node to either (1) signal an end to the permutation process; (2) load an indicated subroutine for execution; or (3) load an indicated new model version.

20. The method of claim 19 including the handling of a permutation loop, i.e., when the original impact node is passed the original permutation control, including
providing for recognition of the permutation loop event; and
providing for the reentry of the impact event in said impact node to trigger a second permutation process.

21. The method of claim 2 wherein the type of permutation operation indicated by said permutation control attribute includes single impact, multiple impact, and interactive.

22. The method of claim 21 wherein said permutation control attribute indicates a subroutine operation and wherein said subroutine operation may contain a permutation enabled macro in its associated data structure.

23. The method of claim 21 wherein said interactive operation further provides for
preventing a permutation;
prompting before permutation is allowed;
prompting to obtain the information needed to complete a permutation;
prompting the user to load a new model version, if desired; and
enabling dynamic user selection of one or more receiver nodes wherein the selection of alternative permutation paths are user controlled for interactive permutation path decisions at run-time.

24. The method of claim 21 further providing a multiple allocation operation as a type of multiple impact operation providing permutation to a group of nodes thereby enabling allocation of an amount among precedent nodes, including an amount which may be equal to all such nodes, a different percentage of the amount to such nodes, different amounts based upon weighting factors, or user-defined allocation amounts.

25. The method of claim 21 further including an interdependent impact node providing for grouping a plurality of nodes for maintenance of group synchronization when a change occurs in the content of any node in the group.

26. A machine-implemented permutation method for polymorphic modeling operations utilizing computer elements including display and memory, said method capable of being used to build a current spreadsheet model and further having the capability of permuting said current spreadsheet model, said method comprising:
providing a permutation control for said current spreadsheet model for storage in memory, wherein said permutation control includes providing a data structure for said permutation control with current content, with permutation content of one or more future contents and with a permutation control attribute that signals one of many possible types of permutation operations; and
providing a permutation process for reconfiguring the current spreadsheet model to a new spreadsheet model by utilizing said permutation control, wherein said permutation process includes providing for incremental model permutations to build a succession of new models to accomodate all possible combinations and permutations of form that said current model can take in order to enable the calculation of results on each new model, and wherein said permutation process further includes providing for the undoing of permutations made to the model by providing for undo options including reset after change, reset to original model, and incremental undo of changes to retrace steps.

* * * * *